(12) United States Patent
Sugiyama et al.

(10) Patent No.: US 8,049,850 B2
(45) Date of Patent: Nov. 1, 2011

(54) LIQUID CRYSTAL DISPLAY DEVICE, OPTICAL COMPENSATORY SHEET, AND POLARIZER AND LIQUID CRYSTAL DISPLAY DEVICE EMPLOYING THE SAME

(75) Inventors: Susumu Sugiyama, Minami-ashigara (JP); Eiichiro Aminaka, Minami-ashigara (JP); Hajime Nakayama, Minami-ashigara (JP); Yukito Saitoh, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 460 days.

(21) Appl. No.: 11/794,355

(22) PCT Filed: Dec. 28, 2005

(86) PCT No.: PCT/JP2005/024262
§ 371 (c)(1),
(2), (4) Date: Jun. 28, 2007

(87) PCT Pub. No.: WO2006/070936
PCT Pub. Date: Jul. 6, 2006

(65) Prior Publication Data
US 2009/0122243 A1    May 14, 2009

(30) Foreign Application Priority Data

Dec. 28, 2004 (JP) ................. 2004-378873
Jan. 20, 2005 (JP) ................. 2005-012674
Feb. 10, 2005 (JP) ................. 2005-035012

(51) Int. Cl.
*G02F 1/1335* (2006.01)
(52) U.S. Cl. ......... 349/118; 349/117; 349/119; 349/120
(58) Field of Classification Search .............. 349/96, 349/117–121
See application file for complete search history.

(56) References Cited

U.S. PATENT DOCUMENTS
6,281,956 B1    8/2001   Ohmuro et al.
(Continued)

FOREIGN PATENT DOCUMENTS
JP         7-278324 A       10/1995
(Continued)

OTHER PUBLICATIONS

Office Action dated Jun. 15, 2010, issued in corresponding Japanese Patent Application No. JP 2005-035012, and an English translation thereof.

(Continued)

*Primary Examiner* — David Nelms
*Assistant Examiner* — David Chung
(74) *Attorney, Agent, or Firm* — Buchanan Ingersoll & Rooney PC

(57) ABSTRACT

A liquid crystal display device comprising a liquid crystal panel in which liquid crystals having negative dielectric anisotropy are interposed between upper substrate and lower substrate that have been vertically oriented on the surface, the orientation of the liquid crystals being almost vertical with no applied voltage, almost horizontal when a predetermined voltage is applied, and tilted when a smaller voltage than the predetermined voltage is applied; a first polarizer and a second polarizer disposed on both sides of the liquid crystal panel such that the absorption axes of the polarizers are perpendicular to each other; a first retardation film disposed between the liquid crystal panel and the first polarizer; and a second retardation film disposed between the liquid crystal panel and the second polarizer, wherein the polarizer comprises a polarizing film and a pair of protective films having the polarizing film in between, and wherein at least one of the protective films is a cellulose acylate film satisfying:

$0 \leq Re_{(630)} \leq 10$ and $|Rth_{(630)}| \leq 25$.

6 Claims, 6 Drawing Sheets

U.S. PATENT DOCUMENTS

| | | | | |
|---|---|---|---|---|
| 6,922,222 B2 * | 7/2005 | Miyachi et al. | | 349/118 |
| 7,153,547 B2 * | 12/2006 | Nishikouji et al. | | 428/1.1 |
| 7,153,552 B2 * | 12/2006 | Kubo et al. | | 428/1.31 |
| 2003/0096093 A1 * | 5/2003 | Sakamaki | | 428/220 |

FOREIGN PATENT DOCUMENTS

| | | | |
|---|---|---|---|
| JP | 2001-247717 A | 9/2001 |
| JP | 2003-14933 A | 1/2003 |
| JP | 2004-148811 A | 5/2004 |
| JP | 2004-271695 A | 9/2004 |
| JP | 2004-326089 A | 11/2004 |
| JP | 2004-341494 A | 12/2004 |

OTHER PUBLICATIONS

Office Action dated Aug. 27, 2010, issued in corresponding European Patent Application No. 05824568.9.

Office Action (Notification of Reasons for Rejection) dated Oct. 12, 2010, issued in corresponding Japanese Patent Application No. JP 2005-012674, and English translation thereof.

Office Action (Notification of Reasons for Rejection) dated Oct. 12, 2010, issued in corresponding Japanese Patent Application No. JP 2004-378873, and English translation thereof.

PCT/ISA/210, Mar. 15, 2006.

PCT/ISA/237, Mar. 15, 2006.

Office Action (Notice of Reasons for Rejection) issued on Dec. 21, 2010, in corresponding Japanese Patent Application No. 2005-035012, and English translation thereof.

Office Action ("Final Rejection") issued on Feb. 1, 2011, in corresponding Japanese Patent Application No. 2004-378873, and English translation thereof.

* cited by examiner

LIQUID CRYSTAL DISPLAY DEVICE, OPTICAL COMPENSATORY SHEET, AND POLARIZER AND LIQUID CRYSTAL DISPLAY DEVICE EMPLOYING THE SAME

TECHNICAL FIELD

The present invention relates to a liquid crystal display device having excellent display characteristics and viewing angle characteristics.

The invention also relates to an optical compensatory sheet having improved color shift when the viewing angle is tilted from the front during dark state, a polarizer employing the optical compensatory sheet, and a liquid crystal display device employing the polarizer.

BACKGROUND ART

Because of the toughness and flame retardancy, cellulose acylate films have been traditionally used for photographic supports and various optical materials. Particularly, in recent years, cellulose acylate films are frequently used as optical transparent films for liquid crystal display devices. Cellulose acylate films exhibit high optical transparency and high optical isotropy and thus, are excellent as the optical materials for devices dealing with polarization, such as liquid crystal display devices. Therefore, cellulose acylate films have been used heretofore as polarizer protective films, or as supports for optical compensatory films whereby display viewed from a tilted direction can be improved (viewing angle compensation).

A polarizer, which is one of the elements constituting a liquid crystal display device, is constructed by bonding a polarizer protective film to at least one side of a polarizer. A polarizer in general can be obtained by staining a stretched polyvinyl alcohol (PVA) film with iodine or a dichromatic dye.

In many cases, as the polarizer protective film, cellulose acylate films, in particular, triacetyl cellulose films, which can be directly bonded to PVA are used. Such a polarizer protective film should be excellent in optical isotropy, and the characteristics of a polarizer greatly depend on the optical characteristics of the polarizer protective film.

Recent liquid crystal display devices are more strongly demanded for improvements in viewing angle characteristics. Thus, optical transparent films such as polarizer protective films or retardation films (also called optical compensatory films) are required to be more optically isotropic. For an optical film to be optically isotropic, it is important that the retardation value of the film, which is represented by the product of the birefringence and thickness of the film, is small. Especially, in order to improve the display viewed from a tilted direction, it is necessary to reduce the retardation in the front direction (Re) as well as the retardation in the thickness direction (Rth). More specifically, it is needed that upon evaluation of the optical properties of an optical transparent film, Re measured at the film front is small, and Re does not change even though the measurement angle is varied.

To the present, there have been cellulose acylate films having reduced front Re values, but it has been difficult to produce cellulose acylate films having little change of Re with the angle, that is, having small Rth. Thus, there have been suggested optical transparent films having reduced angle change for Re by using polycarbonate films or thermoplastic cycloolefin films instead of cellulose acylate films (for example, JP-A Nos. 2001-318233 and 2002-328233, products available as ZEONOR (Zeon Corp. in Japan), ARTON (JSR Corp.), etc.). However, when used as polarizer protective films, these optical transparent films have a problem in bonding to PVA because the films are hydrophobic. There is another problem that the overall in-plane optical properties of the films are non-uniform.

As a solution to these problems, there has been a strong demand for a further improved cellulose acylate film, which attains excellent suitability for bonding to PVA by lowering the optical anisotropy. More specifically, the solution is an optically isotropic optical transparent film obtained by lowering the frontal Re of the cellulose acylate film to almost zero, and reducing the change in retardation angle, that is, lowering the Rth to almost zero.

In the production of a cellulose acylate film, generally a compound called a plasticizer is added to improve the film-forming performance. Known examples of the plasticizer include phosphoric acid triesters such as triphenyl phosphate and biphenyldiphenyl phosphate, and phthalic acid esters (See, for example, Lecture on Plastic Materials, Vol. 17, Nikkan Kogyo Shinbun, Ltd., "Cellulose Resins", p. 121 (1970)). It is known that some of these plasticizers have an effect of lowering the optical anisotropy of cellulose acylate films, and for example, specific fatty acid esters are known (See, for example, JP-A No. 2001-247717). However, it cannot be said that the effect of lowering the optical anisotropy of cellulose acylate films using these conventionally known compounds is sufficient.

Furthermore, recent liquid crystal display devices are also increasingly demanded to have improved display colors. Therefore, optical transparent films such as polarizer protective films or supports for optical compensatory film are required to have smaller Re or Rth in the visible light region with the wavelength ranging from 400 to 800 nm, as well as smaller changes in Re or Rth dependent on the wavelength, that is, smaller chromatic dispersion.

In general, a liquid crystal display device (LCD) comprises a liquid crystal cell and polarizers. The polarizer comprises protective films and a polarizing film, and is obtained by staining a polarizing film made of a polyvinyl alcohol film with iodine, stretching the polarizing film, and laminating protective films on both sides of the polarizing film. In a transmissive liquid crystal display device, this polarizer is mounted on both sides of the liquid crystal cell, and one or more of optical compensatory sheets may be also disposed. In a reflective liquid crystal display device, a reflective plate, a liquid crystal cell, one or more optical compensatory sheets and a polarizer are disposed in the same order. The liquid crystal cell comprises liquid crystalline molecules, two sheets of substrates to enclose the molecules in between, and an electrode layer to apply voltage to the liquid crystalline molecules. The liquid crystal cell performs ON/OFF display on the basis of the difference in the orientation state of the liquid crystalline molecules, and there have been suggested display modes such as TN (twisted nematic), IPS (in-plane switching), OCB (optically compensatory bend), VA (vertically aligned) and ECB (electrically controlled birefringence), that are applicable both to the transmissive and reflective types.

Among these LCDs, for the uses where high display quality is needed, a 90° twisted nematic liquid crystal display device (hereinafter, referred to as TN mode) which employs nematic liquid crystal molecules having positive dielectric anisotropy and is operated by a thin film transistor, is mainly used. However, the TN mode shows such viewing angle characteristics that although the devices have excellent display characteristics when viewed from the front, their display characteristics deteriorate when viewed from a tilted direction, in a manner such that the contrast is reduced, or there occurs tone reversal in which brightness is reversed in grayscale display, or the like. Thus, improvements in these characteristics are highly demanded.

In recent years, as a form of LCD having improvements in such viewing angle characteristics, there has been suggested a vertically aligned nematic liquid crystal display device (hereinafter, referred to as VA mode), in which nematic liquid crystal molecules having negative dielectric anisotropy are employed such that the longer axes of the liquid crystal molecules are approximately aligned in a vertical direction on the substrate, without any voltage applied, and these liquid crystal molecules are operated by a thin film transistor (See JP-A No. 11-258605) This VA mode shows excellent display characteristics at a level equivalent to the TN mode when viewed from the front, and also exhibits expanded viewing angle characteristics due to the application of a retardation film for viewing angle compensation.

It is also known that in the VA mode, even expanded viewing angle characteristics can be realized by using a uniaxially oriented retardation film having positive refractive index anisotropy and a negative uniaxial retardation film having the optical axis in a direction perpendicular to the film plane (See JP-A No. 11-258605).

However, in such a VA mode liquid crystal display device, if the optical anisotropy of the transparent protective film (also accomplishing the role as a support) holding the retardation films and the polarizers is not designed to have an appropriate value, satisfactory viewing angle characteristics cannot be obtained. Furthermore, when the PVA film constituting the polarizer contracts under the effect of heat and humidity, stress is exerted on the transparent protective film holding the polarizer, whereby a change occurs in the optical anisotropy of the protective film itself. Thus, there have been failures, in particular, deteriorating the display quality of so-called corner spots, which is light leakage at four corners of the screen.

Thus, a first object of the present invention is to provide a liquid crystal display device having excellent display characteristics and viewing angle characteristics.

In addition, it is also known for the VA mode that characteristics of wider viewing angle can be obtained by using two sheets of negative uniaxial retardation films having the optical axes in a direction perpendicular to the film plane, above and below the liquid crystal cell, and that characteristics of expanded viewing angle can be realized by using uniaxially oriented retardation films having positive refractive index anisotropy and having an in-plane retardation value of 50 nm in this LCD (See SID 97 DIGEST pp. 845-848).

However, use of two sheets of retardation films (See SID 97 DIGEST pp. 845-848) is associated with an increase in the production costs, and has problems that bonding of a plurality of films causes lowering in the process yield, use of a plurality of films causes increased thickness, and it is disadvantages for the thickness reduction of the display device. Furthermore, use of an adhesive layer for laminating stretched films causes contraction of the adhesive layer under changes in temperature and humidity, and thereby defects of delamination or warpage of films may occur. As methods for improving these problems, there are disclosed a method of reducing the number of retardation films (See JP-A No. 11-95208) and a method of using a cholesteric liquid crystal layer (See JP-A Nos. 2003-15134 and 11-95208). However, even these methods necessitate bonding of a plurality of films, and thus are unsatisfactory from the viewpoints of thickness reduction and production costs reduction. Moreover, there have been problems that light leakage in a tilted direction of the polarizer during dark state is not completely suppressed in the visible light region, and the viewing angle is not sufficiently expanded. A more important point is that, complete compensation of light leakage is difficult for the entire range of wavelength of the visible light with respect to the incident light in a tilted direction of the polarizer during dark state, and accordingly there is a problem that azimuthal direction-dependence of color shift occurs. There is also suggested a method of preventing light leakage by controlling chromatic dispersion of the retardation film (See JP-A No. 2002-221622), but there are problems that the difference between chromatic dispersion of the in-plane retardation and chromatic dispersion of the retardation in the thickness direction is not taken into account, and the effect of inhibiting light leakage is insufficient. Furthermore, the effect of changing the birefringence of the liquid crystal layer is not sufficiently considered, and a sufficient effect cannot be obtained, depending on the birefringence value of the liquid crystal layer.

Therefore, a second object of the invention is to provide a liquid crystal display device, particularly a VA mode liquid crystal display device, having high contrast due to accurate optical compensation of the liquid crystal cell. In particular, it is an object of the invention to provide a liquid crystal display device, particularly a VA mode liquid crystal display device, having reduced light leakage in a tilted direction during dark state and thus having improved viewing angle contrast.

Further, for example, Japanese Patent No. 2587398 describes a technique of expanding the viewing angle by applying an optical compensatory sheet, which is produced as discotic liquid crystals are applied on a triacetyl cellulose film, aligned and fixed, to a TN mode liquid crystal cell. However, with regard to liquid crystal display devices to be used for television sets, which are assumed to be viewed from various angles through large screens, it is difficult to require viewing angle dependence therefrom, and it is impossible to satisfy the requirement even with the method described above. Therefore, liquid crystal display devices that are different from the TN mode, such as IPS (In-Plane Switching) mode, OCB (Optically Compensatory Bend) mode and VA (Vertically Aligned) mode, are being investigated. Particularly, the VA mode is attracting interest as a liquid crystal display device for TV, since it has high contrast and a relatively high process yield in the production of large size screens.

As an optical compensatory sheet for the VA mode, there are known a compensatory sheet having a film (plate A) having an in-plane optical axis as an optically positive single axis and a film (plate C) having an optical axis in the normal direction of the film as an optically negative single axis, and a compensatory sheet which can realize viewing angle expansion by using an optically biaxial film (See JP-A Nos. 11-258605 and 11-133413). However, these literatures do not mention about improvements in color shift when the viewing angle is tilted from the front during dark state. In such optical compensatory sheet for the VA mode, the color shift in the case of tilting the viewing angle from the front during dark state can be improved by taking the chromatic dispersion of $Re_{(\lambda)}$ as a reciprocal chromatic dispersion ($Re_{(\lambda)}$ in the shorter wavelength side is smaller than $Re_{(\lambda)}$ in the longer wavelength side), and taking the chromatic dispersion of $Rth_{(\lambda)}$ as a chromatic dispersion proper ($Re_\lambda$ in the shorter wavelength side is larger than $Re_{(\lambda)}$ in the longer wavelength side), and an optically biaxial film having such chromatic dispersion characteristics is disclosed (WO 2004/068226 A1).

As a specific embodiment of the optical compensatory sheet for the VA mode, JP-A No. 11-95208 discloses an optical compensatory sheet in which a vertically uniaxially stretched film of a norbornene polymer (trade name: ARTON) and a film in which a layer containing an organic viscous composite (trade name: Lucentite STN, Lucentite SPN) in a hydrophobic resin (trade name: Denkabutyral #3000-K) is formed on a triacetyl cellulose film (trade name: FUJITACK SH-80). However, the $Re_{(\lambda)}$ chromatic dispersion of the vertically uniaxially stretched film of ARTON is not dependent on the wavelength while being uniform, and the $Rth_{(\lambda)}$ chromatic dispersion of the triacetyl cellulose film is a reciprocal wavelength distribution. Thus, from the viewpoint of improving the color shift in the case of tilting the viewing angle from the front during dark state, the performance is unsatisfactory. Furthermore, the optically anisotropic layer containing the organic viscous complex in the hydrophobic resin is less durable and soft, and thus the processability of the layer is not good.

As a specific embodiment of the optical compensatory sheet for the VA mode, JP-A No. 2002-311243 describes an optical compensatory sheet prepared from an optically anisotropic layer comprising rod-shaped nematic liquid crystals on triacetyl cellulose (trade name: FUJITACK T-50 SH) and another optically anisotropic layer comprising cholesteric liquid crystals; an optical compensatory sheet prepared from an optically anisotropic layer consisting of a polyimide layer on the triacetyl cellulose and another rod-shaped nematic liquid crystal layer; and a polarizer including an optical compensatory layer, having either of the above-described optical compensatory sheets laminated on a polarizer which employs triacetyl cellulose as a protective film. Even for any one of these two polarizers including optical compensatory sheet, the $Re_{(\lambda)}$ chromatic dispersion of the optically anisotropic layer comprising rod-shaped nematic liquid crystals is chromatic dispersion proper, and the $Rth_{(\lambda)}$ chromatic dispersion of the triacetyl cellulose film is reciprocal chromatic dispersion. Thus, from the viewpoints of improving the color shift in the case of tilting the viewing angle from the front during dark state, the performance is unsatisfactory.

Thus, a third object of the invention is to provide an optical compensatory sheet in which ideal chromatic dispersion characteristics capable of improving the color shift in the case of tilting the viewing angle from the front during dark state of a liquid crystal display device, are realized by lamination of a plurality of retardation films; a polarizer employing the optical compensatory sheet as protective films; and a liquid crystal display device employing the polarizer.

DISCLOSURE OF THE INVENTION

The first object of the present invention is achieved by the following means (hereinafter, referred to as the "first embodiment").

[1] A liquid crystal display device comprising a liquid crystal panel in which liquid crystals having negative dielectric anisotropy are interposed between upper substrate and lower substrate that have been vertically oriented on the surface, the orientation of the liquid crystals being almost vertical with no applied voltage, almost horizontal when a predetermined voltage is applied, and tilted when a smaller voltage than the predetermined voltage is applied; a first polarizer and a second polarizer disposed on both sides of the liquid crystal panel such that the absorption axes of the polarizers are perpendicular to each other; a first retardation film disposed between the liquid crystal panel and the first polarizer; and a second retardation film disposed between the liquid crystal panel and the second polarizer, wherein the polarizer comprises a polarizing film and a pair of protective films having the polarizing film in between, and wherein at least one of the protective films is a cellulose acylate film satisfying:

$0 \leq Re_{(630)} \leq 10$ and $|Rth_{(630)}| \leq 25$.

[2] The liquid crystal display device according to [1], wherein the first retardation film satisfies:

$50 \leq Re_{(589)} \leq 100$ and $30 \leq Rth_{(589)} \leq 80$, and the second retardation film satisfies:

$Re_{(589)} \leq 20$ and $100 \leq |Rth_{(589)}| \leq 300$.

[3] The liquid crystal display device according to [1] or [2], wherein the cellulose acylate film satisfies:

$0 \leq Re_{(630)} \leq 5$ and $|Rth_{(630)}| \leq 10$.

[4] The liquid crystal display device according to any one of [1] to [3], wherein the cellulose acylate film satisfies:

$0 \leq Re_{(630)} \leq 3$ and $|Rth_{(630)}| \leq 5$.

[5] The liquid crystal display device according to any one of [1] to [4], wherein the cellulose acylate film contains at least one compound reducing the retardation in the direction of film thickness, Rth, in an amount satisfying the following formulas (I) and (II):

$(Rth(A)-Rth(0))/A \leq -1.0$, (I)

$0.01 \leq A \leq 30$ (II)

wherein Rth(A) is the Rth (nm) of the film containing A % of the compound reducing Rth, Rth(0) is the Rth (nm) of the film not containing the compound reducing Rth, and A is the weight (%) of the compound based on 100% of the weight of the raw material polymer of the film.

[6] The liquid crystal display device according to any one of [1] to [5], wherein the cellulose acylate film is made of cellulose acylate with a degree of acyl substitution of 2.85 to 3.00 containing at least one compound reducing $Re_{(\lambda)}$ and $Rth_{(\lambda)}$, in an amount of 0.01 to 30% by weight relative to the cellulose acylate solids content.

[7] The liquid crystal display device according to any one of [1] to [6], wherein the cellulose acylate film contains at least one compound reducing $|Re_{(400)}-Re_{(700)}|$ and $|Rth_{(400)}-Rth_{(700)}|$ of the film, in an amount of 0.01 to 30% by weight relative to the cellulose acylate solids content.

[8] The liquid crystal display device according to any one of [1] to [7], wherein the cellulose acylate film has a thickness of 10 to 120 μm.

The second object of the invention is achieved by the following means (hereinafter, referred to as the "second embodiment").

[9] A liquid crystal display device comprising a pair of substrates disposed to face each other, at least one of them having an electrode, and a nematic liquid crystal material interposed between the pair of substrates; and having a liquid crystal cell having a liquid crystal layer in which the liquid crystal molecules of the nematic liquid crystal material align approximately vertically to the surfaces of the pair of substrates during dark state, a first polarizing film and a second polarizing film disposed such that the liquid crystal cell is interposed between the films, and optical compensatory films respectively disposed between the liquid crystal layer and the first polarizing film, and between the liquid crystal layer and the second polarizing film, wherein a cellulose acylate film is disposed between the optical compensatory film and at least one of the polarizing film and the liquid crystal layer, wherein when the thickness of the liquid crystal layer is d (unit: nm), the refractive index anisotropy at a wavelength λ

(unit: nm) is $\Delta n_{(\lambda)}$, the sum of the in-plane retardations of the optical compensatory film and the cellulose acylate film at the wavelength $\lambda$ is $Re_{sum(\lambda)}$, and the sum of the retardations of the optical compensatory film and the cellulose acylate film in the thickness direction at the wavelength $\lambda$ is $Rth_{sum(\lambda)}$, with respect to at least two different wavelengths in the wavelength range of 380 nm to 780 nm, the following formulas (I) to (IV) are satisfied:

$$200 \leq \Delta n_{(\lambda)} \times d \leq 1000, \quad (I)$$

$$Rth_{sum(\lambda)}/\lambda = A \times \Delta n_{(\lambda)} \times d/\lambda + B, \quad (II)$$

$$Re_{sum(\lambda)}/\lambda = C \times \lambda/\{\Delta n_{(\lambda)} \times d\} + D, \text{ and} \quad (III)$$

$$0.488 \leq A \leq 0.56, \quad (IV)$$

B=−0.0567,
−0.041≦C≦0.016, and
D=0.0939; and
wherein when the in-plane retardation of the cellulose acylate film at the wavelength $\lambda$ (unit: nm) is $Re_{2(\lambda)}$, and the retardation in the thickness direction of the cellulose acylate film at the wavelength $\lambda$ (unit: nm) is $Rth_{2(\lambda)}$, the following formulas (IX) and (X) are satisfied:

$$0 \leq Re_{2(630)} \leq 10 \text{ and } |Rth_{2(630)}| \leq 25, \text{ and} \quad (IX)$$

$$|Re_{2(400)} - Re_{2(700)}| \leq 10 \text{ and} \quad (X)$$

$|Rth_{2(400)} - Rth_{2(700)}| \leq 35$.

[10] The liquid crystal display device according to [9], wherein the in-plane slow axis of the optical compensatory film, and the transmission axis of the polarizing film among the first and the second polarizing films, which is disposed closer to the optical compensatory film, are substantially parallel.

[11] The liquid crystal display device according to [9] or [10], wherein with respect to at least two wavelengths differing by 50 nm or greater, the above formulas (I) to (IV) are satisfied.

[12] The liquid crystal display device according to any one of [9] to [11], wherein with respect to all wavelengths of 450 nm, 550 nm and 650 nm, the above formulas (I) to (IV) are satisfied.

[13] A liquid crystal display device comprising a pair of substrates disposed to face each other, at least one of them having an electrode, and a nematic liquid crystal material interposed between the pair of substrates; and having a liquid crystal cell having a liquid crystal layer in which the liquid crystal molecules of the nematic liquid crystal material align approximately vertically to the surfaces of the pair of substrates during dark state, a first polarizing film and a second polarizing film disposed such that the liquid crystal cell is interposed between the films, an optical compensatory film disposed between the liquid crystal layer and one of the first and second polarizing films, and a cellulose acylate film disposed between the liquid crystal layer and at least one of the first and second polarizing films, wherein when the thickness of the liquid crystal layer is d (unit: nm), the refractive index anisotropy at a wavelength $\lambda$ (unit: nm) is $\Delta n_{(\lambda)}$, the sum of the in-plane retardations of the optical compensatory film and the cellulose acylate film at the wavelength $\lambda$ is $Re_{sum(\lambda)}$, and the sum of the retardations of the optical compensatory film and the cellulose acylate film in the thickness direction at the wavelength $\lambda$ is $Rth_{sum(\lambda)}$, with respect to at least two different wavelengths in the wavelength range of 380 nm to 780 nm, the following formulas (V) to (VIII) are satisfied:

$$200 \leq \Delta n_{(\lambda)} \times d \leq 1000, \quad (V)$$

$$Rth_{sum(\lambda)}/\lambda = E \times \Delta n_{(\lambda)} \times d/\lambda, \quad (VI)$$

$$Re_{sum(\lambda)}/\lambda = F \times \lambda/\{\Delta n_{(\lambda)} \times d\} + G, \text{ and} \quad (VII)$$

$$0.726 \leq E \leq 0.958, \quad (VIII)$$

0.0207≦F≦0.0716, and
G=0.032; and
wherein when the in-plane retardation of the cellulose acylate film at the wavelength $\lambda$ (unit: nm) is $Re_{2(\lambda)}$, and the retardation in the thickness direction of the cellulose acylate film at the wavelength $\lambda$ (unit: nm) is $Rth_{2(\lambda)}$, the following formulas (IX) and (X) are satisfied:

$$0 \leq Re_{2(630)} \leq 10 \text{ and } |Rth_{2(630)}| \leq 25, \text{ and} \quad (IX)$$

$$|Re_{2(400)} - Re_{2(700)}| \leq 10 \text{ and} \quad (X)$$

$|Rth_{2(400)} - Rth_{2(700)}| \leq 35$.

[14] The liquid crystal display device according to [13], wherein the in-plane slow axis of the optical compensatory film, and the transmission axis of the polarizing film among the first and the second polarizing films, which is disposed closer to the optical compensatory film, are substantially parallel.

[15] The liquid crystal display device according to [13] or [14], wherein the angle between the in-plane slow axis of the cellulose acylate film and the transmission axis of the polarizing film among the first and second polarizing films, which is disposed closer to the cellulose acylate film, is between −10° and 10°, or between 80° and 110°.

[16] The liquid crystal display device according to any one of [13] to [15], wherein with respect to at least two wavelengths differing by 50 nm or greater, the above formulas (V) to (VIII) are satisfied.

[17] The liquid crystal display device according to any one of [13] to [16], wherein with respect to all wavelengths of 450 nm, 550 nm and 650 nm, the above formulas (V) to (VIII) are satisfied.

The third object of the invention is achieved by the following means (hereinafter, referred to as the "third embodiment").

[18] An optical compensatory sheet having in order of a transparent support satisfying the following formulas (1) and (2), an optically anisotropic layer A satisfying the following formula (3) and an optically anisotropic layer C satisfying the following formula (4) disposed thereon:

$$0 \leq Re_{(590)} \leq 10 \text{ and } |Rth_{(590)}| \leq 25, \quad (1)$$

$$|Re_{(450)} - Re_{(650)}| \leq 10 \text{ and } |Rth_{(450)} - Rth_{(650)}| \leq 35 \quad (2)$$

$$10 \leq Re_{(590)} \leq 150 \text{ and } 0 \leq Rth_{(590)} \leq 200 \quad (3)$$

$$0 \leq Re_{(590)} \leq 10 \text{ and } 40 \leq Rth_{(590)} \leq 400 \quad (4)$$

wherein $Re_{(\lambda)}$ is the front retardation value (unit: nm) at a wavelength of $\lambda$ nm, and $Rth_{(\lambda)}$ is the retardation value (unit: nm) in the thickness direction at a wavelength of $\lambda$ nm.

[19] An optical compensatory sheet having in order of a transparent support satisfying the following formulas (1) and (2), an optically anisotropic layer C satisfying the following formula (4) disposed thereon, and an optically anisotropic layer A satisfying the following formula (3) disposed thereon:

$$0 \leq Re_{(590)} \leq 10 \text{ and } |Rth_{(590)}| \leq 25, \quad (1)$$

$$|Re_{(450)} - Re_{(700)}| \leq 10 \text{ and } |Rth_{(450)} - Rth_{(650)}| \leq 35 \quad (2)$$

$$10 \leq Re_{(590)} \leq 150 \text{ and } 0 \leq Rth_{(590)} \leq 200 \quad (3)$$

$$0 \leq Re_{(590)} \leq 10 \text{ and } 40 \leq Rth_{(590)} \leq 400 \quad (4)$$

wherein $Re_{(\lambda)}$ is the front retardation value (unit: nm) at a wavelength of λ nm, and $Rth_{(\lambda)}$ is the retardation value (unit: nm) in the thickness direction at a wavelength of λ nm.

[20] The optical compensatory sheet according to [18] or [19], wherein the transparent support contains at least one compound reducing $Rth_{(\lambda)}$, in an amount satisfying the following formulas (5) and (6):

$$(Rth_{(\lambda)}(A) - Rth_{(\lambda)}(0))/A \leq -1.0, \text{ and} \quad (5)$$

$$0.01 \leq A \leq 30 \quad (6)$$

wherein $Rth_{(\lambda)}$ (A) is $Rth_{(\lambda)}$ (nm) of the transparent support containing A % of the compound reducing $Rth_{(\lambda)}$; $Rth_{(\lambda)}(0)$ is $Rth_{(\lambda)}$ (nm) of the transparent support not containing the compound reducing $Rth_{(\lambda)}$; and A is the weight (%) of the compound based on 100% by weight of the raw material polymer for the transparent support.

[21] The optical compensatory sheet according to any one of [18] to [20], wherein the transparent support contains at least one compound reducing $|Re_{(400)} - Re_{(700)}|$ and $|Rth_{(400)} - Rth_{(700)}|$, in an amount of 0.01 to 30% by weight relative to the solids content of the raw material polymer for the support.

[22] The optical compensatory sheet according to any one of [18] to [21], wherein the transparent support is formed from a cellulose acylate film.

[23] The optical compensatory sheet according to [22], wherein the cellulose acylate film is made of cellulose acylate with a degree of acyl substitution of 2.85 to 3.00 containing at least one compound reducing $Re_{(\lambda)}$ and $Rth_{(\lambda)}$, in an amount of 0.01 to 30% by weight relative to the cellulose acylate solids content.

[24] The optical compensatory sheet according to any one of [18] to [23], wherein the film thickness of the transparent support is 10 to 120 μm.

[25] The optical compensatory sheet according to any one of [18] to [24], wherein the optically anisotropic layer A is made of a stretched polymer film.

[26] The optical compensatory sheet according to any one of [18] to [24], wherein the optically anisotropic layer A is formed from a liquid crystalline compound.

[27] The optical compensatory sheet according to any one of [18] to [26], wherein the optically anisotropic layer C is made of a stretched polymer film.

[28] The optical compensatory sheet according to any one of [18] to [26], wherein the optically anisotropic layer C is formed from a liquid crystalline compound.

[29] The optical compensatory sheet according to any one of [18] to [26], wherein the optically anisotropic layer C is formed from a non-liquid crystalline compound.

[30] The optical compensatory sheet according to any one of [18] to [29], wherein the wavelength dependence of $Re_{(\lambda)}$ of the optical anisotropic layer A satisfies the following formulas (7) and (8):

$$Re_{(450)}/Re_{(550)} = 0.60 \text{ to } 0.98, \text{ and} \quad (7)$$

$$Re_{(650)}/Re_{(550)} = 1.00 \text{ to } 1.60. \quad (8)$$

[31] The optical compensatory sheet according to any one of [18] to [29], wherein the wavelength dependence of $Rth_{(\lambda)}$ of the optical anisotropic layer C satisfies the following formulas (9) and (10):

$$Rth_{(450)}/Rth_{(550)} = 1.02 \text{ to } 1.60, \text{ and} \quad (9)$$

$$Rth_{(650)}/Rth_{(550)} = 0.60 \text{ to } 1.00. \quad (10)$$

[32] The optical compensatory sheet according to any one of [18] to [29], wherein the wavelength dependence of $Re_{(\lambda)}$ of the optical anisotropic layer A satisfies the following formulas (7) and (8), while the wavelength dependence of $Rth_{(\lambda)}$ of the optical anisotropic layer C satisfies the following formulas (9) and (10):

$$Re_{(450)}/Re_{(550)} = 0.60 \text{ to } 0.98, \quad (7)$$

$$Re_{(650)}/Re_{(550)} = 1.00 \text{ to } 1.60, \quad (8)$$

$$Rth_{(450)}/Rth_{(550)} = 1.02 \text{ to } 1.60, \text{ and} \quad (9)$$

$$Rth_{(650)}/Rth_{(550)} = 0.60 \text{ to } 1.00. \quad (10)$$

[33] A polarizer having protective films on both sides of a polarizer, wherein at least one of the protective films is the optical compensatory sheet according to any one of [18] to [32], and the side facing the transparent support is bonded to the polarizer.

[34] The polarizer according to [33], wherein the protective film contains at least one selected from the group consisting of a plasticizer, an ultraviolet absorbent, a release promoting agent, a dye, a matting agent and conductive microparticles.

[35] The polarizer according to [33] or [34], wherein at least one layer selected from the group consisting of a hard-coat layer, an anti-glare layer, an anti-reflection layer, an anti-fouling layer and an antistatic layer is provided on the surface of at least one protective film.

[36] A liquid crystal display device having a liquid crystal cell and a pair of polarizers disposed on both sides of the liquid crystal cell, wherein at least one of the polarizers is the polarizer according to any one of [33] to [35].

[37] A liquid crystal display device having a liquid crystal cell and a pair of polarizers disposed on both sides of the liquid crystal cell, wherein the polarizer comprises a polarizer and a pair of protective films having the polarizer interposed in between, and at least one of the protective films is the optical compensatory sheet according to [18].

[38] A liquid crystal display device having a liquid crystal cell and a pair of polarizers disposed on both sides of the liquid crystal cell, wherein the polarizer comprises a polarizer and a pair of protective films having the polarizer interposed in between, and at least one of the protective films is the optical compensatory sheet according to [19].

[39] The liquid crystal display device according to any one of [36] to [38], wherein the liquid crystal cell is a VA mode cell.

According to the first embodiment of the invention, a liquid crystal display device having excellent viewing angle characteristics, reduced corner spots, and high display quality can be provided.

The second embodiment of the invention has been completed based on the knowledge obtained as a result of the inventors' devoted study, and is to independently control the chromatic dispersions of the in-plane retardation and the retardation in the thickness direction of an optical compensatory film by appropriately selecting the material or production method, in order to determine the optimal optical values, thus making the viewing angle compensation at a dark state of a liquid crystal cell, particularly a VA mode liquid crystal cell, possible at any wavelength in the visible light region. As a result, the liquid crystal display device according to the second embodiment of the invention reduces light leakage at a tilted angle during dark state with respect to an arbitrary wavelength, thus remarkably improving the viewing angle contrast. Furthermore, the liquid crystal display device according to the second embodiment of the invention can suppress light leakage in the tilted direction during dark state in an arbitrary visible wavelength region, even in the case of birefringence of other liquid crystal layers.

According to the third embodiment of the invention, an optical compensatory sheet having ideal chromatic dispersion characteristics, which can improve the color shift of when the viewing angle is tilted from the front during dark state of a liquid crystal display device, can be provided.

In particular, according to the third embodiment of the invention, ideal optical compensation can be realized by reducing the optical anisotropy ($Re_{(\lambda)}$, $Rth_{(\lambda)}$) of a transparent support forming the optical compensatory sheet, without having any adverse effect on the optical compensation effect of the optically anisotropic layer caused by the optical properties of the transparent support, and thus the color shift particularly of when the viewing angle is tilted from the front during dark state can be improved.

Furthermore, according to the third embodiment of the invention, a polarizer can be prepared from the above-described optical compensatory sheet and a generally used polarizer, for example, one formed from a stretched polyvinyl alcohol film, by a process for preparation of a polarizer employing conventional cellulose acetate as the protective film, and further, a liquid crystal display device having high display quality can be provided by using the polarizer.

Figure 1:
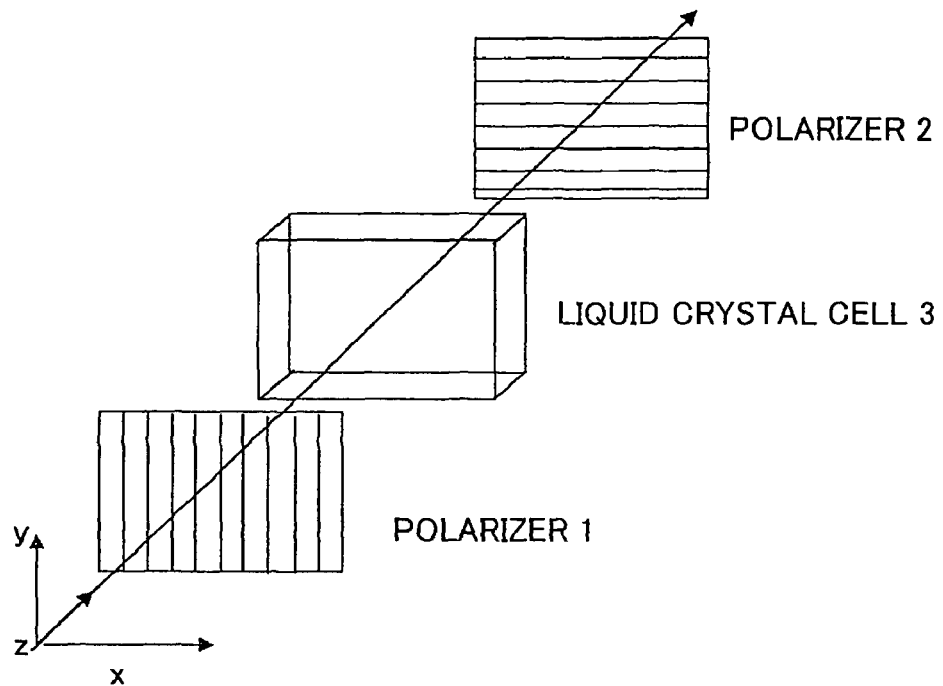
FIG. 1 is a schematic diagram illustrating the exemplary constitution of a conventional VA mode liquid crystal display device.

In the drawings, 1 denotes polarizer, 2 denotes polarizer, 3 denotes liquid crystal cell, 4, 5 and 6 denote optical compensatory film, 11 and 101 denote polarizing film, 12 and 102 denote absorption axis, 13 and 103 denote protective film (cellulose acylate film), 13a and 103a denote in-plane slow axis, 15 and 19 denote optical compensatory film, 15a and 19a denote in-plane slow axis, 16 and 18 denote substrate, and 17 denotes liquid crystal molecules.

BEST MODE FOR CARRYING OUT THE INVENTION

Hereinafter, the invention will be described in detail. The description of the constituent factors described below may be based on the representative Examples of the invention, but the invention is not limited to such Examples. In addition, the numerical value range represented by "to" as used herein means the range including the numerical values described before and after the symbol "to" as the lower limit and the upper limit.

Moreover, in the present specification, the terms "parallel" or "perpendicular" implies that the relative disposition is within the range of the precise angle±less than 5°. The error from the precise angle is preferably less than 4°, and more preferably less than 3°. With regard to the angle, "+" means the clockwise direction, while "−" means the counterclockwise direction. The term "slow axis" means the direction in which the refractive index is the maximum. The "visible light region" is from 380 nm to 780 nm. In addition, the wavelength for the measurement of refractive index is the value at $\lambda$=550 nm in the visible light region, if not stated otherwise.

In the present specification, the term "polarizer" is used to mean both the long-length polarizer, as long as it is not particularly cut, and the polarizer cut to a size fitting in the liquid crystal device (the term "cutting" includes "punching" and "excision"). Furthermore, in the present specification, the "polarizing film" and "polarizer" are distinctively used, but the "polarizer" is to mean a laminate in which the "polarizing film" has, on at least one side thereof, a transparent protective film to protect the polarizing film.

In the present specification, the in-plane retardation $Re_{(\lambda)}$ and the retardation in the thickness direction $Rth_{(\lambda)}$ at a wavelength $\lambda$ of various films, such as a cellulose acylate film and an optical compensatory film, are meant by the values obtained by the following method. First, $Re_{(\lambda)}$ means the value measured with a light having a wavelength of $\lambda$ nm incident from the normal direction of the film, by using KOBRA-21ADH (Oji Scientific Instruments) $Rth_{(\lambda)}$ means the value calculated based on retardation values measured in three directions in total, such as the above-described $Re_{(\lambda)}$, the retardation value measured with a light having a wavelength of $\lambda$ nm incident from a direction tilted by +40° from the normal direction of the film around the slow axis (determined by KOBRA-21ADH) as the tilt axis (axis of rotation), and the retardation value measured with a light having a wavelength $\lambda$ nm incident from a direction of tilted by −40° from the normal direction of the film around the slow axis as the tilt axis (axis of rotation), using KOBRA-21ADH. Here, for the presumed value of the average refractive index, the values given in the Polymer Handbook (John Wiley & Sons, Inc.) and various catalogues for optical films can be used. For those having an average refractive index value different from the conventional values, the refractive index can be measured using an Abbe refractometer. The average refractive index values of frequently used optical films are exemplified below: cellulose acylate (1.48), cycloolefin polymer (1.52), polycarbonate (1.59), polymethyl methacrylate (1.49), and polystyrene (1.59).

When the assumed values of these average refractive indices and the film thickness are input, the KOBRA-21ADH calculates nx, ny and nz.

Throughout the invention, the average refractive index used for the cellulose acylate film was 1.48.

In the first embodiment, the average refractive index used for the first retardation film was 1.52, while the average refractive index used from the second retardation film was 1.6.

In the second embodiment, the sum of the in-plane retardations of the cellulose acylate film and the optical compensatory film, $Re_{sum(\lambda)}$, and the sum of the retardations in the thickness direction thereof, $Rth_{sum(\lambda)}$, also mean the values obtained by the above-described method.

First Embodiment

Hereinafter, the first embodiment of the invention will be described.

The liquid crystal display device of the first embodiment includes a liquid crystal panel in which liquid crystals having negative dielectric anisotropy are interposed between upper substrate and lower substrate that have been vertically oriented on the surface, the orientation of the liquid crystals being almost vertical with no applied voltage, almost horizontal when a predetermined voltage is applied, and tilted when a voltage smaller than the predetermined voltage is applied; a first polarizer and a second polarizer disposed on both sides of the liquid crystal panel such that the absorption axes of the polarizers are perpendicular to each other; a first retardation film disposed between the liquid crystal panel and the first polarizer; and a second retardation film disposed between the liquid crystal panel and the second polarizer, wherein the polarizer comprises a polarizing film and a pair of protective films having the polarizing film in between. For at least one of the protective films, the in-plane retardation, $Re_{(630)}$, at a wavelength of 630 nm is 10 nm or less ($0 \leq Re_{(630)} \leq 10$), while the absolute value of the retardation in the thickness direction, $Rth_{(630)}$, is 25 nm or less ($|Rth| \leq 25$ nm). Furthermore, the values are preferably $0 \leq Re_{(630)} \leq 5$ and $|Rth| \leq 10$ nm, more preferably $0 \leq Re_{(630)} \leq 3$ and $|Rth| \leq 5$. In the present invention, there can be provided a VA (Vertically Aligned) mode liquid crystal display device having excellent viewing angle characteristics, with reduced corner spots, by using a cellulose acetate film having a retardation in the above-described range and also having excellent durability as the protective film of the polarizer.

Hereinafter, the cellulose acylate film will be further described.

[Cellulose Acylate Raw Material Fiber]

The cellulose used in the first embodiment as the raw material for cellulose acylate may be cotton linter or wood pulp (hardwood pulp, softwood pulp), and cellulose acetate obtained from any of the raw material celluloses can be used, and if necessary, may be used in mixtures. Detailed description on such raw material celluloses can be found in, for example, Lecture on Plastic Materials (17), Cellulose Resins (by Marusawa and Uda, Nikkan Kogyo Shinbun, Ltd. (1970)) or Patent Studies of the Japanese Institute of Invention and Innovation 2001-1745 (pp. 7-8), and celluloses described therein can be used. The cellulose acylate film used as the protective film for the polarizer in the first embodiment is not particularly limited.

[Degree of Substitution of Cellulose Acylate]

Next, the cellulose acylate used as the protective film of the polarizer in the first embodiment, which is produced from the above-described cellulose raw materials, will be described. The cellulose acylate used in the first embodiment is cellulose having its hydroxyl groups acylated, and the substituents that can be used include from an acyl group having 2 carbon atoms, which is an acetyl group, to an acyl group having 22 carbon atoms. For the cellulose acylate used in the first embodiment, the degree of substitution of the hydroxyl group of cellulose is not particularly limited, but the degree of substitution can be obtained by measuring the degree of bonding of acetic acid and/or fatty acid having 3 to 22 carbon atoms that substitute the hydroxyl group of cellulose, followed by calculation. The measurement can be carried out according to ASTM D-817-91.

For the cellulose acylate used in the first embodiment, the degree of substitution of the hydroxyl group of cellulose is not particularly limited, but the degree of acyl substitution of the hydroxyl group of cellulose is preferably 2.50 to 3.00. Further, the degree of substitution is preferably 2.75 to 3.00, more preferably 2.85 to 3.00.

Among the acetic acid and/or fatty acid having 3 to 22 carbon atoms substituting the hydroxyl group of cellulose, the acyl group having 2 to 22 carbon atoms may be an aliphatic group or an allyl group, without being particularly limited, and may be used individually or in combination of two or more species. Examples thereof include alkylcarbonyl esters, alkenylcarbonyl esters or aromatic carbonyl esters, aromatic alkylcarbonyl esters of cellulose, each of which may be further substituted. Preferred examples of such acyl group include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a tert-butanoyl group, a cyclohexanecarbonyl group, an oleoyl group, a benzoyl group, a naphthylcarbonyl group, a cinnamoyl group and the like. Among these, an acetyl group, a propionyl group, a butanoyl group, a dodecanoyl group, an octadecanoyl group, a tert-butanoyl group, an oleoyl group, a benzoyl group, a naphthylcarbonyl group, a cinnamoyl group and the like are preferred, and an acetyl group, a propionyl group and a butanoyl group are more preferred.

As a result of devoted study of the inventors, it was found that in the case where the acyl substituents substantially include at least two species selected from an acetyl group/a propionyl group/a butanoyl group among the above-described acyl substituents substituting the hydroxyl group of cellulose, when the total degree of substitution is 2.50 to 3.00, the optical anisotropy of the cellulose acylate film can be effectively reduced. The degree of acyl substitution is more preferably 2.60 to 3.00, and even more preferably 2.65 to 3.00.

[Degree of Polymerization of Cellulose Acylate]

The degree of polymerization of cellulose acylate preferably used in the first embodiment is 180 to 700 as the viscosity average degree of polymerization, and the degree of polymerization of cellulose acetate is more preferably 180 to 550, even more preferably 180 to 400, and particularly preferably 180 to 350. When the degree of polymerization is excessively high, the viscosity of a dope solution of the cellulose acylate is increased, and thus film preparation by flow casting becomes difficult. When the degree of polymerization is excessively low, the strength of the prepared film is deteriorated. An average polymerization degree can be measured by the intrinsic viscosity method of Uda et al (Kazuo Uda and Hideo Saito, Bulletin of The Society of Fiber Science and Technology, Japan, vol. 18, No. 1, pp. 105-120 (1962)). It is also described in detail in JP-A No. 9-95538.

Further, the molecular weight distribution of the cellulose acylate preferably used in the first embodiment is evaluated by gel permeation chromatography, and it is preferred that the polydispersity index Mw/Mn (Mw: weight-average molecular weight, Mn: number-average molecular weight) is small, while the molecular weight distribution is narrow. Specific values of Mw/Mn preferably range from 1.0 to 3.0, more preferably from 1.0 to 2.0, and most preferably from 1.0 to 1.6.

An elimination of low-molecular components results in an average molecular weight (polymerization degree) increasing, but makes the viscosity become lower than a conventionally used cellulose acylate, and thus, such elimination is useful. Cellulose acylate having reduced low-molecular components can be obtained by eliminating low-molecular components from cellulose acylate synthesized by a well-known method. The elimination of the low-molecular components can be effected by rinsing the cellulose acylate with an appropriate organic solvent. In case of preparing cellulose acylate having reduced low-molecular components, an amount of a sulfuric acid catalyst in the acylation reaction is preferably adjusted within a range of 0.5 to 25 parts by mass, with respect to 100 parts by mass of cellulose. The amount of a sulfuric acid catalyst within the aforementioned range makes it possible to synthesize cellulose acylate that is adequate in the molecular weight distribution (with uniform molecular weight distribution). In the preparation of the cellulose acylate used in the first embodiment, the cellulose acylate preferably has a water content of 2 mass % or less, more preferably 1 mass % or less and particularly preferably 0.7 mass % or less. The cellulose acylate is known to generally contain water, in an amount of 2.5 to 5 mass %. In order to attain the aforementioned water content of the cellulose acylate in the invention, drying is required. For the cellulose acylate of the invention, a raw material cotton and a synthesizing method are described in detail in Japan Institute of Invention and Innovation, Technical Publication (Technical Publication No. 2001-1745, pp. 7-12, Mar. 15, 2001, published by Japan Institute of Invention and Innovation).

The cellulose acylate used in the first embodiment may be employed singly or in a mixture of two or more kinds, provided that the substituent, the substitution degree, the polymerization degree, and the molecular weight distribution are within the aforementioned ranges.

[Additive to Cellulose Acylate]

To a solution of the cellulose acylate used for preparation of the cellulose acylate film of the first embodiment may be added various additives (for example, a compound for reducing optical anisotropy, a chromatic dispersion-regulating agent, an anti-ultraviolet agent, a plasticizer, an anti-deterioration agent, fine particles or an optical property-regulating agent) depending on various purposes in each of the preparation steps, and such additives will be explained in the following. And such addition may be carried out in any of the steps of preparing a dope, or may be carried out by adding a step of adding such additives to the final preparation step in the process for preparing dope.

It is preferred that the cellulose acylate film used in the first embodiment contains at least one compound capable of reducing an optical anisotropy, i.e. Re(%) and Rth(%), particularly at least one compound reducing the retardation in the direction of film thickness, Rth, in an amount satisfying the following formulas (I) and (II):

$$(Rth(A)-Rth(0))/A \leq -1.0, \text{ and} \tag{I}$$

$$0.01 \leq A \leq 30 \tag{II}$$

The formulas (I) and (II) are preferably:

$$(Rth(A)-Rth(0))/A \leq -2.0, \text{ and} \tag{I-a}$$

$$0.05 \leq A \leq 25, \tag{II-a}$$

and more preferably:

$$(Rth(A)-Rth(0))/A \leq -3.0, \text{ and} \tag{I-b}$$

$$0.1 \leq A \leq 20. \tag{II-b}$$

In the above formulas, Rth(A) is the Rth (nm) of the film containing A % of the compound reducing Rth, Rth(0) is the Rth (nm) of the film not containing the compound reducing Rth, and A is the weight (%) of the compound based on 100% of the weight of the raw material polymer of the film.

[Structural Feature of Compound for Reducing Optical Anisotropy of Cellulose Acylate Film]

In the following, there will be explained a compound for reducing the optical anisotropy of the cellulose acylate film. As a result of intensive investigations, the present inventors employ a compound capable of suppressing an alignment of cellulose acylate in the film along the in-plane direction and the direction of film thickness, thereby sufficiently reducing the optical anisotropy so that both an Re value and an Rth value can be nearly 0. For this purpose, it is advantageous that the optical anisotropy reducing compound is sufficiently compatible with cellulose acylate and does not have a rod-shaped structure or a planar structure in the compound itself. Specifically, in case that the compound has plural planar functional groups such as aromatic groups, it is advantageous that the compound has a non-planar structure that does not have said functional groups on the same plane.

(Log P Value)

In the preparation of the cellulose acylate film according to the first embodiment, among the aforementioned compound for suppressing an alignment of cellulose acylate in the film along the in-plane direction and the direction of film thickness thereby sufficiently reducing the optical anisotropy, preferred is a compound having an octanol-water distribution coefficient (log P value) within a range of from 0 to 7. A compound having a log P value exceeding 7 is poor in the compatibility with cellulose acylate, thus tending to cause a white turbidity or a powdery formation in the film. Also, a compound having a log P value less than 0 has a high hydrophilicity and thus may deteriorate the water resistance of the cellulose acylate film. The log P value is more preferably within a range of from 1 to 6, and particularly preferably 1.5 to 5.

The octanol-water distribution coefficient (log P value) can be measured by a flask permeation method described in Japan Industrial Standards (JIS) Z7260-107 (2000). The octanol-water distribution coefficient (log P value) may also be estimated, instead of an actual measurement, by a calculational chemical method or an empirical method. As a calculation method, Crippen's fragmentation method (J. Chem. Inf. Comput. Sci., 27, 21 (1987)), Viswanadhan's fragmentation method (J. Chem. Inf. Comput. Sci., 29, 163 (1989)), or Broto's fragmentation method (Eur. J. Med. Chem.-Chim. Theor., 19, 71 (1984)), and the like is are preferably used, and the Crippen's fragmentation method (J. Chem. Inf. Comput. Sci., 27, 21 (1987)) is more preferably used. In case that a compound shows different log P values depending on the measuring method or the calculation method, the Crippen's fragmentation method is preferably used for judging as to whether the compound is within a range of the invention.

[Physical Properties of Compound for Reducing Optical Anisotropy]

An optical anisotropy-reducing compound may or may not include an aromatic group. The optical anisotropy-reducing compound preferably has a molecular weight of 150 to 3000, more preferably 170 to 2000, and particularly preferably 200 to 1000. Such compound may have, within such range of the molecular weight, a specified monomer structure, or an oligomer structure or a polymer structure formed by a bonding of a plurality of such monomer unit.

The optical anisotropy-reducing compound is preferably either a liquid at 25° C. or a solid having a melting point of 25° C. to 250° C. and more preferably either a liquid at 25° C. or a solid having a melting point of 25° C. to 200° C. Also, the optical anisotropy-reducing compound preferably does not evaporate in the course of casting and drying a dope solution for preparing the cellulose acylate film.

An amount of addition of the optical anisotropy-reducing compound is preferably 0.01 mass % to 30 mass % of the cellulose acylate, more preferably 1 mass % to 25 mass %, and particularly preferably 5 mass % to 20 mass %. Particularly, in the first embodiment, at least one optical anisotropy-reducing compound is preferably added to cellulose acylate with a degree of acyl substitution of 2.85 to 3.00 within the above range of amount.

The optical anisotropy-reducing compound may be employed singly or in a mixture of two or more kinds in an arbitrary ratio.

The optical anisotropy-reducing compound may be added any time in the process of preparation of a dope solution, or at the end of such process.

The optical anisotropy reducing compound has an average content, in a portion from at least a surface of the cellulose acylate film to a position of 10% of the total film thickness, of 80% to 99% of an average content of such compound in a central portion of the cellulose acylate film. An amount of the optical anisotropy-reducing compound can be determined by measuring amounts of the compound in a surface portion and a central portion by a method utilizing an infrared absorption spectrum, as described in JP-A-8-57879, and the like.

Hereinbelow, specific examples of the compounds for reducing optical anisotropy of the cellulose acylate film which is preferably used in the first embodiment are given but the compounds used in the first embodiment are not limited thereto.

Formula (1)

$$O=P\begin{array}{l}OR^{11}\\|\\-OR^{12}\\|\\OR^{13}\end{array}$$

In Formula (1), $R^{11}$ to $R^{13}$ each independently represent an aliphatic group having 1 to 20 carbon atoms. $R^{11}$ to $R^{13}$ may be bonded to each other to form a ring.

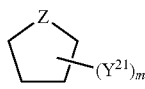

Formula (2)

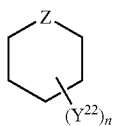

Formula (3)

In Formulas (2) and (3), Z represents a carbon atom, an oxygen atom, a sulfur atom or $-NR^{25}-$, in which $R^{25}$ represents a hydrogen atom or an alkyl group. 5- or 6-membered ring including Z may contain a substituent. $Y^{21}$ and $Y^{22}$ each independently represent an ester group, an alkoxycarbonyl group, an amide group or a carbamoyl group in which the groups have 1 to 20 carbon atoms. Plural of $Y^{21}$ and plural of $Y^{22}$ each may be taken together to form a ring. m is an integer of 1 to 5. n is an integer of 1 to 6.

(4)

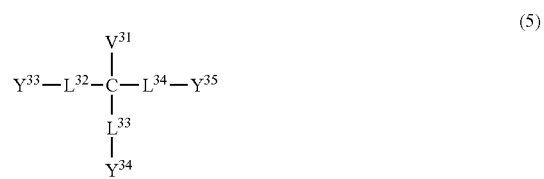

(5)

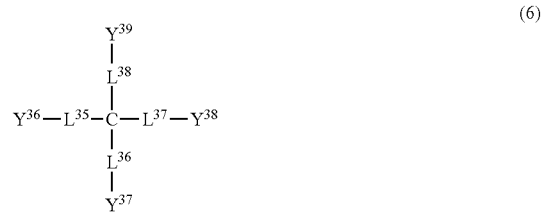

(6)

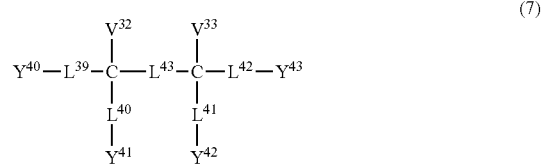

(7)

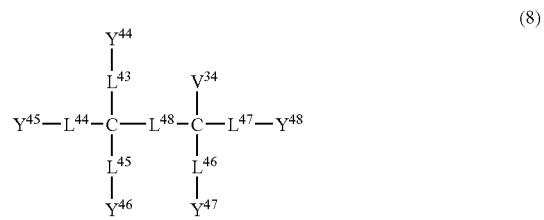

(8)

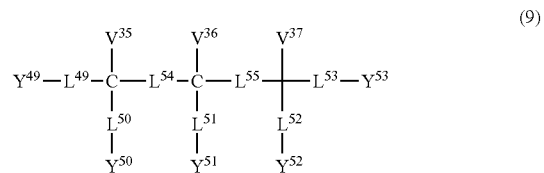

(9)

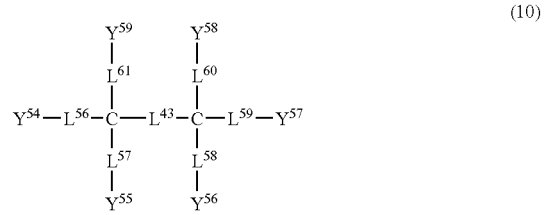

(10)

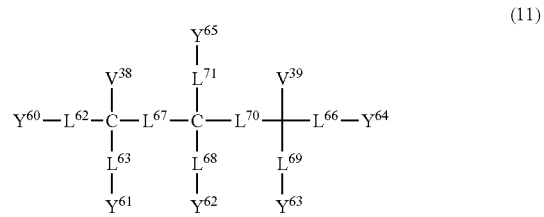

(11)

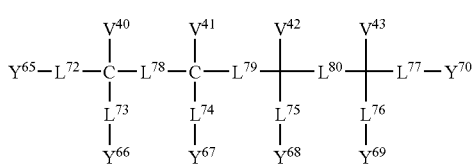
(12)

In Formulas (4) to (12), $Y^{31}$ to $Y^{70}$ each independently represent an ester group having 1 to 20 carbon atoms, an alkoxycarbonyl group having 1 to 20 carbon atoms, an amide group having 1 to 20 carbon atoms, a carbamoyl group having 1 to 20 carbon atoms or a hydroxyl group. $V^{31}$ to $V^{43}$ each independently represent a hydrogen atom, or an aliphatic group having preferably 1 to 20 carbon atoms. $L^{31}$ to $L^{80}$ each independently represent a divalent saturated linkage having 0 to 40 atoms. Herein, "$L^{31}$ to $L^{80}$ having 0 atom" means that the groups at both the ends of the linkage directly form a single bond. $V^{31}$ to $V^{43}$ and $L^{31}$ to $L^{80}$ may further contain a substituent.

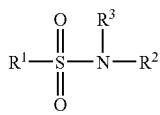
Formula (13)

In Formula (13), $R^1$ represents an alkyl group or an aryl group, and $R^2$ and $R^3$ each independently represent a hydrogen atom, an alkyl group or an aryl group. The total number of the carbon atoms of $R^1$, $R^2$ and $R^3$ is 10 or greater. The alkyl group and the aryl group may have a substituent.

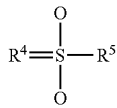
Formula (14)

In Formula (14), $R^4$ and $R^5$ each independently represent an alkyl group or an aryl group. The total number of the carbon atoms of $R^4$ and $R^5$ is 10 or greater. The alkyl group and the aryl group may have a substituent.

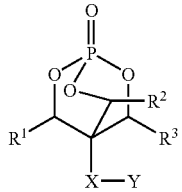
Formula (15)

In the above Formula (15), $R^1$, $R^2$ and $R^3$ are preferably each independently a hydrogen atom or an alkyl group. X is a divalent linking group composed of one or more kinds of groups selected from the linking groups 1 below. Y is a hydrogen atom, an alkyl group, an aryl group or an aralkyl group. $R^4$ is a hydrogen atom, an alkyl group, an aryl group or an aralkyl group.

(Linking Groups 1) a single bond, —O—, —CO—, an alkylene group and an arylene group.

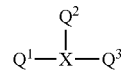
Formula (16)

$Q^1$, $Q^2$ and $Q^3$ each independently represent 5- or 6-membered ring. X represents B, C—R (R represents a hydrogen atom or a substituent.), N, P and P=O.

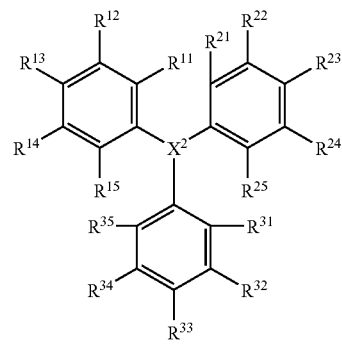
Formula (17)

wherein $X^2$ represents B, C—R (R represents a hydrogen atom or a substituent.) and N. $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ represent a hydrogen atom or a substituent.

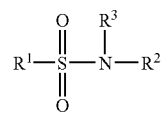
Formula (18)

In Formula (18), $R^1$ represents an alkyl group or an aryl group, and $R^2$ and $R^3$ each independently represent a hydrogen atom, an alkyl group or an aryl group. The alkyl group and the aryl group may have a substituent.

Preferable compounds of Formula (18) are represented by the following Formula (19):

Formula (19)

In Formula (19), $R^4$, $R^5$, and $R^6$ each independently represent an alkyl group or an aryl group. The alkyl group may be straight, branched or cyclic. The number of carbon atoms in the alkyl group is preferably 1 to 20, more preferably 1 to 15, most preferably 1 to 12. Particularly preferable cyclic alkyl group is a cyclohexyl group. The number of carbon atoms in the aryl group is preferably 6 to 36, more preferably 6 to 24.

The alkyl group and the aryl group may have a substituent. Preferable examples of the substituent include a halogen atom (e.g. a chlorine atom, a bromine atom, a fluorine atom and an iodine atom), an alkyl group, an aryl group, an alkoxy group, an aryloxy group, an acyl group, an alkoxycarbonyl group, an aryloxycarbonyl group, an acyloxy group, a sulfonylamino group, a hydroxy group, a cyano group, an amino group and an acylamino group. More preferable examples include a halogen atom, an alkyl group, an aryl group, an alkoxy group, an aryloxy group, a sulfonylamino group and an acylamino group. Particularly preferable examples include an alkyl group, an aryl group, a sulfonylamino group and an acylamino group.

The compounds represented by Formula (1) are described hereinafter.

In Formula (1), $R^{11}$ to $R^{13}$ each independently represent an aliphatic group having 1 to 20 carbon atoms. $R^{11}$ to $R^{13}$ may be bonded to each other to form a ring.

$R^{11}$ to $R^{13}$ is explained in detail. $R^{11}$ to $R^{13}$ are preferably an aliphatic group having 1 to 20, more preferably 1 to 16 carbon atoms, and particularly preferably 1 to 12 carbon atoms. Here, the aliphatic group is preferably an aliphatic hydrocarbon group, and preferably an alkyl group (including straight-chained, branched and cyclic alkyl groups), an alkenyl group or an alkynyl group. Examples of the alkyl group include methyl, ethyl, n-propyl, isopropyl, n-butyl, isobutyl, sec-butyl, t-butyl, pentyl, t-amyl, n-hexyl, n-octyl, decyl, dodecyl, eicosyl, 2-ethylhexyl, cyclopentyl, cyclohexyl, cycloheptyl, 2,6-dimethyl cyclohexyl, 4-t-butylcyclohexyl, cyclopentyl, 1-adamanthyl, 2-adamanthyl, bicyclo[2.2.2]octane-3-yl and the like; examples of the alkenyl group include vinyl, allyl, prenyl, geranyl, oleyl, 2-cyclopentene-1-yl, 2-cyclohexene-1-yl and the like; examples of the alkynyl group include ethynyl, propargyl and the like.

The aliphatic group represented by $R^{11}$ to $R^{13}$ may be substituted or unsubstituted, and examples of the substituent include a halogen atom (a fluorine atom, a chlorine atom, bromine atom or an iodine atom), an alkyl group (including straight-chained, branched and cyclic alkyl groups, a bicyclo alkyl group, an active methine group), an alkenyl group, an alkynyl group, an aryl group, a heterocyclic group (irrespective of the position to be substituted), an acyl group, an alkoxycarbonyl group, an aryloxycarbonyl group, a heterocyclic oxycarbonyl group, a carbamoyl group, an N-acyl carbamoyl group, an N-sulfonyl carbamoyl group, an N-carbamoyl carbamoyl group, an N-sulfamoyl carbamoyl group, a carbazoyl group, a carboxyl group or a salt thereof, an oxalyl group, an oxamoyl group, a cyano group, a carbonimidoyl group, a formyl group, a hydroxyl group, an alkoxyl group (including the groups having repetition of an ethyleneoxy group or propyleneoxy group unit), an aryloxy group, a heterocyclic oxy group, an (alkoxy or aryloxy) acyloxy group, a carbonyloxy group, a carbamoyloxy group, a sulfonyloxy group, an (alkyl, aryl or heterocyclic) amino group, an amino group, an acylamino group, a sulfonamide group, a ureido group, a thioureido group, an (alkoxy or aryloxy) imide group, a carbonylamino group, a sulfamoylamino group, a semicarbazide group, an ammonia group, an oxamoylamino group, an N-(alkyl or aryl)sulfonylureido group, an N-acylureido group, an N-acyl sulfamoylamino group, a heterocyclic group including a quaternary nitrogen atom (for example, a pyridinio group, an imidazolio group, a quinolino group, an isoquinolinio group), an isocyano group, an (alkyl or aryl) imino group, a (alkyl or aryl) sulphonyl group, a sulfinyl group, a sulfo group or a salt thereof, a sulfamoyl group, an N-acyl sulfamoyl group, an N-sulfonyl sulfamoyl group or a salt thereof, a phosphino group, a phosphinyl group, a phosphinyloxy group, a phosphinylamino group, a silyl group and the like.

These groups may be bonded to each other to form a composite substituent, and examples of the substituent include an ethoxyethoxyethyl group, a hydroxyethoxyethyl group, an ethoxycarbonylethyl group and the like. Further, $R^{11}$ to $R^{13}$ may contain a phosphoric ester group as a substituent, and the compound of Formula (1) may also contain a plurality of phosphoric ester groups within the same molecule.

The compounds represented by Formula (1) are described below.

In Formulas (2) and (3), Z represents a carbon atom, an oxygen atom, a sulfur atom or $—NR^{25}—$, in which $R^{25}$ represents a hydrogen atom or an alkyl group. 5- or 6-membered ring including Z may contain a substituent, a plurality of the substituents may be bonded to each other to form a ring. Examples of 5- or 6-membered ring including Z include tetrahydrofuran, tetrahydropyran, tetrahydrothiophene, thiane, pyrrolidine, piperidine, indoline, isoindoline, chroman, isochroman, tetrahydro-2-furanone, tetrahydro-2-pyrone, 4-butane lactam, 6-hexanolactam, and the like.

Further, examples of the 5- or 6-membered ring including Z include a lactone structure or a lactam structure, i.e., a cyclic ester or cyclic amide structure having an oxo group in the neighboring carbon of Z. Examples of the cyclic ester or cyclic amide structure include 2-pyrrolidone, 2-piperidone, 5-pentanolide and 6-hexanolide.

$R^{25}$ represents a hydrogen atom, or an alkyl group (including (straight-chained, branched and a cyclic alkyl groups) having preferably 1 to 20 carbon atoms, more preferably 1 to 16 carbon atoms, and particularly preferably 1 to 12 carbon atoms. Examples of the alkyl group represented by $R^{25}$ include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethyl cyclohexyl, 4-t-butylcyclohexyl, cyclopentyl, 1-adamanthyl, 2-adamanthyl, bicyclo[2.2.2]octane-3-yl and the like. The alkyl group represented by $R^{25}$ may further contain a substituent, and examples of the substituent include those exemplified for the substituent of $R^{11}$ to $R^{13}$.

$Y^{21}$ to $Y^{22}$ each independently represent an ester group, an alkoxycarbonyl group, an amide group or a carbamoyl group. The ester may have preferably 1 to 20 carbon atoms, more preferably 1 to 16 carbon atoms, and particularly preferably 1 to 12 carbon atoms, and examples thereof include acetoxy, ethyl carbonyloxy, propylcarbonyloxy, n-butylcarbonyloxy, isobutylcarbonyloxy, t-butylcarbonyloxy, sec-butylcarbonyloxy, n-pentylcarbonyloxy, t-amylcarbonyloxy, n-hexylcarbonyloxy, cyclohexylcarbonyloxy, 1-ethyl pentylcarbonyloxy, n-heptylcarbonyloxy, n-nonylcarbonyloxy, n-undecylcarbonyloxy, benzylcarbonyloxy, 1-naphthalenecarbonyloxy, 2-naphthalenecarbonyloxy, 1-adamantane carbonyloxy and the like.

The alkoxycarbonyl group may have preferably 1 to 20 carbon atoms, more preferably 1 to 16 carbon atoms, and particularly preferably 1 to 12 carbon atoms, and examples thereof include methoxycarbonyl, ethoxycarbonyl, n-propyloxycarbonyl, isopropyloxycarbonyl, n-butoxycarbonyl, t-butoxycarbonyl, isobutyloxycarbonyl, sec-butyloxycarbonyl, n-pentyloxycarbonyl, t-amyloxycarbonyl, n-hexyloxycarbonyl, cyclohexyloxycarbonyl, 2-ethyl-hexyl-hydroxycarbonyl, 1-ethylpropyloxycarbonyl, n-octyloxycarbonyl, 3,7-dimethyl-3-octyloxycarbonyl, 3,5,5-trimethyl n-hexyloxycarbonyl, 4-t-butylcyclohexyloxycarbonyl, 2,4-dimethyl pentyl-3-oxycarbonyl, 1-adamantaneoxycarbonyl, 2-adamantaneoxycarbonyl, dicyclopentadienyloxycarbonyl, n-decyloxycarbonyl, n-dodecyloxycarbonyl, n-tetradecyloxycarbonyl, n-hexadecyloxycarbonyl and the like.

The amide group may have preferably 1 to 20 carbon atoms, more preferably 1 to 16 carbon atoms, and particularly preferably 1 to 12 carbon atoms, and examples thereof include acetamide, ethylcarboxamide, n-propylcarboxamide, isopropylcarboxamide, n-butylcarboxamide, t-butylcarboxamide, isobutylcarboxamide, sec-butylcarboxamide, n-pentylcarboxamide, t-amylcarboxamide, n-hexylcarboxamide, cyclohexylcarboxamide, 1-ethyl pentylcarboxamide, 1-ethylpropylcarboxamide, n-heptylcarboxamide, n-octylcarboxamide, 1-adamantanecarboxamide, 2-adamantanecarboxamide, n-nonylcarboxamide, n-dodecylcarboxamide, n-pentacarboxamide, n-hexadecyl carboxamide and the like.

The carbamoyl group may have preferably 1 to 20 carbon atoms, more preferably 1 to 16 carbon atoms, and particularly preferably 1 to 12 carbon atoms, and examples thereof include methylcarbamoyl, dimethylcarbamoyl, ethylcarbamoyl, diethylcarbamoyl, n-propylcarbamoyl, isopropylcarbamoyl, n-butylcarbamoyl, t-butylcarbamoyl, isobutylcarbamoyl, sec-butylcarbamoyl, n-pentylcarbamoyl, t-amylcarbamoyl, n-hexylcarbamoyl, cyclohexylcarbamoyl, 2-ethylhexylcarbamoyl, 2-ethyl butylcarbamoyl, t octylcarbamoyl, n-heptylcarbamoyl, n-octylcarbamoyl, 1-adamantanecarbamoyl, 2-adamantanecarbamoyl, n-decylcarbamoyl, n-dodecylcarbamoyl, n-tetradecylcarbamoyl, n-hexadecylcarbamoyl and the like. $Y^{21}$ to $Y^{22}$ may be bonded to each other to form a ring. $Y^{21}$ to $Y^{22}$ may further contain a substituent, and examples of the substituent include those exemplified for the substituent of $R^{11}$ to $R^{13}$.

The compounds of Formulas (4) to (12) are described below.

In Formulas (4) to (12), $Y^{31}$ to $Y^{70}$ each independently represent an ester group, an alkoxycarbonyl group, an amide group, a carbamoyl group or a hydroxyl group. The ester group may have preferably 1 to 20 carbon atoms, more preferably 1 to 16 carbon atoms, and particularly preferably 1 to 12 carbon atoms, and examples thereof include acetoxy, ethylcarbonyloxy, propylcarbonyloxy, n-butylcarbonyloxy, isobutylcarbonyloxy, t-butylcarbonyloxy, sec-butylcarbonyloxy, n-pentylcarbonyloxy, t-amylcarbonyloxy, n-hexylcarbonyloxy, cyclohexylcarbonyloxy, 1-ethyl pentylcarbonyloxy, n-heptylcarbonyloxy, n-nonylcarbonyloxy, n-undecylcarbonyloxy, benzylcarbonyloxy, 1-naphthalenecarbonyloxy, 2-naphthalenecarbonyloxy, 1-adamantane carbonyloxy and the like.

The alkoxycarbonyl group may have preferably 1 to 20 carbon atoms, more preferably 1 to 16 carbon atoms, and particularly preferably 1 to 12 carbon atoms, and examples thereof include 1-ethylpropyloxycarbonyl, octyloxycarbonyl, 3,7-dimethyl-3-octyloxycarbonyl, 3,5,5-trimethyl hexyloxycarbonyl, 4-t-butylcyclohexyloxycarbonyl, 2,4-dimethyl pentyl-3-oxycarbonyl, 1-adamantaneoxycarbonyl, 2-adamantaneoxycarbonyl, dicyclopentadienyloxycarbonyl, decyloxycarbonyl, dodecyloxycarbonyl, tetradecyloxycarbonyl, hexadecyloxycarbonyl are given methoxycarbonyl, ethoxycarbonyl, n-propyloxycarbonyl, isopropyloxycarbonyl, n-butoxycarbonyl, t-butoxycarbonyl, isobutyloxycarbonyl, sec-butyloxycarbonyl, n-pentyloxycarbonyl, t-amyloxycarbonyl, n-hexyloxycarbonyl, cyclohexyloxycarbonyl, 2-ethyl-hexyl-hydroxycarbonyl and the like.

The amide group may have preferably 1 to 20 carbon atoms, more preferably 1 to 16 carbon atoms, and particularly preferably 1 to 12 carbon atoms, and examples thereof include acetamide, ethyl carboxamide, n-propyl carboxamide, isopropyl carboxamide, n-butyl carboxamide, t-butyl carboxamide, isobutyl carboxamide, sec-butyl carboxamide, n-pentyl carboxamide, t-amyl carboxamide, n-hexyl carboxamide, cyclohexyl carboxamide, 1-ethyl pentyl carboxamide, 1-ethylpropyl carboxamide, n-heptyl carboxamide, n-octyl carboxamide, 1-adamantane carboxamide, 2-adamantane carboxamide, n-nonyl carboxamide, n-dodecyl carboxamide, pentacarboxamide, n-hexadecyl carboxamide and the like.

The carbamoyl group may have preferably 1 to 20 carbon atoms, more preferably 1 to 16 carbon atoms, and particularly preferably 1 to 12 carbon atoms, and examples thereof include methylcarbamoyl, dimethylcarbamoyl, ethyl carbamoyl, diethylcarbamoyl, n-propyl carbamoyl, isopropyl carbamoyl, n-butyl carbamoyl, t-butyl carbamoyl, isobutyl carbamoyl, sec-butyl carbamoyl, n-pentyl carbamoyl, t-amyl carbamoyl, n-hexylcarbamoyl, cyclohexyl carbamoyl, 2-ethylhexyl carbamoyl, 2-ethyl butyl carbamoyl, t-octyl carbamoyl, n-heptyl carbamoyl, n-octyl carbamoyl, 1-adamantane carbamoyl, 2-adamantane carbamoyl, n-decyl carbamoyl, n-dodecyl carbamoyl, n-tetradecyl carbamoyl, n-hexadecyl carbamoyl and the like. $Y^{31}$ to $Y^{70}$ may further contain a substituent, and examples of the substituent include those exemplified for the substituent of $R^{11}$ to $R^{13}$.

$V^{31}$ to $V^{43}$ each independently represent a hydrogen atom, or an aliphatic group having preferably 1 to 20 carbon atoms, more preferably 1 to 16 carbon atoms, and particularly preferably 1 to 12 carbon atoms. Herein, the aliphatic group is preferably an aliphatic hydrocarbon group, more preferably an alkyl group (including straight-chained, branched and cyclic alkyl groups), an alkenyl group or an alkynyl group. Examples of the alkyl group include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethyl cyclohexyl, 4-t-butylcyclohexyl, cyclopentyl, 1-adamanthyl, 2-adamanthyl, bicyclo[2.2.2]octane-3-yl and the like; examples of the alkenyl group include vinyl, allyl, prenyl, geranyl, oleyl, 2-cyclopentene-1-yl, 2-cyclohexene-1-yl and the like; and examples of the alkynyl group include ethynyl, propargyl and the like. $V^{31}$ to $V^{43}$ may further contain a substituent, and examples of the substituent include those exemplified for the substituent of $R^{11}$ to $R^{13}$.

$L^{31}$ to $L^{80}$ each independently represent a divalent saturated linkage having 0 to 40 atoms. Herein, the description, "$L^{31}$ to $L^{80}$ having 0 atom" means that the groups at both the ends of the linkage directly form a single bond. Preferred examples of $L^{31}$ to $L^{77}$ include an alkylene group (for example, methylene, ethylene, propylene, trimethylene, tetramethylene, pentamethylene, hexamethylene, methylethylene, ethylethylene and the like), a cyclic divalent group (for example, cis-1,4-cyclohexylene, trans-1,4-cyclohexylene, 1,3-cyclopentylidene and the like), ether, thioether, ester, amide, sulfone, sulfoxide, sulfide, sulfonamide, ureylene, thioureylene and the like. Examples of the composite substituent include —$(CH_2)_2O(CH_2)_2$—, —$(CH_2)_2O(CH_2)_2O(CH_2)$—, —$(CH_2)_2S(CH_2)_2$—, —$(CH_2)_2O_2C(CH_2)_2$— and the like. $L^{31}$ to $L^{80}$ may further contain a substituent, and examples of the substituent include those exemplified for the substituent of $R^{11}$ to $R^{13}$.

Preferred examples of the compound formed by combinations of $Y^{31}$ to $Y^{70}$, $V^{31}$ to $V^{43}$ and $L^{31}$ to $L^{80}$ include citric acid esters (for example, O-acetyl triethyl citrate, O-acetyl tributyl citrate, acetyl triethyl citrate, acetyl tributyl citrate, O-acetyl tri(ethyloxycarbonyl methylene) citrate and the like), oleic acid esters (for example, ethyl oleate, butyl oleate, 2-ethylhexyl oleate, phenyl oleate, cyclohexyl oleate, octyl oleate and the like), ricinoleic acid esters (for example, methyl acetyl ricinoleate and the like), sebacic acid esters (for example, dibutyl sebacate and the like), carboxylic acid esters of glycerin (for example, triacetin, tributyrin and the like), glycolic acid esters (for example, butyl-phthalyl-butyl glycolate, ethyl phthalylethyl glycolate, methyl phthalylethyl glycolate, butyl-phthalyl-butyl glycolate, methyl phthalyl methyl glycolate, propyl phthalyl propyl glycolate, butyl-phthalyl-butyl glycolate, octyl phthalyl octyl glycolate and the like), carboxylic acid esters of pentaerythritol (for example, pentaerythritol tetraacetate, pentaerythritol tetraacetate and the like), carboxylate of dipentaerythritol (for example, dipentaerythritol hexaacetate, dipentaerythritol hexabutylate, dipentaerythritol tetraacetate and the like), carboxylic acid esters of trimethylolpropane (trimethylolpropane triacetate, trimethylolpropane diacetate, trimethylolpropane monopropionate, trimethylolpropane tripropionate, trimethylolpropane tributylate, trimethylolpropane tripivaloate, trimethylolpropane tri(t-butyl acetate), trimethylolpropane di-2-ethylhexanate, trimethylolpropane tetra-2-ethylhexanate, trimethylolpropane diacetate monooctanate, trimethylolpropane trioctanoate, trimethylolpropane tri(cyclohexane carboxylate) and the like), glycerol esters as described in JP-A No. 11-246704, digylcerol esters as described in JP-A. No. 2000-63560, citric acid esters as described in JP-A. No. 11-92574, pyrrolidone carboxylic acid esters (methyl 2-pyrrolidone-5-carboxylate, ethyl 2-pyrrolidone-5-carboxylate, 2-pyrrolidone-5-butyl carboxylate, 2-ethylhexyl 2-pyrrolidone-5-carboxylate), cyclohexanedicarboxylic acid esters (dibutyl 1,2-cis-cyclohexanedicarboxylate, dibutyl trans-1,2-cyclohexanedicarboxylate, dibutyl cis-1,4-cyclohexanedicarboxylate, dibutyl trans-1,4-cyclohexanedicarboxylate), xylitol carboxylic acid esters ate (xylitol pentaacetate, xylitol tetraacetate, xylitol pentapropionate.

Hereinbelow, examples of the compound of the invention represented by Formulas (1) to (12) are given. For Formula (1), Compounds C-1 to C-76 are given, and for Formulas (2) to (12), Compounds C-201 to C-231, C-401 to C-448 are given. The values of log P as described in the tables or in the parenthesis are determined according to a Crippen's fragmentation method (J. Chem. Inf. Comput. Sci., 27, 21 (1987).

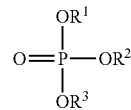

wherein $R^1$ to $R^3$ have the same meanings as $R^{11}$ to $R^{13}$ in the above-described Formula (1), and specific examples thereof are shown below as Compounds C-1 to C-76.

| compound | $R^1$ | $R^2$ | $R^3$ | log P |
|---|---|---|---|---|
| C-1 | $CH_3$ | $C_2H_5$ | $C_2H_5$ | 1.24 |
| C-2 | $C_2H_5$ | $C_2H_5$ | $C_2H_5$ | 1.58 |
| C-3 | $C_3H_7$ | $C_3H_7$ | $C_3H_7$ | 2.99 |
| C-4 | i-$C_3H_7$ | i-$C_3H_7$ | i-$C_3H_7$ | 2.82 |
| C-5 | $C_4H_9$ | $C_4H_9$ | $C_4H_9$ | 4.18 |
| C-6 | i-$C_4H_9$ | i-$C_4H_9$ | i-$C_4H_9$ | 4.2 |
| C-7 | s-$C_4H_9$ | s-$C_4H_9$ | s-$C_4H_9$ | 4.23 |
| C-8 | t-$C_4H_9$ | t-$C_4H_9$ | t-$C_4H_9$ | 3.06 |
| C-9 | $C_5H_{11}$ | $C_5H_{11}$ | $C_5H_{11}$ | 5.37 |
| C-10 | $CH_2C(CH_3)_3$ | $CH_2C(CH_3)_3$ | $CH_2C(CH_3)_3$ | 5.71 |
| C-11 | c-$C_5H_9$ | c-$C_5H_9$ | c-$C_5H_9$ | 4.12 |
| C-12 | 1-ethylpropyl | 1-ethylpropyl | 1-ethylpropyl | 5.63 |
| C-13 | $C_6H_{13}$ | $C_6H_{13}$ | $C_6H_{13}$ | 6.55 |
| C-14 | c-$C_6H_{11}$ | c-$C_6H_{11}$ | c-$C_6H_{11}$ | 5.31 |
| C-15 | $C_7H_{15}$ | $C_7H_{15}$ | $C_7H_{15}$ | 7.74 |
| C-16 | 4-methylcyclohexyl | 4-methylcyclohexyl | 4-methylcyclohexyl | 6.3 |
| C-17 | 4-t-butylcyclohexyl | 4-t-butylcyclohexyl | 4-t-butylcyclohexyl | 9.78 |
| C-18 | $C_8H_{17}$ | $C_8H_{17}$ | $C_8H_{17}$ | 8.93 |
| C-19 | 2-ethylhexyl | 2-ethylhexyl | 2-ethylhexyl | 8.95 |
| C-20 | 3-methylbutyl | 3-methylbutyl | 3-methylbutyl | 5.17 |
| C-21 | 1,3-dimethylbutyl | 1,3-dimethylbutyl | 1,3-dimethylbutyl | 6.41 |
| C-22 | 1-isopropyl-2-methylpropyl | 1-isopropyl-2-methylpropyl | 1-isopropyl-2-methylpropyl | 8.05 |
| C-23 | 2-ethylbutyl | 2-ethylbutyl | 2-ethylbutyl | 6.57 |
| C-24 | 3,5,5-trimethylhexyl | 3,5,5-trimethylhexyl | 3,5,5-trimethylhexyl | 9.84 |
| C-25 | cyclohexylmethyl | cyclohexylmethyl | cyclohexylmethyl | 6.25 |
| C-26 | $CH_3$ | $CH_3$ | 2-ethylhexyl | 3.35 |
| C-27 | $CH_3$ | $CH_3$ | 1-adamantyl | 2.27 |
| C-28 | $CH_3$ | $CH_3$ | $C_{12}H_{25}$ | 4.93 |
| C-29 | $C_2H_5$ | $C_2H_5$ | 2-ethylhexyl | 4.04 |
| C-30 | $C_2H_5$ | $C_2H_5$ | 1-adamantyl | 2.96 |
| C-31 | $C_2H_5$ | $C_2H_5$ | $C_{12}H_{25}$ | 5.62 |
| C-32 | $C_4H_9$ | $C_4H_9$ | cyclohexyl | 4.55 |
| C-33 | $C_4H_9$ | $C_4H_9$ | $C_6H_{13}$ | 4.97 |
| C-34 | $C_4H_9$ | $C_4H_9$ | $C_8H_{17}$ | 5.76 |
| C-35 | $C_4H_9$ | $C_4H_9$ | 2-ethylhexyl | 5.77 |
| C-36 | $C_4H_9$ | $C_4H_9$ | $C_{10}H_{21}$ | 6.55 |
| C-37 | $C_4H_9$ | $C_4H_9$ | $C_{12}H_{25}$ | 7.35 |
| C-38 | $C_4H_9$ | $C_4H_9$ | 1-adamantyl | 4.69 |
| C-39 | $C_4H_9$ | $C_4H_9$ | $C_{16}H_{33}$ | 8.93 |
| C-40 | $C_4H_9$ | $C_4H_9$ | dicyclcpentadienyl | 4.68 |
| C-41 | $C_6H_{13}$ | $C_6H_{13}$ | $C_{14}H_{29}$ | 9.72 |
| C-42 | $C_6H_{13}$ | $C_6H_{13}$ | $C_8H_{17}$ | 7.35 |
| C-43 | $C_6H_{13}$ | $C_6H_{13}$ | 2-ethylhexyl | 7.35 |
| C-44 | $C_6H_{13}$ | $C_6H_{13}$ | $C_{10}H_{21}$ | 8.14 |
| C-45 | $C_6H_{13}$ | $C_6H_{13}$ | $C_{12}H_{25}$ | 8.93 |
| C-46 | $C_6H_{13}$ | $C_6H_{13}$ | 1-adamantyl | 6.27 |
| C-47 | 4-chlorobutyl | 4-chlorobutyl | 4-chlorobutyl | 4.18 |
| C-48 | 4-chlorohexyl | 4-chlorohexyl | 4-chlorohexyl | 6.55 |

-continued

| compound | R¹ | R² | R³ | log P |
|---|---|---|---|---|
| C-49 | 4-bromobutyl | 4-bromobutyl | 4-bromobutyl | 4.37 |
| C-50 | 4-bromobutyl | 4-bromobutyl | 4-bromohexyl | 6.74 |
| C-51 | $(CH_2)_2OCH_2CH_3$ | $(CH_2)_2OCH_2CH_3$ | $(CH_2)_2OCH_2CH_3$ | 1.14 |
| C-52 | $C_8H_{17}$ | $C_8H_{17}$ | $(CH_2)_2O(CH_2)_2OCH_2CH_3$ | 6.55 |
| C-53 | $C_6H_{13}$ | $C_6H_{13}$ | $(CH_2)_2O(CH_2)_2OCH_2CH_3$ | 4.96 |
| C-54 | $C_4H_9$ | $C_4H_9$ | $(CH_2)_2O(CH_2)_2OCH_2CH_3$ | 3.38 |
| C-55 | $C_4H_9$ | $C_4H_9$ | $(CH_2)_2O(CH_2)_2OCH_2OH$ | 2.59 |
| C-56 | $C_6H_{13}$ | $C_6H_{13}$ | $(CH_2)_2O(CH_2)_2OCH_2OH$ | 4.18 |
| C-57 | $C_8H_{17}$ | $C_8H_{17}$ | $(CH_2)_2O(CH_2)_2OCH_2OH$ | 5.76 |
| C-58 | $C_4H_9$ | $(CH_2)_2O(CH_2)_2OCH_2OH$ | $(CH_2)_2O(CH_2)_2OCH_2OH$ | 2.2 |
| C-59 | $C_4H_9$ | $C_4H_9$ | $CH_2CH=CH_2$ | 4.19 |
| C-60 | $C_4H_9$ | $CH_2CH=CH_2$ | $CH_2CH=CH_2$ | 3.64 |
| C-61 | $(CH_2)_2CO_2CH_2CH_3$ | $(CH_2)_2CO_2CH_2CH_3$ | $(CH_2)_2CO_2CH_2CH_3$ | 1.1 |
| C-62 | $(CH_2)_2CO_2(CH_2)_3CH_3$ | $(CH_2)_2CO_2(CH_2)_3CH_3$ | $(CH_2)_2CO_2(CH_2)_3CH_3$ | 3.69 |
| C-63 | $(CH_2)_2CONH(CH_2)_3CH_3$ | $(CH_2)_2CONH(CH_2)_3CH_3$ | $(CH_2)_2CONH(CH_2)_3CH_3$ | 1.74 |
| C-64 | $C_4H_9$ | $C_4H_9$ | $(CH_2)_4OP=O(OC_4H_9)_2$ | 6.66 |
| C-65 | $C_4H_9$ | $C_4H_9$ | $(CH_2)_3OP=O(OC_4H_9)_2$ | 6.21 |
| C-66 | $C_4H_9$ | $C_4H_9$ | $(CH_2)_2OP=O(OC_4H_9)_2$ | 6.16 |
| C-67 | $C_4H_9$ | $C_4H_9$ | $(CH_2)_2O(CH_2)_2OP=O(OC_4H_9)_2$ | 5.99 |
| C-68 | $C_6H_{13}$ | $C_6H_{13}$ | $(CH_2)_2O(CH_2)_2OP=O(OC_4H_9)_2$ | 7.58 |
| C-69 | $C_6H_{13}$ | $C_6H_{13}$ | $(CH_2)_2OP=O(OC_4H_9)_2$ | 8.25 |
| C-70 | $c\text{-}C_6H_{11}$ | $c\text{-}C_6H_{11}$ | $(CH_2)_2O(CH_2)_2OP=O(OC_4H_9)_2$ | 6.35 |
| C-71 | $C_6H_{12}Cl$ | $C_6H_{12}Cl$ | $(CH_2)_2O(CH_2)_2OP=O(OC_4H_9)_2$ | 7.18 |
| C-72 | $C_4H_8Cl$ | $C_4H_8Cl$ | $(CH_2)_2O(CH_2)_2OP=O(OC_4H_9)_2$ | 5.6 |
| C-73 | $C_4H_8Cl$ | $C_4H_8Cl$ | $(CH_2)_2O(CH_2)_2OP=O(OC_4H_8Cl)_2$ | 5.59 |
| C-74 | $C_4H_9$ | $C_4H_9$ | 2-tetrahydrofuranyl | 3.27 |
| C-75 | $C_4H_9$ | 2-tetrahydrofuranyl | 2-tetrahydrofuranyl | 2.36 |
| C-76 | 2-tetrahydrofuranyl | 2-tetrahydrofuranyl | 2-tetrahydrofuranyl | 1.45 |

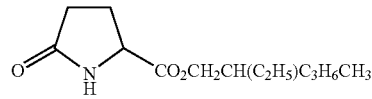

C-201
(2.00)

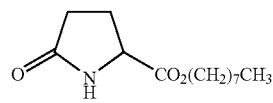

C-202
(2.02)

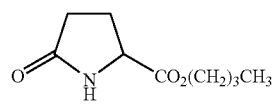

C-203
(3.69)

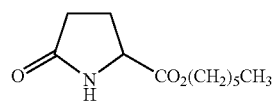

C-204
(1.18)

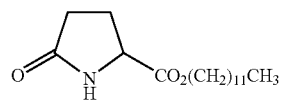

C-205
(5.36)

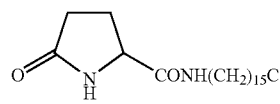

C-206
(4.68)

| compound | R¹ | R² | R³ | log P |
|---|---|---|---|---|

C-207
(1.32)
R¹ = 5-oxopyrrolidin-2-yl with CONHCH₂CH(C₂H₅)C₃H₆CH₃

C-208
(2.42)
R¹ = 6-oxopiperidin-2-yl with CO₂CH₂CH(C₂H₅)C₃H₆CH₃

C-209
(4.10)
R¹ = 6-oxopiperidin-2-yl with CO₂(CH₂)₁₁CH₃

C-210
(5.77)
R¹ = 6-oxopiperidin-2-yl with CO₂(CH₂)₁₅CH₃

C-211
(3.43)
R¹ = 6-oxopiperidin-2-yl with CONH(CH₂)₁₁CH₃

C-212
(3.84)
cyclohexane-1,2-diyl with CO₂C₄H₉, CO₂C₄H₉

C-213
(5.51)
cyclohexane-1,2-diyl with CO₂C₆H₁₃, CO₂C₆H₁₃

C-214
(7.14)
cyclohexane-1,2-diyl with CO₂CH₂CH(C₂H₅)C₃H₆CH₃, CO₂CH₂CH(C₂H₅)C₃H₆CH₃

-continued

| compound | R¹ | R² | R³ | log P |
|---|---|---|---|---|

C-215
(3.84)

R¹ = 1,4-cyclohexylene with CO₂C₄H₉ groups at both positions

C-216
(5.51)

R¹ = 1,4-cyclohexylene with CO₂C₆H₁₃ groups at both positions

C-217
(7.14)

R¹ = 1,4-cyclohexylene with CO₂CH₂CH(C₂H₅)C₃H₆CH₃ groups at both positions

C-218
(2.98)

R¹ = tetrahydrofuran-2-yl with CO₂CH₂CH(C₂H₅)C₃H₆CH₃

C-219
(3.70)

R¹ = tetrahydrothiophen-2-yl with CO₂CH₂CH(C₂H₅)C₃H₆CH₃

C-220
(2.15)

R¹ = tetrahydropyran with substituents H₃CH₂COCO, H₃CH₂COCO, O₂CCH₂CH₃, O₂CCH₂CH₃, O₂CCH₂CH₃

C-221
(4.45)

R¹ = tetrahydropyran with substituents H₃C(H₂C)₂OCO, H₃C(H₂C)₂OCO, O₂C(CH₂)₂CH₃, O₂C(CH₂)₂CH₃, O₂C(CH₂)₂CH₃

| compound | R¹ | R² | R³ | log P |
|---|---|---|---|---|

C-222
(1.27)

C-223
(6.53)

C-224
(2.23)

C-225
(5.01)

C-226
(1.31)

C-227
(5.69)

-continued

| compound | R¹ | R² | R³ | log P |
|---|---|---|---|---|

C-228
(1.56)

C-229
(3.51)

C-230
(5.18)

C-231
(3.90)

C-401
(2.37)

C-402
(5.71)

C-403
(7.53)

C-404
(5.72)

-continued
| compound | R¹ | R² | R³ | log P |
|---|---|---|---|---|
C-405
(1.81)
C-406
(3.52)
C-407
(5.45)
C-408
(1.66)
C-409
(2.58)
C-410
(5.14)
C-411
(1.32)
C-412
(3.22)

-continued

| compound | R¹ | R² | R³ | log P |
|---|---|---|---|---|

C-413 (2.10): glycerol with $C_7H_{15}OC(O)-$, $-OCOCH_3$, and $-OCOCH_3$ substituents C-414 (4.61): glycerol with $-OH$, $-OCOC_7H_{15}$, and $-OCOC_7H_{15}$ substituents C-415 (4.84): glycerol with $H_3COCO-$, $-OCOC_7H_{15}$, and $-OCOC_7H_{15}$ substituents C-416 (2.43): neopentyl core with $C_2H_5-$ and three $-CH_2OCOCH_2CH_3$ groups C-417 (1.78): neopentyl core with $C_2H_5-$, one $-CH_2OCOCH_3$ and two $-CH_2OCOCH_2CH_3$ C-418 (2.61): neopentyl core with $C_2H_5-$, one $-CH_2OCOCH_3$ and two $-CH_2OCO(CH_2)_2CH_3$ C-419 (1.31): neopentyl core with $C_4H_9-$ and three $-CH_2OCOCH_3$ C-420 (2.56): neopentyl core with $C_7H_{15}-$ and three $-CH_2OCOCH_3$ C-421 (4.23): neopentyl core with $C_{11}H_{23}-$ and three $-CH_2OCOCH_3$ -continued

| compound | R¹ | R² | R³ | log P |
|---|---|---|---|---|

C-422 (1.84): H₃CH₂COCOH₂C—C(CH₂OCOCH₂CH₃)(CH₂OCOCH₂CH₃)—CH₂OCOCH₂CH₃

C-423 (3.51): C₃H₇CO₂H₂C—C(CH₂OCOC₃H₇)(CH₂OCOC₃H₇)—CH₂OCOC₃H₇

C-424 (2.44): H₃COCOH₂C—C(CH₂OCOC₃H₇)(CH₂OCOC₃H₇)—CH₂OCOC₃H₇

C-425 (2.54): H₃CH₂COCOH₂C—C(CH₂OCOCH₂CH₃)(CH₂OCOCH₂CH₃)—CH₂—O—H₂C—C(CH₂OCOCH₂CH₃)(CH₂OCOCH₂CH₃)—CH₂OCOCH₂CH₃

C-426 (3.01): CH₃OCO—C(CH₂CO₂C₄H₉)(CH₂CO₂C₄H₉)—CH₂CO₂C₄H₉

C-427 (2.78): HO—C(CH₂CO₂C₄H₉)(CH₂CO₂C₄H₉)—CH₂CO₂C₄H₉

C-428 (1.91): CH₃OCO—C(CH₂CO₂C(CH₃)₃)(CH₂CO₂C(CH₃)₃)—CH₂CO₂C(CH₃)₃

C-429 (1.03): C₈H₁₇OCO—C(CH₂CO₂CH₂CO₂CH₃)(CH₂CO₂CH₂CO₂CH₃)—CH₂CO₂CH₂CO₂CH₃

| compound | R¹ | R² | R³ | log P |
|---|---|---|---|---|

HO—C(CH₂CO₂CH₂CO₂C₄H₉)₃
C-430
(1.36)

CH₃OCO—C(CH₂CO₂CH₂CO₂C₄H₉)₃
C-431
(1.59)

(CH₃OCO)₂CH—CH(CO₂C₄H₉)₂
C-432
(1.52)

(CH₃OCO)₂CH—CH(CO₂C₆H₁₃)₂
C-433
(3.19)

(CH₃(CH₂)₂OCO)₂CH—CH(CO₂C₄H₉)₂
C-434
(3.66)

H₃CH₂C—C(CH₂OCOCH₂CH₃)₂—CH₂—O—H₂C—C(CH₂OCOCH₂CH₃)₂—CH₂CH₃
C-435
(3.73)

H₃CH₂C—C(CH₂OCOCH₃)₂—CH₂—O—H₂C—C(CH₂OCOCH₃)₂—CH₂CH₃
C-436
(1.12)

CH₂OCOC₂H₅
CHOCOC₂H₅
CHOCOC₂H₅
CHOCOC₂H₅
CHOCOC₂H₅
CH₂OCOC₂H₅
C-437
(2.36)

-continued

| compound | R¹ | R² | R³ | log P |
|---|---|---|---|---|

$CH_2OCOCH_3$
|
$CHOCOCH_3$
|
$CHOCOCH_3$
|
$CHOCOCH_3$
|
$CHOCOCH_3$
|
$CH_2OCOC_9H_{19}$

C-438
(2.02)

$CH_2OCOC_{11}H_{23}$
|
$CHOH$
|
$CHOCOCH_3$
|
$CHOCOCH_3$
|
$CHOCOCH_3$
|
$CH_2OCOCH_3$

C-439
(2.62)

$CH_2OCOCH_3$
|
$CHOCOC_2H_5$
|
$CHOCOC_2H_5$
|
$CHOCOC_2H_5$
|
$CH_2OCOC_2H_5$

C-440
(1.36)

$CH_2OCOCH_3$
|
$CHOCOCH_3$
|
$CHOCOCH_3$
|
$CHOCOCH_3$
|
$CH_2OCOC_9H_{19}$

C-441
(2.32)

$CH_2OCOC_{11}H_{23}$
|
$CHOCOCH_3$
|
$CHOCOCH_3$
|
$CHOCOCH_3$
|
$CH_2OCOCH_3$

C-442
(3.16)

$H_3CH_2COCOH_2C$—C($CH_2OCOCH_2CH_3$)($CH_2OCOCH_2CH_3$)—$CH_2CH_2OCH_2CH_2CH(CH_2CH_2OCOCH_2CH_3)_2$

C-443
(3.37)

| compound | R¹ | R² | R³ | log P |
|---|---|---|---|---|

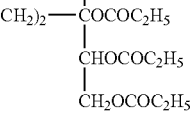
C-444
(1.63)

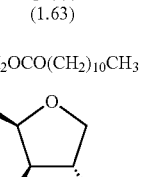
C-445
(3.03)

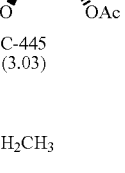
C-446
(1.69)

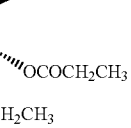
C-447
(0.47)

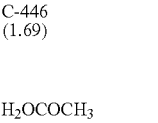
C-448
(3.60)

The compounds of Formulas (13) and (14) are described below.

In Formula (13), $R^1$ represents an alkyl group or an aryl group, and $R^2$ and $R^3$ each independently represent a hydrogen atom, an alkyl group or an aryl group. Further, the total number of the carbon atoms of $R^1$, $R^2$ and $R^3$ is particularly preferably 10 or greater. In Formula (14), $R^4$ and $R^5$ each independently represent an alkyl group or an aryl group. Further, the total number of the carbon atoms of $R^4$ and $R^5$ is 10 or greater, and each of $R^4$ and $R^5$ may have an alkyl group and an aryl group substituted. The substituent is preferably a fluorine atom, an alkyl group, an aryl group, an alkoxyl group, a sulfone group and a sulfonamide group, and particularly preferably an alkyl group, an aryl group, an alkoxyl group, a sulfone group and a sulfonamide group. Further, the alkyl group may be straight-chained, branched or cyclic, and preferably has 1 to 25 carbon atoms, more preferably 6 to 25 carbon atoms, and particularly preferably 6 to 20 carbon atoms (for example, methyl, ethyl, propyl, isopropyl, butyl, isobutyl, t-butyl, amyl, isoamyl, t-amyl, hexyl, cyclohexyl, heptyl, octyl, bicyclo octyl, nonyl, adamanthyl, decyl, t-octyl, undecyl, dodecyl, tridecyl, tetradecyl, pentadecyl, hexadecyl, heptadecyl, octadecyl, nonadecyl, didecyl). The aryl group preferably has 6 to 30 carbon atoms, and particularly preferably 6 to 24 carbon atoms (for example, phenyl, biphenyl, terphenyl, naphthyl, binaphthyl, triphenyl phenyl). Preferred examples of the compounds represented by Formula (13) or Formula (14) are given below.

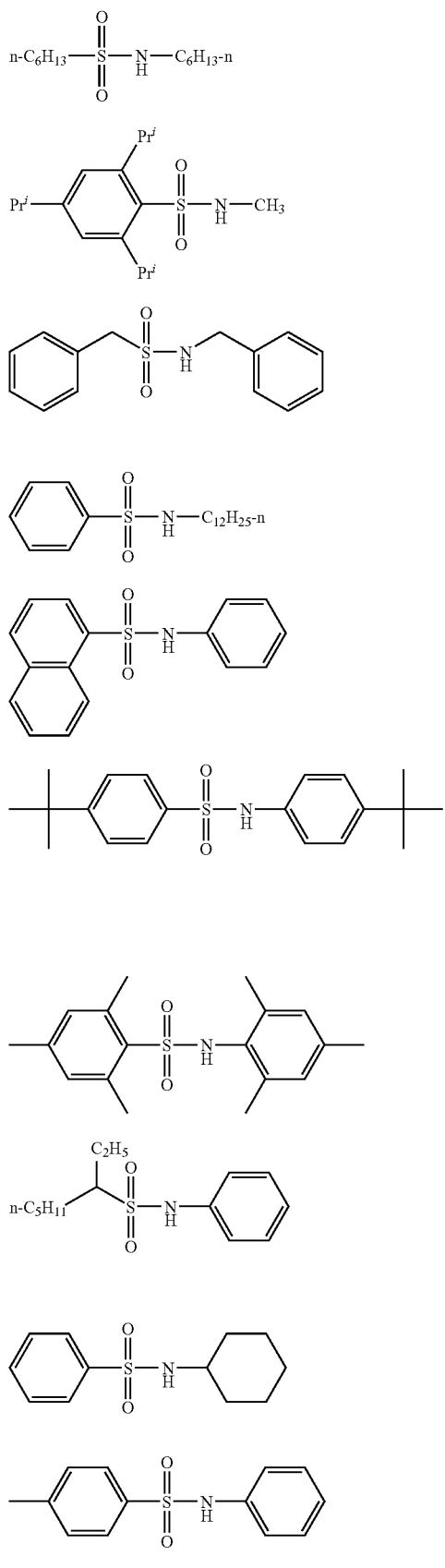
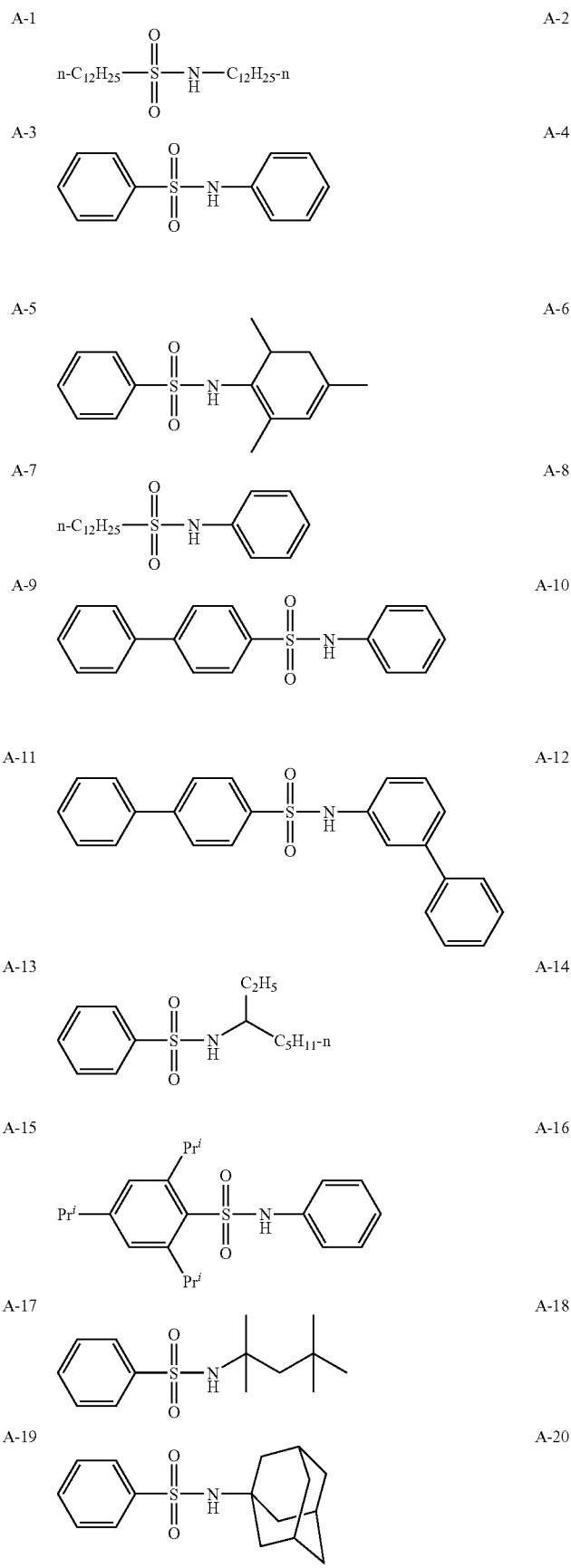

-continued
A-21 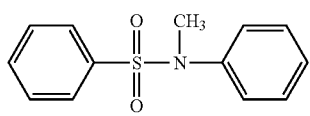
A-22 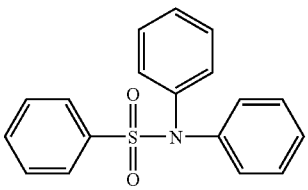
A-23 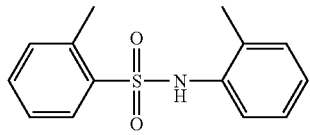
A-24 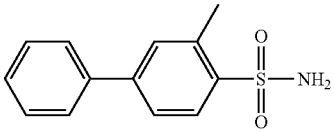
A-25 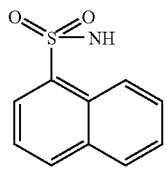
A-26 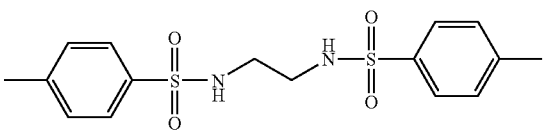
A-27 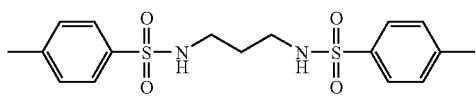
A-28 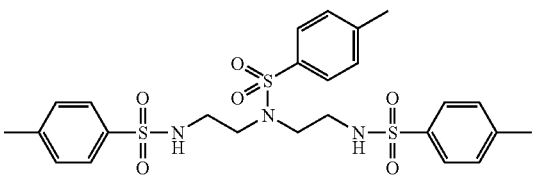
A-29 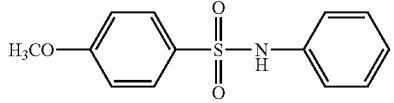
A-30 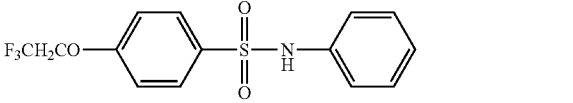
A-31 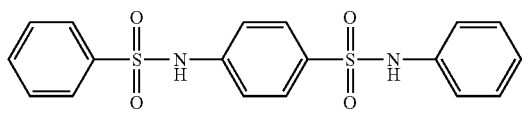
A-32 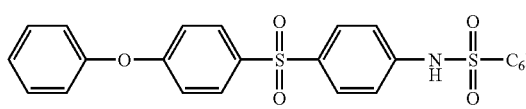
A-33 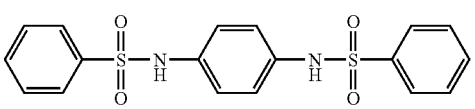
A-34 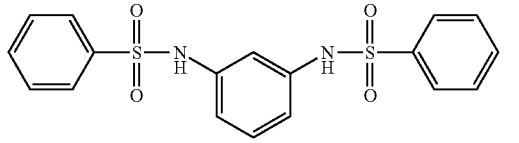
A-35 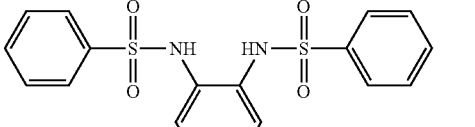
A-36 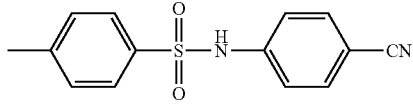
A-37 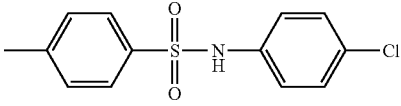
A-38
A-39 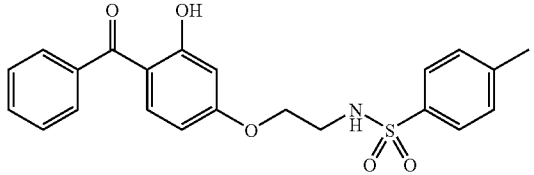
A-40 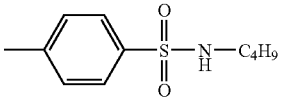

-continued
A-41 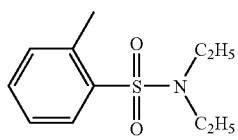
A-42 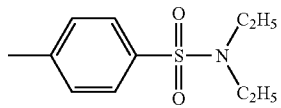
A-43 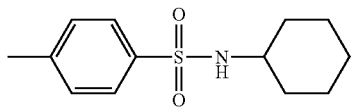
A-44 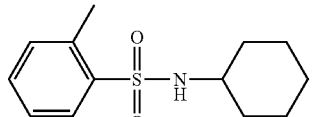
A-45 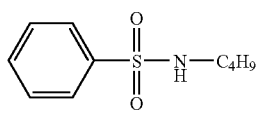
A-46 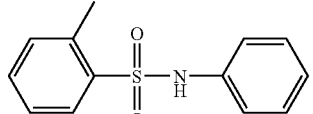
A-47 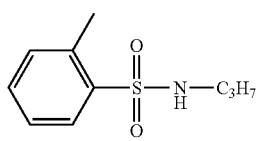
A-48 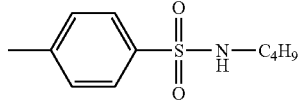
A-49 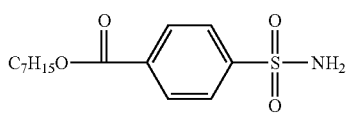
A-50 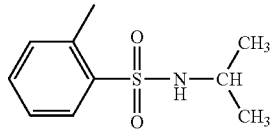
A-51 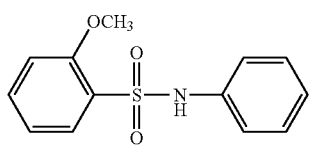
B-1 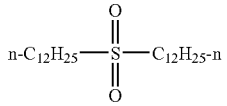
B-2 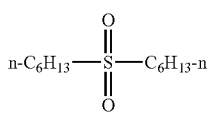
B-3 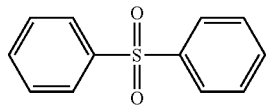
B-4 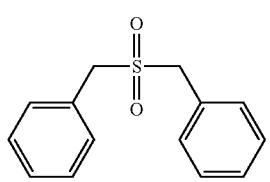
B-5 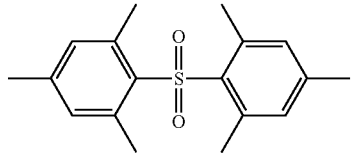
B-6 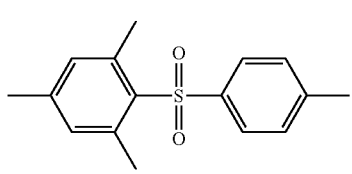
B-7 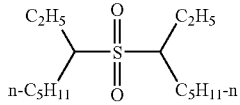
B-8 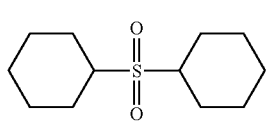
B-9 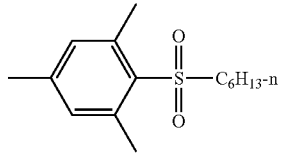

-continued
B-10
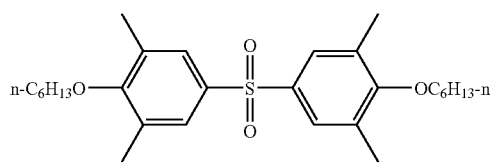
B-11
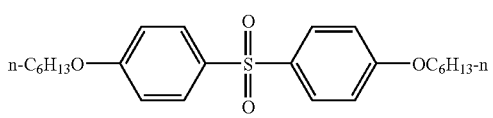
B-12
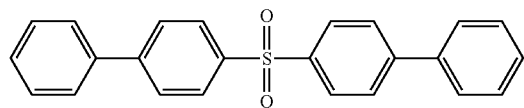
B-13
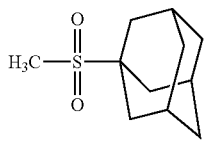
B-14
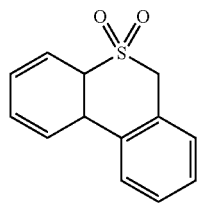
B-15
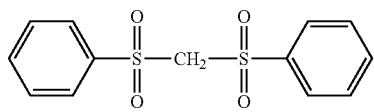
B-16
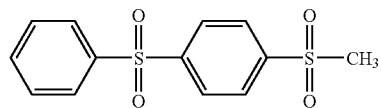
B-17
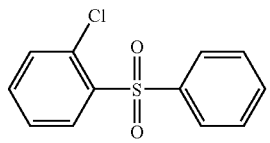
B-18
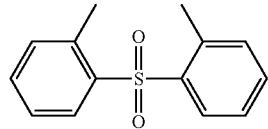
B-19
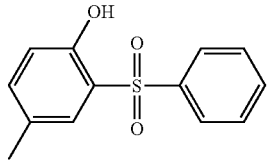
B-20
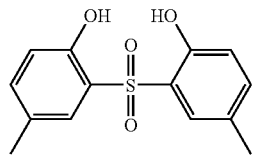
B-21
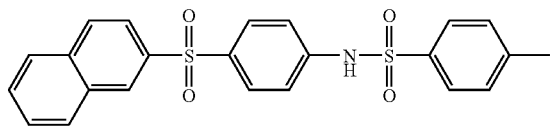
B-22
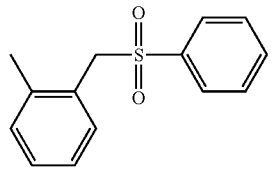
B-23
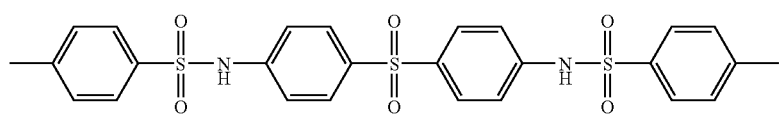
B-24
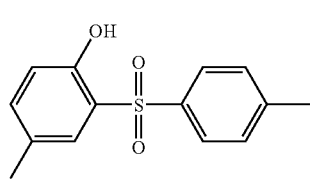
B-25
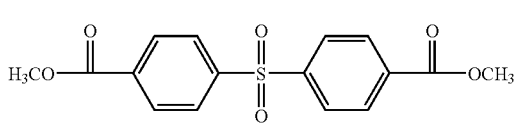

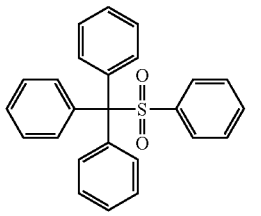
B-26

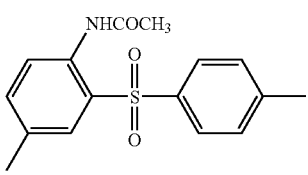
B-28

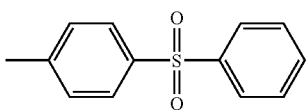
B-30

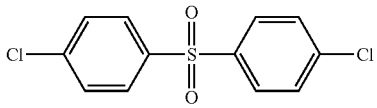
B-32

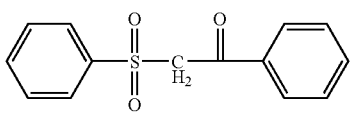
B-34

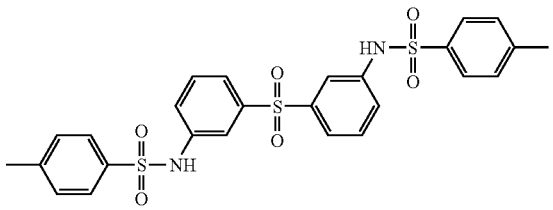
B-27

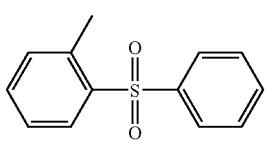
B-29

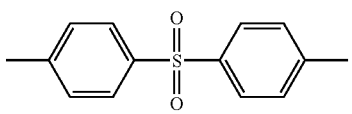
B-31

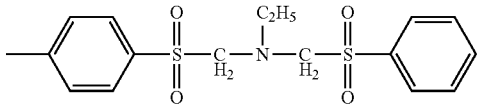
B-33

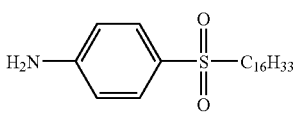
B-35

The compounds of Formula (15) are described below.

In the Formula (15), $R^1$, $R^2$ and $R^3$ are preferably each independently a hydrogen atom or an alkyl group having 1 to carbon atoms (e.g., methyl, ethyl, propyl, isopropyl, butyl, amyl and isoamyl), and at least one of $R^1$, $R^2$ and $R^3$ is particularly preferably an alkyl group having 1 to 3 carbon atoms (e.g., methyl, ethyl, propyl and isopropyl). X is preferably a divalent linking group composed of one or more kinds of groups selected from the group consisting of a single bond, —O—, —CO—, an alkylene group (preferably having 1 to 6 carbon atoms, and more preferably 1 to 3 carbon atoms; e.g., methylene, ethylene and propylene) or an arylene group (preferably having 6 to 24 carbon atoms, and more preferably 6 to 12 carbon atoms; e.g., phenylene, biphenylene and naphthylene), and particularly preferably a divalent linking group composed of one or more kinds of groups selected from the group consisting of —O—, an alkylene group or an arylene group. Y is preferably a hydrogen atom, an alkyl group (preferably having 2 to 25 carbon atoms, and more preferably 2 to 20 carbon atoms; e.g., ethyl, isopropyl, t-butyl, hexyl, 2-ethylhexyl, t-octyl, dodecyl, cyclohexyl, dicyclohexyl and adamanthyl), an aryl group (preferably having 6 to 24 carbon atoms, and more preferably 6 to 18 carbon atoms; e.g., phenyl, biphenyl, terphenyl and naphthyl) or an aralkyl group (preferably having 7 to 30 carbon atoms, and more preferably 7 to 20 carbon atoms; e.g., benzyl, cresyl, t-butylphenyl, diphenylmethyl and triphenylmethyl), and particularly preferably an alkyl group, an aryl group or an aralkyl group. For combination of —X—Y, the total number of carbon atoms of —X—Y is preferably 0 to 40, more preferably 1 to 30, and most preferably 1 to 25. Preferred examples of the compound represented by Formula (15) are given below but the compounds used in the present invention are not limited thereto.

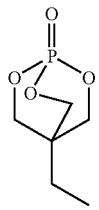
PL-1

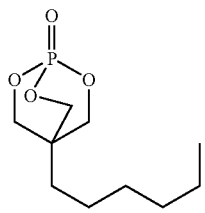
PL-2

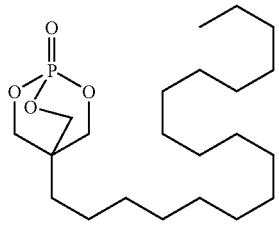
PL-3

PL-4
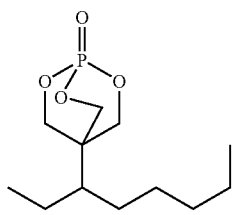
PL-5
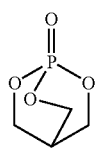
PL-6
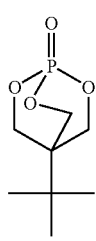
PL-7
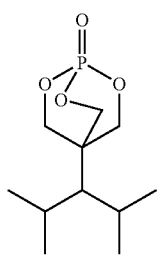
PL-8
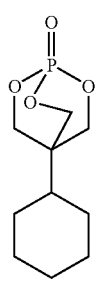
PL-9
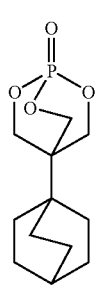
PL-10
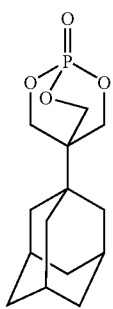
PL-11
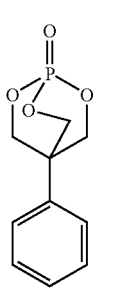
PL-12
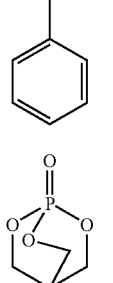
PL-13
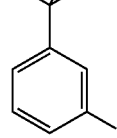
PL-14
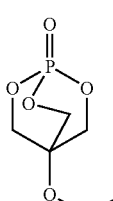
PL-15
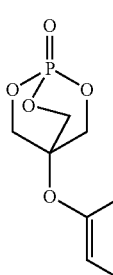

PL-16 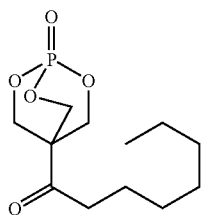
PL-17 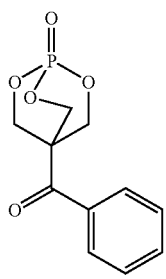
PL-18 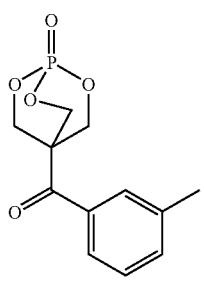
PL-19 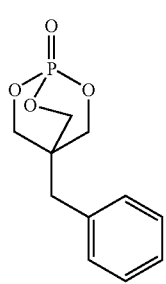
PL-20 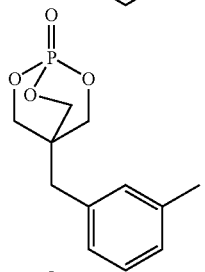
PL-21 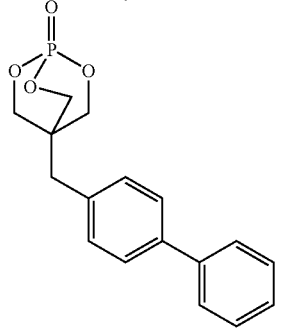
PL-22 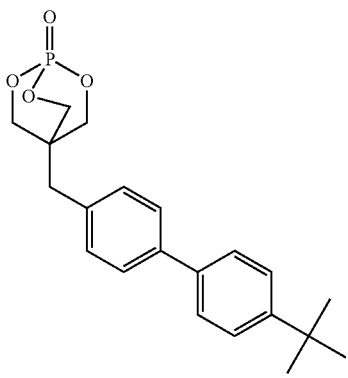
PL-23 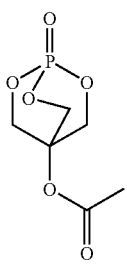
PL-24 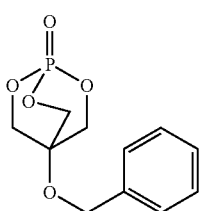
PL-25 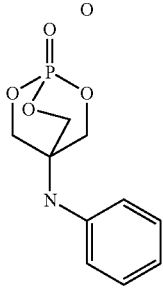
PL-26
PL-27 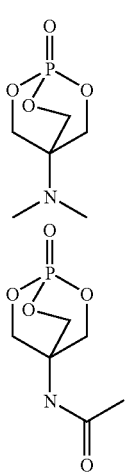

PL-28
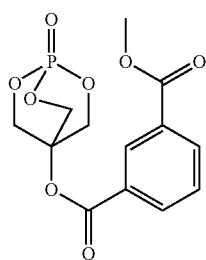
PL-29
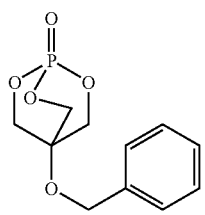
PL-30
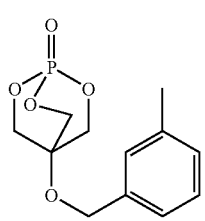
PL-31
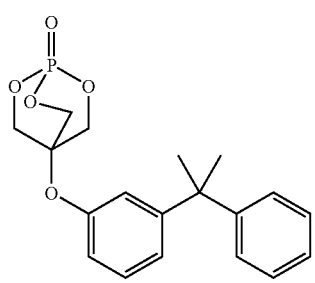
PL-32
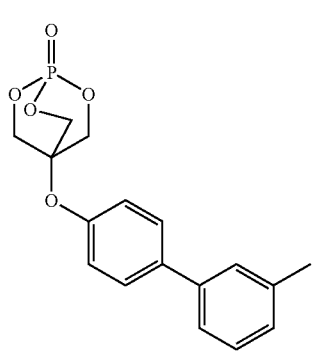
PL-33
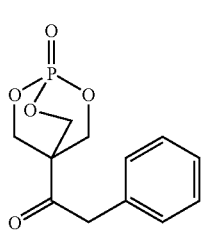
PL-34
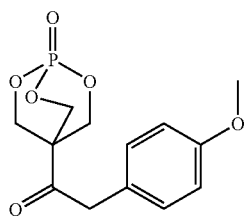
PL-35
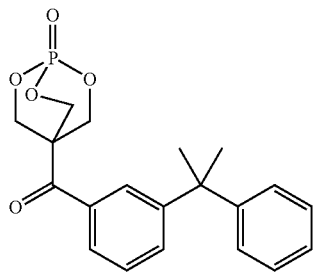
PL-36
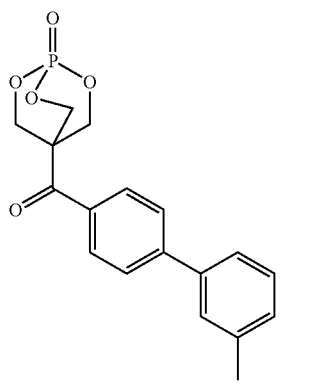
PL-37
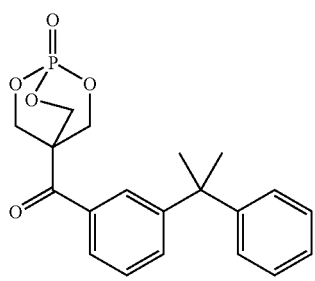
PL-38
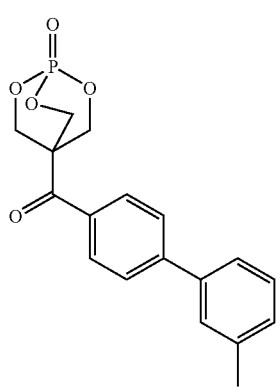

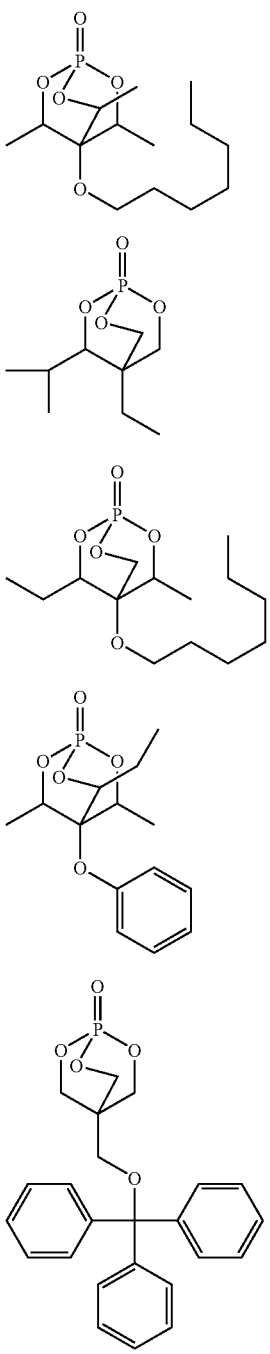

The compounds of Formula (16) are described below.

$Q^1$, $Q^2$ and $Q^3$ each independently represent 5- or 6-membered ring, which may be a heterocyclic hydrocarbon ring, a monocyclic hydrocarbon ring, and may form a condensed ring with other rings. The hydrocarbon ring is preferably a substituted or unsubstituted cyclohexane ring, a substituted or unsubstituted cyclopentane ring, an aromatic hydrocarbon ring, and more preferably an aromatic hydrocarbon ring. The heterocyclic ring is preferably a ring containing at least one selected from an oxygen atom, a nitrogen atom and a sulfur atom of a 5- or 6-membered ring, and more preferably an aromatic heterocyclic ring containing at least one selected from an oxygen atom, a nitrogen atom or a sulfur atom.

$Q^1$, $Q^2$ and $Q^3$ are preferably an aromatic hydrocarbon ring or an aromatic heterocyclic ring. The aromatic hydrocarbon ring is preferably a monocyclic or bicyclic aromatic hydrocarbon ring having 6 to 30 carbon atoms (e.g., a benzene ring, a naphthalene ring, etc.); more preferably an aromatic hydrocarbon ring having 6 to 20 carbon atoms; even more preferably an aromatic hydrocarbon ring having 6 to 12 carbon atoms; and particularly preferably a benzene ring.

The aromatic heterocyclic ring is preferably an aromatic heterocyclic ring containing an oxygen atom, a nitrogen atom or a sulfur atom. Specific examples of the heterocyclic ring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene, etc. Preferred examples of the aromatic heterocyclic ring are pyridine, triazine and quinoline. $Q^1$, $Q^2$ and $Q^3$ are preferably an aromatic hydrocarbon ring, and more preferably a benzene ring. $Q^1$, $Q^2$ and $Q^3$ may be substituted, and the substituent may be exemplified by the following substituent T.

X represents B, C—R (R represents a hydrogen atom or a substituent.), N, P and P═O. X is preferably B, C—R (R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxyl group, a mercapto group, a halogen atom (e.g., a fluorine atom, a chlorine atom, a bromine atom and an iodine atom) and a carboxyl group; more preferably an aryl group, an alkoxy group, an aryloxy group, a hydroxyl group and a halogen atom; even more preferably an alkoxy group and a hydroxyl group; and particularly preferably a hydroxyl group.) and N. X is more preferably C—R and N, and particularly preferably C—R.

The compound represented by Formula (16) is preferably a compound represented by the Formula (17).

In the Formula (17), $X^2$ represents B, C—R (R represents a hydrogen atom or a substituent.) and N. $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ represent a hydrogen atom or a substituent.

X represents B, C—R (R represents a hydrogen atom or a substituent.), N, P and P═O. X is preferably B, C—R (R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxyl group, a mercapto group, a halogen atom (e.g., a fluorine atom, a chlorine atom, a bromine atom and an iodine atom) and a carboxyl group; more preferably an aryl group, an alkoxy group, an aryloxy group, a hydroxyl group and a halogen atom; even more preferably an alkoxy group and a hydroxyl group; and particularly preferably a hydroxyl group.), N and P═O. X is more preferably C—R and N, and particularly preferably C—R.

$R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ represent a hydrogen atom or a substituent, and the substituent may be exemplified by the following substituent T. $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ are preferably an alkyl group, an alkenyl group, an alkynyl group, an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, an ureido group, a phosphoric acid amide group, a hydroxyl group, a mercapto group, a halogen atom (e.g., a fluorine atom, a chlorine atom, a bromine atom and an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms and more preferably 1 to 12 carbon atoms, and having a heteroatom such as a nitrogen atom, an oxygen atom, or a sulfur atom; specifically, e.g., imidazolyl, pyridyl, quinolyl, furyl, piperidyl, morpholino, benzoxazolyl, benzimidazolyl, benzothiazolyl, etc.), a silyl group; more preferably an alkyl group, an aryl group, a substituted or unsubstituted amino group, an alkoxy group and an aryloxy group; and even more preferably an alkyl group, an aryl group and an alkoxy group.

These substituents may be further substituted. When there are two or more substituents, they may be identical or different. If possible, they may be bonded to each other to form a ring.

The above-described substituent T will be illustrated below. Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, n-octyl, n-decyl, n-hexadecyl, cyclopropyl, cyclopentyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, mo preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atom, and particularly preferably 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms; e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atom, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably having 0 to 12 carbon atoms; e.g., sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chloride atom, a bromine atom and an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, more preferably 1 to 12 carbon atoms, and having a heteroatom such as a nitrogen atom, an oxygen atom, or a sulfur atom; specifically, e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl, etc.), etc. These substituents may be further substituted. When there are two or more substituents, they may be identical or different. If possible, they may be bonded to each other to form a ring.

Specific examples of the compound represented by Formula (16) are given below but the compounds used in the present invention are not limited thereto.

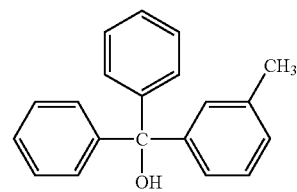

D-1

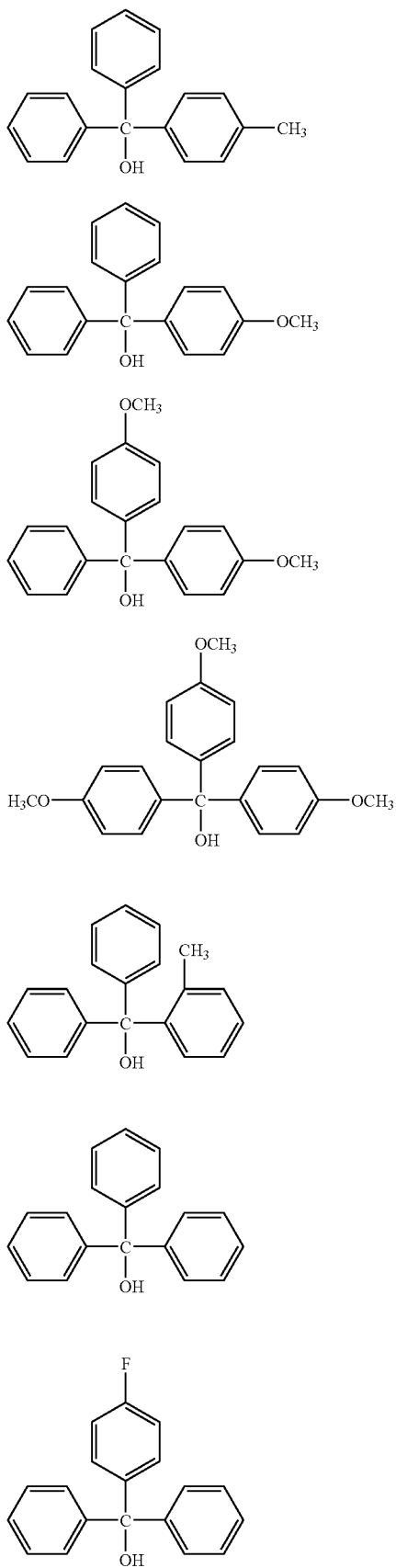
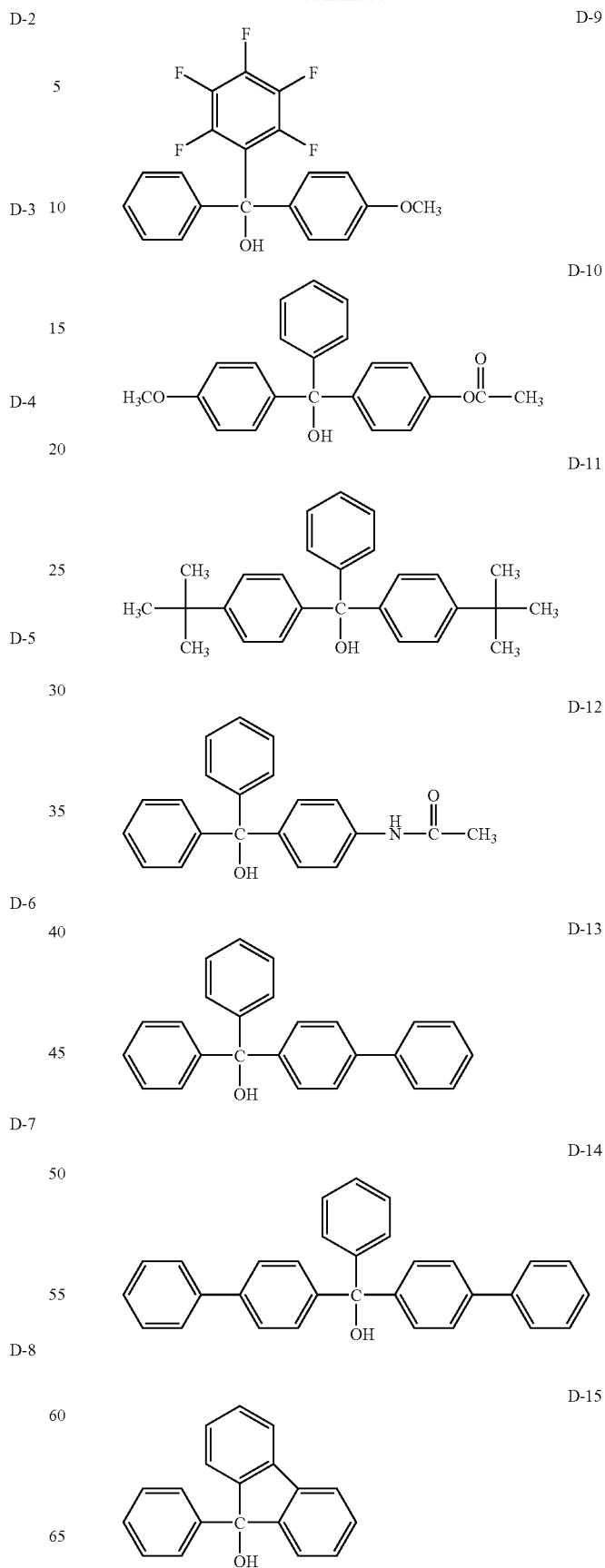

-continued
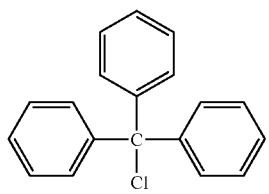
D-16
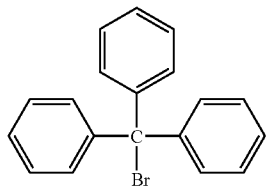
D-17
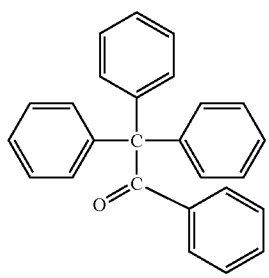
D-18
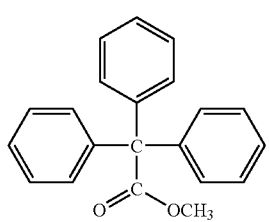
D-19
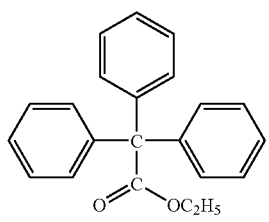
D-20
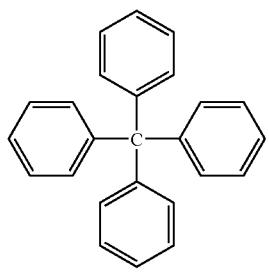
D-21
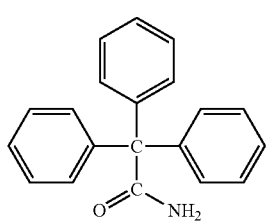
D-22
-continued
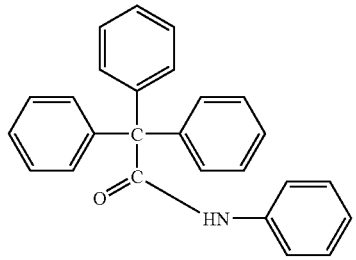
D-23
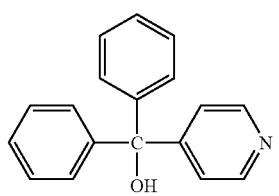
D-24
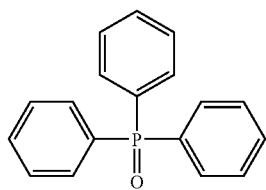
E-1
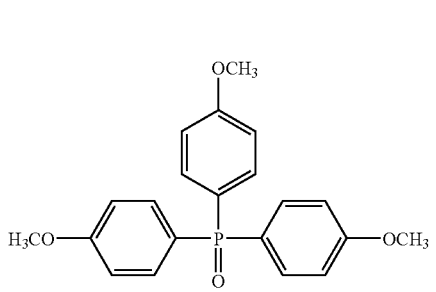
E-2
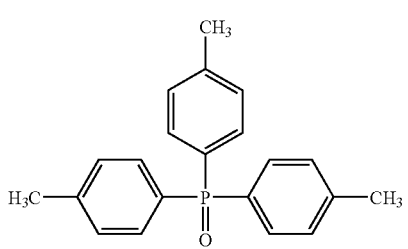
E-3
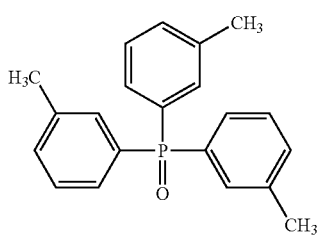
E-4

-continued
E-5
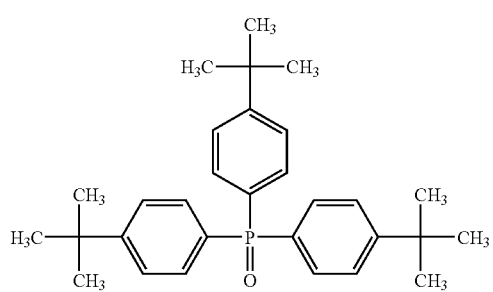
E-6
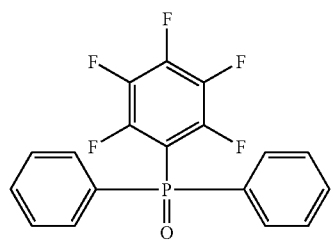
E-7
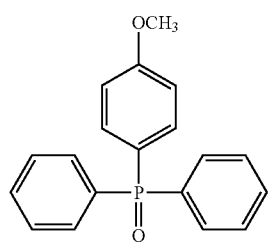
E-8
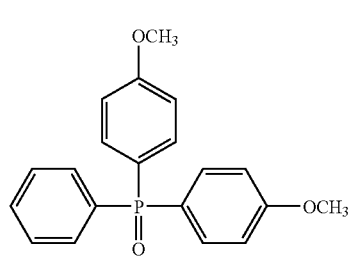
E-9
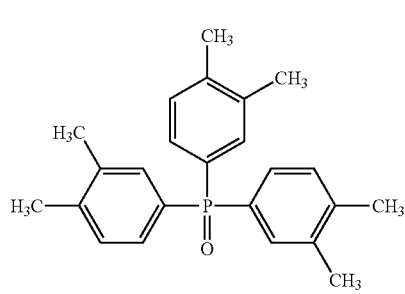
E-10
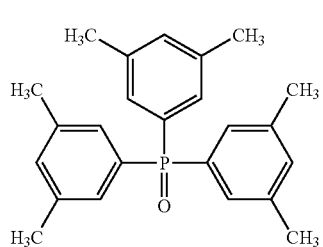
-continued
E-11
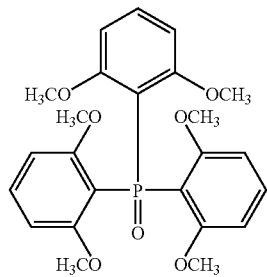
E-12
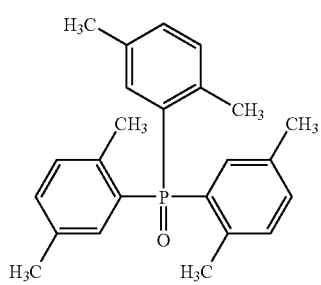
E-13
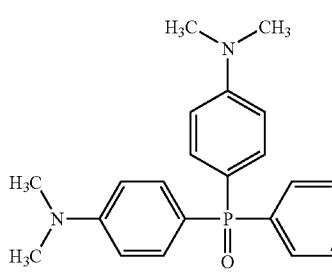
E-14
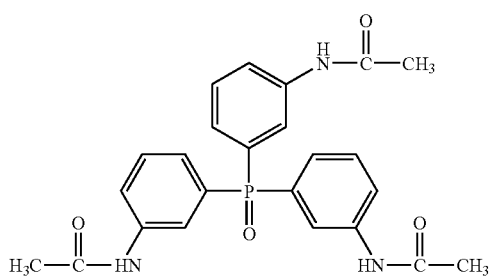
E-15
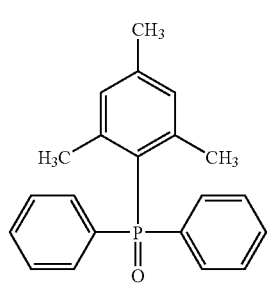

E-16 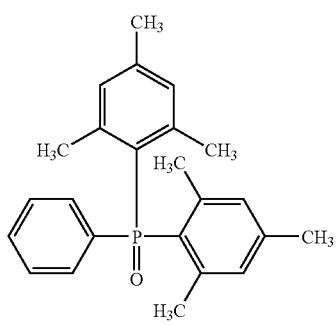
E-17 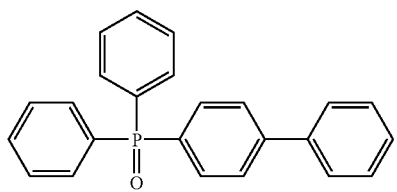
E-18 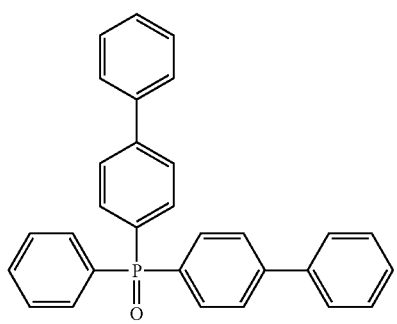
E-19 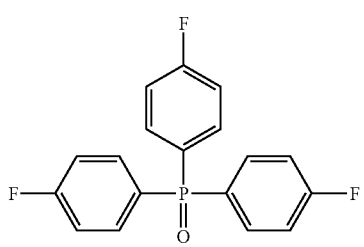
E-20 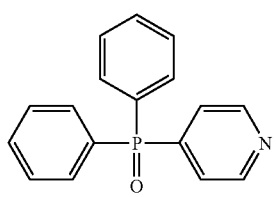
E-21 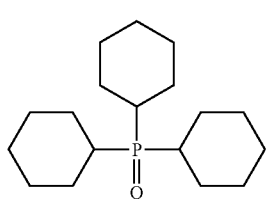
E-22 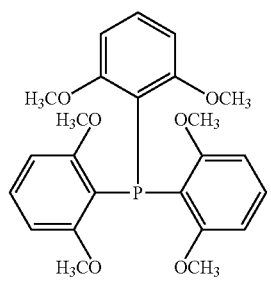
E-23 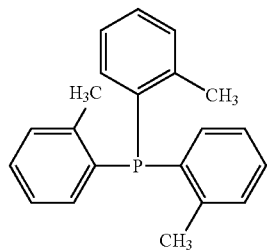
E-24 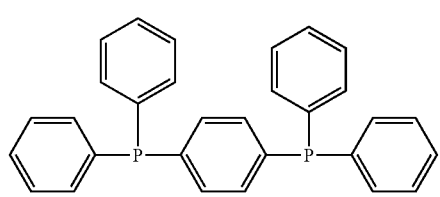
E-25 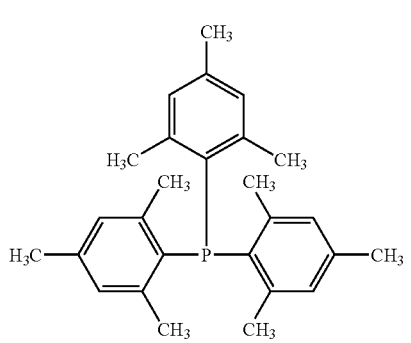
E-26 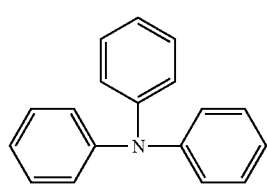
E-27 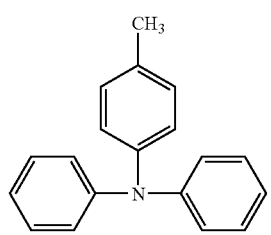

E-28
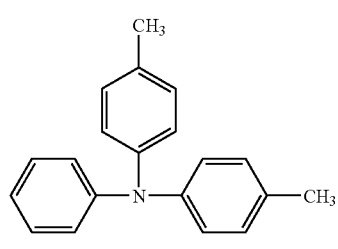
E-29
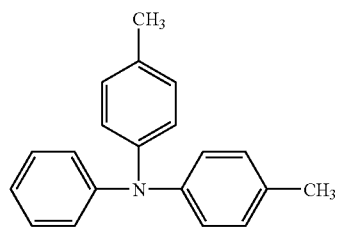
E-30
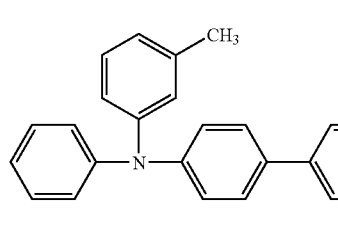
E-31
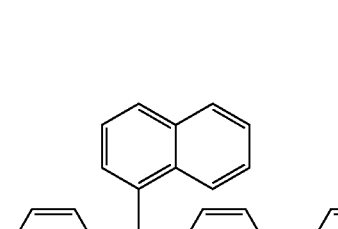
E-32
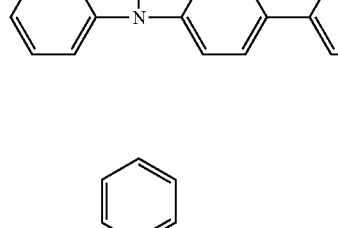
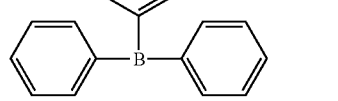
Preferred examples of the compound represented by Formula (18) or Formula (19) are given below, but the compounds used in the present invention are not limited thereto.
FA-1
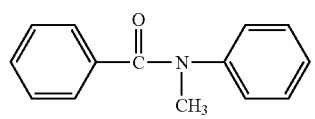
FA-2
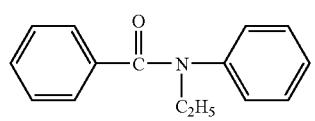
FA-3
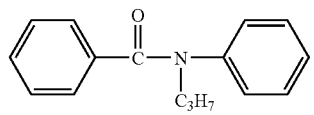
FA-4
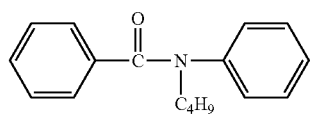
FA-5
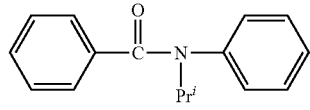
FA-6
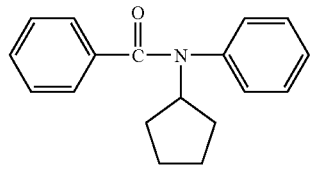
FA-7
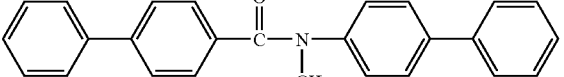
FA-8
FA-9
FA-10
FA-11
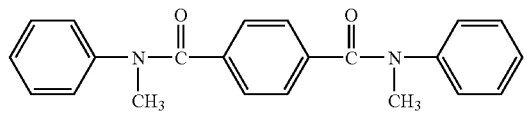
FA-12
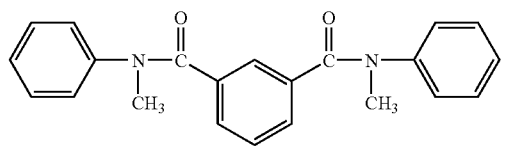

FA-13
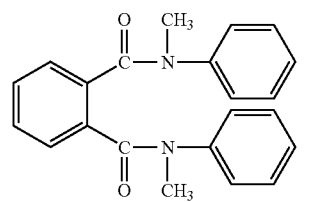
FA-14
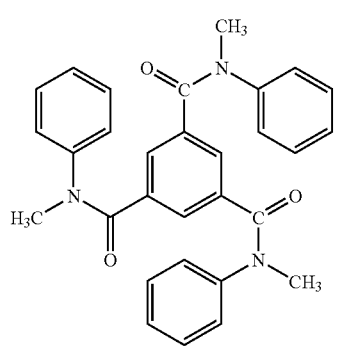
FA-15
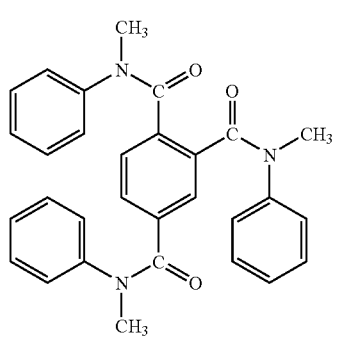
FA-16
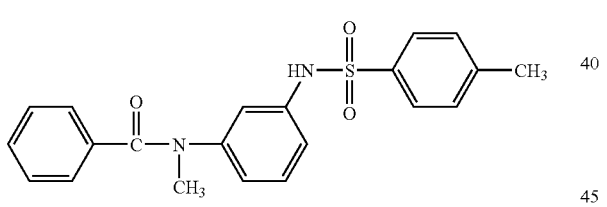
FA-17
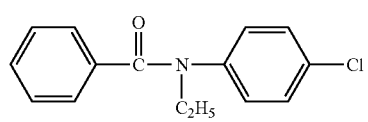
FA-18
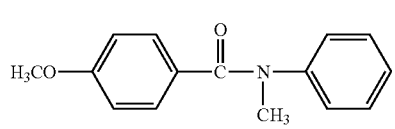
FA-19
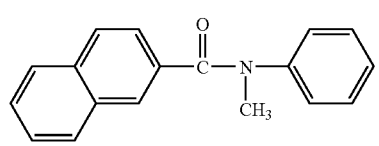
FA-20
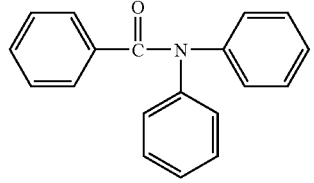
FA-21
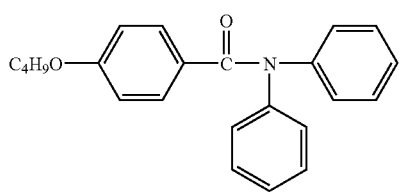
FA-22
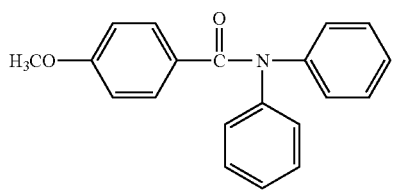
FA-23
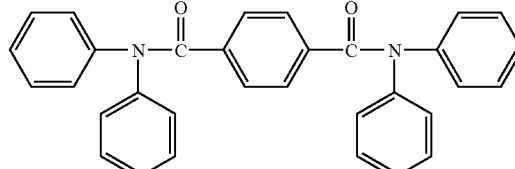
FA-24
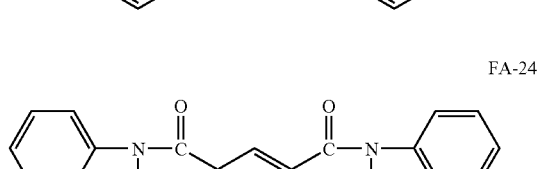
FA-25
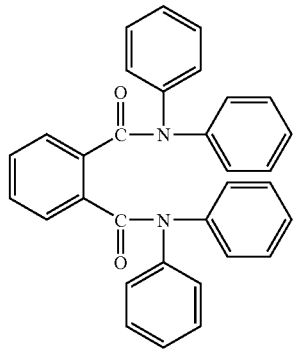

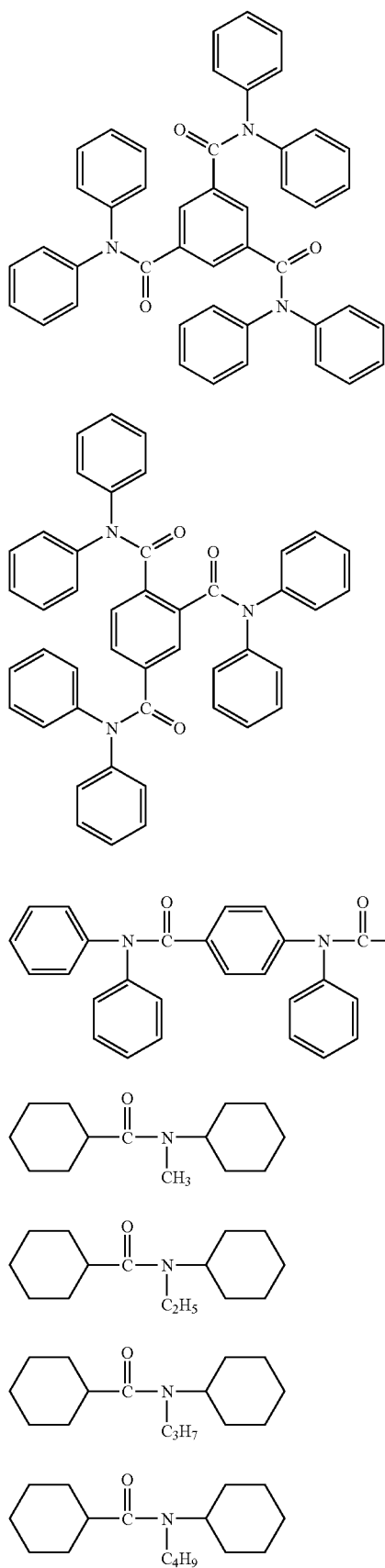
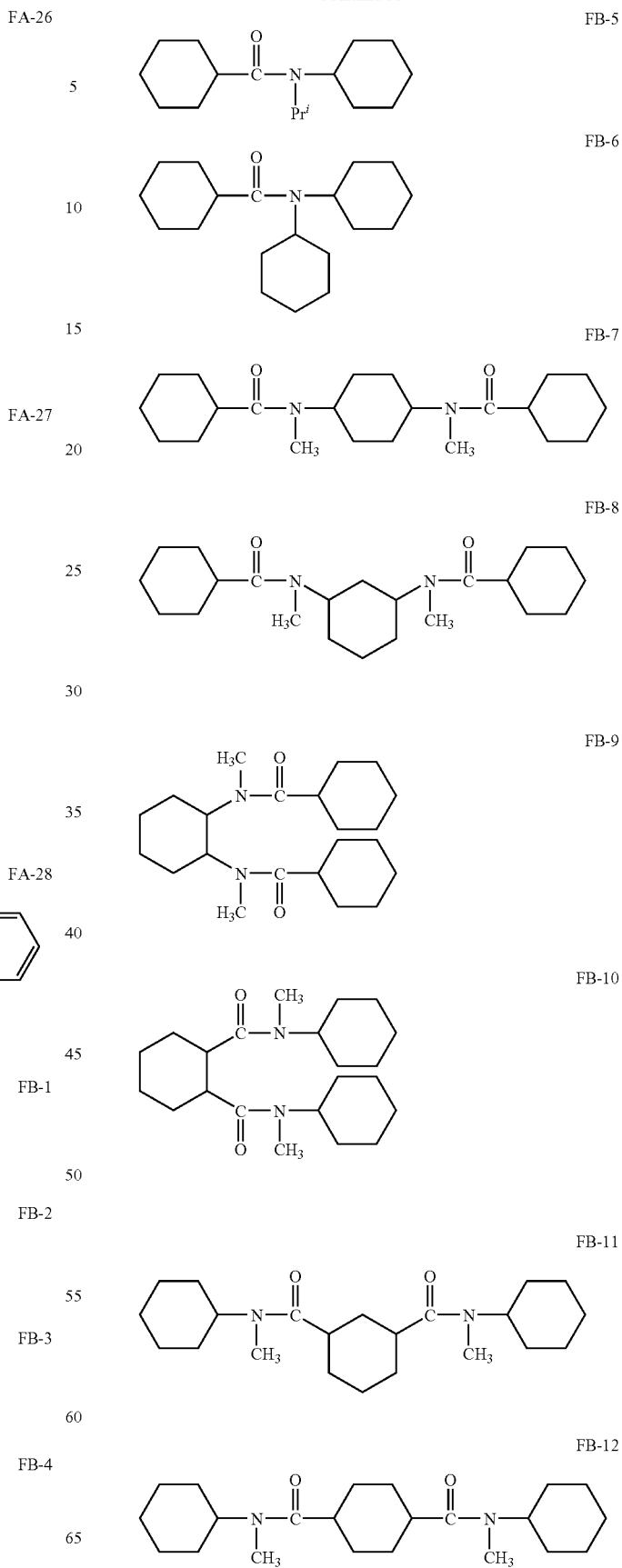

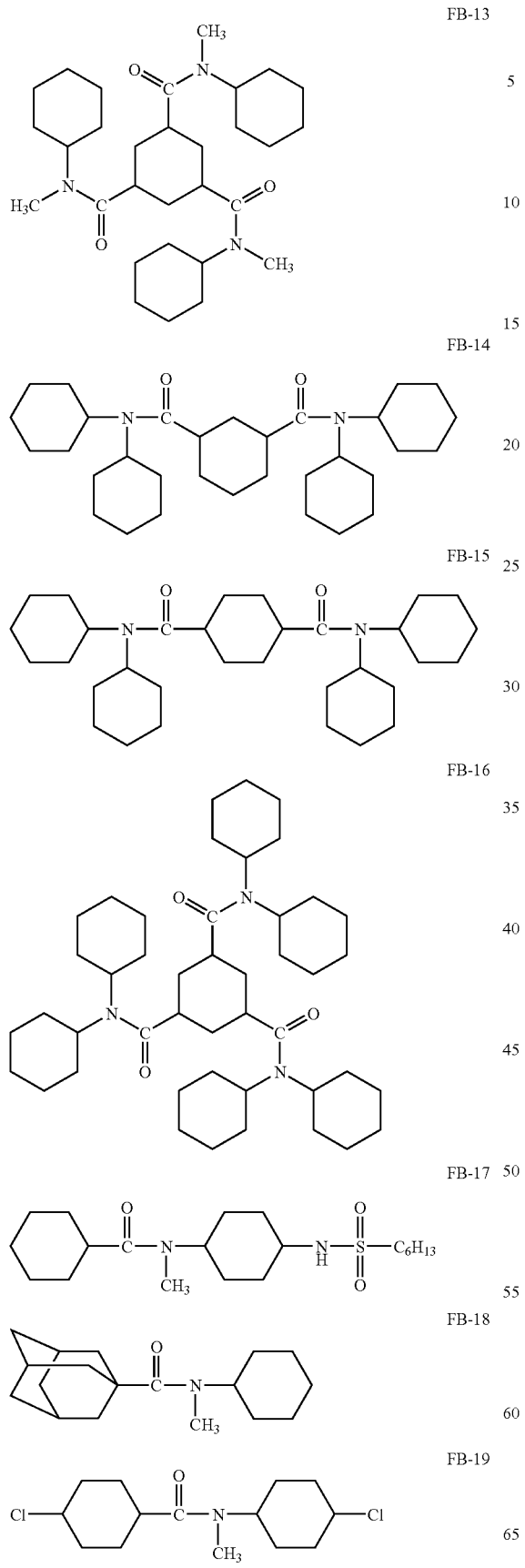
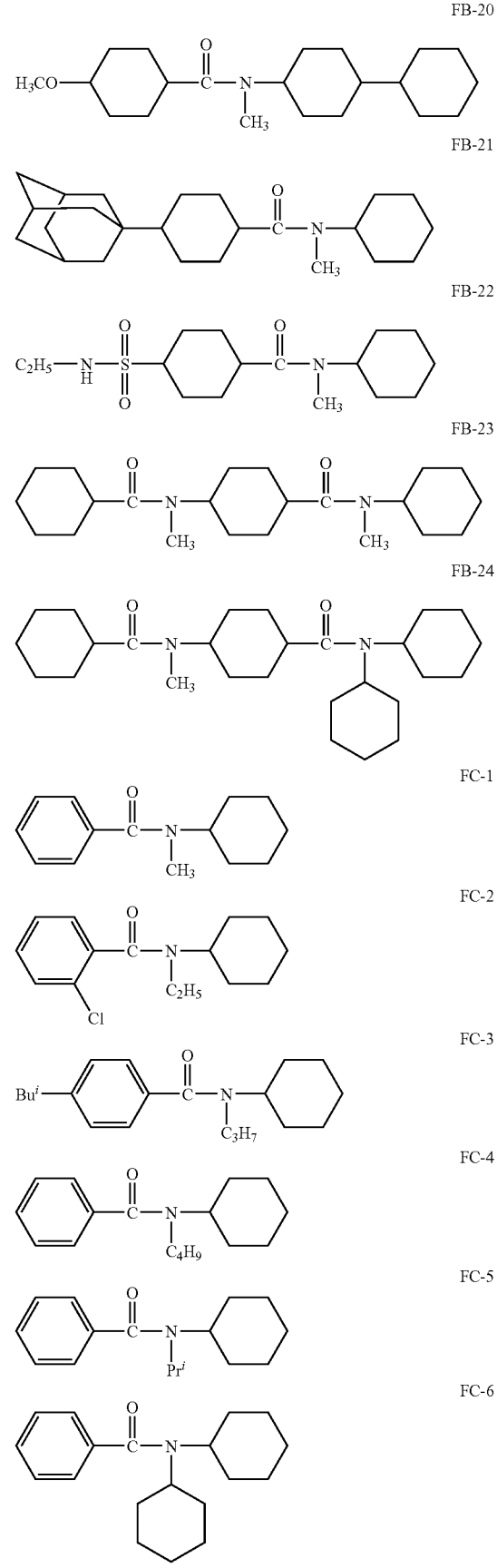

FC-7
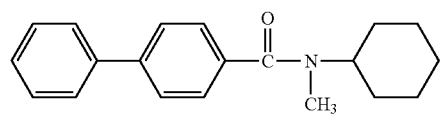
FC-8
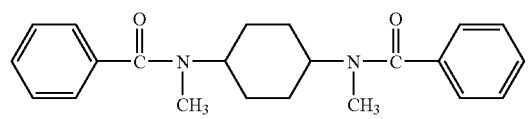
FC-9
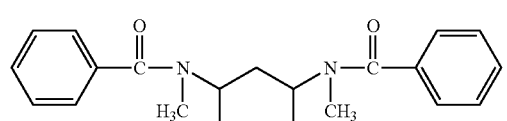
FC-10
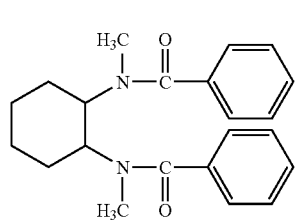
FC-11
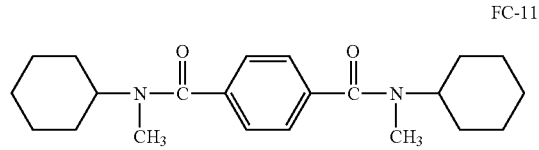
FC-12
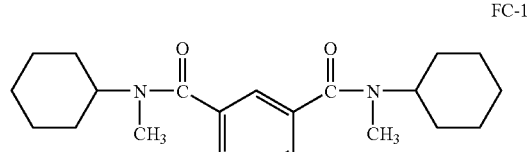
FC-13
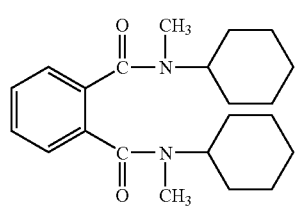
FC-14
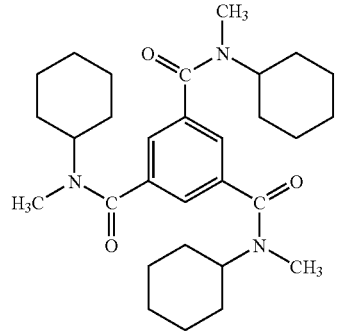
FC-15
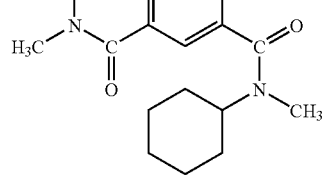
FC-16
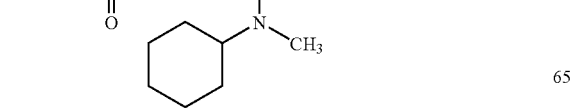
FC-17
FC-18
FC-19
FC-20
FC-21
FC-22
FC-23
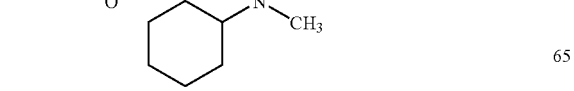

FC-24
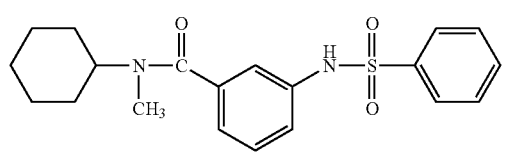
FC-25
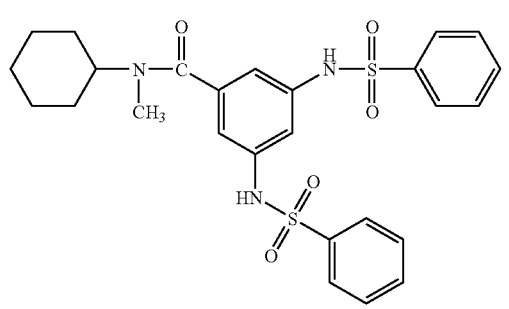
FD-1
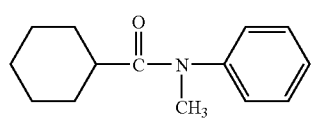
FD-2
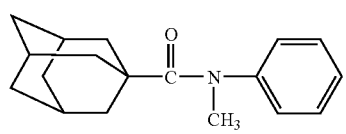
FD-3
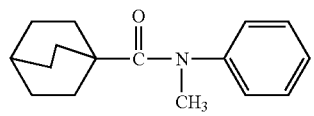
FD-4
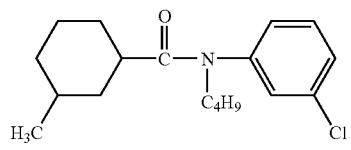
FD-5
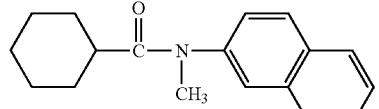
FD-6
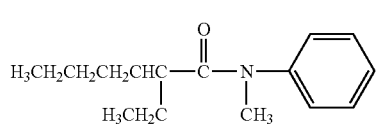
FD-7
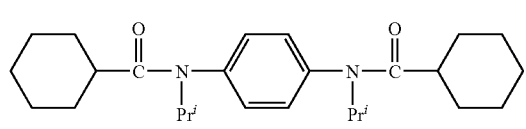
FD-8
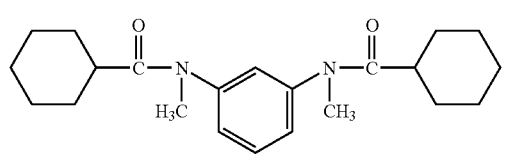
FD-9
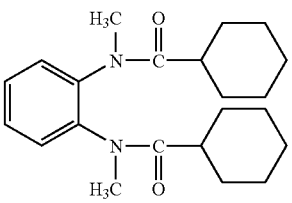
FD-10
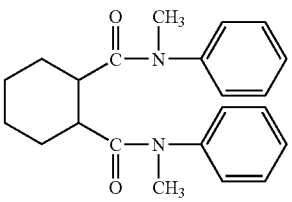
FD-11
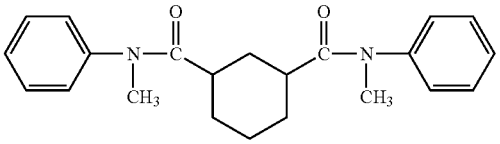
FD-12
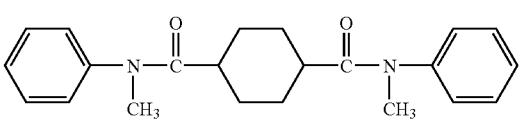
FD-13
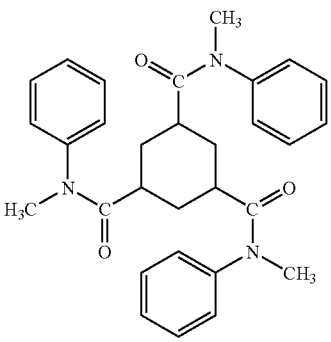
FD-14
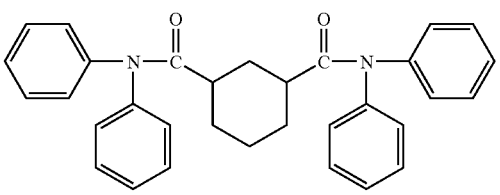
FD-15
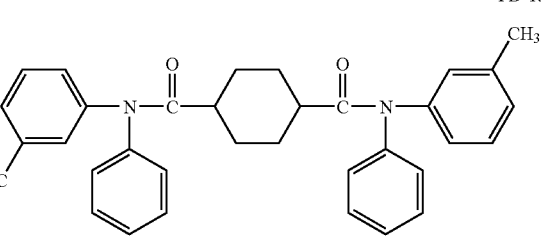

FD-16

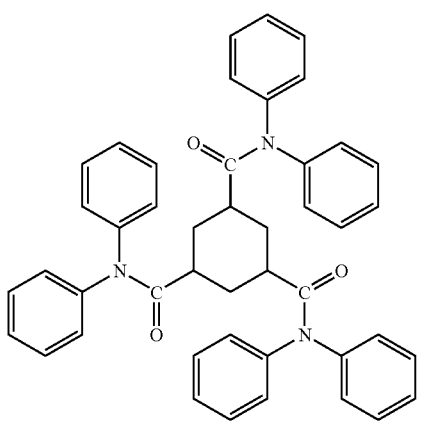

FD-17

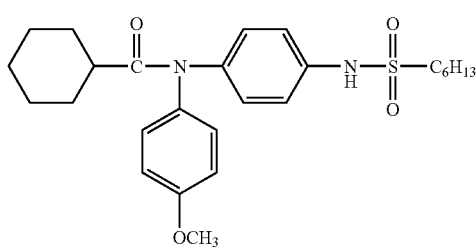

FD-18

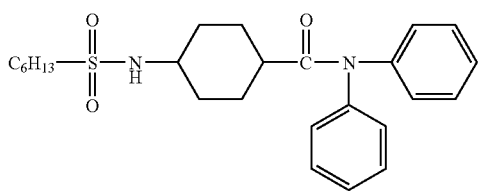

FD-19

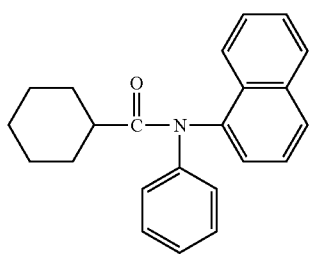

FD-20

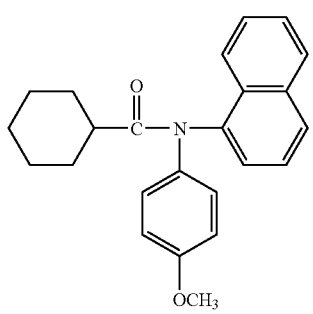

FD-21

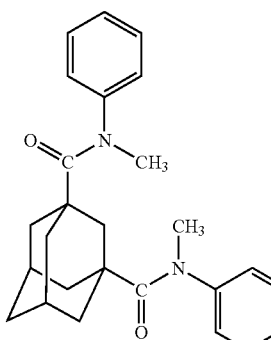

FD-22

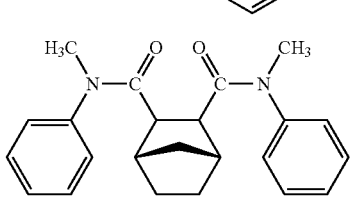

The present inventors of the invention have made extensive studies and, as a result, have found that an optical anisotropy decreases even though a polyhydric alcohol ester compound, a carboxylic acid ester compound, a polycyclic carboxylic acid compound and a bisphenol derivative, which have an octanol-water partition coefficient (Log P value) of 0 to 7, are added to cellulose acylate.

Specific examples of the polyhydric alcohol ester compound, the carboxylic acid ester compound, the polycyclic carboxylic acid compound and the bisphenol derivative, which have an octanol-water partition coefficient (Log P value) of 0 to 7, are given below.

(Polyhydric Alcohol Ester Compound)

The polyhydric alcohol having an octanol-water partition coefficient (Log P value) of 0 to 7 is an ester of di- or more polyhydric alcohol and at least one monocarboxylic acid. Examples of the polyhydric alcohol ester compound are given below but the compounds used in the present invention are not limited thereto.

(Polyhydric Alcohol)

Preferred examples of polyhydric alcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, etc. Particularly preferred are triethylene glycol, tetraethylene glycol, dipropylene glycol, tripropylene glycol, sorbitol, trimethylolpropane and xylitol.

(Monocarboxylic Acid)

The monocarboxylic acids in the polyhydric alcohol ester are not specifically limited. A known aliphatic monocarboxylic acid, an alicyclic monocarboxylic acid, an aromatic monocarboxylic acid, etc. can be used. It is preferable that water vapor permeability, water content, retainability of a cellulose acylate film are improved when an alicyclic monocarboxylic acid and an aromatic monocarboxylic acid are used.

Preferred examples of the monocarboxylic acid are given below but the compounds used in the present invention are not limited thereto.

For an aliphatic monocarboxylic acid, a straight-chained or branched aliphatic acid preferably having 1 to 32 carbon atoms, more preferably 1 to 20 carbon atoms, and particularly preferably 1 to 10 carbon atoms can be used. It is preferable to contain an acetic acid because of improving compatibility with a cellulose ester. It is also preferable to use a mixture of an acetic acid and other monocarboxylic acids.

Preferred examples of the aliphatic monocarboxylic acid include a saturated fatty acid such as an acetic acid, a propionic acid, a butyric acid, a valeric acid, a caproic acid, an enanthic acid, a caprylic acid, a pelargonic acid, a capric acid, a 2-ethyl-hexane carboxylic acid, an undecylic acid, a lauric acid, a tridecylic acid, a myristic acid, a pentadecylic acid, a palmitic acid, a heptadecylic acid, a stearic acid, a nonadecanoic acid, an arachic acid, a behenic acid, a lignoceric acid, a cerotic acid, a heptacosane acid, a montanoic acid, a melissic acid, a lacseric acid, etc.; and an unsaturated fatty acid such as an undecylenic acid, an oleic acid, a sorbic acid, a linoleic acid, a linolenic acid, an arachidonic acid, etc. These may be further substituted.

Preferred examples of the alicyclic monocarboxylic acid include a cyclopentanecarboxylic acid, a cyclohexanecarboxylic acid, a cyclooctanecarboxylic acid or derivatives thereof.

Preferred examples of the aromatic monocarboxylic acid include a benzoic acid, one in which an alkyl group is introduced into a benzene ring of a benzoic acid, such as a toluic acid, an aromatic monocarboxylic acid comprising two or more benzene rings such as a biphenylcarboxylic acid, a naphthalene carboxylic acid and a tetralincarboxylic acid, and derivatives thereof. Particularly, a benzoic acid is preferable.

A carboxylic acid in the polyhydric alcohol ester of the invention may be used alone or in a combination of two or more. In addition, all the OH group in polyhydric alcohol may be esterified, and a part of the OH group may be present as it is. Preferably, an aromatic ring or 3 or more of a cycloalkyl ring may be provided in a molecule.

For the polyhydric alcohol ester compound, the following compounds can be exemplified but the compounds used in the present invention are not limited thereto.

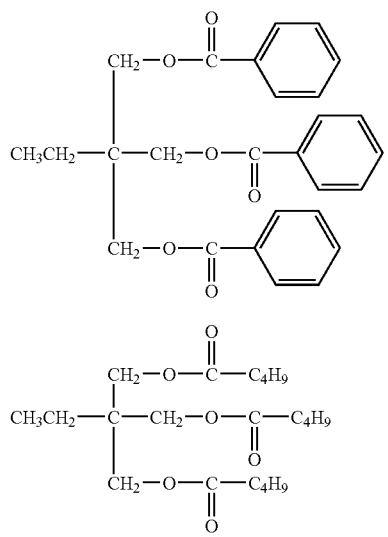

1-1

1-2

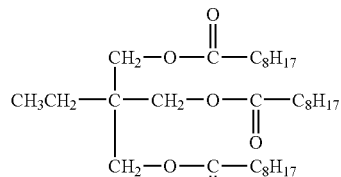

1-3

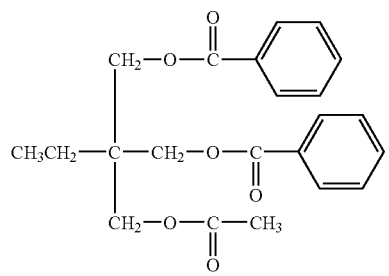

1-4

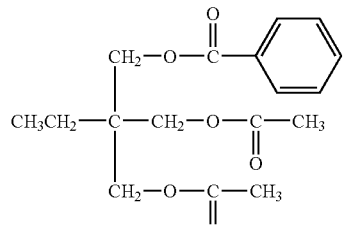

1-5

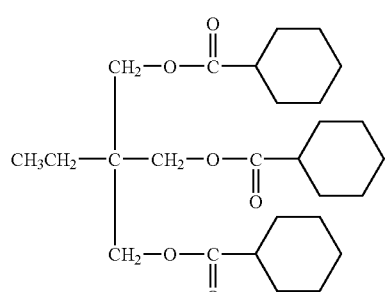

1-6

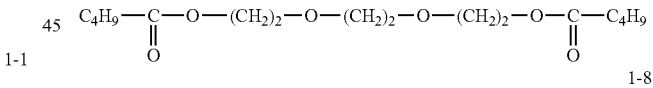

1-7

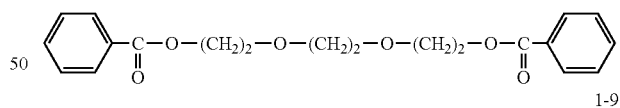

1-8

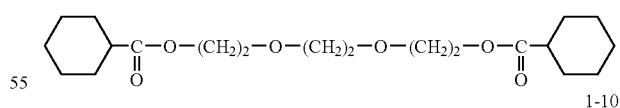

1-9

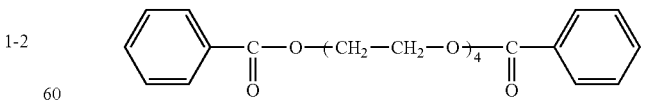

1-10

(Carboxylic Acid Ester Compound)

For the carboxylic acid ester compound having an octanol-water partition coefficient (Log P value) of 0 to 7, the following compounds can be exemplified. Specifically, examples of the carboxylic acid ester compound include a phthalic acid ester and a citric acid ester. Examples of the phthalic acid ester include dimethyl phthalate, diethyl phthalate, dicyclohexyl phthalate, dioctyl phthalate, and diethylhexyl phthalate. Examples of the citric acid ester include acetyl triethyl citrate and acetyl tributyl citrate. In addition, examples of other carboxylic acid esters include butyl oleate, methylacetyl ricinoleate, dibutyl sebacate, triacetin and trimethylolpropane tribenzoate. Alkylphthalylalkyl glycolate is also preferably used for this purpose. Alkyl of alkylphthalylalkyl glycolate is an alkyl group of 1 to 8 carbon atoms. Examples of alkylphthalylalkyl glycolate include methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, propylphthalylethyl glycolate, methylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate. Preferably, methylphthalylmethyl glycolate, ethylphthalylethyl glycolate, propylphthalylpropyl glycolate, butylphthalylbutyl glycolate and octylphthalyloctyl glycolate may be used, and particularly preferably ethylphthalylethyl glycolate may be used. Furthermore, alkylphthalylalkyl glycolate may be used in a combination of two or more.

Examples of carboxylic acid ester compounds having an octanol-water partition coefficient (Log P value) of 0 to 7 can be exemplified by the following compounds but the compounds used in the present invention are not limited thereto:

J-1

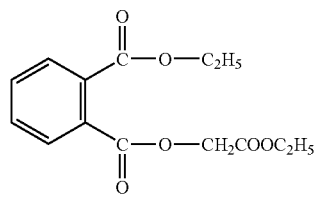

J-2

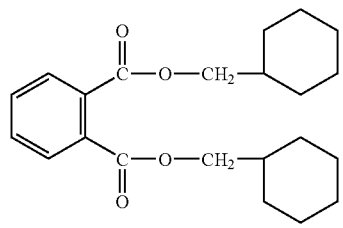

J-3

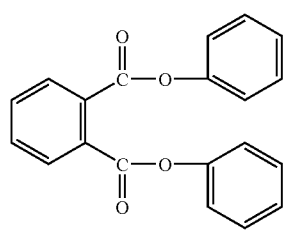

J-4

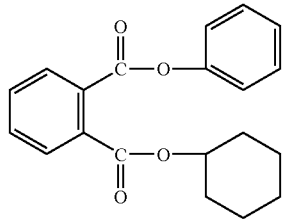

J-5

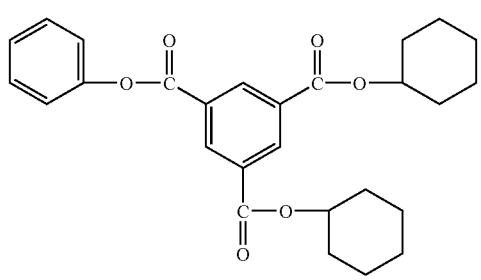

J-6

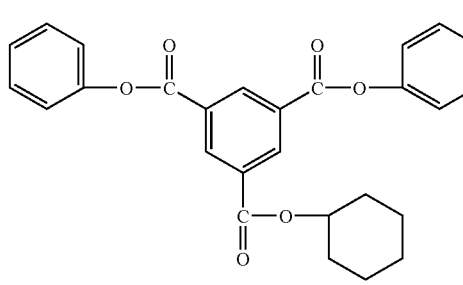

J-7

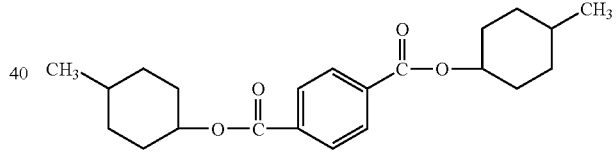

J-8

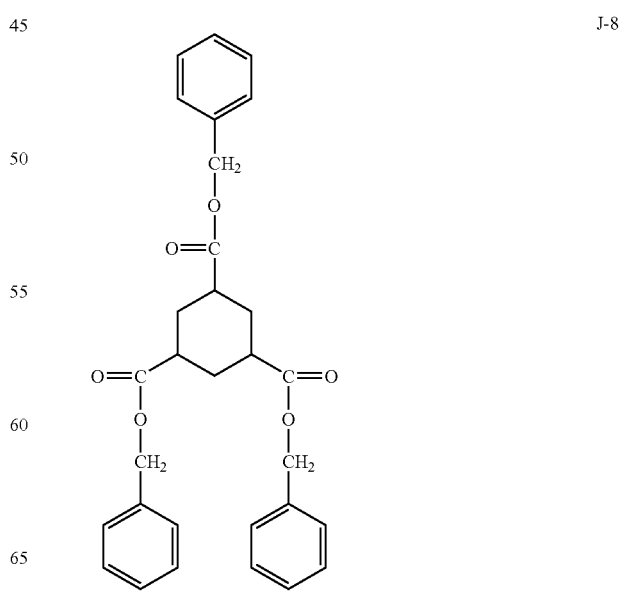

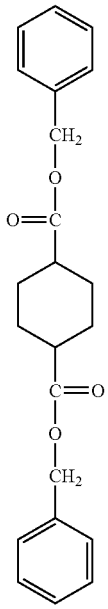

J-9

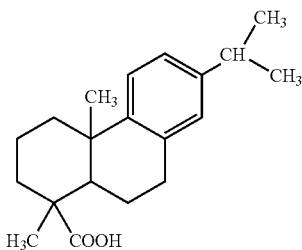

K-2

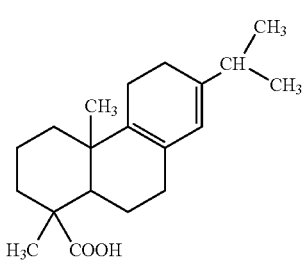

K-3

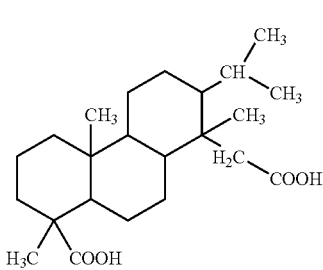

K-4

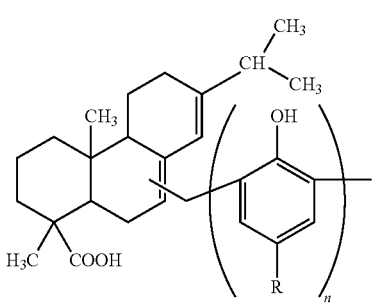

K-5

(Porous Carboxylic Acid Compound)

The porous carboxylic acid compound having an octanol-water partition coefficient (Log P value) of 0 to 7 which is used in the first embodiment is preferably a compound having the molecular weight of 3000 or less, particularly preferably a compound having the molecular weight of 250 to 2000. Regarding the cyclic structure, a ring formed of 3 to 8 atoms is preferred, and particularly 6- and/or 5-membered ring is preferred. The ring may contain carbon, oxygen, nitrogen, sulfur or other atoms, and a part of the bonding of the ring may have unsaturated bonds, for example, a 6-membered ring may be a benzene ring or a cyclohexane ring. The compound of the invention is formed of a plurality of the above-mentioned cyclic structures. For example, the compound may have any one of a benzene ring or a cyclohexane ring within the molecule; may have two cyclohexane rings; or may have naphthalene derivatives or anthracene or the like derivatives. More preferably, the compound having 3 or more of such ring-shaped structures within the molecule is preferred. Further, at least one bond in the ring-shaped structure not having an unsaturated bond is preferred. Specifically, abietic acid derivatives such as abietic acid, dehydro-abietic acid, and parastric acid are mentioned, and the chemical formulas thereof are presented below but the compounds used in the present invention are not limited thereto.

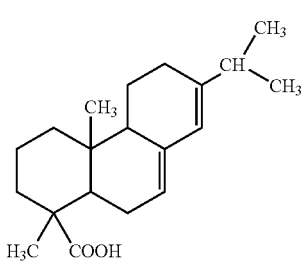

K-1

(Bisphenol Derivatives)

Bisphenol derivatives used in the invention being a compound having the molecular weight of 10000 or less is preferred, and within this range, the compound may be a monomer, an oligomer or a polymer. Further, the compound may be a copolymer with other polymers, or may be modified at the end-portion with a reactive substituent. The chemical formulas thereof are given below but the compounds used in the present invention are not limited thereto.

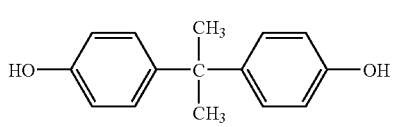

L-1

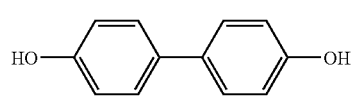

L-2

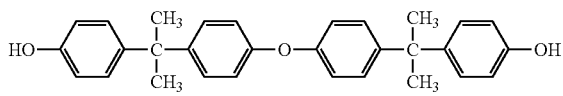

L-3

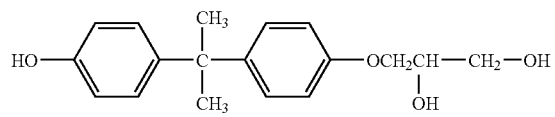

L-4

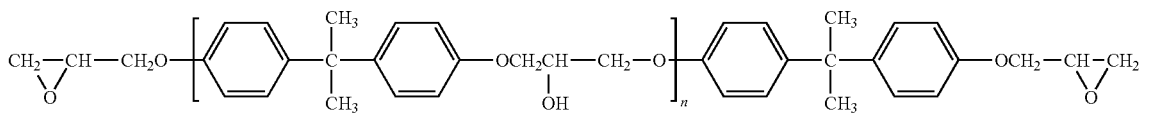

L-5

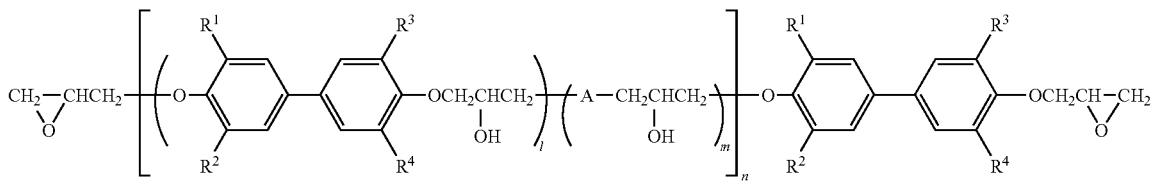

L-6

Among the specific examples of bisphenol derivatives having an octanol-water partition coefficient (Log P value) of 0 to 7 which is used in the first embodiment, $R^1$ to $R^4$ are each independently a hydrogen atom or an alkyl group having 1 to 10 carbon atoms. l, m and n are the number of the repeated units, which is not specifically limited. l, m and n are preferably an integer of 1 to 100, and more preferably an integer of 1 to 20.

[Wavelength Dispersion Regulating Agent]

In the first embodiment, a compound lowering the chromatic dispersion of the cellulose acylate films (hereinafter, referred to as a "chromatic dispersion regulating agent") is preferably added to the film.

The chromatic dispersion regulating agent is described below.

In the first embodiment, the difference between $Re(\lambda)$ and $Rth(\lambda)$ at wavelengths of 400 nm and 700 nm, that is, $|Re_{(400)}-Re_{(700)}|$ and $|Re_{(400)}-Re_{(700)}|$, can be reduced by addition of the compound that has absorbance at an ultraviolet region of 200 to 400 nm for prevention of coloration of the film and is capable of controlling chromatic dispersion of $Re_{(\lambda)}$ and $Rth_{(\lambda)}$ of the film.

In order to improve the chromatic dispersion of Rth of cellulose acylate films in the first embodiment, it is desirable to add at least one compound, which lowers the chromatic dispersion of Rth represented by the following formula (iv), $\Delta Rth=|Rth_{(400)}-Rth_{(700)}|$, in condition that the following formulas (v) and (vi) are satisfied:

$\Delta Rth=|Rth_{(400)}-Rth_{(700)}|$ (iv)

$(\Delta Rth(B)-\Delta Rth(0))/B \leq -2.0$ (v)

$0.01 \leq B \leq 30;$ (vi)

it is more desirable in that the above formulas (v) and (vi) being in the range of:

$(\Delta Rth(B)-\Delta Rth(0))/B \leq -3.0$ (v-a)

$0.05 \leq B \leq 25;$ and (vi-a)

it is even more desirable in that the above formulas (v) and (vi-b) being in the range of:

$(\Delta Rth(B)-\Delta Rth(0))/B \leq -4.0$ (v-b)

$0.1 \leq B \leq 20.$ (vi-b)

The cellulose acylate film has a chromatic dispersion property such that the Re and Rth values in general are larger in the longer wavelength than in the shorter wavelength side. Therefore, in order to enlarge the relatively small Re and Rth in the shorter wavelength side, smoothing the chromatic dispersion is requested. Meanwhile, the compound having absorbance at an ultraviolet region of 200 to 400 nm has a chromatic dispersion property such that the light absorbance is larger in the longer wavelength than in the shorter wavelength side. When the compound itself exists uniformly inside the cellulose acylate film, it is assumed that the birefringence of the compound, that is, the chromatic dispersion of Re, Rth and light absorbance is large in the shorter wavelength side.

As described above, by using a compound having absorbance at 200 to 400 nm, and the chromatic dispersion of Re and Rth of the compound itself assumed to be large in the shorter wavelength side, it is possible to control the Re, Rth chromatic dispersion of the cellulose acylate film. Therefore, the compound which controls the chromatic dispersion being sufficiently and homogeneously soluble to cellulose acylated is requested. The range of the absorbance in the ultraviolet region of these compounds is preferably 200 to 400 nm, more preferably 220 to 395 nm, and even more preferably 240 to 390 nm.

Recently, in the liquid crystal display devices such as television, laptop computer and mobile cellular phone, the brightness was increase with less electrical power. Therefore, a light element, which is used in the liquid crystal display devices, having excellent transmittance is requested. In this regard, it is preferable that cellulose acylate films containing a compound, which has the absorbance at an ultraviolet region of 200 to 400 nm and which lowers |Re$_{(400)}$−Re$_{(700)}$| and |Rth$_{(400)}$−Rth$_{(700)}$| of the films has an excellent spectral transmittance. According to cellulose acylate films of the first embodiment, the spectral transmittance at a wavelength of 380 nm is 45% to 95%; however, the spectral transmittance at a wavelength of 380 nm being 10% or less is desired.

Accordingly, the chromatic dispersion regulating agent preferably used in the first embodiment having the molecular weight of 250 to 1000 is preferred in the view point of volatility. It is more preferably 260 to 800, even more preferably 270 to 800, and particularly preferably 300 to 800. Within these ranges of molecular weight, the chromatic dispersion regulating agent may be in a form of specific monomer, or in a form of oligomer or polymer formed from multiple bonding of the monomer unit.

It is preferable not to emit the chromatic dispersion regulating agent during dope casting and drying process of the cellulose acylate film preparation.

(Compound Addition Amount)

The above-mentioned chromatic dispersion regulating agent preferably used in the first embodiment is added preferably in the amount of 0.01 to 30% by mass, more preferably 0.1 to 20% by mass, and particularly preferably 0.2 to 10% by mass with respect to cellulose acylate.

(Compound Addition Method)

Further, the chromatic dispersion regulating agent may be used alone or in combination of 2 or more compounds in an arbitrary ratio.

Also, the timing of the chromatic dispersion regulating agent addition may be any time during the dope preparation process or after the completion of the dope preparation process.

Specific examples of the chromatic dispersion regulating agent preferably used in the invention include benzotriazole compounds, benzophenone compounds, cyano group-containing compounds, oxybenzophenone compounds, salicylic acid ester compounds, nickel complex salt compounds or the like.

Examples of benzotriazole compound represented by Formula (101) can be preferably used as a chromatic dispersion regulating agent of the invention but the compounds which can be used in the first embodiment are not limited thereto.

$$Q^1\text{-}Q^2\text{-}OH \qquad \text{Formula (101)}$$

Wherein $Q^1$ is a nitrogen-containing aromatic heterocyclic ring, $Q^2$ is an aromatic ring.

$Q^1$ is a nitrogen-containing aromatic heterocyclic ring, preferably represents a 5- to 7-membered nitrogen-containing aromatic heterocyclic ring, and more preferably represents a 6-membered nitrogen-containing aromatic heterocyclic ring. Examples thereof include imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purine, pyridine, pyrazine, pyrimidine, pyridazine, triazine, triazaindene, tetrazaindene and the like. More preferably, a 5-membered nitrogen-containing aromatic heterocyclic ring include imidazole, pyrazole, triazole, tetrazole, thiazole, oxazole, benzotriazole, benzothiazole, benzoxazole, thiadiazole, oxadiazole preferably with benzotriazole being particularly preferable.

The nitrogen-containing aromatic heterocyclic ring represented by $Q^1$ may be further substituted, and the substituent is preferably the following substituent T. Further, in the case where the nitrogen-containing aromatic heterocyclic ring contains a plurality of substituent, each substituent may be condensed to form a ring structure.

The aromatic ring represented by $Q^2$ may be an aromatic hydrocarbon ring or an aromatic heterocyclic ring. Also, the aromatic rings may be monocyclic or may form a fused ring with other rings.

The aromatic hydrocarbon ring is preferably a monocyclic or bicyclic aromatic hydrocarbon ring having 6 to 30 carbon atoms (e.g., a benzene ring, a naphthalene ring, etc.), more preferably an aromatic hydrocarbon ring having 6 to 20 carbon atoms, and even more preferably an aromatic hydrocarbon ring having 6 to 12 carbon atoms. Particularly preferred is a benzene ring.

The aromatic heterocyclic ring is preferably an aromatic heterocyclic rings containing a nitrogen atom or a sulfur atom. Specific examples of the heterocyclic ring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole, tetrazaindene and the like. Preferable examples of the aromatic heterocyclic ring include pyridine, triazine, and quinoline.

The aromatic ring represented by $Q^2$ is preferably an aromatic hydrocarbon ring, more preferably a naphthalene ring or a benzene ring, and particularly preferably a benzene ring. $Q^2$ may be further substituted, and the substituent is preferably the following substituent T.

Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, n-octyl, n-decyl, n-hexadecyl, cyclopropyl, cyclopentyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, more preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atoms, and particularly 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms; e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atom, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably having 0 to 12 carbon atoms; e.g., sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chloride atom, a bromine atom and an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, more preferably 1 to 12 carbon atoms, and having a heteroatom such as a nitrogen atom, an oxygen atom, or a sulfur atom; e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl, etc.), and the like. These substituents may be further substituted. When there are two or more substituents, they may be identical or different. If possible, they may be bonded to each other to form a ring.

The compound represented by Formula (101) is preferably a compound represented by the following formula (101-A):

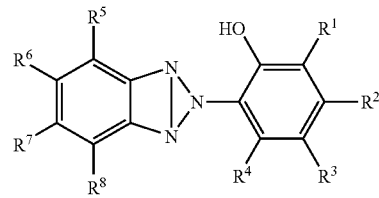

Formula (101-A)

wherein $R^1$, $R^2$, $R^3$, $R^4$, $R^5$, $R^6$, $R^7$ and $R^8$ are each independently a hydrogen or a substituent.

$R^1$, $R^2$, $R^3$, $R^4$, $R^5$, $R^6$, $R^7$ and $R^8$ each independently represent a hydrogen atom or a substituent, and the substituent may be exemplified by the above-described substituent T. These substituents may be further substituted with other substituents, and the substituents may be condensed to form a ring structure.

$R^1$ and $R^3$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; and particularly preferably an alkyl group having 1 to 12 carbon atoms (preferably having 4 to 12 carbon atoms).

$R^2$ and $R^4$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; particularly preferably a hydrogen atom or a methyl group; and most preferably a hydrogen atom.

$R^5$ and $R^8$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; particularly preferably a hydrogen atom or a methyl group; and most preferably a hydrogen atom.

$R^6$ and $R^7$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom or a halogen atom; and particularly preferably a hydrogen atom or a chlorine atom.

The compound represented by Formula (101) is preferably a compound represented by the following formula (101-B):

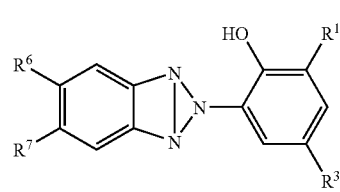

Formula (101-B)

wherein $R^1$, $R^3$, $R^6$ and $R^7$ have the same as meaning as those in Formula (101-A), and their preferable ranges are the same as those in Formula (101-A).
Specific examples of the compound represented by Formula (101) will be given in the following but the compounds which can be used in the present invention are not limited thereto.
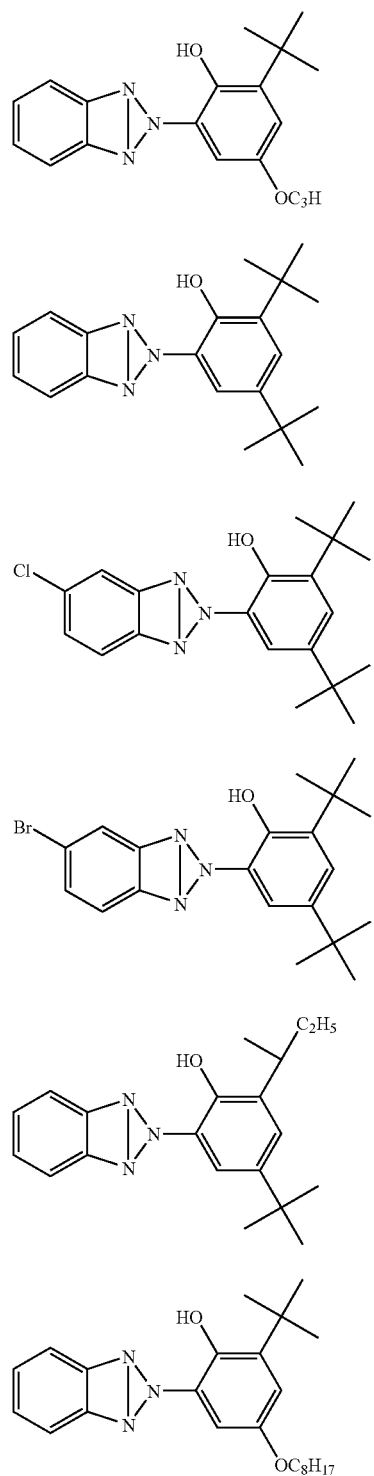
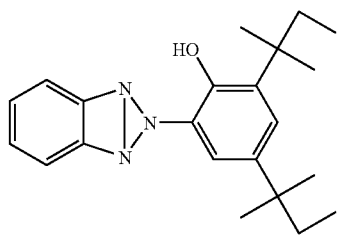
UV-7
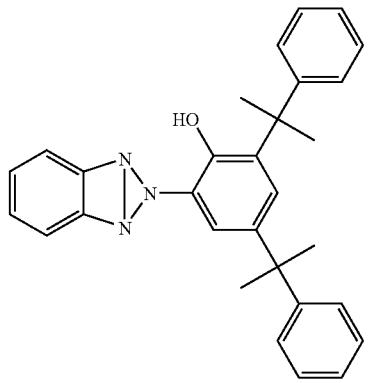
UV-8
UV-9
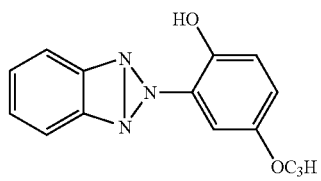
UV-10
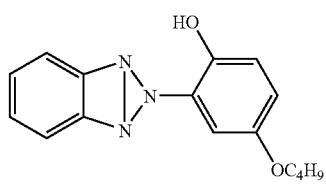
UV-11
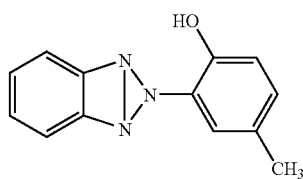
UV-12
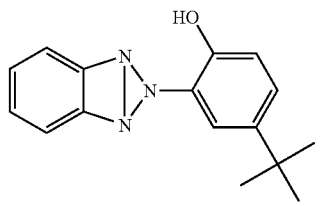
UV-13
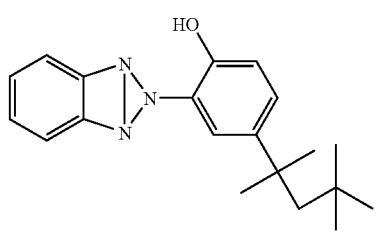

UV-14
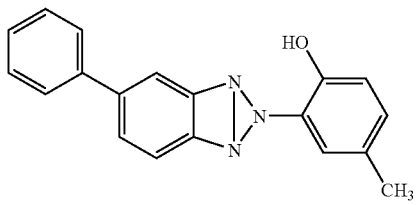

UV-15
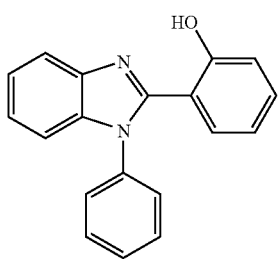

UV-16
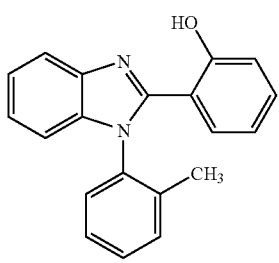

UV-17
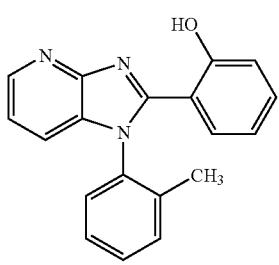

UV-18
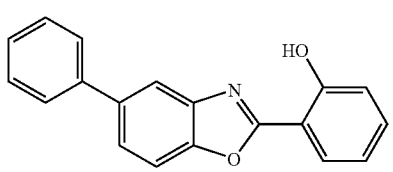

UV-19
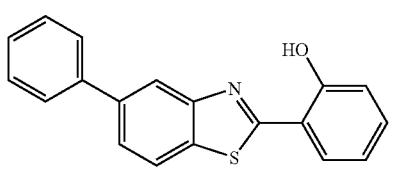

UV-20
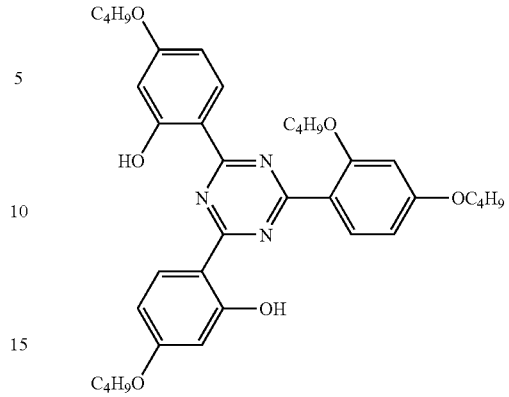

UV-21
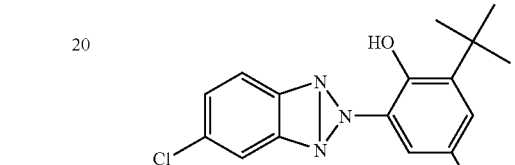

UV-22
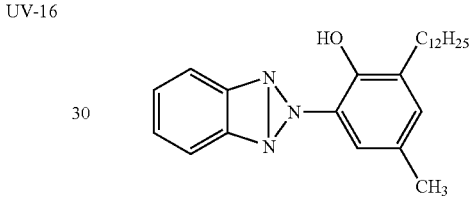

UV-23
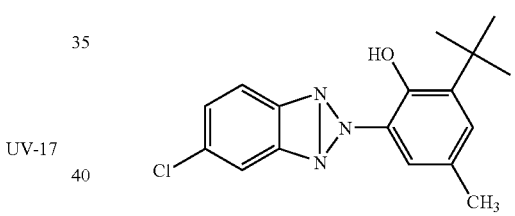

Among the benzotriazole compounds given in the above examples, the compounds excluding those having a molecular weight of 320 or less were confirmed to be advantageous in the aspect of retentivity when produced into cellulose acylate films of the invention.

As another chromatic dispersion regulating agent of the invention, the benzophenone compound represented by Formula (102) is preferably used:

Formula (102)

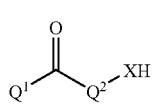

wherein $Q^1$ and $Q^2$ are each independently an aromatic ring, and X is NR (wherein R is a hydrogen atom or a substituent), an oxygen atom or a sulfur atom.

The aromatic ring represented by $Q^1$ and $Q^2$ may be an aromatic hydrocarbon ring or an aromatic heterocyclic ring. These substituents may be monocyclic or may form a fused ring with other rings.

The aromatic hydrocarbon ring represented by $Q^1$ and $Q^2$ is preferably a monocyclic or bicyclic aromatic hydrocarbon ring having 6 to 30 carbon atoms (e.g., a benzene ring, a naphthalene ring, etc.), more preferably an aromatic hydrocarbon ring having 6 to 20 carbon atoms, and even more preferably an aromatic hydrocarbon ring having 6 to 12 carbon atoms. Particularly preferred is a benzene ring.

The aromatic heterocyclic ring represented by $Q^1$ and $Q^2$ is preferably an aromatic heterocyclic rings containing at least one selected from an oxygen atom, a nitrogen atom and a sulfur atom. Specific examples of the heterocyclic ring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. Preferred examples of the aromatic heterocyclic ring are pyridine, triazine and quinoline.

The aromatic ring represented by $Q^1$ and $Q^2$ is preferably an aromatic hydrocarbon ring, more preferably an aromatic hydrocarbon ring having 6 to 10 carbon atoms, and even more preferably a substituted or unsubstituted benzene ring.

$Q^1$ and $Q^2$ may be further substituted, and the substituent is preferably the following substituent T. However, the substituent does not include carboxylic acids, sulfonic acids or quaternary ammonium salts. If possible, the substituents may be bonded to each other to form a ring structure.

X is NR (where R is a hydrogen atom or a substituent, and the substituent may be exemplified by the following substituent T), an oxygen atom or a sulfur atom. X is preferably NR (wherein R is preferably an acyl group or a sulfonyl group, and these substituents may be further substituted) or O, and particularly preferably O.

Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, n-octyl, n-decyl, n-hexadecyl, cyclopropyl, cyclopentyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, more preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atoms, and particularly 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms; e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atom, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably having 0 to 12 carbon atoms; e.g., sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chloride atom, a bromine atom and an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, more preferably 1 to 12 carbon atoms, and having a heteroatom such as a nitrogen atom, an oxygen atom, or a sulfur atom; e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl, etc.), and the like. These substituents may be further substituted. When there are two or more substituents, they may be identical or different. If possible, they may be bonded to each other to form a ring.

The compound represented by Formula (102) is preferably a compound represented by the following Formula (102-A):

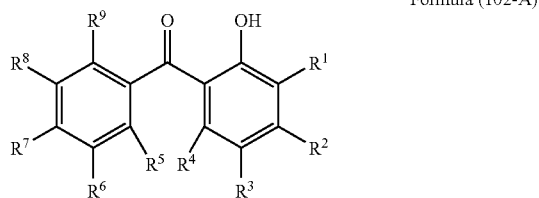

Formula (102-A)

wherein $R^1$, $R^2$, $R^3$, $R^4$, $R^5$, $R^6$, $R^7$, $R^8$ and $R^9$ are each independently a hydrogen atom or a substituent.

$R^1$, $R^2$, $R^3$, $R^4$, $R^5$, $R^6$, $R^7$, $R^8$ and $R^9$ each independently represent a hydrogen atom or a substituent, and the substituent may be exemplified by the above-described substituent T. These substituents may be further substituted with other substituents, and the substituents may be condensed to form a ring structure.

$R^1$, $R^3$, $R^4$, $R^5$, $R^6$, $R^8$ and $R^9$ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; and particularly preferably a hydrogen atom or a methyl group; and most preferably a hydrogen atom.

$R^2$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably an alkoxy group having 1 to 20 carbon atoms; and particularly preferably an alkoxy group having 1 to 12 carbon atoms.

$R^7$ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 20 carbon atoms (preferably having 1 to 12 carbon atoms, more preferably 1 to 8 carbon atoms, and even more preferably a methyl group); and particularly preferably a methyl group or a hydrogen atom.

The compound represented by Formula (102) is more preferably a compound represented by the following Formula (102-B):

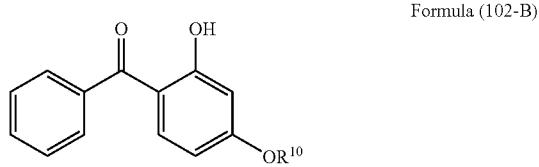

Formula (102-B)

wherein $R^{10}$ is a hydrogen atom, a substituted or unsubstituted alkyl group, a substituted or unsubstituted alkenyl group, a substituted or unsubstituted alkynyl group, or a substituted or unsubstituted aryl group.

$R^{10}$ is a hydrogen atom, a substituted or unsubstituted alkyl group, a substituted or unsubstituted alkenyl group, a substituted or unsubstituted alkynyl group, or a substituted or unsubstituted aryl group, and the substituents on the aforementioned groups can be exemplified by the substituent T.

$R^{10}$ is preferably a substituted or unsubstituted alkyl group, more preferably a substituted or unsubstituted alkyl group having 5 to 20 carbon atoms, even more preferably a substituted or unsubstituted alkyl group having 5 to 12 carbon atoms (e.g., a hexyl group, a 2-ethylhexyl group, an octyl group, a decyl group, a dodecyl group, a benzyl group, etc.), and particularly preferably a substituted or unsubstituted alkyl group having 6 to 12 carbon atoms (e.g., a 2-ethylhexyl group, an octyl group, a decyl group, a dodecyl group or a benzyl group).

The compound represented by Formula (102) can be synthesized by a known method described in JP-A No. 11-12219.

Specific examples of the compound represented by Formula (102) are given below but the compounds which can be used in the present invention are not limited thereto.

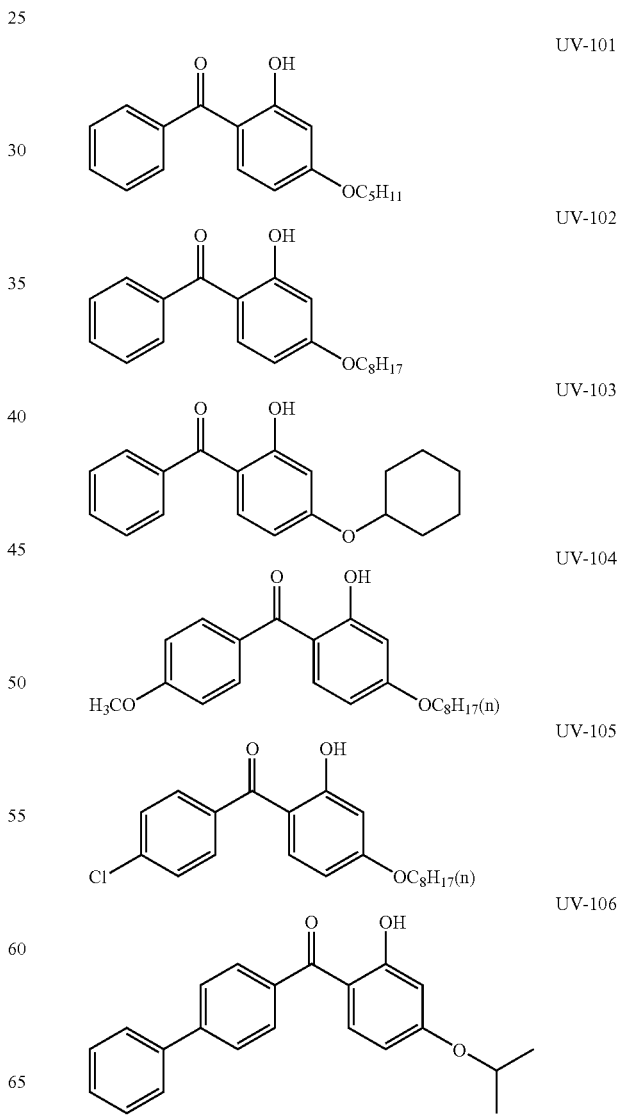

UV-107
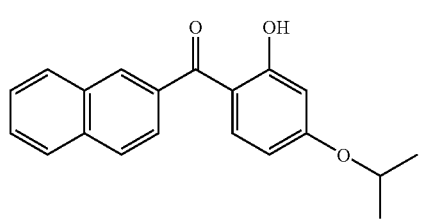

UV-108
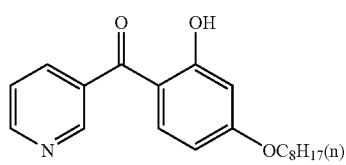

UV-109
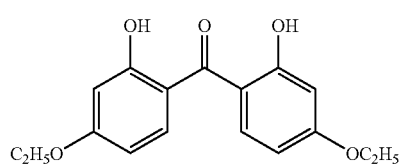

UV-110
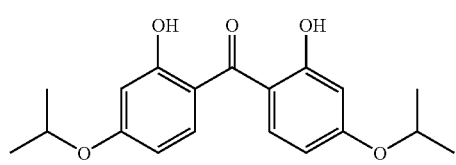

UV-111
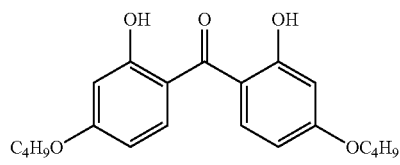

UV-112
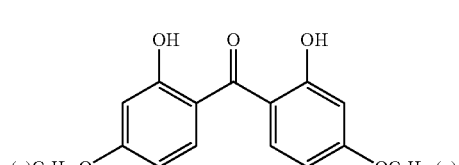

UV-113
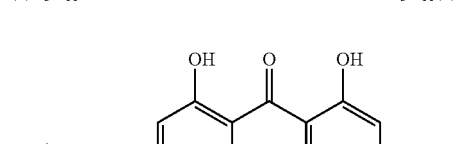

UV-114
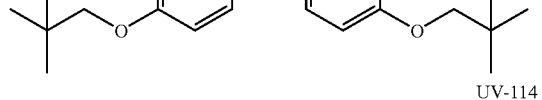

UV-115
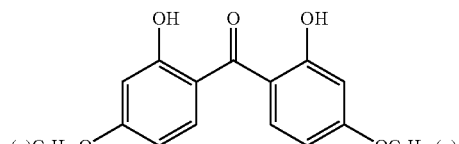

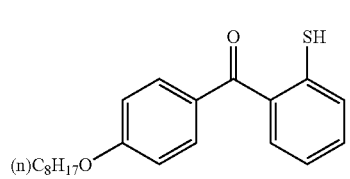

UV-116
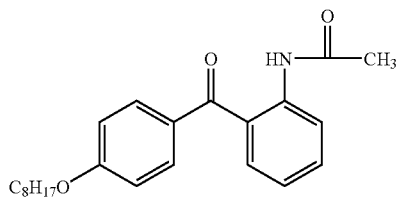

UV-117
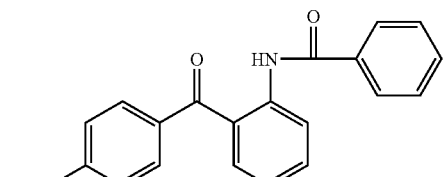

UV-118
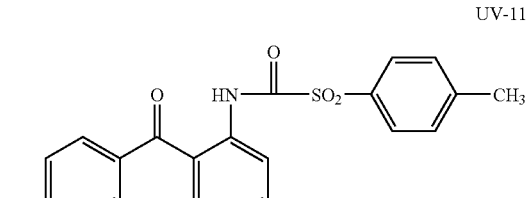

UV-119
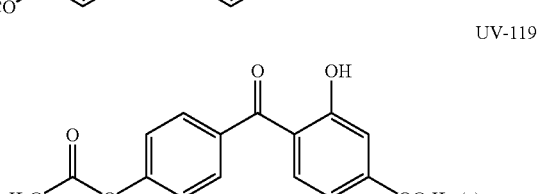

UV-120
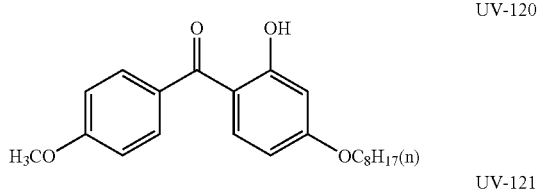

UV-121
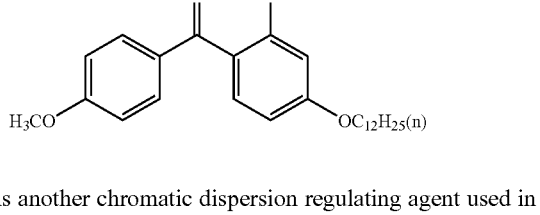

As another chromatic dispersion regulating agent used in the invention, a cyano group-containing compound represented by Formula (103) is preferably used:

Formula (103)
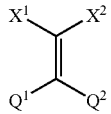

wherein $Q^1$ and $Q^2$ are each independently an aromatic ring. $X^1$ and $X^2$ are each a hydrogen atom or a substituent, and at least one of them is a cyano group, a carbonyl group, a sulfonyl group or an aromatic heterocyclic ring. The aromatic ring indicated as $Q^1$ and $Q^2$ may be an aromatic hydrocarbon ring or an aromatic heterocyclic ring. Further, these may be monocyclic or may for a fused ring with other rings.

The aromatic hydrocarbon ring is preferably a monocyclic or bicyclic aromatic hydrocarbon ring having 6 to 30 carbon atoms (e.g., benzene ring, naphthalene ring, etc.), more preferably an aromatic hydrocarbon ring having 6 to 20 carbon atoms, even more preferably an aromatic hydrocarbon ring having 6 to 12 carbon atoms, and particularly preferably a benzene ring.

The aromatic heterocyclic ring is preferably an aromatic heterocyclic ring containing a nitrogen atom or a sulfur atom. Specific examples of the heterocyclic ring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. The aromatic heterocyclic ring is preferably pyridine, triazine or quinoline.

The aromatic ring indicated as $Q^1$ and $Q^2$ is preferably an aromatic hydrocarbon ring, and more preferably a benzene ring.

$Q^1$ and $Q^2$ may be further substituted, and the following substituent T is preferably used. Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, n-octyl, n-decyl, n-hexadecyl, cyclopropyl, cyclopentyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, mo preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atom, and particularly preferably 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms, e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atoms, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably 0 to 12 carbon atom; sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chlorine atom, a bromine atom, an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms and more preferably 1 to 12 carbon atoms, and having a heteroatom such as a nitrogen atom, an oxygen atom, or a sulfur atom; e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl), and the like. These substituents may be further substituted. When there are two substituents, the may be identical or different. If possible, the substituents may be connected to each other to form a ring.

$X^1$ and $X^2$ are a hydrogen atom or a substituent and at least one group is a cyano group, a carbonyl group, a sulfonyl group, an aromatic heterocyclic ring. A substituent represented by $X^1$ and $X^2$ may be exemplified by the above-mentioned substituent T. In addition, the substituent represented by $X^1$ and $X^2$ may be further substituted by other substituents and each substituent represented by $X^1$ and $X^2$ may be annelated to form a ring structure.

$X^1$ and $X^2$ are preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; and even more preferably a cyano group or a carbonyl group; and particularly preferably a cyano group or an alkoxycarbonyl group (—C(=O)OR (R is an alkyl group having 1 to 20 carbon atoms, an aryl group having 6 to 12 carbon atoms, and a combination thereof).

The compound represented by Formula (103) is preferably a compound represented by the following Formula (103-A):

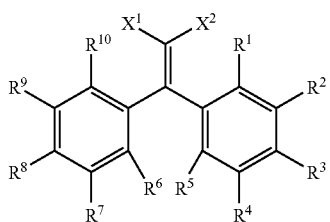

Formula (103-A)

wherein $R^1$, $R^2$, $R^3$, $R^4$, $R^5$, $R^6$, $R^7$, $R^8$, $R^9$ and $R^{10}$ are each independently a hydrogen atom or a substituent. $X^1$ and $X^2$ have the same meanings as those in Formula (103) and their preferable ranges are the same as those in Formula (103).

$R^1$, $R^2$, $R^3$, $R^4$, $R^5$, $R^6$, $R^7$, $R^8$, $R^9$ and $R^{10}$ each independently represent a hydrogen atom or a substituent, and the substituent may be exemplified by the above-described substituent T. These substituents may be further substituted with other substituents, and the substituents may be annelated to form a ring structure.

$R^1$, $R^2$, $R^4$, $R^5$, $R^6$, $R^7$, $R^9$ and $R^{10}$ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; and particularly preferably a hydrogen atom or a methyl group; and most preferably a hydrogen atom.

$R^3$ and $R^8$ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 12 carbon atoms, or an alkoxy group having 1 to 12 carbon atoms; and particularly preferably a hydrogen atom.

The compound represented by Formula (103) is more preferably a compound represented by the following Formula (103-B):

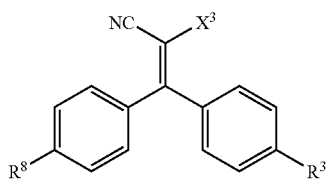

Formula (103-B)

wherein $R^3$ and $R^8$ have the same meanings as those in Formula (103-A) and their preferable ranges are the same as those in Formula (103-A). $X^3$ represents a hydrogen atom or a substituent.

$X^3$ represents a hydrogen atom or a substituent, and the substituent may be exemplified by the above-described substituent T. The substituent may be further substituted with other substituents, if possible. $X^3$ is preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; and even more preferably a cyano group or a carbonyl group; and particularly preferably a cyano group or an alkoxycarbonyl group (—C(=O)OR (R is an alkyl group having 1 to 20 carbon atoms, an aryl group having 6 to 12 carbon atoms, and a combination thereof).

The compound represented by Formula (103) is more preferably a compound represented by the following Formula (103-C):

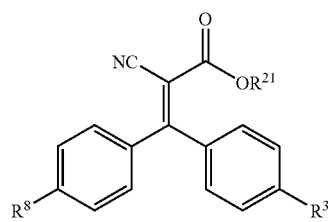

Formula (103-C)

wherein $R^3$ and $R^8$ have the same meanings as those in Formula (103-A) and their preferable ranges are the same as those in Formula (103-A). $R^{21}$ represents an alkyl group having 1 to 20 carbon atoms.

When both of $R^3$ and $R^8$ are a hydrogen atom, $R^{21}$ is preferably an alkyl group having 2 to 12 carbon atoms, more preferably an alkyl group having 4 to 12 carbon atoms, even more preferably an alkyl group having 6 to 12 carbon atoms, particularly preferably an octyl group, a tert-octyl group, a 2-ethylhexyl group, a decyl group, or a dodecyl group, and most preferably 2-ethylhexyl group.

When $R^3$ and $R^8$ are not a hydrogen atom, the compound represented by the Formula (103-C) has a molecular weight of 300 or more and $R^{21}$ is preferably an alkyl group having 20 or less carbon atoms The compound represented by Formula (103) of the invention can be synthesized by a method described in Journal of American Chemical Society, Vol. 63, pp. 3452 (1941).

Specific examples of the compound represented by Formula (103) are given below but the compounds which can be used in the present invention are not limited thereto.

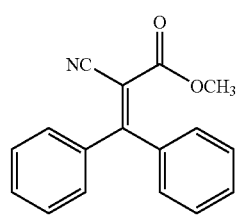

UV-201

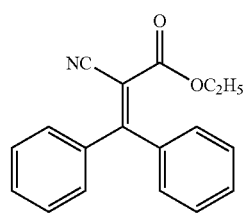

UV-202

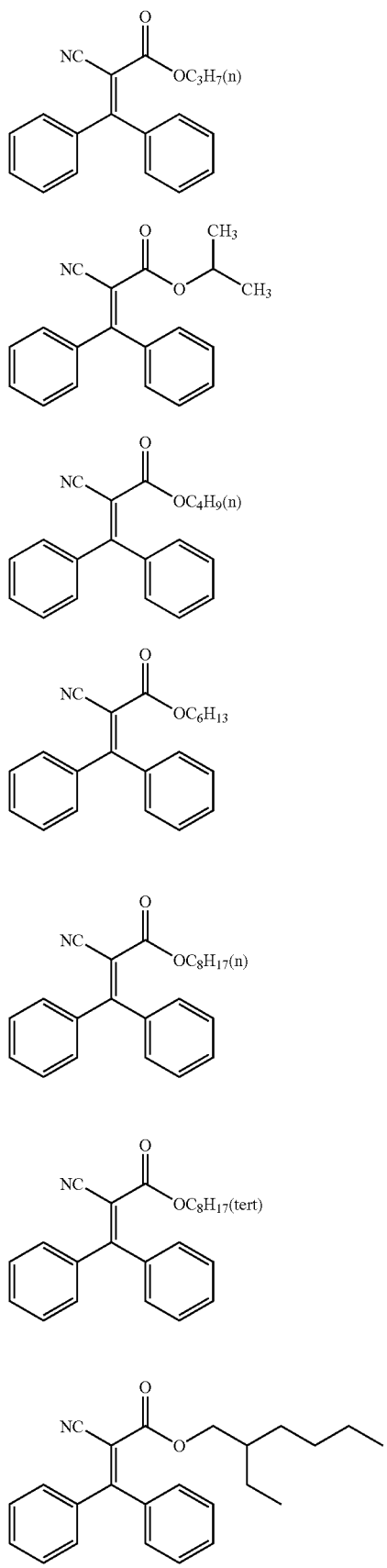
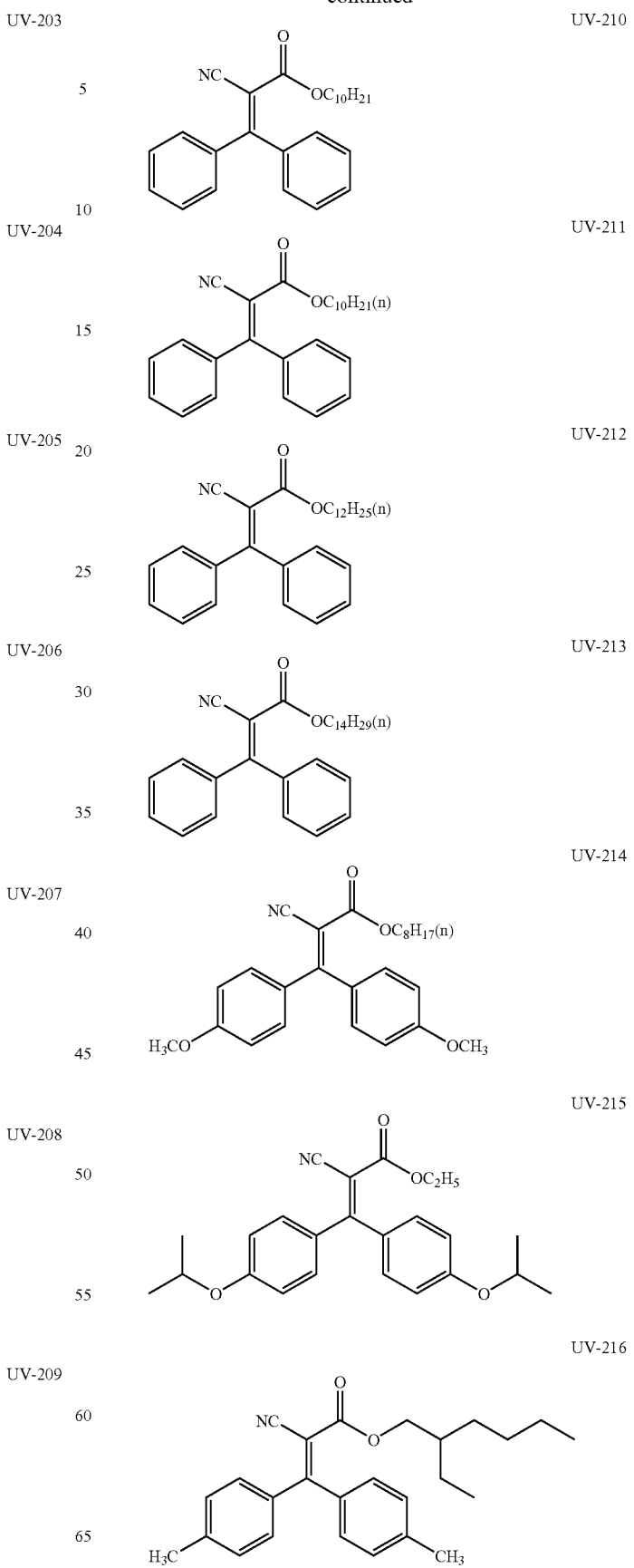

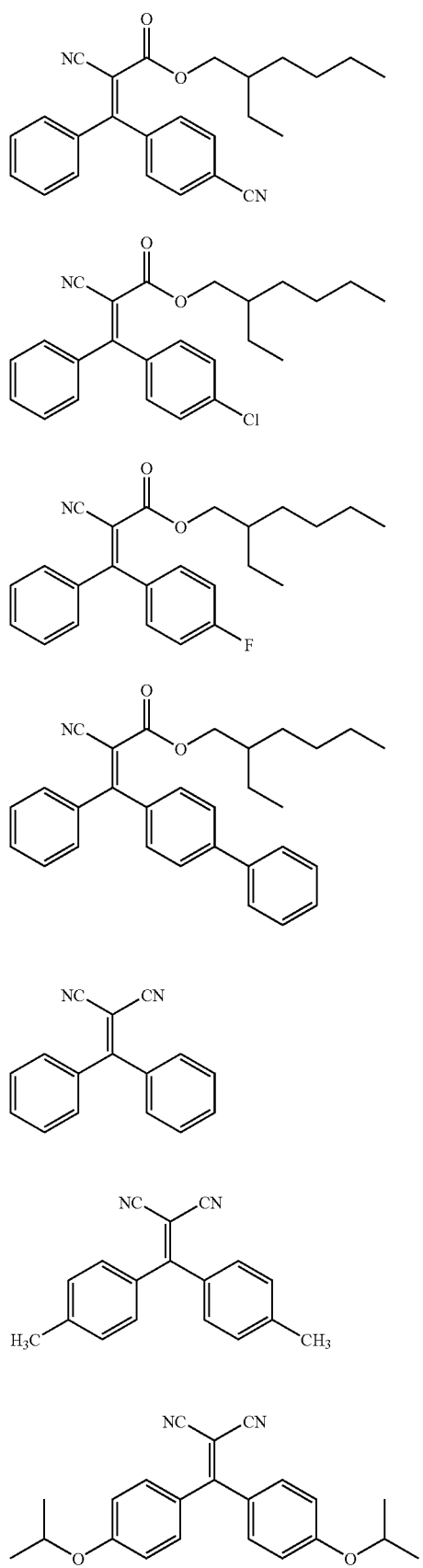
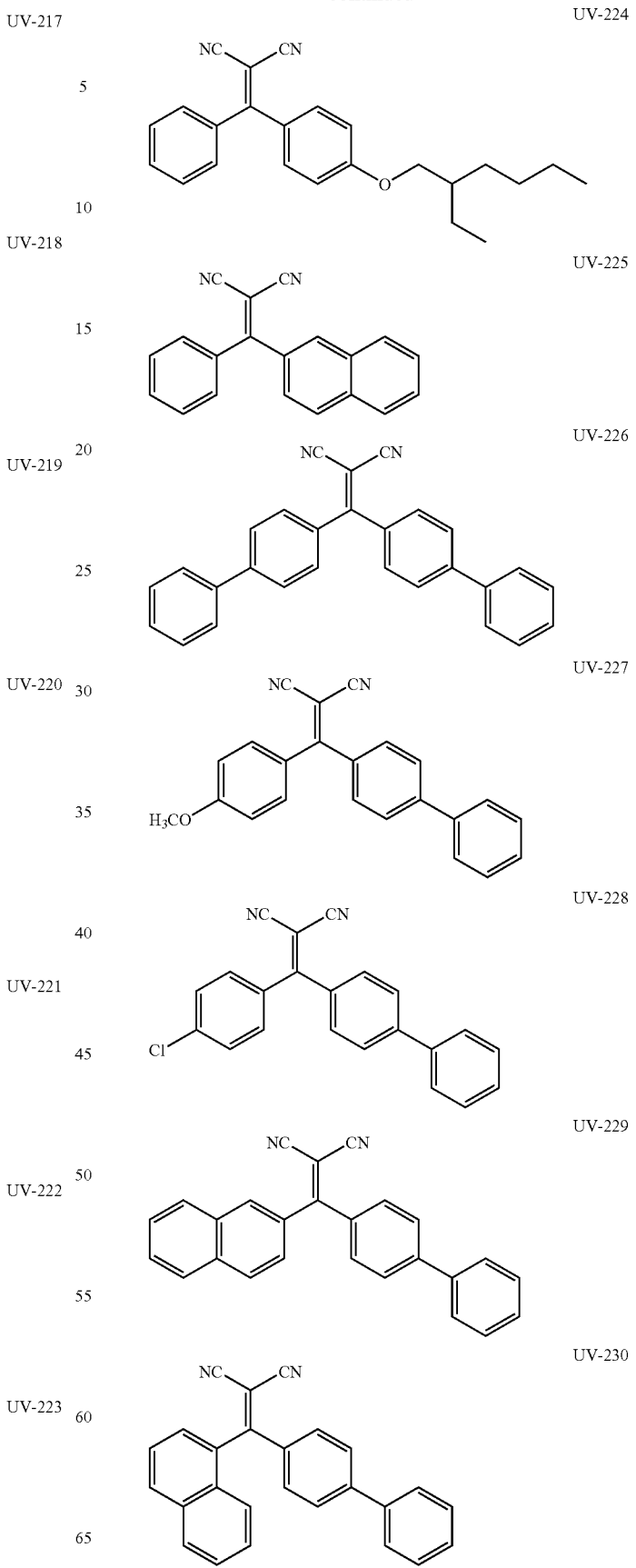

-continued

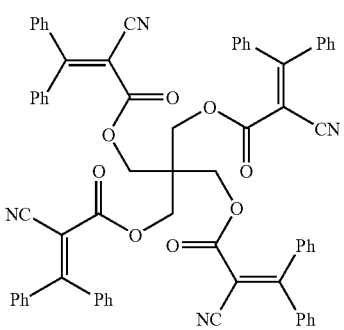

UV-231

[Fine Particles of Matting Agent]

It is preferable that the cellulose acylate film according to the first embodiment contains fine particles as a matting agent. Examples of the fine particles usable in the first embodiment include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Fine particles containing silicon are preferred because of having a low turbidity. In particular, silicon dioxide is preferred. It is preferable that fine particles of silicone dioxide have an average primary particle size of 20 nm or less and an apparent specific gravity of 70 g/l or more. Fine particles having a small average primary particle size of 5 to 16 nm are more preferable, since the haze of the resultant film can be lowered thereby. The apparent specific gravity is preferably form 90 to 200 g/l or more and more preferably from 100 to 200 g/l or more. A higher apparent specific gravity makes it possible to prepare a dispersion having the higher concentration, thereby improving haze and aggregates.

These fine particles form the secondary particles having an average particle size of usually from 0.1 to 3.0 μm. In a film, these fine particles occur as aggregates of the primary particles and provide irregularities of 0.1 to 3.0 μm on the film surface. It is preferred that the average secondary particle size is from 0.2 μm to 1.5 μm, more preferably from 0.4 μm to 1.2 μm and most preferably from 0.6 μm to 1.1 μm. The primary or secondary particle size is determined by observing a particle in the film under a scanning electron microscope and referring the diameter of its circumcircle as the particle size. 200 particles are observed at various sites and the mean is referred to as the average particle size.

As the fine particles of silicon dioxide, use can be made of marketed products such as AEROSIL R972, R972V, R974, R812, 200, 200V, 300, R202, OX50 and TT600 (each manufactured by Dehussa Japan Co., Ltd.). As the fine particles of zirconium oxide, use can be made of products marketed under the trade name of, for example, AEROSIL R976 and R811 (each manufactured by Dehussa Japan Co., Ltd.).

Among these products, AEROSIL 200V and AEROSIL R972V are particularly preferable, since they are fine particles of silicon dioxide having an average primary particle size of 20 nm or less and an apparent specific gravity of 70 g/l or more and exert an effect of largely lowering the coefficient of friction while maintaining the turbidity of the optical film at a low level.

To obtain a cellulose acylate film having particles with a small average secondary particle size, some techniques may be proposed in the step of preparing a dispersion of the fine particles in the invention. For example, the fine particles are mixed with a solvent under stirring to preliminarily give a fine particle dispersion. Then this fine particle dispersion is added to a small amount of a cellulose acylate solution having been prepared separately and dissolved therein under stirring. Then it is further mixed with a main cellulose acylate dope solution. This is a preferable preparation method from the viewpoints of achieving a high dispersibility of the fine particles of silicon dioxide while causing little re-aggregation of the fine particles of silicon dioxide. An alternative method comprises adding a small amount of a cellulose ester to a solvent, dissolving it under stirring, then adding fine particles thereto, dispersing the fine particles in a dispersing machine to give a solution of the fine particle additive, and then sufficiently mixing the solution of the fine particle additive with a dope solution in an in-line mixer. Although the invention is not restricted to these methods, it is preferable in the step of mixing and dispersing the fine particles of silicon dioxide in, for example, a solvent that the silicon oxide concentration ranges from 5 to 30% by weight, preferably from 10 to 25% by weight and most preferably from 15 to 20% by weight. A higher dispersion concentration is preferred, since the solution turbidity in response to the amount added is lowered and haze and aggregation are improved thereby. The final content of the cellulose acylate in the dope solution preferably ranges from 0.01 to 1.0 g/m$^2$, more preferably from 0.03 to 0.3 g/m$^2$ and most preferably from 0.08 to 0.16 g/m$^2$.

Preferable examples of lower alcohols usable as the solvent include methyl alcohol, ethyl alcohol, propyl alcohol, isopropyl alcohol and butyl alcohol. As solvents other than lower alcohols, it is preferable to use solvents which have been used in forming cellulose ester films.

[Plasticizer, Anti-Deterioration Agent, Releasing Agent]

The cellulose acylate film of the first embodiment may include, in addition to the optical anisotropy reducing compound and the chromatic dispersion regulating agent mentioned above, various additives (such as a plasticizer, an anti-ultraviolet agent, an anti-deterioration agent, a releasing agent, and an infrared absorber), which may be added in the preparation steps according to the purpose and which may be a solid or an oily substance. In other words, the boiling point and the melting point thereof are not specifically limited. For example, a mixing of an ultraviolet absorbing material at 20° C. or lower or at 20° C. or higher, and a mixing of a plasticizer are possible as described in JP-A No. 2001-151901. Also an infrared absorbing dye is described for example in JP-A No. 2001-194522. Also the addition may be executed any time in the process of preparation of a dope solution, or by adding an additive adding step in a final preparation step of such process. Also in the case where the cellulose acylate film is formed of plural layers, the kind and the amount of the additive may be different in each layer. These are known technologies as described for example in JP-A No. 2001-151902. For such technologies, there are preferably used materials described in detail in Japan Institute of Invention and Innovation, Journal of Technical Disclosure (Technical Publication No. 2001-1745, pp. 16-22, Mar. 15, 2001, published by Japan Institute of Invention and Innovation).

[Ratio of Addition of Compounds]

In the cellulose acylate film of the first embodiment, the total amount of compounds having a molecular weight of 3,000 or less is preferably 5 to 45%, more preferably 10 to 40% and even more preferably 15 to 30% with respect to the weight of cellulose acylate. Such compounds include an optical anisotropy reducing compound, a chromatic dispersion regulating agent, an anti-ultraviolet agent, a plasticizer, an anti-deterioration agent, fine particles, a releasing agent, an infrared absorber and the like as described above, and have a molecular weight of preferably 3,000 or less, more preferably 2,000 or less and even more preferably 1,000 or less. In the case where the total amount of these compounds is 5% or less, properties of the cellulose acylate alone tend to be exhibited, thereby resulting in fluctuations in optical performances and physical strength in response to changes in temperature and humidity. Further, the total amount of these compounds above 45% may exceeds a limit of solubility of these compounds in the cellulose acylate film, thus causing a precipitation on the film surface and leading to a white turbidity of the film (bleeding from the film).

[Organic Solvent for Cellulose Acylate Solution]

In the first embodiment, the cellulose acylate film is preferably produced by a solvent cast method, utilizing a solution (dope) prepared by dissolving cellulose acylate in an organic solvent. A principal solvent to be used in the invention is preferably selected from an ester, a ketone, and an ether having 3 to 12 carbon atoms, and a halogenated hydrocarbon having 1 to 7 carbon atoms. The ester, ketone or ether may have a ring structure. A compound having two or more functional groups of ester, ketone or ether (namely —O—, —CO— or —COO—) can also be used as a principal solvent, and another functional group such as an alcoholic hydroxyl group may be present. In a principal solvent having two or more functional groups, the number of carbon atoms of such solvent may maintained within a range defined for a compound having either of such functional groups.

In the preparation of the cellulose acylate film of the first embodiment, a halogenated hydrocarbon of chlorine type may be used as the principal solvent, or a non-chlorine solvent may be used as the principal solvent as described in Japan Institute of Invention and Innovation, Journal of Technical Disclosure, Technical Publication No. 2001-1745, pp. 12-16.

A solvent for the cellulose acylate solution and film of the invention, including a dissolving method, is described, as preferred embodiments, in following Patent Documents: JP-A Nos. 2000-95876, 12-95877, 10-324774, 8-152514, 10-330538, 9-95538, 9-95557, 10-235664, 12-63534, 11-21379, 10-182853, 10-278056, 10-279702, 10-323853, 10-237186, 11-60807, 11-152342, 11-292988 and 11-60752. These Patent Documents describe not only a solvent preferable for the cellulose acylate of the invention but also properties of a solution thereof and substances to be present, and constitute preferable embodiments also in the present invention.

[Manufacturing Process of Cellulose Acylate Film]
[Dissolving Process]

In the preparation of the cellulose acylate film of the first embodiment, a solution (dope) of the cellulose acylate is not restricted in a method of dissolution, and may be prepared at a room temperature, or by a cooled dissolving method or a high-temperature dissolving method, or a combination thereof. For a process of preparation of a cellulose acylate solution of the first embodiment, and processes of concentration and filtration of the solution associated with the dissolving process, there can be preferably used a manufacturing process described in detail in Japan Institute of Invention and Innovation, Journal of Technical Disclosure (Technical Publication No. 2001-1745, pp. 22-25, Mar. 15, 2001, published by Japan Institute of Invention and Innovation).

(Transparency of Dope Solution)

In the first embodiment, the cellulose acylate solution preferably has a dope transparency of preferably 85% or higher, more preferably 88% or higher and more preferably 90% or higher. It was confirmed that various additives are sufficiently dissolved in the cellulose acylate solution (dope) of the first embodiment. For the specific calculation method of dope transparency, the dope solution is filled in glass cell of 1 cm square and absorbance at 550 nm is measured using the spectrophotometer (UV-3150, manufactured by Shimadzu Corporation). The absorbance of the solvent is previously measured as the blank, and the transparency of cellulose acylate is calculated from a ratio to the absorbance of the blank.

[Casting, Drying and Winding Process]

Next, the process of producing a film using the cellulose acylate solution of the invention is described below. The cellulose acylate film of the first embodiment can be produced by the method and apparatus conventionally used for preparation of the cellulose triacetate films according to the solution casting method and solution casting apparatus. First, the dope (cellulose acylate solution) prepared in a dissolving tank (pot) is stored into a stock tank, defoamed and finally prepared. Then, the dope is sent from outlet to a pressurized die through a quantitative gear pump of pressing type, which can quantitatively send the dope with high precision, for example, according to rotation number, and from a metal fittings of the pressurized die (slit), the dope is evenly cast on a metal support of casting part running endlessly. At the peeling point where the metal support nearly once rotates, the insufficiently dried dope film (which is referred to as web) is peeled from the metal support. While both sides of the web are fixed with clips to keep the width, the web is transferred and dried with a tenter, then the web is successively transferred with rollers of drying apparatus to complete drying, and wound up by a winder in a predetermined length. The combination of the tenter and the rollers of drying apparatus can be varied according to the purpose. In addition to the solution casting apparatus, a coating apparatus can also be used for the purpose of providing processing of the film surface such as an undercoating layer, an antistatic layer, an anti-halation layer and a protective layer. This is described in detail in the Laid-open Technical Report, pp. 25 to 30 (No. 2001-1745, Mar. 15, 2001, Japan Institute of Invention and Innovation), and classified as casting (including co-cast), metal support, drying and peeling, which is preferably used in the invention. The thickness of the cellulose acylate film is preferably in the range of 10 to 120 µm, more preferably 20 to 100 µm, and more preferably 30 to 90 µm.

[Changes of Optical Property of Film after High Humidity Processing]
[Evaluation of Physical Properties for Cellulose Acylate Film]

Regarding the change in the optical properties according to the environmental change of the cellulose acylate film of the first embodiment, it is preferable that the variation of Re and Rth of the film processed at 60° C. and 90% RH for 240 hours is 15 nm or less, more preferably 12 nm or less and more preferably 10 nm or less.

[Change in Optical Property of Film after High Temperature Processing]

More over, it is preferable that the variation of Re and Rth of the film processed at 80° C. for 240 hours is 15 nm or less, more preferably 12 nm or less, and more preferably 10 nm or less.

[Amount of Volatilized Compound after Heating Process of Film]

For the compound for lowering Rth and the compound for decreasing ΔRth, which can be preferably used in cellulose acylate film of the first embodiment, it is preferable that the amount of the compound volatilized from the film, which is processed at 80° C. for 240 hours is 30% or below, more preferably 25% or below, and more preferably 20% or below.

Further, the amount of the compound volatilized from the film is evaluated as followings. The film treated at 80° C. for 240 hours and the untreated film were dissolved in a solvent, respectively and the compounds were detected by high performance liquid chromatography. The amount of the residual compounds in the film is calculated as peak areas of the compounds by the following equation.

Volatilization ratio (%)={(amount of residual compounds in untreated products}−(amount of residual compounds in treated products)/(amount of residual compounds in untreated products)× 100

[Glass Transition Temperature Tg of Film]

The glass transition temperature Tg of the cellulose acylate film of the first embodiment is 80 to 165° C. From the viewpoint of heat resistance, Tg is preferably 100 to 160° C., and more preferably 110 to 150° C. The glass transition temperature Tg is measured using a 10 mg sample of the cellulose acylate film of the first embodiment by differential scanning calorimeter (DSC2910, manufactured by T.A Instrument) from room temperature to 200° C. at a rate of the temperature rising and falling of 5° C./min.

[Haze of Film]

The haze of the cellulose acylate film of the first embodiment is preferably 0.01 to 2.0%, more preferably 0.05 to 1.5%, and particularly preferably 0.1 to 1.0%. The transparency of the film as an optical film is important. The haze is measured using a sample of the cellulose acylate film of the first embodiment cut into the size of 40 mm×80 mm by hazemeter (HGM-2DP, manufactured by Suga test instruments Co., Ltd.) under the condition of 25° C. and 60% RH according to JIS K-6714.

[Humidity Dependency of Re and Rth of Film]

The in-plane retardation Re and the retardation Rth in the thickness direction of the cellulose acylate film of the first embodiment are preferably those which have a minor change due to the humidity. Specifically, the difference between the Rth value as measured under the condition of 25° C. and 10% RH and the Rth value as measured under the condition of 25° C. and 80%, namely ΔRth (=Rth 10% RH−Rth 80% RH) is preferably in the range of 0 to 50 nm, more preferably 0 to 40 nm, and more preferably 0 to 35 nm.

[Equilibrium Water Content of Film]

The equilibrium water content of the cellulose acylate film of the first embodiment is preferably 0 to 4% under the condition of 25° C. and 80%, more preferably 0.1 to 3.5%, and particularly preferably 1 to 3%, regardless of film thickness, not to undermine the adherence to the water-soluble polymer such as polyvinylalcohol, when used as a protective film of polarized plate. 4% or more of equilibrium water content is not preferable because the dependency on humidity variation of retardation is too high, when used as a support of optically compensatory film. The water content is measured using a sample of the cellulose acylate film of the first embodiment cut into the size of 7 mm×35 mm by moisture meter and sample drying apparatus (CA-03, VA-05, manufactured by Mitsubishi Chemical Corporation) according to the Karl Fisher's method, to devide the amount of water (g) by the mass of the sample (g).

[Moisture Permeability]

The moisture permeability of the cellulose acylate film using as an optically compensatory film of the first embodiment is measured according to the JIS Z-0208 under the condition of 60° C. and 95% RH. The moisture permeability is preferably in the range of 400 to 2000 g/m²·24 h, reduced in terms of film thickness of 80 μm, more preferably 500 to 1800 g/m²·24 h and particularly preferably 600 to 1600 g/m²·24 h. When the value is above 2000 g/m²·24 h, the tendency that the absolute value of humidity dependency of Re value and Rh value of the film exceeds 5 nm/% RH is strengthened. More over, in the case of the optical compensation film composed of the optical anisotropic film layered on the cellulose acylate film of the first embodiment, the tendency that the absolute value of humidity dependency of Re value and Rh value of film exceed 5 nm/% RH is strengthened, and thus it is not preferable. When the optically compensatory sheet or the polarizer is incorporated in liquid crystal display apparatus, variation of hue or deterioration of viewing angle is caused. Also, in the case where the polarizer is prepared to adhere on both sides of the polarizing film, when the moisture permeability is below 400 g/m²·24 h, the defective adhesion occurs because the cellulose acylate film prevents the adhesive from being dried. When the cellulose acylated film is too thick, the moisture permeability is lowered, while the thin film increases the water permeability. Thus, any film thickness sample is necessary to be designed to reduce in term of 80 μm. The film thickness is reduced by (water permeability in terms of 80 μm=measured water permeability×measured film thickness/80 μm).

For the measuring method, the method described in "The physical property of polymer II" (polymer experiment study 4, published by Kyoritsu Publication) page 285 to 294: measurement of vapor permeability (mass method, thermo-hygrometer, vapor pressure method and absorption amount method) can be applied. The humidity of 70 mmφ cellulose acylate film sample of present first embodiment is controlled under the condition of 25° C., and 90% RH and 60° C., and 5% RH for 24 hours, and the sample is subjected to a moisture permeability tester (KK-709007, manufactured by Toyo Seiki Seisakusho, Ltd.) to calculate a moisture content per unit area (g/m²), according to JIS Z-0208 by using the following equation.

Moisture permeability=mass after moisture conditioning−mass before moisture conditioning

[Dimensional Change of Film]

Regarding the dimensional stability of the cellulose acylate film of the first embodiment, the rate of dimensional change under high humidity, as measured after keeping the sample under the condition of 60° C., and 90% RH for 24 hours, and the rate of dimensional change under high temperature, as measured after keeping the sample under the condition of 90° C., and 5% RH for 24 hours are preferably 0.5% or less, more preferably 0.3% or less and more preferably 0.15% or less.

Specific measuring method is as follows. Two samples of the cellulose acylate film are prepared in a size of 30 mm×120 mm, and the humidity of the sample is conditioned at 25° C., and 60% RH for 24 hours. The 6 mmφ hole is opened at each of the ends of the sample at an interval of 100 mm by automatic pin gauge(manufactured by Shinto Scientific Co., Ltd.), and distance between these punched holes are measured (L0). The distance (L1) between the punched holes after treatment under the condition of 60° C., and 90% RH for 24 hours, and the distance (L2) between the punched holes after treatment under the condition of 90° C., and 5% RH for 24 hours are measured. The measuring is performed to the minimum scale of the order of 1/1000 mm. The rate of dimensional change is calculated according to the following equation.

Rate of dimensional change at 60° C., and 90% RH(high humidity)={|L0−L1|/L0}×100, Rate of dimensional change 90° C., and 5% RH(high temperature)={|L0−L2|/L0}×100

[Elastic Modulus of Film]
(Elastic Modulus)

The elastic modulus of the cellulose acylate film is preferably 200 to 500 kgf/mm$^2$, more preferably 240 to 470 kgf/mm$^2$, and more preferably 270 to 440 kgf/mm$^2$. Specifically, the samples are stretched by 0.5% tensile strength under the condition of 23° C. and 70% and stretching rate of 10%/min. The stress is measured using universal tensile tester (STM T50BP, manufactured by Toyo Baldwin Co., Ltd.) to determine the elastic modulus.

[Coefficient of Optical Elasticity of Film]
(Optical Elasticity of Film)

The coefficient of optical elasticity of a cellulose acylate according to the present first embodiment is preferably 50×10$^{-13}$ cm$^2$/dyne or less, more preferably 30×10$^{-13}$ cm$^2$/dyne or less, and most preferably 20×10$^{-13}$ cm$^2$/dyne. As a specific measuring method, a cellulose acylate film sample of 12 mm×12 mm was applied with tensile stress in a longitudinal direction, and the retardation at that time was measured by ellipsometer (M150, JASCO Corporation), and then the coefficient of optical elasticity was calculated from the variation of the retardation with respect to the stress.

(Change of Front Retardation Before and after Stretching and Detection of Slow Axis)

A sample of 100×100 mm was prepared, and stretching was carried out using a fixed uniaxial drawing machine under the condition at the temperature of 140° C. in the machine direction (MD direction) or the transverse direction (TD direction). The front retardation of each sample before and after the stretching was measured using an automatic birefringence meter KOBRA21ADH. Detection of the slow axis was determined from orientation angle which is obtained when measuring the above-mentioned retardation. Smaller change of Re by stretching is preferred, and specifically, when Re$_{(n)}$ represents the front in-plane retardation (nm) of n(%) stretched film, and Re$_{(0)}$ represents the front in-plane retardation (nm) of non-stretched film, it is preferable that |Re$_{(n)}$−Re$_{(0)}$|/n≦1.0, and more preferable that |Re$_{(n)}$−Re$_{(0)}$|/n≦0.3 or less.

(Direction of Having Slow Axis)

Since the polarizing film has the absorption axis in the machine direction (MD direction), the cellulose acylate film that can be used in the present invention has the slow axis preferably close to the MD or TD direction. Having the slow axis in parallel or perpendicular to the polarizing film, light leakage and change in color can be reduced. The term "close" refers to, for example, an angle between the slow axis and MD direction or the slow axis and TD direction in the range of 0 to 10°, and preferably in the range of 0 to 5°.

(Cellulose Acylate Film Whose Intrinsic Birefringence is Positive)

When the cellulose acylate film that can be used in the invention is stretched in the direction having the slow axis in the film plane, the front retardation (Re) is increased, and when the cellulose acylate film is stretched in the direction perpendicular to the direction having the slow axis in the film plane, the front retardation (Re) is decreased. This shows that the intrinsic birefringence is positive, and that stretching in the direction perpendicular to the slow axis is effective in removing retardation exhibited within the cellulose acylate film. For this method, it is considered, for example, to decrease the front retardation using tenter stretching in the direction perpendicular to MD (TD direction) when the film has the slow axis in the machine direction (MD direction). As an inverse example, it is considered to decrease the front retardation (Re) by stretching strongly the tension of the machine conveyance roll in MD direction when it has the slow axis in TD direction.

(Cellulose Acylate Film Whose Intrinsic Birefringence is Negative)

It is also possible that when the cellulose acylate film that can be used in the invention is stretched in the direction having the slow axis, the front retardation (Re) decreases, and when it is stretched in the direction which is perpendicular to the direction having the slow axis, the front retardation (Re) increases. This shows that the intrinsic birefringence is negative, and stretching in the same direction as that of the slow axis is effective in removing retardation exhibited within the cellulose acylate film. For this method, it is considered, for example, to decrease the front retardation (Re) by stretching strongly the tension of the machine conveyance roll in MD direction when the cellulose acylate film has the slow axis in MD direction. As an inverse example, it is considered to decrease the front retardation using tenter stretching in the direction which is perpendicular to MD (TD direction) when it has the slow axis in TD direction.

[Method for Evaluation of Cellulose Acylate Film]

For evaluation of the cellulose acylate film that can be used in the first embodiment, the measurement was carried out in the following methods.

(In-Plane Retardation Re and Retardation Along Thickness Direction Rth)

A sample of 30 mm×40 mm was conditioned in humidity at 25° C. and 60% RH for 2 hours, and Re$_{(\lambda)}$ was measured by entering the light of λ nm wavelength in the direction from the normal of the film with an automatic birefringence meter KOBRA21ADH (manufactured by Oji Scientific Instruments Co., Ltd.). In addition, Rth$_{(\lambda)}$ was calculated by inputting the assumed value 1.48 of the average refraction index and the film thickness to the base having the above-mentioned Re$_{(\lambda)}$ and the retardation value which was measured by entering the light of wavelength λ nm from the direction which is tilted by +40° to the direction from normal of the film for the oblique axis which is the in-plane slow axis, and the retardation value which was measured by entering the light of wavelength λ nm from the direction which is tilted by −40° to the direction from normal of the film for the oblique axis which is the in-plane slow axis.

(Measurement of Chromatic Dispersion of Re and Rth)

A sample of 30 mm×40 mm was conditioned in humidity at 25° C. and 60% RH for 2 hours, and chromatic dispersion of Re was measured by determining Re at each wavelength by entering the light of from 780 nm to 380 nm wavelength in the direction from normal of the film with Ellipsometer M-150 (manufactured by JASCO Corporation). In addition, for the chromatic dispersion of Re, it was calculated on the base of retardation values which were measured in the total of three directions, i.e., the above-mentioned Re, the retardation value which was measured by entering the light of 780 to 380 nm from the direction which is tilted by +40° to the direction from normal of the film for the oblique axis which is the in-plane slow axis, and the retardation value which was measured by entering the light of 780 nm to 380 nm wavelength from the direction which is tilted by −40° to the direction from normal of the film for the oblique axis which is the in-plane slow axis, and by inputting the assumed value 1.48 of the average refraction index and the film thickness.

[Evaluation Method of the Cellulose Acylate Film]

In an evaluation method of the present first embodiment, the measuring was performed by following method.

(Measuring of Chromatic Dispersion of Re, Rth)

Humidity of sample of 30 mm×40 mm was conditioned at 25° C., 60% RH for 2 hours, and Re at respective wavelengths was calculated by entering the light having wavelength of 780 nm to 380 nm in a normal direction of a film in an ellipsometer M-150 (manufactured by JASCO Corporation) to measure chromatic dispersion of Re.

(Molecular Orientation Axis)

Humidity of sample of 70 mm×100 mm was conditioned at 25° C., 60% RH for 2 hours, and the molecular orientation axis was calculated form the phase difference at the time that an incident angle in a vertical incidence has changed by an automatic birefringence meter (KOBRA21DH, Oji Scientific Instruments Co., Ltd.).

(Axis Shift)

Furthermore, an axis shift angle was measured using automatic birefringence meter. Twenty points at equal intervals are measured over the whole width in a transverse direction and an average value of absolute values was obtained. A range of phase retardation axis angle (axis shift) is that twenty points at equal intervals are measured over the whole width in a transverse direction and the difference between average of four points from the large absolute value of the axis shift and average of four points from the small absolute value of the axis shift.

(Transmittance)

The transmittance of visible light (615 nm) of sample of 20 mm×70 mm was measured at 25° C., 60% RH using a transparency measuring instrument (AKA photoelectric tube calorimeter, KOTAKI Ltd.).

(Spectroscopic Characterization)

The transmittance at wavelength of 300 to 450 nm of sample of 13 mm×40 mm was measured at 25° C., 60% RH using a spectrophotometer (U-3210, HITACHI LTD.). The inclination width was obtained at a wavelength of 75%–a wavelength of 5%. A limit wavelength was appeared at a wavelength of (inclination angle/2)+5%. An absorption edge was appeared at a wavelength having transmittance of 0.4%. From this, the transmittance at 380 nm and 350 nm was evaluated.

[Property of Film Surface]

It is preferred that a surface of cellulose acylate film of the first embodiment has an arithmetic average roughness (Ra) of the surface unevenness of the film of 0.1 μm or less, and a maximum height (Ry) of 0.5 μm or less based on JISB0601-1994. More preferably, the arithmetic average roughness (Ra) is 0.05 μm or less and the maximum height (Ry) is 0.2 μm or less. Unevenness of the film surface can be evaluated using an atomic force microscope (AFM).

[Irregularity in Plane of Retardation of Cellulose Acylate Film]

It is preferred that the cellulose acylate film of the first embodiment satisfies following equation. |Re(MAX)–Re(MIN)|≦3 and |Rth(MAX)–Rth(MIN)|≦5 (wherein, Re(MAX), Rth(MAX) are maximum retardation values of a film of 1 m square cut off optionally, and Re(MIN), Rth(MIN) are minimum values thereof, respectively).

[Retention Property of Film]

For the cellulose acylate film of the first embodiment, retention property is required for various compounds which are added to the film. Specifically, the mass change of the film is preferably 0 to 5% when the cellulose acylate film of the first embodiment is left under the condition of 80° C./90% RH for 48 hours. It is more preferably 0 to 3%, and more preferably 0 to 2%.

(Evaluation Method for the Retention Property)

The sample was cut into a size of 10 cm×10 cm, and left under atmosphere of 23° C. and 55% RH for 24 hours and then the mass was measured. Then, it was left under the condition of 80±5° C. and 90±10% RH for 48 hours. The surface of the sample after the treatment was lightly wiped, and left at 23° C. and 55% RH for one day, and then the mass was measured. The retention property was calculated by the following method.

Retention property(mass %)={(the mass before being left–the mass after being left)/the mass before being left}×100

[Mechanical Properties of Film]

(Curl)

The curl value of the cellulose acylate film of the present invention in the horizontal direction is preferably −10/m to +10/m. When carrying out the surface treatment, conduction of the rubbing treatment in applying and building optical anisotropic layers, or carrying out application and building or lamination of an alignment film or optical anisotropic layer and the like for a long time for the cellulose acylate film of the first embodiment as described below, if the curl value of the cellulose acylate film of the first embodiment in the horizontal direction is beyond the above-mentioned range, it may cause problems in handling the film or cause cutting of the film. In addition, since the film contacts strongly with the convey roll at the edge or central part and the like of the film, the dust is easy to occur, adhesion of foreign substances onto the film increases, and point defect of the optical compensation film or frequency of application line may be beyond the acceptable value. In addition, with the curl in the above-mentioned range, it is possible to reduce spot trouble which is easy to occur when installing the optical anisotropic layer, and also prevent air bubbles from entering in polarization film lamination, so it is preferred.

The curl value can be measured according to the measurement method set forth by American National Standards Institute (ANSI/ASCPH1.29-1985).

(Tear Strength)

The tear strength based on the tear test method of JISK 7128-2: 1998 (Elmendorf tear method) is preferably 2 g or more for the cellulose acylate film of the first embodiment in the thickness range of 20 to 80 μm. It is more preferably 5 to 25 g, and more preferably 6 to 25 g. In addition, it is preferably 8 g or more when converted to 60 μm, more preferably 8 to 15 g. Specifically, 50 mm×64 mm of the sample segment is regulated in humidity under the condition of 25° C. and 65% RH for 2 hours, and then it can be measured using a tear strength tester of light load.

[The Amount of the Remaining Solvent of Film]

The cellulose acylate film of the first embodiment is preferably dried at the condition to make that the amount of the remaining solvent is in the range of 0.01 to 1.5 mass %. It is more preferably 0.01 to 1.0 mass %. It is possible to suppress the curl by regulating the amount of the remaining solvent in the transparent supporter which is used in the first embodiment to 1.5% or less. It is more preferably 1.0% or less. It is considered that the main factor of the effects is that free accumulation is reduced by reducing the amount of the remaining solvent in filming by the above-mentioned solvent cast method.

[Hygroscopic Expansion Coefficient of Film]

The hygroscopic expansion coefficient of the cellulose acylate film of the first embodiment is preferably $30 \times 10^{-5}$/% RH or less. The hygroscopic expansion coefficient is more preferably $15 \times 10^{-5}$/% RH or less, and more preferably $10\times10^{-5}$/% RH or less. In addition, the hygroscopic expansion coefficient is preferable as it is small, but usually, it is a value of $1.0\times10^{-5}$/% RH or more. The hygroscopic expansion coefficient refers to the amount of the change of the sample length when the relative humidity changes at certain temperature. By regulating the hygroscopic expansion coefficient, it is possible to prevent increase in frame-shaped transmission, i.e., light leakage by distortion while maintaining optical compensation functions of the optical compensation film in using the cellulose acylate film of the first embodiment as an optical compensation film supporter.

[The Surface Treatment]

By carrying out the surface treatment depending on the situation, it is possible to achieve improvement of adhesion of the cellulose acylate film to each of the function layers (for example, the primer layer and the back layer). For example, it is possible to use glow discharge treatment, ultraviolet light irradiation treatment, corona treatment, flame treatment, acid or alkali treatment. The glow discharge treatment herein may be low temperature plasma which occurs under low pressure gas of $10^{-3}$ to 20 Torr, and further it is also preferably plasma treatment under atmospheric pressure. Plasma excited gas refers to the gas which is plasma-excited under the above-mentioned conditions, and for example, it is argon, helium, neon, krypton, xenon, nitrogen, carbon dioxide and chlorofluorocarbon such as tetrafluoromethane and a mixture thereof and the like. Regarding this, details are described particularly in pp. 30-32 in the journal of technical disclosure by Japan Institute of Invention and Innovation (Laid-open technique NO. 2001-1745, published on Mar. 15, 2001, Japan Institute of Invention and Innovation), which can be preferably used in the first embodiment.

[Contact Angle of the Film Surface by Alkali Saponification Treatment]

Alkali saponification treatment can be taken as one of effective means of the surface treatment when using the cellulose acylate film of the first embodiment as a transparent protective film of a polarization plate. In this case, the contact angle of the film surface after alkali saponification treatment is preferably 55° or less. It is more preferably 50° or less, and more preferably 45° or less. As an evaluation method for the contact angle, it can be used evaluation of hydrophilic/hydrophobic property by a conventional method wherein the water droplet of 3 mm diameter is dropped on the film surface after the alkali saponification treatment, and the angle of the film surface with the water droplet is found.

(Light Resistance)

As an index of light endurance of the cellulose acylate of the first embodiment, color difference $\Delta E^*ab$ of the film which has been irradiated by super xenon light for 240 hours is preferably 20 or less. It is more preferably 18 or less, and more preferably 15 or less. Measurement for the color difference was by UV3100 (manufactured by Shimadzu Corporation). For the measurement method, the film was regulated in humidity at 25° C. and 60% RH for 2 hours or more, and then color measurement for the film before xenon light irradiation was carried out to find the initial value (L0*, a0*, b0). Then, a film was irradiated with the xenon light for 240 hours under the condition of 150 W/m$^2$, 60° C. and 50% RH at super xenon weather meter SX-75 (manufactured by Suga test instruments, Co., Ltd.). After the predetermined time passed, the film was taken out of the constant temperature bath, and regulated in humidity at 25° C. and 60% RH for 2 hours, and then color measurement was carried out again to obtain the value after a lapse of a predetermined time (L1, a1*, b1*). From this, color difference $\Delta E^*ab=((L0^*-L1^*)^2+(a0^*-a1^*)^2+(b0^*-b1^*)^2)^{0.5}$ was found.

[Polarizer]

The liquid crystal display device of the first embodiment has a first polarizer and a second polarizer disposed on both sides of the liquid crystal panel. The first and second polarizers respectively consist of a polarizing film and a pair of protective films having the polarizing film interposed in between, and at least one of such protective films (also used as support) is the above-described cellulose acylate film which satisfies:

$0 \leq Re_{(630)} \leq 10$ and $|Rth_{(630)}| \leq 25$.

According to the first embodiment, the method for producing the polarizer is not particularly limited, and a general method for production can be used. Mention may be made of a method of subjecting the obtained cellulose acylate film to an alkali treatment, and bonding the treated cellulose acylate film on both sides of a polarizer which has been produced by immersing and stretching a polyvinyl alcohol film in an iodine solution, using an aqueous solution of completely saponified polyvinyl alcohol solution. The cellulose acylate film may be subjected to good adhesion processing as described in JP-A Nos. 6-94915 and 6-118232, instead of the alkali treatment.

The adhesive used for the bonding of the treated surface of the protective film and the polarizing film may be exemplified by polyvinyl alcohol-based adhesives such as polyvinyl alcohol or polyvinyl butyral, vinyl-based latex such as butyl acrylate, or the like.

The polarizer is constituted of a polarizing film and protective films protecting both sides of the polarizing film, and can be further constituted by bonding a protector film on one side of the polarizer and bonding a separator film on the other side. The protector film and the separator film are used for the purpose of protecting the polarizer during shipping and product inspection of the polarizer, and the like. In this case, the protector film is bonded for the purpose of protecting the surface of the polarizer and is used on the opposite side of the surface where the polarizer is bonded to the liquid crystal plate. The separator film is used for the purpose of covering the adhesive layer which is bonded to the liquid crystal plate, and is used on the side of the surface where the polarizer is bonded to the liquid crystal plate.

In the liquid crystal display device of the first embodiment, excellent display properties can be obtained regardless of the disposition site of the protective film consisting of the cellulose acylate film satisfying the above formula. In particular, since the polarizer-protecting film on the outermost surface of the display side of the liquid crystal display device is provided with a transparent hardcoat layer, an anti-glare layer, an anti-reflection layer or the like, it is particularly preferable to use the polarizer-protecting film in this part.

[Retardation Film]

The liquid crystal display device of the first embodiment has a first retardation film between the liquid crystal panel and the first polarizer, and a second retardation film between the liquid crystal panel and the second retardation film.

In the liquid crystal display device of the first embodiment, the first retardation film preferably satisfies:

$50 \leq Re_{(589)} \leq 100$ and $30 \leq Rth_{(589)} \leq 80$, and the second retardation film preferably satisfies:

$Re_{(589)} \leq 20$ and $100 \leq |Rth_{(589)}| \leq 300$.

Further, the first retardation film more preferably satisfies:

$50 \leq Re_{(589)} \leq 90$ and $40 \leq Rth_{(589)} \leq 60$, and the second retardation film more preferably satisfies:

$Re_{(589)} \leq 10$ and $150 \leq |Rth_{(589)}| \leq 250$.

When the first and second retardation films have retardations in the above-described ranges, excellent display properties can be realized. The position of the first and second retardation films may be on either the viewing side or the backlight side, but it is preferred to dispose each of the films such that the first retardation film is on the viewing side, and the second retardation film is on the backlight side.

In the first embodiment, it is preferred to dispose the polarizer and the first retardation film such that the angle formed by the absorption axis of the polarizer and the slow axis of the first retardation film is between 85° and 95° inclusive. When a polarizer having an optical compensation function disposed to form this angle is used in a VA mode liquid crystal cell, the birefringence of such cell is efficiently compensated, and thus the viewing angle of the liquid crystal display device employing the polarizer having an optical compensation function, can be expanded. Moreover, the angle between the direction of the absorption axis of the polarizer and the direction of the slow axis of the first retardation film is more preferably between 86° and 94°, and even more preferably between 87° and 93°.

In the first embodiment, the polymer film included in the first retardation film can be formed from a stretched polymer film, which is formed by stretching a non-stretched polymer film by an appropriate method, or a liquid crystal film. Also, the liquid crystal film is most preferably formed of nematic liquid crystals.

A non-stretched polymer film is not particularly limited, but is preferably a material which can be imparted with optical anisotropy by film stretching, and which has excellent controllability of birefringence, transparency and heat resistance. The above-described non-stretched polymer film may be used individually or in combination of two or more species. For example, polyolefin (polyethylene, polypropylene, etc.), polynorbornen polymers, polyesters, polyvinyl chloride, polystyrene, polyacrylonitrile, polysulfone, polyallylate, polyvinyl alcohol, polymethacrylic acid esters, polyacrylic acid esters, cellulose esters and copolymers thereof can be used.

Further, the polymer film described in JP-A No. 2001-343529 (WO 01/37007) also can be used. For this polymer film, for example, a resin composition containing a thermoplastic resin having substituted or unsubstituted imide groups in the side chain and a thermoplastic resin having substituted or unsubstituted phenyl groups and cyano groups in the side chain can be used, which may be exemplified by a resin composition containing an alternating copolymer of isobutene and N-methylene maleimide, and an acrylonitrile/styrene copolymer.

The method for producing the non-stretched polymer film is not particularly limited, and a conventional method can be used. An extrusion method or a flow casting film formation method is preferred since the irregularity of birefringence of the polymer film after stretching can be reduced. The non-stretched polymer film that can be used has a thickness of, for example, 3 mm or less, preferably 1 μm to 1 mm, and particularly preferably 5 to 500 μm.

The method for stretching the non-stretched polymer film is not particularly limited, but a conventional method can be used. For example, mention may be made of tenter transverse stretching or biaxial stretching. In the biaxial stretching, it is preferred that the drawing ratio in the direction of the major axis is smaller than the drawing ratio in the direction of the minor axis. Also, biaxial stretching can be carried out by using either simultaneous biaxial stretching based on a whole tenter mode or sequential biaxial stretching based on a roll tenter mode.

The drawing ratio of the non-stretched polymer film may vary depending on the drawing method, but a non-stretched polymer film is usually stretched to 101 to 250% with respect to the length. The drawing ratio of the non-stretched polymer film is preferably 101 to 200% with respect to the length of the non-stretched polymer film.

The temperature for stretching the non-stretched polymer film is appropriately selected in accordance with the glass transition temperature (Tg) of the non-stretched polymer film used or the kinds of the additives in the non-stretched polymer film. The temperature for stretching the non-stretched polymer film is, for example, 80 to 250° C., preferably 120 to 220° C., and particularly preferably 140 to 200° C. In particular, the temperature for stretching the non-stretched polymer film is preferably near Tg or higher than Tg of the non-stretched polymer film to be stretched.

The thickness of the stretched polymer film can be appropriately determined in accordance with the screen size of the image display device to be used. The thickness of the stretched polymer film is, for example, 1 mm or less, preferably 1 to 500 μm, and particularly preferably 5 to 300 μm.

The second retardation film can be produced by coating an alignment layer with cholesteric liquid crystals, aligning the liquid crystals and fixing the aligned state to form a cholesteric liquid crystal layer.

The cholesteric liquid crystal layer is not particularly limited, and one produced by a method equivalent to conventional liquid crystal aligning techniques can be used. For example, a cholesteric liquid crystal polymer and a chiral agent are first coated on an alignment layer of a substrate. The coated layer is heated to a temperature above the glass transition temperature and below the isotropic phase transition temperature, so as to align the liquid crystal polymer molecules in the coated layer. Thereafter, when the coated layer is cooled to a temperature below the glass transition temperature, a cholesteric liquid crystal layer in which the alignment of the liquid crystal polymer molecules is fixed can be formed on the substrate. Alternatively, mention may be made of a method in which a photo-crosslinkable liquid crystal monomer and a chiral agent are coated on the above-described alignment layer, and the coated layer is heated to a temperature above the glass transition temperature and below the isotropic phase transition temperature as described above, so as to align the liquid crystal monomer in the coated layer. This is subjected to photo-irradiation to crosslink the liquid crystal monomer to form a cholesteric liquid crystal layer on the substrate.

[Liquid Crystal Panel]

The liquid crystal panel in the liquid crystal display device of the first embodiment is a liquid crystal panel in which liquid crystals having negative dielectric anisotropy are interposed between upper substrate and lower substrate that have been vertically oriented on the surface, the orientation of the liquid crystals being almost vertical with no applied voltage, almost horizontal when a predetermined voltage is applied, and tilted when a voltage smaller than the predetermined voltage is applied. The liquid crystal layer of the liquid crystal panel is usually formed by encapsulating liquid crystal in a gap formed by inserting a spacer between two substrates. A transparent electrode layer can be formed on the substrate as a transparent film containing a conductive material. The liquid crystal cell may further have a gas barrier layer, a hardcoat layer or an undercoat layer (used for adhesion of the transparent electrode layer). Such layers are usually provided on the substrate. The substrate of the liquid crystal cell generally has a thickness of 50 μm to 2 mm. A VA mode liquid crystal display device may be, for example, in a mode of partitioned alignment as described in JP-A No. 10-123576. The liquid crystal display device of the first embodiment can exhibit excellent display characteristics and viewing angle characteristics, as any of the transmissive type, reflective type or semi-transmissive type liquid crystal display device.

In the liquid crystal display device of the first embodiment, the cellulose acylate film satisfying $0 \leq Re_{(630)} \leq 10$ and $|Rth_{(630)}| \leq 25$ as described above can be used as a hardcoat film, an anti-glare film or an anti-reflection film, for the purpose of improving the visibility of the liquid crystal display device. Preferred embodiments of such anti-glare film and anti-reflection film are described in detail in pages 54 through 57 of the "Patent Studies" of the Japanese Institute of Invention and Innovation (JIII) (Publicized Technology No. 2001-1745, published on Mar. 15, 2001, JIII), and thus the above-described cellulose acylate film can be suitably used.

The cellulose acylate film satisfying $0 \leq Re_{(630)} \leq 10$ and $|Rth_{(630)}| \leq 25$ as described above has excellent transparency, with the optical anisotropy being near zero, and thus can be used as a replacement of the liquid crystal cell glass substrate, that is, the transparent substrate encapsulating liquid crystals to be driven, of the liquid crystal display device.

Since it is desirable that the transparent substrate encapsulating liquid crystals has excellent gas barrier property, a gas barrier layer may be provided on the surface of the cellulose acylate film described above, if necessary. The form or material of the gas barrier layer is not particularly limited, but a method of depositing $SiO_2$ or the like on at least one surface of the cellulose acylate film, or a method of providing a coating layer of a polymer having relatively high gas barrier property, such as a vinylidene chloride polymer or a vinyl alcohol polymer, can be envisaged and appropriately used.

If the cellulose acylate film is to be used as the transparent substrate encapsulating liquid crystals, there may be provided a transparent electrode for driving liquid crystals by voltage application. The transparent electrode is not particularly limited, but a transparent electrode can be provided by depositing a metal film, a metal oxide film or the like on at least one surface of the cellulose acylate film. Among them, a metal oxide film is preferable from the viewpoints of transparency, conductivity and mechanical properties, and inter alia, a thin film of indium oxide containing mainly tin oxide and 2 to 15% of zinc oxide can be preferably used. Detailed description of these films is disclosed in, for example, JP-A Nos. 2001-125079, 2000-227603 or the like.

Second Embodiment

Next, the second embodiment of the invention will be described.

Hereinafter, the operation of the second embodiment will be described with reference to the drawing.

FIG. 1 is a schematic diagram illustrating the constitution of a general VA mode liquid crystal display device. The VA mode liquid crystal display device has a liquid crystal cell 3 having a liquid crystal layer in which the liquid crystals vertically align with respect to the substrate surface with no applied voltage, that is, during dark state, and a polarizer 1 and a polarizer 2 which have the liquid crystal cell 3 interposed in between, and which are disposed such that their transmission axes (represented by arrows in FIG. 1) are disposed in perpendicular directions to each other. In FIG. 1, light is incident from the side of polarizer 1. With no applied voltage, when light advancing in the normal direction, that is, the z-axis direction is incident, the light passing through the polarizer 1 maintains a linearly polarized state, and further passes through the liquid crystal cell 3, finally being completely intercepted by the polarizer 2. As a result, an image of high contrast can be displayed.

Figure 2:
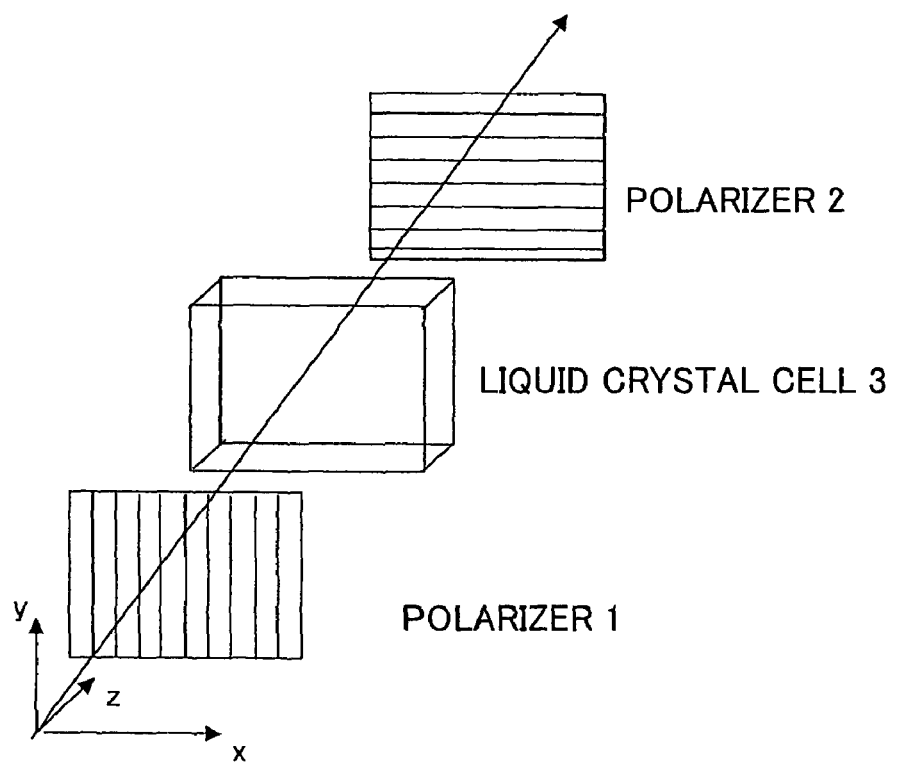
FIG. 2 is a schematic diagram illustrating the exemplary constitution of a conventional VA mode liquid crystal display device.

However, as shown in FIG. 2, the circumstance is different in the case of incidence of radiating light. When light is incident not from the z-axis direction but from a tilted direction, that is, when light is incident from a tilted direction (so-called OFF AXIS) with respect to the polarizing directions of the polarizers 1 and 2, the incident light is under the effect of the retardation in the tilted direction while passing through the vertically aligned liquid crystal layer of the liquid crystal cell 3, thereby the polarization state being changed. Moreover, the apparent transmission axes of the polarizer 1 and polarizer 2 are off the direction from the perpendicular disposition. Because of these two factors, the light incident from a tilted direction in the Off Axis is not completely intercepted by the polarizer 2, and there occurs light leakage during dark state, thus to decrease the contrast.

Here, the polar angle and the azimuthal angle will be defined. The polar angle is a tilt angle from the normal direction of the film surface, that is, from the z-axis in FIG. 1 and FIG. 2, and for example, the normal direction of the film surface is the direction of polar angle=0°. The azimuthal angle represents the direction of counter-clockwise rotation with respect to the positive direction of the x-axis, and for example, the positive direction of the x-axis is the direction of azimuthal angle=0, while the positive direction of the y-axis is the direction of azimuthal angle=90°. The tilt direction in the off axis described above refers to the case where the polar angle is not 0°, and refers mainly to the azimuthal angle=45°, 135°, 225° or 315°.

Figure 3:
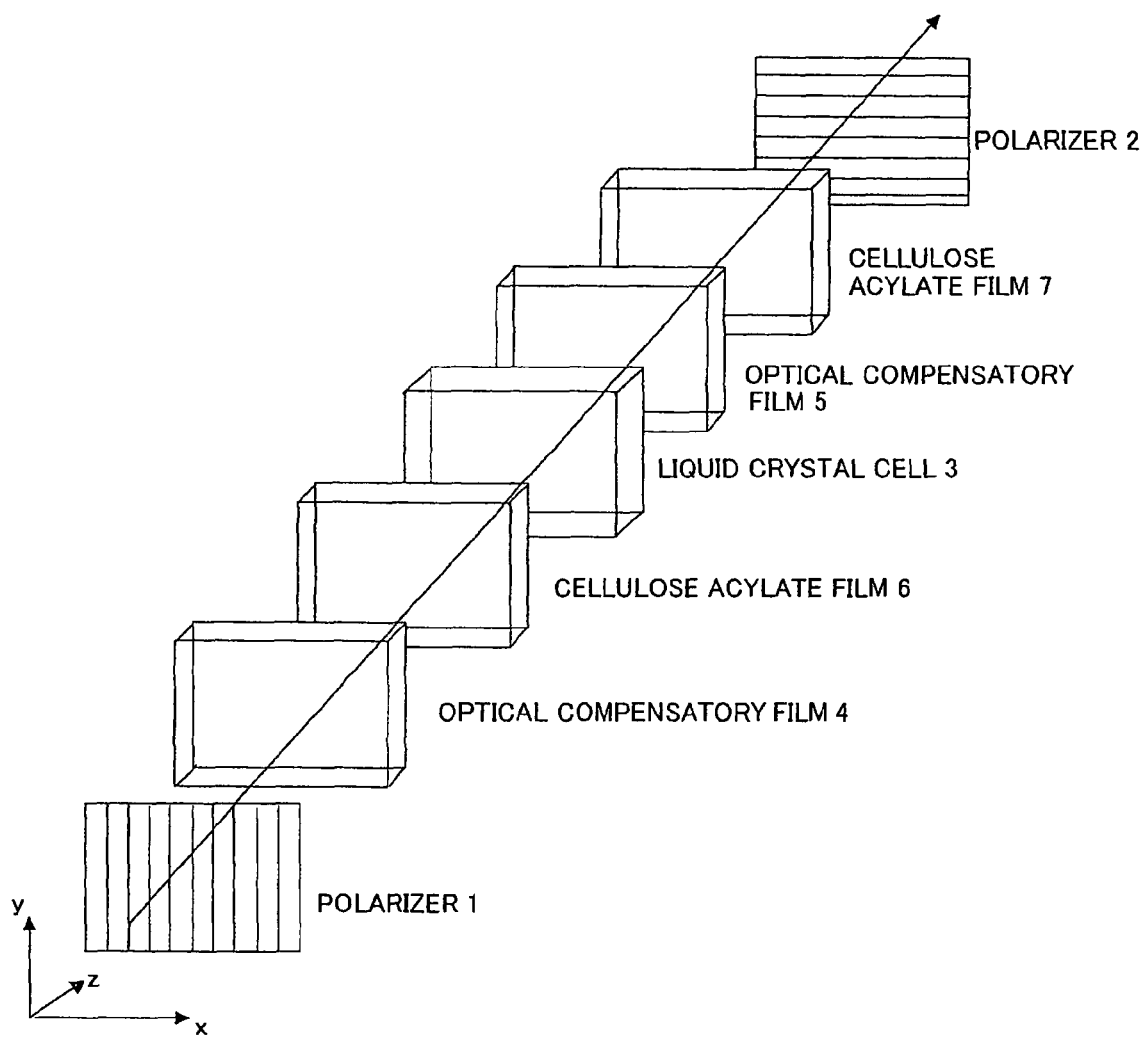
FIG. 3 is a schematic diagram illustrating the exemplary constitution of one type of liquid crystal display device of the second embodiment.

FIG. 3 shows a schematic diagram illustrating an exemplary constitution to explain the mechanism of one embodiment of the second embodiment. The liquid crystal display device shown in FIG. 3 has a constitution in which the constitution of FIG. 1 is further added with a cellulose acylate film 6 and an optical compensatory film 4 disposed between the liquid crystal cell 3 and the polarizer 1, and with an optical compensatory film 5 and a cellulose acylate film 7 disposed between the liquid crystal cell 3 and the polarizer 2. In the liquid crystal display device of the present embodiment, the refractive index anisotropy, $\Delta n_{(\lambda)}$, at a thickness d (unit: nm, the same hereinafter) of the liquid crystal layer in the liquid crystal cell and a wavelength $\lambda$ of the liquid crystal layer (unit: nm, the same hereinafter); the sum of the in-plane retardations at a wavelength $\lambda$, $Re_{sum(\lambda)}$, of the optical compensatory film 4 and the cellulose acylate film 6, and of the optical compensatory film 5 and the cellulose acylate film 7; and the sum of the retardations in the thickness direction at a wavelength $\lambda$, $Rth_{sum(\lambda)}$, satisfy the following formulas (I) through (IV) with respect to two different wavelengths in the wavelength range of 380 nm to 780 nm:

$$200 \leq \Delta n_{(\lambda)} \times d \leq 1000, \quad (I)$$

$$Rth_{sum}(\lambda)/\lambda = A \times \Delta n_{(\lambda)} \times d/\lambda + B, \quad (II)$$

$$Re_{sum}(\lambda)/\lambda = C \times \lambda / \{\Delta n_{(\lambda)} \times d\} + D, \text{ and} \quad (III)$$

$$0.488 \leq A \leq 0.56, \quad (IV)$$

B=−0.0567,

−0.041≤C≤0.016, and

D=0.0939.

Furthermore, when the in-plane retardation at a wavelength $\lambda$ (unit: nm) of the cellulose acylate film is $Re_{2(\lambda)}$, and the retardation in the thickness direction at a wavelength λ (unit: nm) is $Rth_{2(\lambda)}$, the following formulas (IX) and (X) are satisfied:

$$0 \leq Re_{2(630)} \leq 10 \text{ and } |Rth_{2(630)}| \leq 25, \text{ and} \quad (IX)$$

$$|Re_{2(400)} - Re_{2(700)}| \leq 10 \text{ and} \quad (2)$$

$$|Rth_{2(400)} - Rth_{2(700)}| \leq 35.$$

Figure 4:
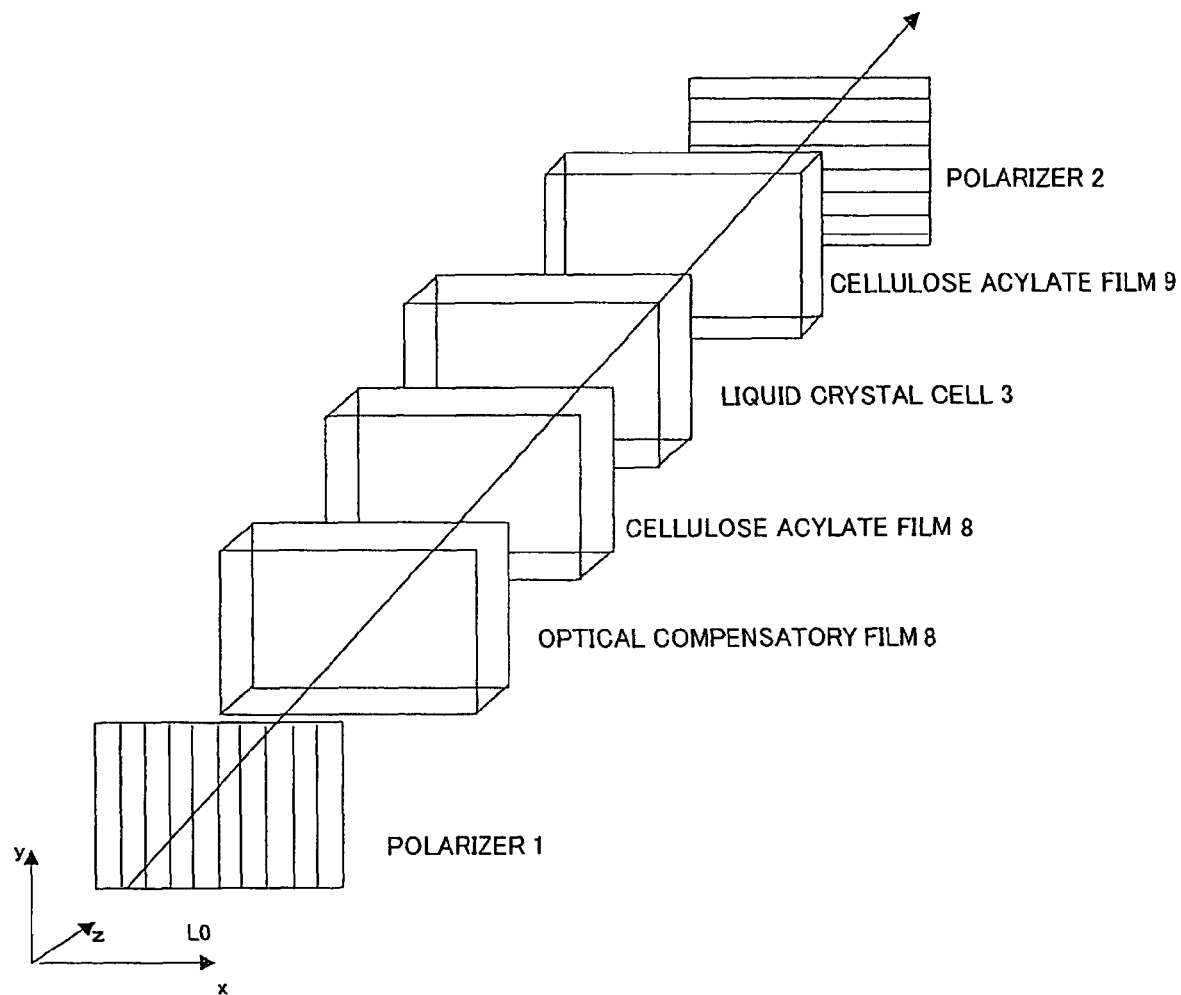
FIG. 4 is a schematic diagram illustrating the exemplary constitution of another type of liquid crystal display device of the second embodiment.

FIG. 4 shows a schematic diagram illustrating an exemplary constitution to explain the mechanism of another embodiment of the second embodiment. The dispositions of the optical compensatory film 8 and the cellulose acylate film 9 may be changed to each other. In the liquid crystal display device of the present embodiment, the refractive index anisotropy, $\Delta n_{(\lambda)}$, at a thickness d (unit: nm, the same hereinafter) of the liquid crystal layer in the liquid crystal cell and a wavelength λ of the liquid crystal layer (unit: nm, the same hereinafter); the sum of the in-plane retardations at a wavelength λ, $Re_{sum(\lambda)}$, of the optical compensatory film 8 and the cellulose acylate film 9; and the sum of the retardations in the thickness direction at a wavelength λ, $Rth_{sum(\lambda)}$, satisfy the following formulas (I) through (IV) with respect to two different wavelengths in the wavelength range of 380 nm to 780 nm:

$$200 \leq \Delta n_{(\lambda)} \times d \leq 1000, \quad (V)$$

$$Rth_{sum(\lambda)}/\lambda = E \times \Delta n_{(\lambda)} \times d/\lambda, \quad (VI)$$

$$Re_{sum(\lambda)}/\lambda = F \times \lambda/\{\Delta n_{(\lambda)} \times d\} + G, \text{ and} \quad (VII)$$

$$0.726 \leq E \leq 0.958, \quad (VIII)$$

$0.0207 \leq F \leq 0.0716$, and
$G = 0.032$.

Furthermore, when the in-plane retardation at a wavelength λ (unit: nm) of the cellulose acylate film is $Re_{2(\lambda)}$, and the retardation in the thickness direction at a wavelength λ (unit: nm) is $Rth_{2(\lambda)}$, the following formulas (IX) and (X) are satisfied:

$$0 \leq Re_{2(630)} \leq 10 \text{ and } |Rth_{2(630)}| \leq 25, \text{ and} \quad (IX)$$

$$|Re_{2(400)} - Re_{2(700)}| \leq 10 \text{ and} \quad (X)$$

$$|Rth_{2(400)} - Rth_{2(700)}| \leq 35.$$

In the second embodiment, it is possible to have optical compensation to a slow axis and retardation appropriate to the wavelength, even in the case where a light having a predetermined wavelength in the visible light region is incident from a tilted direction, by combining the liquid crystal layer, the optical compensatory film and the cellulose acylate film satisfying any of the formulas (I) through (IV) and the formulas (V) through (VIII). As a result, the visual contrast during dark state is remarkably improved as compared with conventional liquid crystal display devices, and the color shift in the viewing angle direction during dark state is also remarkably reduced. The liquid crystal display device of the invention satisfies the formulas (I) through (IV) or the formulas (V) through (VIII) with respect to at least two different wavelengths. It is preferable that the liquid crystal display device satisfies the formulas (I) through (IV) or the formulas (V) through (VIII) with respect to two wavelengths differing by 50 nm or greater. To which wavelength the above-described conditions would be satisfied may vary depending on the use of the liquid crystal display device, and the wavelength and wavelength range affecting the display properties the most will be selected. In general, the liquid crystal display device preferably satisfies the formulas (I) through (IV) or the formulas (V) through (VIII) with respect to the wavelengths of 650 nm, 550 nm and 450 nm, which correspond to the three primary colors of red (R), green (G) and blue (B). In addition, although the wavelengths of R, G and B are not essentially represented by the above-described wavelengths, these wavelengths are considered to be suitable in defining the optical properties exerting the effect of the second embodiment.

Figure 5:
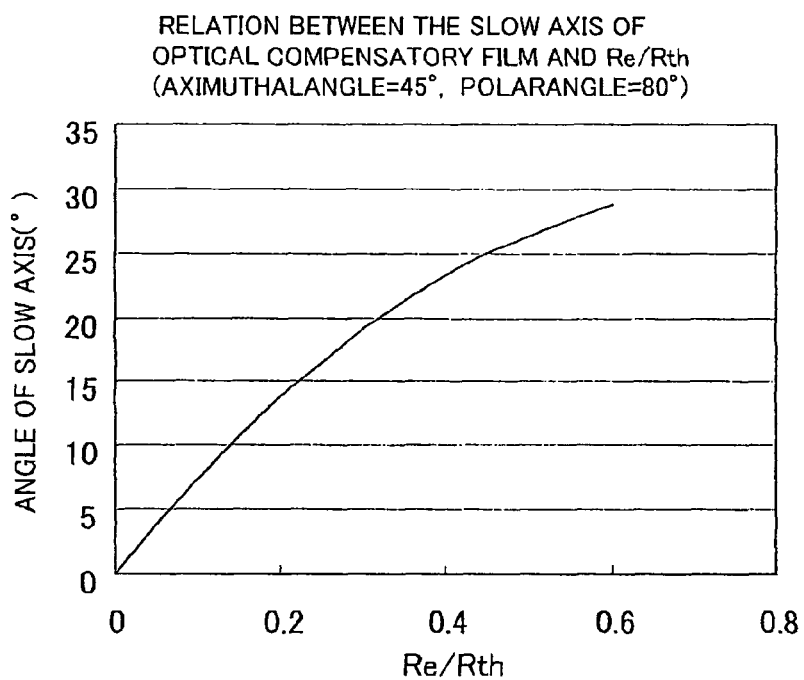
FIG. 5 is a graph showing the optical characteristics of an exemplary optical compensatory film used for the second embodiment.

Next, the principle of compensation in the second embodiment will be described in detail. In the second embodiment, attention should be paid in particular to the ratios of retardations and wavelength, i.e., Re/λ and Rth/λ. It is because Re/λ and Rth/λ are the quantities representing the birefringence and are the most important parameters determining the phase when there is a transition in the polarization state. Moreover, the ratio between Re/λ and Rth/λ, i.e., Re/Rth, determines the two intrinsic polarization axes in the transmission of a light advancing through a biaxial birefringent medium in a tilted direction. In FIG. 5, there is shown an exemplary result of calculating the relationship of the direction of one of two intrinsic polarization axes and Re/Rth, in the case where a light advancing through a biaxial birefringent medium in a tilted direction is incident. In addition, the direction of the light transmission was assumed to be such that the azimuthal angle=45° and the polar angle=34°. It should be understood that when Re/Rth is determined from the results shown in FIG. 5, one of the intrinsic polarization axes is determined. Further, Re/λ and Rth/λ have the function of changing the two phases of intrinsic polarization.

In the related art, the chromatic dispersion of a film to compensate the VA mode has been defined in terms of Re, Rth or Re/Rth. In the second embodiment, a principle was found whereby the VA mode can be compensated at a wavelength λ, not by using the values of Re, Rth, Re/Rth and the like, but by focusing on Re/λ and Rth/λ and rendering the parameters dimensionless. Furthermore, the inventors also paid attention to that a chromatic dispersion exists in the birefringence Δnd of the liquid crystal layer of the subject to be compensated, and devotedly studied on the relationship between the chromatic dispersion of Re and Rth of the optical compensatory film and the chromatic dispersion of the birefringence Δnd of the liquid crystal layer of the subject of optical compensation. Thus, they found that when the relations (I) through (IV) or (V) through (VIII) are satisfied, the viewing angle properties of the liquid crystal display device are significantly improved. In the liquid crystal display device of the second embodiment, when the relations of the formulas (I) through (IV) or the formulas (V) through (VIII) are satisfied, the liquid crystal cell is accurately optically compensated, and thus a decrease in the contrast is reduced, even in the case where there exist two factors that light is incident from a tilted direction and is under the effect of the retardation in a tilted direction of the liquid crystal layer, and that the apparent transmission axes of the pair of upper and lower polarizers are out of alignment.

In addition, in the VA mode, liquid crystals are vertically aligned upon no voltage application, that is, during dark state. Therefore, in order that the polarization state of the light incident from the normal direction may not be influenced by the retardation of the optical compensatory film during dark state, it is desirable that the in-plane slow axis of the optical compensatory film is vertical to or in parallel with the polarization axis of the polarizer which is located closer.

Figure 6:
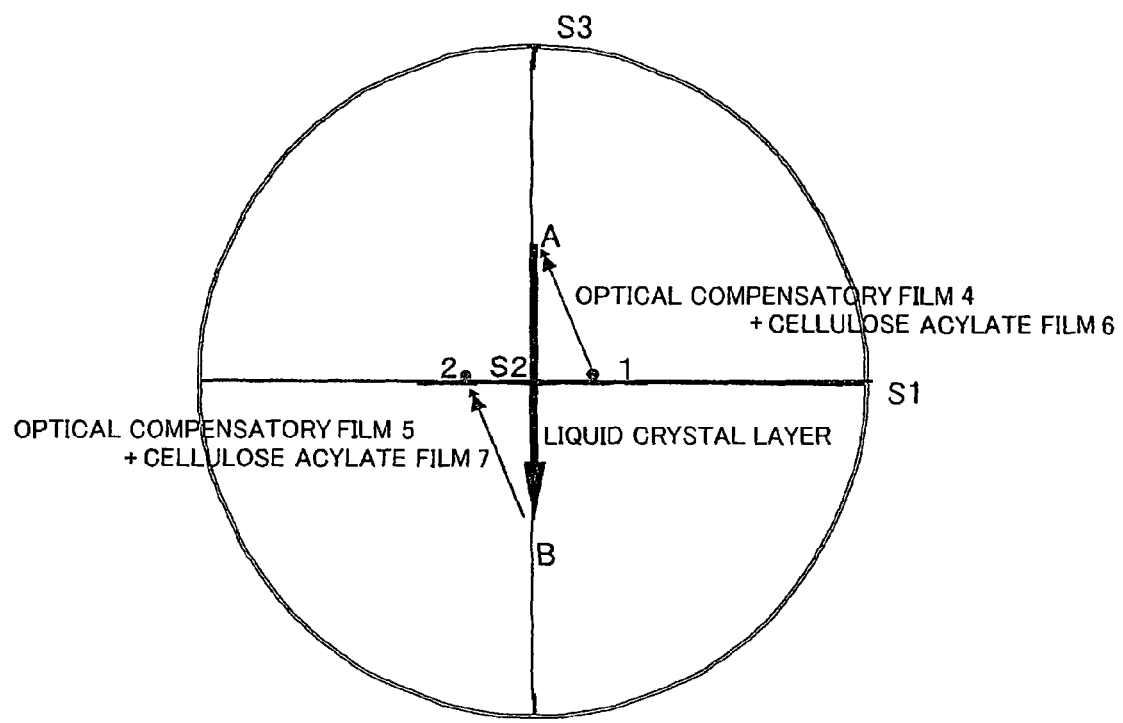
FIG. 6 is a schematic diagram of a Poincare sphere used to illustrate the change in the polarization state of incident light in an exemplary liquid crystal display device of the second embodiment.

FIG. 6 shows a diagram illustrating the compensation mechanism of the embodiment shown in FIG. 3 by means of a Poincare sphere. Here, the direction of light transmission is such that the azimuthal angle=45° and the polar angle=34°. In FIG. 6, the S2 axis is an axis penetrating vertically downward from the paper surface, while FIG. 6 is a diagram of viewing the Poincare sphere from the positive direction of the S2 axis.

Further, since FIG. 6 is presented in a planar mode, the point displacement of before and after the change of the polarization state is represented by straight arrows in the figure, but in fact, the change of polarization state due to the transmission through the liquid crystal layer or the optical compensatory film is represented by the rotation of a specific axis determined in accordance with the respective optical properties in the Poincare sphere, through a specific angle of rotation.

The polarization state of the incident light transmitting through the polarizer 1 in FIG. 3 corresponds to point 1 in FIG. 6, while the polarization state intercepted by the absorption axis of the polarizer 2 in FIG. 3 corresponds to point 2 in FIG. 6. In general, in the VA mode liquid crystal display devices, the light leakage of the off axis in a tilted direction is attributable to the misalignment of the point 1 and the point 2. An optical compensatory film is generally used to bring a change in the polarization state of the incident light, including a change in the polarization state in the liquid crystal layer, from point 1 to point 2. The liquid crystal layer of the liquid crystal cell 3 exhibits positive refractive index anisotropy and is vertically aligned. Thus, the change in the polarization state of the incident light due to the transmission through the liquid crystal layer is represented on the Poincare sphere by an arrow pointing from up to down as shown in FIG. 6 and is shown as a rotation around the S1 axis (rotation from point A to point B in the figure). The angle of rotation is proportional to the value obtained by dividing the effective retardation from a tilted direction of the liquid crystal layer at a wavelength of $\lambda$, $\Delta n'd'$, by the wavelength, i.e., $\Delta n'd'/\lambda$. In order to compensate this liquid crystal layer, the present embodiment employs optical compensatory films 4 and 5 as well as cellulose acetate films 6 and 7. The length of the arrow (the length of the arrow from point 1 to point A and the length of the arrow from point B to point 2 in the figure) in the tilted direction for the combinations of optical compensatory film 4+cellulose acetate film 6 and of optical compensatory film 5+cellulose acetate film 7, that is, the angle of rotation, is almost proportional to the respective $Rth_{sum}/\lambda$ of the combinations of optical compensatory film 4+cellulose acetate film 6 and of optical compensatory film 5+cellulose acetate film 7, thus the axis of rotation of the arrows being determined by $Re_{sum}/Rth_{sum}$ as described above. In order to achieve optical compensation of the VA mode liquid crystal cell by means of the optical compensatory films 4 and 5 as well as the cellulose acetate films 6 and 7 as described in FIG. 6, when a liquid crystal layer having a large $\Delta n'd'/\lambda$ is used, it is necessary that the $Rth_{sum}/\lambda$ of the optical compensatory films 4 and 5 as well as the cellulose acetate films 6 and 7 are increased, and the length of the arrow from point 1 to point A and the length of the arrow from point B to point 2 are increased. Also, in order to bring the directions of the arrow in the tilted direction from point 1 to point A and the arrow in the tilted direction from point B to point 2 more vertical, it can be envisaged that it is necessary to reduce the $Re_{sum}/Rth_{sum}$, that is, $Re_{sum}/\lambda$, of the optical compensatory films 4 and 5 as well as the cellulose acylate films 6 and 7. In the present embodiment, the $Re_{sum}/\lambda$ and the $Rth_{sum}/\lambda$ of the optical compensatory films+cellulose acylate films are determined in accordance with the $\Delta n'd'/\lambda$ of the liquid crystal layer under the condition that the formulas (I) through (IV) are satisfied, in order to achieve accurate optical compensation. In the present embodiment, when the $\Delta nd$ of the liquid crystal at a wavelength $\lambda$ in the liquid crystal layer of the subject to be optically compensated, and the wavelength $\lambda$ are determined, $\Delta n'd'/\lambda$ is determined as well. Thus, optical compensatory films and cellulose acylate films having $Re_{sum}/\lambda$ and $Rth_{sum}/\lambda$ which satisfy the above formulas may be favorably used in accordance thereto. Since it is advantageous to have desired values of $Re_{sum}/\lambda$ and $Rth_{sum}/\lambda$ of combined optical compensatory film and cellulose acylate film, the values of $Re/\lambda$ and $Rth/\lambda$ that could not be obtained in a single optical compensatory film can be adjusted by means of the properties of the cellulose acylate film to obtain the desired value. The embodiment shown in FIG. 3 employs the optical compensatory films and cellulose acylate films such that one at the top and one at the bottom, thus being two in total, respectively. In particular, it can be seen that when the properties of the optical films at the upper and lower are the same, the arrow pointing downward of the liquid crystal layer undergoes a transition of S1=0 on the Poincare sphere due to the symmetry, and the starting point and the ending point of the arrow under the liquid crystal layer symmetrically lie in the upper semisphere and the lower semisphere of the Poincare sphere, respectively, with the equator existing in between.

Figure 7:
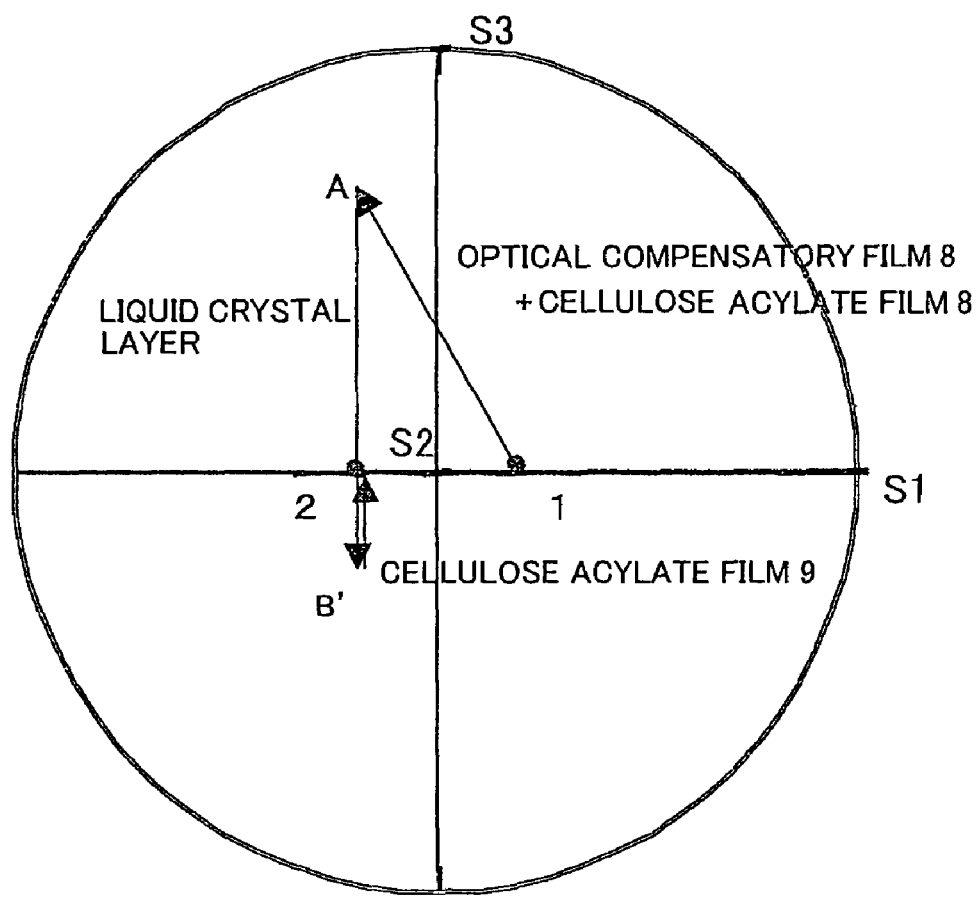
FIG. 7 is a schematic diagram of a Poincare sphere used to illustrate the change in the polarization state of incident light in another exemplary liquid crystal display device of the second embodiment.

FIG. 7 shows a diagram illustrating the compensation mechanism of the embodiment shown in FIG. 4 by means of a Poincare sphere. In addition, since the points and axes marked with the same symbols as shown in FIG. 6 have the meanings as defined above, detailed description on them will be omitted. As shown in FIG. 7, in order to optically compensate the VA mode liquid crystal cell by means of the optical compensatory film 8+cellulose acylate film 8, when a liquid crystal layer having a large $\Delta n'd'/\lambda$ is used, it is necessary to extend the length of the arrow from point 1 to point A by increasing the $Rth_{sum}/\lambda$ of the optical compensatory film 8. Further, in order to render the direction of the arrow in the upward tilted direction from point 1 to point A more vertical, it can be envisaged that it is necessary to decrease the $Re_{sum}/Rth_{sum}$, that is, to reduce the $Re_{sum}/\lambda$, of the optical compensatory film 8. In the present embodiment, the $Re_{sum}/\lambda$ and the $Rth_{sum}/\lambda$ of the optical compensatory film are determined in accordance with the $\Delta n'd'/\lambda$ of the liquid crystal layer under the condition that the formulas (V) through (VIII) are satisfied, in order to achieve accurate optical compensation. In the present embodiment, when the $\Delta nd$ of the liquid crystal at a wavelength $\lambda$ in the liquid crystal layer of the subject to be optically compensated, and the wavelength $\lambda$ are determined, $\Delta n'd'/\lambda$ is determined as well. Thus, an optical compensatory film having $Re_{sum}/\lambda$ and $Rth_{sum}/\lambda$ which satisfy the above formulas may be favorably used in accordance thereto.

Furthermore, FIG. 7 has the same constitution as shown in FIG. 4. With this constitution, it is possible to achieve accurate optical compensation by combining the liquid crystal cell 3 with the optical compensatory film 8, cellulose acylate film 8 and cellulose acylate film 9 which satisfy the above formulas (V) through (VIII).

As described above, the second embodiment optimizes the relationship between the so-called birefringence $\Delta nd/\lambda$ of the liquid crystal layer in the VA mode, and the $Re_{sum}/\lambda$ and $Rth_{sum}/\lambda$ of the optical film and cellulose acylate film to compensate the birefringence, in accordance with the spectral range or spectral distribution of the light source used. In view of theoretically speculating and clearly defining the optimal range, the second embodiment is different from the conventional technology relating to the optical compensation in the VA mode. When a liquid crystal layer and an optical compensatory film are combined so that the above formulas (I) through (VI) or (V) through (VIII) are satisfied, the chromatic dispersion of the liquid crystal layer can be compensated by the chromatic dispersion of the optical compensatory film. As a result, the visual contrast of the panel employing the VA mode can be greatly decreased. Also, since light leakage in the dark state can be controlled over an arbitrary wavelength range, the color shift with the viewing angle which occurs due to light leakage at a specific wavelength can be also reduced.

The second embodiment is represented by the above-described relational expressions in order to indicate the optimal values of the film, and examples have been carried out to confirm the effect. In the above formulas, the parameters of A, B, C and D, or the parameters of E, F and G define the scopes of obtaining the effect of the invention. However, B and D, or G are conveniently expressed as integers of the most suitable values in order to indicate the scope of the effect of the film, while A and C, or E and F are expressed in value ranges to indicate the scope of the effect of the second embodiment.

The second embodiment is to provide an optical compensatory film having a chromatic dispersion which can largely reduce the viewing angle contrast and the color shift with the viewing angle of the panel employing the VA mode, with respect to an arbitrary birefringence and chromatic dispersion of the liquid crystals; however, the second embodiment can be also applied to a liquid crystal cell employing different wavelengths of R, G and B. For example, even in the case of applying the film of the second embodiment to a transmissive liquid crystal cell having a constitution with different R, G and B, optical compensation can be achieved by using the above-described formulas, and as a result, an effect of wide viewing angle contrast can be obtained. Further, even in the case of a liquid crystal panel employing a conventional light source with a mixture of multiple wavelengths, an effect of wide viewing angle contrast can be obtained with an optical compensatory film satisfying the formulas of the second embodiment, for example, by typifying the properties of the liquid crystal panel using the wavelength of G.

The scope of the second embodiment is not limited by the display mode of the liquid crystal layer, and can be used in liquid crystal display devices having liquid crystal layers of any display mode, such as the VA mode, IPS mode, ECB mode, TN mode and OCB mode.

Next, the optical properties, raw materials, method for production and the like of the optical compensatory film that can be used in the second embodiment will be described in detail.

[Optical Compensatory Film]

In the second embodiment, the optical compensatory film contributes to the enhancement of the viewing angle contrast and the reduction of the color shift depending on the viewing angle of the liquid crystal display device, particularly the VA mode liquid crystal display device. The optical compensatory film of the second embodiment may be disposed between the polarizer on the viewer's side and the liquid crystal cell, or between the polarizer on the backside and the liquid crystal cell, or even on both sides as described above. For example, the optical compensatory film can be installed inside the liquid crystal display device as an independent element, or can be also installed inside the liquid crystal display device as an element of the polarizer to function as an optical compensatory film imparting the optical properties described above to the protective film protecting the polarizing film.

As described in the above, in the optical compensatory film, the Re/$\lambda$ and Rth/$\lambda$ with respect to an arbitrary wavelength $\lambda$ that is used by the light source or by the viewer among the wavelengths in the visible light region have different preferred ranges depending on the shape of the liquid crystal layer and the wavelength $\lambda$. For example, in the case of using the optical compensatory film in the optical compensation of a VA mode liquid crystal cell (for example, a VA mode liquid crystal cell comprising a liquid crystal layer in which the product of the thickness d ($\mu$m) and the refractive index anisotropy $\Delta$n, And is 0.2 to 1.0 $\mu$m) with respect to a wavelength of 550 nm, the Re/$\lambda$ is preferably 0.04 to 0.13 nm, more preferably 0.05 to 0.1 nm, and even more preferably 0.06 to 0.09 nm. The Rth/$\lambda$ is preferably 0.05 to 1.1 nm, more preferably 0.1 to 1.0 nm, and even more preferably 0.13 to 0.91 nm.

The optical compensatory film has three average refractive indices nx, ny and nz in the directions of x, y and z axes which are perpendicular to each other. These three values are the intrinsic refractive indices of the optical compensatory film, and Rth and Re are determined from these values and the thickness $d_1$. An optical compensatory film satisfying the above-described optical properties can be produced by selecting appropriate raw materials, amount of mixing, production conditions and the like, and adjusting the parameters to desired ranges. Since nx, ny and nz vary with the wavelength, Rth and Re also vary with the wavelength. The optical compensatory film described above can be produced by using this characteristic.

In the second embodiment, the material of the optical compensatory film is not particularly limited. For example, the material may be a stretched birefringent polymer film, or an optically anisotropic layer formed by fixing a liquid crystalline compound in a specific orientation. Further, the optical compensatory film is not limited to a monolayer structure, and may have a laminate structure in which multiple layers are laminated. In a configuration of the laminate structure, the materials constituting the respective layers may not be the same material, and for example, the laminate may be a laminate of a polymer film and an optically anisotropic layer comprising a liquid crystalline compound. In the configuration of laminate structure, upon consideration of the thickness, a coated type laminate including layers formed by coating is preferred to a laminate of stretched polymer films.

When a liquid crystalline compound is used in the production of the optical compensatory film, since the liquid crystalline compound has various orientation states, the optically anisotropic layer produced by fixing the liquid crystalline compound in a specific orientation, exhibits desired optical properties as a monolayer or as a multilayer laminate. That is, the optical compensatory film may have a configuration comprising a support and at least one optically anisotropic layer formed on the support. The retardation of the entirety of the optical compensatory film having such configuration can be adjusted by the optical anisotropy of the optical anisotropic layer. The liquid crystalline compound can be classified into rod-shaped liquid crystal compounds and discotic liquid crystal compounds, in accordance with the shape of the molecule. Furthermore, the respective classes are again divided into a low molecular weight type and a high molecular weight type, and both types can be used. When a liquid crystalline compound is used in the production of the optical compensatory film, it is preferable to use a rod-shaped liquid crystal compound or a discotic liquid crystal compound, and it is more preferable to use a rod-shaped liquid crystal compound having a polymerizable group or a discotic liquid crystal compound having a polymerizable group.

The optical compensatory film may consist of a polymer film. The polymer film may be a stretched polymer film, or a combination of a coated type polymer layer and a polymer film. The material of the polymer film that can be used may be in general a synthetic polymer (for example, polycarbonate, polysulfone, polyethersulfone, polyacrylate, polymethacrylate, a norbornene resin, triacetyl cellulose). A cellulose acylate film formed from a composition containing cellulose acylate and a rod-shaped compound having aromatic rings (specifically, an aromatic compound having two aromatic rings) is also preferable. A polymer film having the desired optical properties can be produced by controlling the type and amount of addition of the aromatic compound, and the conditions for film stretching.

In the liquid crystal display device of the second embodiment, as described above, at least one cellulose acylate film satisfying the above formulas (IX) and (X), that is, having low optical anisotropy and low wavelength dispersibility is used. The details including the production method, raw material and the like of the cellulose acylate film that can be used in the second embodiment are as described for the first embodiment in the above.

[Additives to Cellulose Acylate]

The cellulose acylate film is preferably produced by a method of film forming by solution flow casting, but the method of production is not limited to this. In the method of film forming by solution flow casting, a solution of cellulose acylate (dope) is first prepared. Various additives (for example, a compound reducing optical anisotropy, a chromatic dispersion regulating agent, an ultraviolet blocking agent, a plasticizer, a degradation preventing agent, microparticles, an optical property regulating agent, etc.) can be added to the cellulose acylate solution in accordance with the use in the respective production processes. The time of addition may be at any stage during the dope producing process, but it is preferable to add additives at the final production step of the dope production process and then further perform the production process.

In the second embodiment, it is preferable that at least one compound reducing the optical anisotropy of the cellulose acylate film, particularly reducing the retardation in the film thickness direction, Rth, is contained in an amount to satisfy the following formulas (ii) and (iii):

$$(Rth_2(A)-Rth_2(0))/A \leq -1.0, \text{ and} \quad \text{(ii)}$$

$$0.01 \leq A \leq 30. \quad \text{(iii)}$$

The formulas (ii) and (iii) are more preferably $$(Rth_2(A)-Rth_2(0))/A \leq -2.0, \text{ and} \quad \text{(ii)}$$

$$0.05 \leq A \leq 25, \quad \text{(iii)}$$

and even more preferably $$(Rth_2(A)-Rth_2(0))/A \leq -3.0, \text{ and} \quad \text{(ii)}$$

$$0.1 \leq A \leq 20. \quad \text{(iii)}$$

The structural feature and properties of the compound reducing the optical anisotropy of the cellulose acylate film that can be used for the second embodiment are as described in the above for the first embodiment.

Specific examples of the compound reducing the optical anisotropy of the cellulose acylate film that is preferably used in the second embodiment include the compounds represented by the above formulas (13), (18) and (19).

[Wavelength Dispersion Regulating Agent]

A compound reducing the chromatic dispersion of the cellulose acylate film (hereinafter, also referred to as "chromatic dispersion regulating agent") will be described. In order to improve the chromatic dispersion of $Rth_2$ of the cellulose acylate film, it is preferable that at least one compound reducing the chromatic dispersion of $Rth_2$ represented by the following formula (Iv), $\Delta Rth=|Rth_2(400)-Rth_2(700)|$, is included in an amount satisfying the following formulas (v) and (vi). The details about the chromatic dispersion regulating agent are as described above for the first embodiment.

$$\Delta Rth=|Rth_2(400)-Rth_2(700)|, \quad \text{(vi)}$$

$$(\Delta Rth(B)-\Delta Rth(0))/B \leq -2.0, \text{ and} \quad \text{(v)}$$

$$0.01 \leq B \leq 30. \quad \text{(vi)}$$

The formulas (v) and (vi) are more preferably $$(\Delta Rth(B)-\Delta Rth(0))/B \leq -3.0, \text{ and} \quad \text{(v)}$$

$$0.05 \leq B \leq 25, \quad \text{(vi)}$$

and even more preferably $$(\Delta Rth(B)-\Delta Rth(0))/B \leq -4.0, \text{ and} \quad \text{(v)}$$

$$0.1 \leq B \leq 20. \quad \text{(vi)}$$

[Matting Agent Microparticles, Plasticizer, Degradation Preventing Agent, Parting Agent]

It is preferable to add microparticles to the cellulose acylate film as a matting agent. Further, in the second embodiment, in addition to the compound reducing optical anisotropy and the chromatic dispersion regulating agent, various additives (for example, a plasticizer, an ultraviolet blocking agent, a degradation preventing agent, a parting agent, an infrared absorbent, etc.) can be added to the cellulose acylate film in accordance with the use for the respective production processes. The details are as described above for the first embodiment.

The cellulose acylate film is preferably produced by a solvent casting method, and is preferably produced by using a solution of cellulose acylate dissolved in an organic solvent (dope). The details of the organic solvent are as described above for the first embodiment. Further, the details of the production process and of the optical performance and properties of the cellulose acylate film in the second embodiment are also as described above for the first embodiment.

The cellulose acylate film satisfying desired optical properties may be installed inside the liquid crystal display device of the second embodiment as an independent element, or may be installed as an element integrated with other elements. For example, the cellulose acylate film may be installed as an element of the polarizer to be used as a protective film for the polarizing film, or in the case where the optical compensatory film includes an optically anisotropic layer comprising a liquid crystalline composition, the cellulose acylate film may be installed as an element of the optical compensatory film to be used as a support for the optically anisotropic layer. Furthermore, even in the case of an optical compensatory film which is laminated with a polymer film having other optical properties to satisfy specific optical properties, the cellulose acylate film may be installed as a polymer film element constituting the optical compensatory film.

A cellulose acylate film provided with various functional layers may be also installed in the liquid crystal display device of the invention. For example, mention may be made of an antistatic layer, a curable resin layer (a transparent hardcoat layer), an anti-reflection layer, a good adhesion layer, an anti-glare layer, an optical compensatory film, an oriented layer, a liquid crystal layer and the like. The functional layers and materials thereof that can be used for the cellulose acylate film may be surfactants, a gliding agent, a matting agent, an antistatic layer, a hardcoat layer and the like, and the details are described in pages 32 to 45 of the "Patent Studies" of the Japanese Institute of Invention and Innovation (Publicized technology No. 2001-1745, published on Mar. 15, 2001, JIII), which information can be used preferably for the second embodiment.

As described above, the cellulose acylate film having the optical properties may be used as a protective film for the polarizing film. In this case, the production method for the polarizer is not particularly limited, and the polarizer can be produced by a general method. Mention may be made of a method of subjecting the obtained cellulose acylate film to an alkali treatment, and bonding the treated cellulose acylate film on both sides of a polarizer which has been produced by immersing and stretching a polyvinyl alcohol film in an iodine solution, using an aqueous solution of completely saponified polyvinyl alcohol solution. The cellulose acylate film may be subjected to good adhesion processing as described in JP-A Nos. 6-94915 and 6-118232, instead of the alkali treatment.

The adhesive used for the bonding of the treated surface of the protective film and the polarizer may be exemplified by polyvinyl alcohol-based adhesives such as polyvinyl alcohol or polyvinyl butyral, vinyl-based latex such as butyl acrylate, or the like.

The polarizer is constituted of a polarizer and protective films protecting both sides of the polarizer, and can be further constituted by bonding a protector film on one side of the polarizer and bonding a separator film on the other side. The protector film and the separator film are used for the purpose of protecting the polarizer during shipping and product inspection of the polarizer, and the like. In this case, the protector film is bonded for the purpose of protecting the surface of the polarizer and is used on the opposite side of the surface where the polarizer is bonded to the liquid crystal plate. The separator film is used for the purpose of covering the adhesive layer which is bonded to the liquid crystal plate, and is used on the side of the surface where the polarizer is bonded to the liquid crystal plate.

As described above, the cellulose acylate film having the above-described optical properties may be used as a part or the entirety of the optical compensatory film. In particular, in the optical compensatory film comprising the optically anisotropic layer formed from a liquid crystalline composition, the cellulose acylate film can be used as a support for the optically anisotropic layer. Furthermore, in addition to the function as a support, the cellulose acylate film can function as a protective film for the polarizing film. In addition, the optical compensatory film refers to an optical material generally used in liquid crystal display devices to compensate for the retardation, and is interchangeably used with a retardation plate, an optical compensatory sheet or the like. The optical compensatory film has birefringence and thus is used for the purpose of eliminating coloration of the display screen of a liquid crystal display device or of improving the viewing angle properties. The cellulose acylate film has $Re_{2(\lambda)}$ and $Rth_{2(\lambda)}$ at a wavelength $\lambda$ in the range of $0 \leq Re_{2(630)} \leq 10$ nm and $|Rth_{2(630)}| \leq 25$ nm, implying smaller optical anisotropy, and also exhibits a relationship of $|Re_{2(400)} - Re_{2(700)}| \leq 10$ and $|Rth_{2(400)} - Rth_{2(700)}| \leq 35$, implying smaller chromatic dispersion. Thus, the cellulose acylate film does not cause any unnecessary anisotropy, and when used in combination with an optically anisotropic layer having birefringence, the optical performance of the optically anisotropic layer only can be expressed.

Next, an embodiment of applying the second embodiment to a VA mode liquid crystal display device will be described with reference to FIG. 8.

[Liquid Crystal Display Device]

Figure 8:
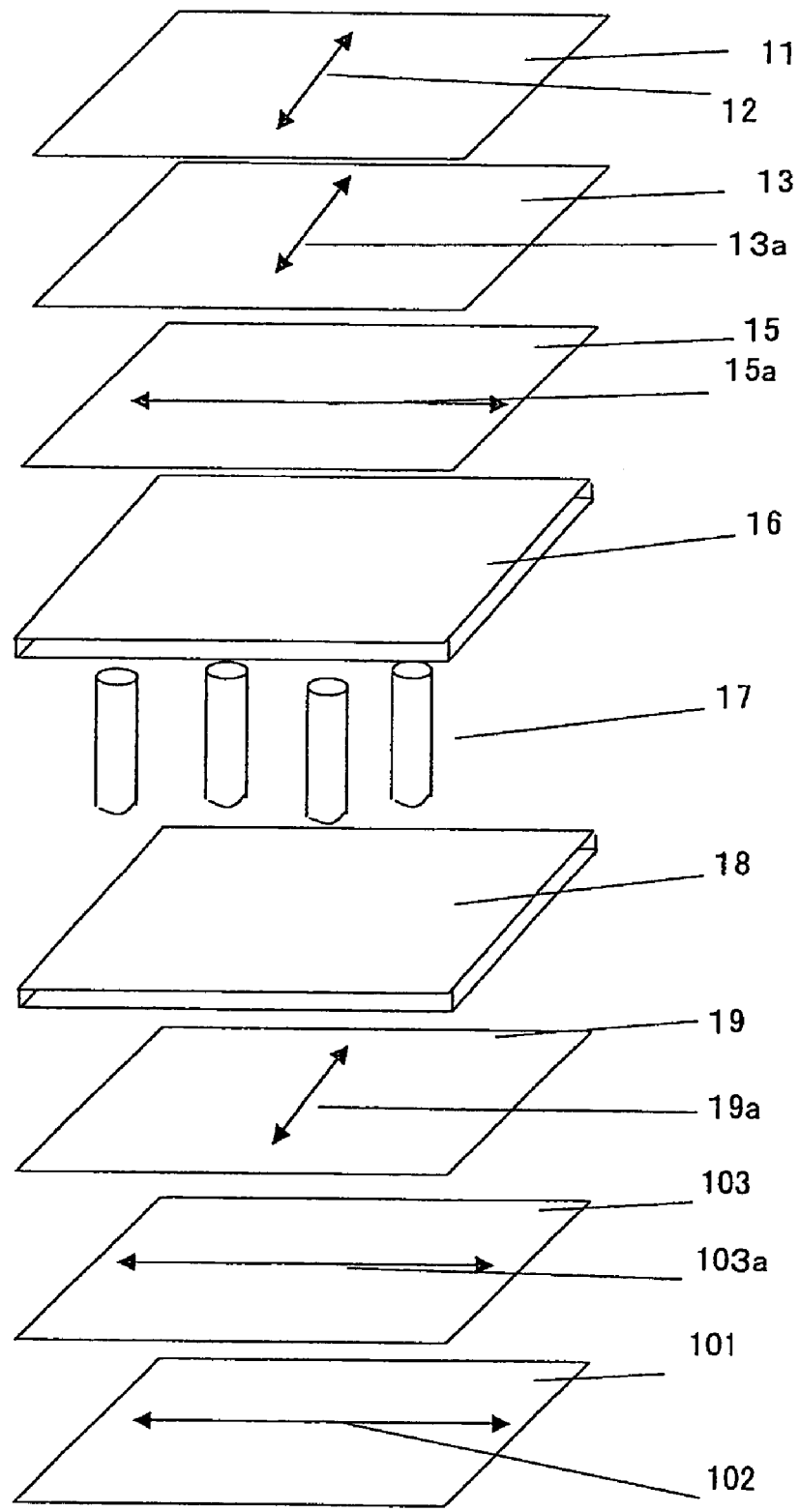
FIG. 8 is a schematic diagram illustrating an exemplary liquid crystal display device of the second embodiment.

The liquid crystal display device shown in FIG. 8 has liquid crystal cells 16 to 18, and an upper polarizing film 11 and a lower polarizing film 101 having the liquid crystal cell interposed in between, and an optical compensatory film 15 is interposed between the upper polarizing film 11 and the liquid crystal cell 16 to 18, and an optical compensatory film 19 is interposed between the lower polarizing film 101 and the liquid crystal cells 16 to 18. The optical compensatory film 15 or the optical compensatory film 19 may be only on one side depending on the constitution, as described above. The polarizing films 11 and 101 are protected respectively by a pair of transparent protective films. However, FIG. 8 shows only the transparent protective films 13 and 103 that are disposed closer to the liquid crystal cell, and the transparent protective films disposed distant to the liquid crystal cell are omitted. The transparent protective films 13 and 103 consist of cellulose acylate films satisfying the above formulas (IX) and (X).

The liquid crystal cell comprises an upper substrate 16, a lower substrate 18, and a liquid crystal layer formed by liquid crystal molecules 17 that is interposed between the upper and lower substrates. Oriented films (not shown in the figure) are formed on the surfaces of the substrates 16 and 18 that are in contact with the liquid crystal molecules 17 (hereinafter, may be referred to as the "inner surfaces"), and the alignment of the liquid crystal molecules 17 at no applied voltage or at a low voltage is controlled to be vertical in the direction. Further, on the inner surfaces of the substrates 16 and 18, transparent electrodes (not shown in the figure) are formed which are capable of applying voltage to the liquid crystal layer formed by the liquid crystal molecules 17. In the second embodiment, the product $\Delta n \cdot d$ of the thickness d (#m) and the refractive index anisotropy $\Delta n$ of the liquid crystal layer is preferably 0.1 to 1.0 μm. Moreover, the optimal value of $\Delta n \cdot d$ is more preferably 0.2 to 1.0 μm, and even more preferably 0.2 to 0.5 μm. Within these ranges, the brightness for white display is high, and the brightness for dark state is low, thus it being possible to obtain a display device with high brightness contrast. The liquid crystal material that can be used is not particularly limited, but in an embodiment in which an electric field is applied in between the upper and lower substrates 16 and 18, a liquid crystal material having negative dielectric anisotropy is used so that the liquid crystal molecules 17 respond vertically to the direction of the electric field. When an electrode is formed only on any one side of the substrates 16 and 18 so that an electric field is applied in a transverse direction parallel to the substrate surface, a liquid crystal material having positive dielectric anisotropy can be used.

For example, when the liquid crystal cell is a VA mode liquid crystal cell, a nematic liquid crystal material having negative dielectric anisotropy, $\Delta n = 0.0813$ and $\Delta \in = -4.6$, or the like can be used in between the upper and lower substrates 16 and 18. The thickness d of the liquid crystal is not particularly limited, but when a liquid crystal having properties of the above-described ranges is used, the thickness can be set to about 3.5 μm. Since the brightness during white display changes with the magnitude of the product $\Delta n \cdot d$ of the thickness d and the refractive index anisotropy $\Delta n$, in order to obtain the maximum brightness, $\Delta n \cdot d$ is preferably set to be within the range of 0.2 to 0.5 μm.

Moreover, in the VA mode liquid crystal display device, a chiral agent that is generally used as a TN mode liquid crystal display device is seldom used because addition of the agent deteriorates the dynamic response characteristics, but the agent is added in some cases so as to reduce defective alignment. In the case of a multi-domain structure, it is advantageous to use the chiral agent in controlling the alignment of liquid crystal molecules in the boundary regions between the domains. A multi-domain structure refers to a structure in which one pixel of a liquid crystal display device is partitioned to a plurality of regions. For example, in the VA mode, since the liquid crystal molecules 17 are tilted during white display, the liquid crystal molecules 17 have different magnitudes of birefringence in the tilted direction and the inverse direction when viewed from a tilted direction, thereby a variance in the brightness or color tone occurring. However, with the multi-domain structure, the viewing angle characteristics with respect to the brightness or color tone are improved, and thus it is desirable. Specifically, the bias in the brightness or color tone depending on the viewing angle can be reduced by constituting individual pixels in at least two (preferably 4 or 8) regions having different initial orientation of liquid crystal molecules and averaging them. Alternatively, the same effect can be obtained by constituting individual pixels in at least two different regions in which the orientation direction of the liquid crystal molecules continuously change with the applied voltage.

When a plurality of regions having different orientation directions of the liquid crystal molecules 7 are to be formed within one pixel, for example, methods may be used to provide slits on the electrode, to change the direction of electric field by providing projections, to impart bias to the electric field density, and the like. In order to obtain a viewing angle that is uniform in all directions, increasing the number of this partition would be advantageous, but even with a four-partition or an eight-partition or greater, an almost uniform viewing angle can be obtained. In particular, an eight-partition is preferable because the absorption axis of the polarizer can be set at any arbitrary angle. There is a tendency that liquid crystal molecules 7 have difficulties in responding at the boundaries of the individual domains. In the normally-black mode such as the VA mode, a decrease in the brightness becomes problem because dark state should be maintained. Thus, it is possible to decrease the boundary region between domains by adding a chiral agent to the liquid crystal material. On the other hand, since the white display state is maintained in the normally-white mode, the frontal contrast is decreased. Thus, a light intercepting layer such as a black matrix to block the regions may be provided.

The slow axes 13a and 103a of the slow axes 13 and 103 of the protective films that are on the closer side to the liquid crystal layer from the polarizing film 11 and the polarizing film 101 are preferably substantially in parallel with or perpendicular to each other. When the slow axes 13a and 103a of the transparent protective films 13 and 103 are perpendicular to each other, the birefringences of the respective protective films are cancelled by each other, and thus deterioration of the optical properties of the light incident perpendicularly to the liquid crystal display device can be reduced. In the embodiment in which the slow axes 13a and 103a are in parallel, when there is residual retardation in the liquid crystal layer, the birefringence of the protective film can be used to compensate this retardation.

The absorption axes 12 and 102 of the polarizing films 11 and 101, the slow axis directions 13a and 103a of the protective films 13 and 103, and the orientation direction of the liquid crystal molecules 17 are adjusted to the optimal ranges in accordance with the materials used in each element, display mode, laminate structure of the element, or the like. That is, the absorption axis 12 of the polarizing films 11 and 101, and the absorption axis 102 of the polarizing film 101 are disposed to be substantially perpendicular to each other. However, the liquid crystal display device of the invention is not limited to this constitution.

The optical compensatory films 15 and 19 that are disposed in between the liquid crystal cell and the polarizing film 11 and the polarizing film 101, respectively, are optical compensatory films, and as described above, for example, are formed from birefringent polymer films, or from laminates of a transparent support and an optically anisotropic layer composed of liquid crystal molecules formed on the transparent support. In addition, the in-plane slow axis 15a of the optical compensatory film 15 is preferably disposed to be substantially perpendicular to the absorption axis 12 of the polarizing film 11 which is disposed closer. Similarly, the in-plane slow axis 19a of the optical compensatory film 19 is preferably disposed to be substantially perpendicular to the absorption axis 102 of the polarizing film 101 which is disposed closer. When the absorption axes are disposed in such a manner, the optical compensatory film 15 or 19 causes retardation with respect to a light incident from the normal direction, and thus causes no light leakage, while the effect of the invention can be sufficiently accomplished with respect to a light incident from a tilted direction. The combinations of the optical compensatory film 15 and the transparent protective film 13, and/or the combination of the optical compensatory film 19 and the transparent protective film 103 can be combined so that the sum of retardations satisfies the above formulas (I) through (IV), together with the properties of the liquid crystal layer, thereby optically compensating the liquid crystal cell 16 to 18. The transparent protective films 13 and 103 satisfy the above formulas (IX) and (X) and are elements having low optical anisotropy and low wavelength dispersibility, and thus the design of combination with optically anisotropic layers is feasible. Also, since the polarizer on the backlight side (not shown in FIG. 8) is likely to be exposed to high temperatures by the heat from the backlight, the protective films of the polarizing film usually undergoes distortion and thus alteration in the optical properties, thus light leakage in the frame taking place. The liquid crystal display device of FIG. 8 employs cellulose acylate having low optical anisotropy and low wavelength dispersibility as the transparent protective films 13 and 103, and thus such light leakage in the frame can be reduced.

In addition, when one of the transparent protective films 13 and 103 is a cellulose acylate film satisfying the above formulas (IX) and (X), the same effect is accomplished, and especially the transparent protective film of the polarizer disposed on the backlight side (the transparent protective film disposed closer to the liquid crystal cell) is preferably formed from such a cellulose acylate film.

In a non-operating state where no driving voltage is applied to the individual transparent electrodes (not shown in the figure) of the liquid crystal cell substrates 16 and 18, the liquid crystal molecules 17 in the liquid crystal layer are aligned almost vertically to the surfaces of the substrate 16 and 18, and as a result, the polarization state of the transmitting light virtually does not change. Since the absorption axes 12 and 102 are perpendicular to each other, the light incident from the lower side (for example, the backside electrode) is polarized by the polarizing film 101 and is transmitted through the liquid crystal cell 16 to 18 while maintaining the polarized state, finally being intercepted by the polarizing film 11. That is, in the liquid crystal display device of FIG. 8, an ideal dark state is accomplished for the non-operating state. In this regard, in an operating state where a driving voltage is applied to the transparent electrode (not shown in the figure), the liquid crystal molecules 17 are tilted in a direction parallel to the surfaces of the substrates 16 and 18, and the transmitting light undergoes a change in the polarization state under the effect of the tilted liquid crystal molecules 17. Therefore, the light incident from the lower side (for example, the backside electrode) is polarized by the polarizing film 101 and is further subjected to a change in the polarization state by transmitting through the liquid crystal cell 16 to 18, finally transmitting through the polarizing film 11. That is, a white display can be accomplished for the operating state with applied voltage.

The feature of the VA mode is its high contrast. However, conventional VA mode liquid crystal display devices have a problem that even though the contrast is high in the front, the contrast decreases in tilted directions. Since liquid crystal molecules 17 are aligned perpendicularly to the surfaces of the substrates 16 and 18 during dark state, when observed from the front, the liquid crystal molecules 17 have almost no birefringence and therefore have low transmittance, and high contrast can be achieved. However, when viewed from a tilted direction, the liquid crystal molecules 17 have birefringence. Furthermore, the intersection angle of the absorption axes 12 and 102 of the upper and lower polarizing films 11 and 101 is perpendicular at 90° from the front, but is larger than 90° when viewed from a tilted direction. Traditionally, there has been a problem that light leakage occurs in a tilted direction and contrast is decreased because of these two factors in the liquid crystal display device of the invention having the constitution shown in FIG. 8, due to the optical properties of the liquid crystal layer 7, optical compensatory films 15 and 19 having optical properties which satisfy specific conditions, and transparent protective films 13 and 103 which are cellulose acylate films are used to reduce light leakage in tilted directions during dark state and to improve the contrast. Also, the designing of liquid crystal display devices is also made easier.

FIG. 8 illustrates a liquid crystal display device in which the optical compensatory films 15 and 19 are disposed on both sides of the liquid crystal cell between the liquid crystal cell and the polarizing films 11 and 101, respectively; however, there may be only one optical compensatory film. In such embodiment, the optical compensatory film in combination with the liquid crystal layer satisfies the above formulas (V) through (VIII), and thus performs accurate optical compensation of the liquid crystal layer. In the present embodiment, a cellulose acylate film satisfying the above formulas (IX) and (X) can be disposed in between the optical compensatory film and the liquid crystal layer or the polarizing film, so as to reduce light leakage in the frame, as in the constitution of FIG. 8. Furthermore, the designing of liquid crystal display devices can be made easier.

The liquid crystal display device of the second embodiment is not limited to the constitution shown in FIG. 8 and may also include other elements. For example, a color filter may be disposed between the liquid crystal cell and the polarizing film. When used as a transmissive type, a backlight having a cold cathode or hot cathode fluorescent tube, a light-emitting diode, a field emission device or an electroluminescent device as the light source can be disposed on the backside.

The liquid crystal display device of the second embodiment includes the direct view type, the image projection type and the light modulation type. The present invention is particularly effective in the embodiment wherein the display device of the invention is applied to an active matrix liquid crystal display device employing a three-terminal or two-terminal semiconductor device such as TFT or MIM. Of course, it is also effective in an embodiment wherein the display device of the invention is applied to a passive matrix liquid crystal display device represented by the STN type, which is also called time division driving.

Hereinafter, the polarizer that can be used for the liquid crystal display device of the second embodiment will be described. As described above, a polarizer employing the cellulose acylate film having the predetermined optical properties as the protective film for the polarizing film may be favorably used. In the following description, although no particular mention is made on the case where the protective film is the cellulose acylate film, the following terms are also applicable to the cases of producing polarizers having the cellulose acylate film as the protective film for the polarizing film.

[Polarizer]

In the second embodiment, a polarizer consisting of a polarizing film and a pair of protective films having the polarizing film disposed in between can be used. For example, a polarizer obtained by staining a polarizing film formed from a polyvinyl alcohol film or the like with iodine, stretching the film, and laminating both sides of the film with protective films, can be used. The polarizer is disposed on the outer side of the liquid crystal cell. It is preferable that a pair of polarizers respectively consisting of a polarizing film and a pair of protective films having the polarizing film disposed in between are disposed on both sides of the liquid crystal cell.

<Protective Film>

The polarizer that can be used for the second embodiment may have a pair of protective films (also referred to as protection films) laminated on both sides of the polarizing film. The type of the protective film is not particularly limited, and cellulose acetate, cellulose acetate butyrate, cellulose esters such as cellulose propionate, polycarbonates, polyolefin, polystyrene, polyesters and the like can be used. As described above, the protective films can be imparted with a dual function as an optical compensatory film and a protective film, by using a polymer film satisfying the optical properties required by optical compensatory films.

The protective film is preferably bonded continuously to a polarizing film which is usually supplied in a rolled form and thus has a long length, such that the films correspond in a longitudinal direction. Here, the orientation axis (slow axis) of the protective film may be of any direction, but the orientation axis of the protective film is preferably in parallel to the longitudinal direction, from the viewpoint of operational convenience.

For the protective films having the polarizing film interposed in between, use can be made of those in which the slow axis substantially corresponds to the direction where the average refractive index of the film surface would be the maximum. That is, at least one of the protective films is formed from a film which satisfies the relations nx, ny=nz and nx>ny; a film which satisfies the relations nx=ny, nz and nx>nz; or the like, wherein nx, ny and nz are three average refractive indices in the directions of x, y and z axes which are perpendicular to each other, and wherein the in-plane average refractive indices are taken as nx and ny, while the average refractive index of the thickness direction is taken as nz. As described above, in the case of imparting the ability of optical compensation to the protective film, the ratio between Re and Rth at a wavelength in the visible light region of 450 nm, i.e., Re/Rth(450 nm) is 0.4- to 0.95-folds of the Re/Rth(550 nm) at a wavelength of 550 nm, while the Re/Rth(650 nm) at a wavelength of 650 nm is preferably 1.05- to 1.9-folds of the Re/Rth(550 nm) at a wavelength of 550 nm, and the retardation in the thickness direction Rth at a wavelength of 550 nm is preferably 70 nm to 400 nm.

Meanwhile, in an embodiment where the protective film does not function as an optical compensatory film, the retardation of the transparent protective film is preferably low. In an embodiment where the absorption axis of the polarizing film and the orientation axis of the transparent protective film are not in parallel, particularly when the retardation values of the transparent protective films exceed certain values, the polarization axis and the orientation axis (slow axis) of the transparent protective film are obliquely aligned, and the linear polarization changes to elliptical polarization, which is not considered to be desirable. Therefore, the retardation of the transparent protective film is, for example, preferably 10 nm or less, more preferably 5 nm or less, with respect to 632.8 nm. For the polymer films having low retardations, cellulose triacetate, polyolefin such as ZEONEX, ZEONOR (all products by Nippon Zeon Co., Ltd.) and ARTON (JSR Corp.) are preferably used. In addition to that, for example, the non-birefringent optical resin materials described in JP-A Nos. 8-110402 and 11-293116 can be also mentioned. In the present embodiment, when a laminate consisting of a support and an optically anisotropic layer comprising a liquid crystalline compound on the support is used as the optical compensatory film, the protective film may function as the support for the optically anisotropic layer.

When the protective film is bonded to the polarizing film, it is preferable that the protective film and the polarizing film are laminated such that the slow axis (orientation axis) of at least one protective film (the protective film disposed closer to the liquid crystal cell when installed in the liquid crystal display device) intersects the absorption axis (drawing axis) of the polarizing film. Specifically, the angle between the absorption axis of the polarizing film and the slow axis of the protective film is preferably 10° to 90°, more preferably 20° to 70°, even more preferably 40° to 50°, and particularly preferably 43° to 47°. The angle between the slow axis of the protective film on the other side and the absorption axis of the polarizing axis is not particularly limited, and can be appropriately set depending on the purpose of the polarizer. However, the angle is preferably within the above-described range, and it is also desirable that the slow axes of the pair of the protective films correspond to each other.

In addition, when the slow axis of the protective film and the absorption axis of the polarizing film are in parallel to each other, the dimensional change of the polarizer and the mechanical stability of the polarizer referred to as curl prevention can be improved. When at least two axes of three films in total consisting of a polarizing film and a pair of protective films, the slow axis of one protective film and the absorption axis of a polarizing film, or the slow axes of two protective films are substantially in parallel, the same effect can be obtained.

<Adhesive>

The adhesive used for the polarizing film and the protective film is not particularly limited, but mention may be made of PVA resins (including PVAs modified with acetacetyl groups, sulfonic acid groups, carboxyl groups, oxyalkylene groups or the like) or aqueous solutions of boron compounds, and among them, PVA resins are preferred. The thickness of the adhesive layer after drying is preferably 0.01 to 10 μm, particularly preferably 0.05 to 5 μm.

<Integrated Production Process for Polarizing Film and Transparent Protective Film>

The polarizer that can be used for the second embodiment is subjected to a drying process after the stretching of the film for the polarizing film, in which the film is contracted and the volatile fraction is decreased. However, it is preferable to add a post-heating process after bonding a transparent protective film on at least one surface of the polarizer after or during the drying process. In an embodiment wherein the transparent protective film functions as a support for the optically anisotropic layer which functions as an optical compensatory film, it is preferable to have a post-heating process, after bonding a transparent protective film to one side of the polarizer and bonding a transparent support having an optically anisotropic layer on the other side of the polarizer. As a specific bonding method, there is available a method in which during the process of drying the film, transparent protective films are bonded to the polarizing film with an adhesive, with both terminals being maintained, and then both the terminals are trimmed, or after drying, the film for polarizing film is removed from the maintained parts of the terminals, both edges of the film are trimmed, and then transparent protective films are adhered. For the trimming method, general techniques such as cutting with a cutter such as a blade, using a laser or the like can be used. After the bonding, it is preferable to heat the plate to dry the adhesive and to better the polarizing performance. The conditions for heating may vary with the adhesive, but in the case of an aqueous system, 30° C. is preferred, 40° C. to 100° C. is more preferred, and 50° C. to 90° C. is even more preferred. These processes are more preferably carried out in an integrated process from the viewpoints of performance and production efficiency.

<Performance of Polarizer>

It is preferable that the optical properties and durability (short-term and long-term storability) of the polarizer consisting of transparent protective films, a polarizer, and a transparent support according to the second embodiment show equivalent or greater performance compared to the commercially available superhigh contrast form (for example, HLC2-5618 by Sanritsu Corp., etc.). More specifically, it is desirable that the visible light transmittance is 42.5% or greater, the degree of polarization $\{(Tp-Tc)/(Tp+Tc)\}^{1/2} \geq 0.9995$ (wherein Tp is parallel transmittance, and Tc is cross transmittance), the change rate of light transmittance before and after standing the polarizer under an atmosphere of 60° C. and 90% RH of humidity for 500 hours and then at 80° C. under a dry atmosphere for 500 hours is 3% or less, more preferably 1% or less, based on the absolute value, and the change rate of the degree of polarization under the same conditions is 1% or less, more preferably 0.1% or less, based on the absolute value.

Third Embodiment

Next, the third embodiment of the invention will be explained.

The optical compensatory sheet which is a form of the third embodiment (hereinafter, also referred to as "optical compensatory sheet I") is an optical compensatory sheet having a transparent support satisfying the following formulas (1) and (2), and an optically anisotropic layer A satisfying the following formula (3) and an optically anisotropic layer C satisfying the following formula (4) formed thereon sequentially.

The optical compensatory sheet which is another form of the third embodiment (hereinafter, also referred to as "optical compensatory sheet II") is an optical compensatory sheet having a transparent support satisfying the following formulas (1) and (2), and an optically anisotropic layer C satisfying the following formula (4) and an optically anisotropic layer A satisfying the following formula (3) formed thereon sequentially.

$$0 \leq Re_{(590)} \leq 10 \text{ and } |Rth_{(590)}| \leq 25, \tag{1}$$

$$|Re_{(450)} - Re_{(650)}| \leq 10 \text{ and } |Rth_{(450)} - Rth_{(650)}| \leq 35 \tag{2}$$

$$10 \leq Re_{(590)} \leq 150 \text{ and } 0 \leq Rth_{(590)} \leq 200 \tag{3}$$

$$0 \leq Re_{(590)} \leq 10 \text{ and } 40 \leq Rth_{(590)} \leq 400. \tag{4}$$

In the third embodiment, as the transparent support forming the optical compensatory sheet satisfies the above formulas (1) and (2), ideal optical compensation can be realized, without the optical properties of the transparent support adversely affecting the optical compensatory effect of the optically anisotropic layer, and in particular, the color shift of when the viewing angle is tilted from the front during dark state of the liquid crystal display device can be improved. The above formula (1) is preferably $0 \leq Re_{(590)} \leq 5$ and $|Rth_{(590)}| \leq 10$ nm, and particularly preferably $0 \leq Re_{(590)} \leq 3$ and $|Rth_{(590)}| \leq 5$ nm. The above formula (2) is preferably $|Re_{(450)}-Re_{(650)}| \leq 5$ and $|Rth_{(450)}-Rth_{(650)}| \leq 25$, and particularly preferably $|Re_{(450)}-Re_{(650)}| \leq 3$ and $|Rth_{(450)}-Rth_{(650)}| \leq 15$.

Hereinafter, the transparent support will be described further.

[Transparent Support]

The transparent support used for the third embodiment is preferably a polymer film, and the material to be used is preferably one having small intrinsic birefringence, such as cycloolefin-based polymers. Specific examples of the cycloolefin polymer include those described in JP-A Nos. 1-132625, 1-132626, 1-240517, 63-145324, 63-264626, 63-218726, 2-133413, 60-168708, 61-120816, 60-115912, 62-252406, 60-252407, WO 2004/0490.11 A1, WO 20-04/068226 A1, WO 2004/070463 A1 and the like. Also, commercially available cycloolefin-based polymers that can be used include ARTON (JSR Corp.), ZEONOR (Nippon Zeon Co., Ltd.), ZEONEX (Nippon Zeon Co., Ltd.), and ESCENA (Sekisui Chemical Co., Ltd.).

For the transparent support used for the third embodiment, it is more preferable to use a cellulose acylate film from the aspect that conventional production processes for polarizer can be used. The details such as the method for production and raw material of the cellulose acylate film that can be used for the third embodiment are as described above for the first embodiment.

[Additives to Cellulose Acylate]

In the third embodiment, various additives (for examples, a compound reducing optical anisotropy, a chromatic dispersion regulating agent, an ultraviolet blocking agent, a plasticizer, a degradation preventing agent, microparticles, an optical property regulating agent, etc.) can be added to the cellulose acylate solution that is used for the production of the cellulose acylate film in accordance with the use in the respective production processes. The time of addition may be at any stage during the dope producing process, but it is preferable to add additives at the final production step of the dope production process and then further perform the production process.

The transparent support, particularly the transparent support formed from a cellulose acylate film, that is used for the third embodiment preferably contains at least one compound reducing optical anisotropy, specifically $Re_{(\lambda)}$ and $Rth_{(\lambda)}$, and particularly $Rth_{(\lambda)}$, to an extent satisfying the following formulas (5) and (6).

$$(Rth_{(\lambda)}(A)-Rth(0))/A \leq -1.0 \quad (5)$$

$$0.01 \leq A \leq 30. \quad (6)$$

The above formulas (5) and (6) are more preferably $$(Rth_{(\lambda)}(A)-Rth(0))/A \leq -2.0 \quad (5)$$

$$0.05 \leq A \leq 25, \quad (6)$$

and even more preferably $$(Rth_{(\lambda)}(A)-Rth(0))/A \leq -3.0 \quad (5)$$

$$0.1 \leq A \leq 20, \quad (6)$$

wherein $Rth_{(\lambda)}(A)$: $Rth_{(\lambda)}$(nm) of the transparent support containing A % of the compound reducing $Rth_{(\lambda)}$, $Rth_{(\lambda)}(0)$: $Rth_{(\lambda)}$(nm) of the transparent support not containing the compound reducing $Rth_{(\lambda)}$, A: weight (%) of the compound when the weight of the raw material polymer for the transparent support is 100.

The structural feature and properties of the compound reducing optical anisotropy of the transparent support (particularly, the transparent support formed from a cellulose acylate film) that can be used for the third embodiment are as described above for the first embodiment.

Specific examples of the compound reducing optical anisotropy of the transparent support (particularly, the transparent support formed from a cellulose acylate film) that are preferably used for the third embodiment include the compounds represented by the above formulas (13), (18) and (19).

[Wavelength Dispersion Regulating Agent]

In the third embodiment, it is preferable to add a compound reducing the chromatic dispersion of the film (hereinafter, also referred to as a chromatic dispersion regulating agent) to the transparent support.

In the third embodiment, when a compound which absorbs at a wavelength of 200 to 400 nm in the ultraviolet region and thus is capable of preventing coloration of the film and controlling the chromatic dispersion of $Re_{(\lambda)}$ and $Rth_{(\lambda)}$ of the film, is added to the transparent support (preferably, a cellulose acylate film), the difference between $Re_{(\lambda)}$ and $Rth_{(\lambda)}$ at wavelengths of 450 nm and 650 nm, that is, $|Re_{(450)}-Re_{(650)}|$ and $|Rth_{(450)}-Rth_{(650)}|$, can be reduced, and also the difference between $Re_{(\lambda)}$ and $Rth_{(\lambda)}$ at wavelengths of 400 nm and 700 nm, that is, $|Re_{(400)}-Re_{(700)}|$ and $|Rth_{(400)}-Rth_{(700)}|$, can be reduced. As described above, for the optical compensatory sheet of the third embodiment, the transparent support is such that $|Re_{(450)}-Re_{(650)}| \leq 10$ and $|Rth_{(450)}-Rth_{(650)}| \leq 35$, preferably $|Re_{(450)}-Re_{(650)}| \leq 5$ and $|Rth_{(450)}-Rth_{(650)}| \leq 25$, and particularly preferably $|Re_{(450)}-Re_{(650)}| \leq 3$ and $|Rth_{(450)}-Rth_{(650)}| \leq 15$.

Furthermore, according to the third embodiment, it is preferable to add at least one compound reducing the chromatic dispersion of Rth represented by the following formula (iv), $\Delta Rth=|Rth_{(400)}-Rth_{(700)}|$, to an extent satisfying the following formulas (v) and (vi) in order to improve the chromatic dispersion of Rth of the transparent support (preferably, a cellulose acylate film).

$$\Delta Rth=|Rth_{(400)}-Rth_{(700)}| \quad (vi)$$

$$(\Delta Rth(B)-\Delta Rth(0))/B \leq -2.0 \quad (v)$$

$$0.01 \leq B \leq 30. \quad (vi)$$

The above formulas (v) and (vi) are more preferably $$(\Delta Rth(B)-\Delta Rth(0))/B \leq -3.0 \quad (v)$$

$$0.05 \leq B \leq 25, \quad (vi)$$

and even more preferably $$(\Delta Rth(B)-\Delta Rth(0))/B \leq -4.0 \quad (v)$$

$$0.1 \leq B \leq 20. \quad (vi)$$

The details of the chromatic dispersion regulating agent are as described above for the first embodiment.

[Matting Agent Microparticles, Plasticizer, Degradation Preventing Agent, Parting Agent]

It is preferable that microparticles are added to the transparent support (preferably, cellulose acylate film) used for the invention as a matting agent. Furthermore, according to the second embodiment, in addition to the compound reducing optical anisotropy and the chromatic dispersion regulating agent, various additives (for example, a plasticizer, an ultraviolet blocking agent, a degradation preventing agent, a parting agent, an infrared absorbent, etc.) can be added to the transparent support (preferably, cellulose acylate film) in accordance with the use for the respective production processes. The details are as described above for the first embodiment.

The transparent support (preferably, cellulose acylate film) used for the invention is preferably produced by the solvent casting method, and it is preferable to produce the support by using a solution of cellulose acylate dissolved in an organic solvent (dope). The details of the organic solvent are as described for the first embodiment. Further, the details of the production process for the cellulose acylate film, and optical performance and properties of the film according to the third embodiment are also as described for the first embodiment.

[Optical Compensatory Sheet]

The optical compensatory sheet I of the third embodiment is an optical compensatory sheet having an optically anisotropic layer A satisfying the following formula (3) and an optically anisotropic layer C satisfying the following formula (4) sequentially on the transparent support, and the optical compensatory sheet II is an optical compensatory sheet having an optically anisotropic layer C satisfying the following formula (4) and an optically anisotropic layer A satisfying the following formula (3) sequentially on the transparent support.

$$10 \leq Re_{(590)} \leq 150 \text{ and } 0 \leq Rth_{(590)} \leq 200 \tag{3}$$

$$0 \leq Re_{(590)} \leq 10 \text{ and } 40 \leq Rth_{(590)} \leq 400. \tag{4}$$

wherein $Re_{(\lambda)}$ is the front retardation value (unit: nm) at a wavelength of $\lambda$ nm, and $Rth_{(\lambda)}$ is the retardation value in the thickness direction (unit: nm) at a wavelength of $\lambda$ nm.

In addition, an optically compensatory sheet refers to an optical material which is generally used for a liquid crystal display device to compensate the retardation, and has the same meaning as a retardation plate, an optical compensatory film or the like. The optical compensatory sheet has birefringence and thus is used for the purpose of eliminating coloration of the display screen of a liquid crystal display device or improving the viewing angle properties. For the transparent support, Re and Rth have small optical anisotropy such that $0 \leq Re_{(590)} \leq 10$ nm and $|Rth_{(590)}| \leq 25$ nm, and have small chromatic dispersion such that $|Re_{(450)}-Re_{(650)}| \leq 10$ and $|Rth_{(450)}-Rth_{(650)}| \leq 35$, thus not causing any unnecessary anisotropy. When an optically anisotropic layer having birefringence is used in combination, the optical performance of only the optically anisotropic layer can be expressed.

Furthermore, according to the third embodiment, it is possible to make the viewing angle wider and also to reduce the color shift of when the viewing angle is tilted from the front during dark state, by laminating two optically anisotropic layers described below on the transparent support. Also, even in the case of being used as a protective film for a polarizer, when an optical compensatory sheet is to eventually function as an optical compensatory sheet, it is included as the optical compensatory sheet of the third embodiment.

In the optical compensatory sheet I, an optically anisotropic layer A satisfying the following formula (3) and an optically anisotropic layer C satisfying the following formula (4) are sequentially laminated in that order on the transparent support, and in the optical compensatory sheet II, an optically anisotropic layer C satisfying the following formula (4) and an optically anisotropic layer A satisfying the following formula (3) are sequentially laminated in that order. Layers such as an orientation film layer and an adhesive layer may be provided in between the respective transparent support, optically anisotropic layer A and optically anisotropic layer C.

$$10 \leq Re_{(590)} \leq 150 \text{ and } 0 \leq Rth_{(590)} \leq 200 \tag{3}$$

$$0 \leq Re_{(590)} \leq 10 \text{ and } 40 \leq Rth_{(590)} \leq 400. \tag{4}$$

In the optical compensatory sheet according to the first embodiment of the invention, the formulas (3) and (4) are preferably $$15 \leq Re_{(590)} \leq 50 \text{ and } 8 \leq Rth_{(590)} \leq 50 \tag{3}$$

$$0 \leq Re_{(590)} \leq 10 \text{ and } 50 \leq Rth_{(590)} \leq 170. \tag{4}$$

In the optical compensatory sheet II, the formulas (3) and (4) are preferably $$50 \leq Re_{(590)} \leq 130 \text{ and } 25 \leq Rth_{(590)} \leq 130 \tag{3}$$

$$0 \leq Re_{(590)} \leq 10 \text{ and } 40 \leq Rth_{(590)} \leq 100. \tag{4}$$

In order to reduce the color shift of when the viewing angle is tilted from the front during dark state, the wavelength dependency of $Re_{(\lambda)}$ of the optically anisotropic layer A preferably satisfies the following formulas (7) and (8), and the wavelength dependency of $Rth_{(\lambda)}$ of the optically anisotropic layer C preferably satisfies the following formulas (9) and (10).

$$Re_{(450)}/Re_{(550)}=0.60 \text{ to } 0.98 \tag{7}$$

$$Re_{(650)}/Re_{(550)}=1.00 \text{ to } 1.60 \tag{8}$$

$$Rth_{(450)}/Rth_{(550)}=1.02 \text{ to } 1.60 \tag{9}$$

$$Rth_{(650)}/Rth_{(550)}=0.60 \text{ to } 1.00 \tag{10}$$

The above formulas (7), (8), (9) and (10) are more preferably $$Re_{(450)}/Re_{(550)}=0.7 \text{ to } 0.95 \tag{7}$$

$$Re_{(650)}/Re_{(550)}=1.05 \text{ to } 1.3 \tag{8}$$

$$Rth_{(450)}/Rth_{(550)}=1.05 \text{ to } 1.3 \tag{9}$$

$$Rth_{(650)}/Rth_{(550)}=0.7 \text{ to } 0.95. \tag{10}$$

The optically anisotropic layers A and C which constitute the optical compensatory sheet of the third embodiment are not limited in the material, as long as the material satisfies the above formulas (3) and (4), preferably the formulas (3), (4) and (7) through (10). The layers may be formed from a composition containing a liquid crystalline compound, or may be formed from polymer films having birefringence. Furthermore, the optically anisotropic layer C can be also formed from a non-liquid crystalline compound. The non-liquid crystalline compound is not particularly limited, and known ones can be used.

The liquid crystalline compound is preferably a discotic liquid crystalline compound or a rod-shaped liquid crystalline compound.

In addition, the method for production of the optically anisotropic layer A can be referred from, for example, JP-A No. 2002-48919, while the method for production of the optically anisotropic layer C can be referred from, for example, JP-A No. 2004-4474.

(Discotic Liquid Crystalline Compound)

Examples of the discotic liquid crystalline compound that can be used for the third embodiment include the compounds described in various literatures (C. Destrade et al., Mol. Crysr. Liq. Cryst., Vol. 71, page 111 (1981); Kikan Kagaku Sosetsu, No. 22, Ekisho No Kagaku, chapter 5, chapter 10, section 2

(compiled by Nihon Kagaku Kai and published in 1994); B. Kohne et al., Angew. Chem. Soc. Chem. Comm., page 1794 (1985); J. Zhang et al., J. Am. Chem. Soc., Vol. 116, page 2655 (1994)).

In the optically anisotropic layer, the discotic liquid crystal molecules are preferably fixed in an aligned state, and are most preferably fixed by a polymerization reaction. The polymerization of discotic liquid crystal molecules is described in JP-A No. 8-27284. In order to fix the discotic liquid crystal molecules by polymerization, it is necessary to attach a polymerizable group to the disc-like core of the discotic liquid crystal molecules as a substituent. However, when the polymerizable group is directly attached to the disc-like core, it becomes difficult to maintain the orientation state for the polymerization reaction. Thus, a linking group is introduced between the disc-like core and the polymerizable group. The discotic liquid crystal molecule having a polymerizable group is described in JP-A No. 2001-4387.

(Rod-Shaped Liquid Crystalline Compound)

Examples of the rod-shaped liquid crystalline compound that can be used for the third embodiment include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes and alkenylcyclohexylbenzonitriles. According to the third embodiment, not only the low molecular weight liquid crystalline compounds described above, but also high molecular weight liquid crystalline compounds can be used.

In the optically anisotropic layer, the rod-shaped liquid crystal molecules are preferably fixed in the aligned state, and most preferably fixed by polymerization reaction. Examples of the polymerizable rod-shaped liquid crystalline compound that can be used for the invention include the compounds described in Makromol. Chem., Vol. 190, page 2255 (1989); Advanced Materials, Vol. 5, page 107 (1993); U.S. Pat. Nos. 4,683,327, 5,622,648, and 5,770,107, WO 95/22586, WO 95/24455, WO 97/00600, WO 98/23580, WO 98/52905, JP-A Nos. 1-272551, 6-16616, 7-110469, 11-80081, 2001-328973 and the like.

(Optically Anisotropic Layer Formed from Polymer Film)

As described above, the optically anisotropic layer may be formed from a polymer film. The polymer film can be formed from a polymer which is capable of expressing optical anisotropy. Examples of such polymer include polyolefin (for example, polyethylene, polypropylene, norbornene polymers), polycarbonates, polyallylate, polysulfone, polyvinyl alcohol, polymethacrylic acid ester, polyacrylic acid ester and cellulose ester (for example, cellulose triacetate, cellulose diacetate). Copolymers or polymer mixtures of these polymers also may be used.

The optical anisotropy of the polymer film is preferably obtained by stretching. The stretching is preferably uniaxial stretching or biaxial stretching. Specifically, vertical uniaxial stretching employing the difference of the rim speeds of two or more rolls, tenter stretching of clamping the two lateral sides of a polymer film and stretching in the width direction, or biaxial stretching combining these two is preferred. In addition, two or more polymer films may be used so that the collective optical properties of the two or more films satisfy the above-described conditions. The polymer film is preferably produced by the solvent casting method in order to reduce irregularity of birefringence. The thickness of the polymer film is preferably 20 to 500 µm, and most preferably 40 to 100 µm.

Also, a method can be preferably used in which at least one polymer material selected from the group consisting of polyamide, polyimide, polyester, polyether ketone, polyamideimide-polyesteramide and polyaryl ether ketone is used as the polymer film forming the optical anisotropic layer, a substrate is coated with a solution of the polymer dissolved in a solvent, and the solvent is dried to form a film from the coating. Here, a method of stretching the polymer film and the substrate to exhibit optical anisotropy and using the product as an optical anisotropic layer is also favorably used, and the transparent support used for the third embodiment can be favorably used as the substrate. Furthermore, it is also desirable to use a method of producing the polymer film on another substrate, releasing the polymer film from the substrate, and then bonding the polymer film to the transparent support for use. In this method, the thickness of the polymer film can be made small, and the thickness is preferably 50 µm or less, and more preferably 1 to 20 µm.

[Polarizer]

The polarizer of the third embodiment is a polarizer having protective films on both sides of the polarizer, and is a polarizer characterized in that at least one of the protective films is the optical compensatory sheet of the third embodiment, and the surface on the transparent support side is bonded to the polarizer. When the optical compensatory sheet of the third embodiment is used as the polarizer-protecting film, the production method for the polarizer is not particularly limited, and general production methods can be used. For example, mention may be made of a method of subjecting the obtained cellulose acylate film to alkali treatment, and bonding the treated cellulose acylate film on both sides of a polarizer which has been produced by immersing and stretching a polyvinyl alcohol film in an iodine solution, using an aqueous solution of completely saponified polyvinyl alcohol solution. The cellulose acylate film may be subjected to the good adhesion processing as described in JP-A Nos. 6-94915 and 6-118232, instead of the alkali treatment.

The adhesive used for the bonding of the treated surface of the protective film and the polarizer may be exemplified by a polyvinyl alcohol adhesive such as polyvinyl alcohol or polyvinyl butyral, a vinyl-based latex such as butyl acrylate, or the like. For the polarizer of the invention, at least one layer selected from the group consisting of a hardcoat layer, an anti-glare layer, an anti-reflection layer, an anti-fouling layer and an antistatic layer can be provided on at least one surface of the protective film. For these layers, known ones can be used. It is also possible to add, if necessary, various additives such as a plasticizer, an ultraviolet absorbent, a release promoting agent, dyes, a matting agent and conductive microparticles, to the protective film. The details thereof are as described above.

The polarizer comprises a polarizer and protective films protecting the two surfaces of the polarizer, and the polarizer can be further constituted by bonding a protector film on one surface of the polarizer and bonding a separator film on the opposite surface. The protector film and the separator film are used for the purpose of protecting the polarizer during shipping and product inspection of the polarizer, and the like. In this case, the protector film is bonded for the purpose of protecting the surface of the polarizer and is used on the opposite side of the surface where the polarizer is bonded to the liquid crystal plate. The separator film is used for the purpose of covering the adhesive layer which is bonded to the liquid crystal plate., and is used on the side of the surface where the polarizer is bonded to the liquid crystal plate.

A liquid crystal display device usually has a substrate comprising liquid crystals in two sheets of polarizers, and the optical compensatory sheet of the third embodiment is used on the liquid crystal cell side as a protective film for the polarizer. The protective film for the polarizer on the outermost surface on the display side of the liquid crystal display device is usually provided with a transparent hardcoat layer, an anti-glare layer, an anti-reflection layer or the like.

[Liquid Crystal Display Device]

The liquid crystal display device as a form of the third embodiment (hereinafter, also referred to as "liquid crystal display device I") is a liquid crystal display device having a liquid crystal cell and a pair of polarizers disposed on both sides of the liquid crystal cell, and is a liquid crystal display device characterized in that at least one of the polarizers is the polarizer of the third embodiment.

The liquid crystal display device as another form of the third embodiment (hereinafter, also referred to as "liquid crystal display device II") is a liquid crystal display device having a liquid crystal cell and a pair of polarizers disposed on both sides of the liquid crystal cell, and is a liquid crystal display device characterized in that the polarizer comprises a polarizer and a pair of protective films having the polarizer interposed in between, and at least one of the protective films is the optical compensatory sheet of the third embodiment.

The liquid crystal display device of the third embodiment has the optical compensatory sheet of the invention described above as the protective film for the polarizer, wherein the color shift of when the viewing angle is tilted from the front during dark state is improved, and thus high display quality can be realized.

The liquid crystal layer of the liquid crystal cell is usually formed by encapsulating liquid crystals in a gap formed by inserting a spacer between two substrates. A transparent electrode layer can be formed on the substrate as a transparent film containing a conductive material. The liquid crystal cell may further have a gas barrier layer, a hardcoat layer or an undercoat layer (used for adhesion of the transparent electrode layer). Such layers are usually provided on the substrate. The substrate of the liquid crystal cell generally has a thickness of 50 µm to 2 mm.

The liquid crystal cell in the liquid crystal display device of the third embodiment can be liquid crystal cells of various display modes. Mention may be made of various display modes such as TN (Twisted Nematic), IPS (In-Plane Switching), FLC (Ferroelectric Liquid Crystal), AFLC (Anti-Ferroelectric Liquid Crystal), OCB (Optically Compensatory Bend), STN (Super Twisted Nematic), VA (Vertically Aligned) and HAN (Hybrid Aligned Nematic). Among these, the liquid crystal cell in the liquid crystal display device of the third embodiment is preferably of the VA mode or OCB mode, and particularly preferably the VA mode.

In the VA mode liquid crystal cell, rod-shaped liquid crystal molecules are substantially vertically aligned when no voltage is applied.

The VA mode liquid crystal cell includes (1) the VA mode liquid crystal cells in a narrow sense in which rod-like liquid crystal molecules are substantially vertically aligned under no applied voltage and are oriented substantially horizontally upon voltage application (described in JP-A No. 2-176625), (2) the (MVA mode) liquid crystal cells in which VA mode is formed in multiple domains for visual field angle expansion {"SID97, Digest of Tech. Papers (Proceedings), Vol. 28, p. 845 (1997)}, (3) the liquid crystal cells in a mode (n-ASM mode, CPA mode) in which rod-shaped liquid crystal molecules are substantially vertically aligned under no applied voltage and are aligned in twisted multiple domains upon voltage application {described in Japan Liquid Crystal Symposium, Proceedings, p. 58-59 (1998), SHARP Technical Journal, Vol. 80, p. 11}, and (4) the SURVIVAL mode liquid crystal cells in which the liquid crystals are aligned in multiple domains by a gradient electric field {Display Monthly, issue of May, p. 14 (1999)}, the PVA mode liquid crystal cells {"18$^{th}$, IDRC Proceedings", p. 383 (1998)}.

EXAMPLES

Hereinafter, the invention will be further described in detail by way of Examples and Comparative Examples. Materials, contents, ratios, processing contents, processing order and the like presented hereinbelow may be suitably changed as long as the object of the invention is not impaired. However, the scope of the invention is not limited to these specific examples below.

First Embodiment

Preparative Example 1

(Production of Cellulose Acylate Film)

The following composition was fed into a mixing tank and agitated under heating to dissolve individual components, thereby preparing a cellulose acylate solution A.

| <Composition of cellulose acylate solution A> | |
|---|---|
| Cellulose acetate with degree of substitution of 2.86 | 100 parts by weight |
| Triphenyl phosphate (plasticizer) | 7.8 parts by weight |
| Biphenyl diphenyl phosphate (plasticizer) | 3.9 parts by weight |
| Methylene chloride (first solvent) | 300 parts by weight |
| Methanol (second solvent) | 54 parts by weight |
| 1-Butanol | 11 parts by weight |

The following compositions were fed into other mixing tanks and agitated under heating to dissolve individual components, thereby preparing additive solutions B-1 to B-6.

TABLE 1

<Composition of additive solutions B-1 to B-6>

| Additive solution | Methylene chloride | Methanol | Optical anisotropy reducing agent (A-19) | Wavelength dispersion regulating agent (UV-102) |
|---|---|---|---|---|
| B-1 | 80 parts by weight | 20 parts by weight | absence | absence |
| B-2 | same | same | absence | 2 parts by weight |
| B-3 | same | same | absence | 4 parts by weight |
| B-4 | same | same | 20 parts by weight | absence |
| B-5 | same | same | 40 parts by weight | absence |
| B-6 | same | same | 40 parts by weight | 4 parts by weight |

<Production of Cellulose Acetate Film Sample No. 001>

To 477 parts by weight of the cellulose acylate solution A, 40 parts by weight of the additive solution B-1 was added and the resultant mixture was thoroughly stirred to give a dope. From a casting port, the dope was cast on a drum cooled to 0° C. Then the dope was stripped off at a solvent content of 70% by weight and the film was fixed in both sides with a pin tenter (shown in FIG. 3 of JP-A No. 4-1009) and dried at a solvent content of from 3 to 5% by weight while maintaining intervals giving a stretching rate in the transverse direction (perpendicular to the machine direction) of 3%. Next, it was further dried by passing between rolls of a heat treatment unit to give a cellulose acetate film sample No. 001 of 80 μm in thickness.

<Production of Cellulose Acetate Film Sample Nos. 002 to 003 and 101 to 105>

Cellulose acetate film sample Nos. 002 to 003 and 101 to 105 were produced in the same manner as for cellulose acetate film sample No. 001, except that the additive solutions and thickness used in the production of cellulose acetate film sample No. 001 were substituted with those listed in Table 2. Spectral transmittance of these samples at the wavelengths of 380 nm and 350 nm was measured, and as a result, transmittance of the samples at the wavelength of 380 nm was 45% or more and 95% or less. However, it was known that only the samples with chromatic dispersion regulating agent added thereto had transmittance of 10% or less at the wavelength of 350 nm.

Preparative Example 2

(Production of Cellulose Acylate Film)

The following composition was fed into a mixing tank and agitated under heating to dissolve individual components, thereby preparing a cellulose acylate solution <Composition of cellulose acylate solution C>

| | |
|---|---|
| Cellulose acetate with degree of substitution of 2.86 | 100 parts by weight |
| Methylene chloride (first solvent) | 300 parts by weight |
| Methanol (second solvent) | 54 parts by weight |
| 1-Butanol | 11 parts by weight |

The following three compositions were fed into other mixing tanks and agitated under heating to dissolve individual components, thereby preparing additive solutions B-7 to B-19. To 465 parts by weight of the cellulose acylate solution C, 40 parts by weight of the additive solutions B-7 to 19 were added respectively to give cellulose acetate film sample Nos. 004 to 007 and 106 to 114 of 80 μm in thickness. It was confirmed that the transparency of the dope solutions of these samples was good as 85% or more, and that the compound for reducing optical anisotropy and chromatic dispersion regulating agent were used sufficiently together with the dope solution of cellulose acylate. It was also confirmed that haze of these samples was in the range of 0.01 to 2% so that when molded into a film, the film had sufficient transparency. Moreover, the glass transition temperature (Tg) of these samples was measured, and as a result, it was confirmed that the samples had Tg of 80 to 165° C. except for the comparative sample No. 004 which did not add an optical anisotropy reducing agent or a chromatic dispersion regulating agent.

TABLE 2

| Sample No. | Additive solution | Thickness (μm) | Optical anisotropy reducing agent (A-19) | Wavelength dispersion regulating agent (UV-102) | Re (630 nm) | Rth (630 nm) | Spectral transmittance (%) 380 nm | Spectral transmittance (%) 350 nm | Note |
|---|---|---|---|---|---|---|---|---|---|
| 001 | B-1 | 80 | 0 | 0 | 5.1 | 34.0 | 93.6 | 92.8 | Comp. Ex. |
| 002 | B-2 | 80 | 0 | 0.9 | 4.5 | 39.3 | 66.5 | 6.5 | Same |
| 003 | B-3 | 80 | 0 | 1.8 | 6.1 | 42.2 | 69.4 | 3.1 | Same |
| 101 | B-4 | 80 | 5.9 | 0 | 1.8 | 23.8 | 89.4 | 91.2 | Present invention |
| 102 | B-5 | 80 | 12 | 0 | 1.9 | 7.2 | 86.5 | 90.5 | Same |
| 103 | B-6 | 80 | 12 | 1.8 | 1.9 | 14.9 | 73.8 | 3.1 | Same |
| 104 | B-6 | 60 | 12 | 1.8 | 2.0 | 12.3 | 74.2 | 2.8 | Same |
| 105 | B-6 | 40 | 12 | 1.8 | 1.3 | 8.2 | 73.8 | 3.0 | Same |

TABLE 3

<Composition of Additive solutions B-7 to B-16>

| Sample No. | Additive solution | Methylene Chloride | Methanol | Optical anisotropy reducing agent Compound | Optical anisotropy reducing agent Content | Wavelength dispersion regulating agent Compound | Wavelength dispersion regulating agent Content | Doping transparency (%) | Film haze (%) | Film Tg (° C.) | Note |
|---|---|---|---|---|---|---|---|---|---|---|---|
| 4 | B-7 | 80 parts by weight | 20 parts by weight | absence | — | absence | — | 92.5 | 0.23 | 171.2 | Comp. Ex. |
| 5 | B-8 | same | same | absence | — | UV-102 | 2 parts by weight | 93.1 | 0.25 | 150.4 | same |
| 6 | B-9 | same | same | absence | — | UV-102 | 4 parts by weight | 90.2 | 0.32 | 145.3 | same |

TABLE 3-continued

<Composition of Additive solutions B-7 to B-16>

| Sample No. | Additive solution | Methylene Chloride | Methanol | Optical anisotropy reducing agent Compound | Content | Wavelength dispersion regulating agent Compound | Content | Doping transparency (%) | Film haze (%) | Film Tg (° C.) | Note |
|---|---|---|---|---|---|---|---|---|---|---|---|
| 7 | B-10 | same | same | BDP | 40 parts by weight | absence | — | 91.2 | 0.27 | 140.1 | same |
| 106 | B-11 | same | same | C-1 | 40 parts by weight | absence | — | 90.3 | 0.31 | 132.4 | Present invention |
| 107 | B-12 | same | same | A-7 | 40 parts by weight | absence | — | 91.4 | 0.33 | 136.2 | same |
| 108 | B-13 | same | same | B-30 | 40 parts by weight | absence | — | 92.3 | 0.32 | 138.1 | same |
| 109 | B-14 | same | same | PL-1 | 40 parts by weight | absence | — | 90.7 | 0.34 | 137.4 | same |
| 110 | B-15 | same | same | PL-19 | 40 parts by weight | absence | — | 89.4 | 0.24 | 124.5 | same |
| 111 | B-16 | same | same | D-7 | 40 parts by weight | absence | — | 92.2 | 0.27 | 138.0 | same |
| 112 | B-17 | same | same | E-1 | 40 parts by weight | absence | — | 93.0 | 0.23 | 133.0 | same |
| 113 | B-18 | same | same | I-10 | 40 parts by weight | UV-21 | 2 parts by weight | 89.4 | 0.38 | 132.8 | same |
|  |  |  |  |  |  | UV-22 | 2 parts by weight |  |  |  |  |
| 114 | B-19 | same | same | L-1 | 40 parts by weight | UV-21 | 2 parts by weight | 90.2 | 0.32 | 131.3 | same |
|  |  |  |  |  |  | UV-22 | 2 parts by weight |  |  |  |  |

Preparative Example 3

(Preparation of Cellulose Acetate Solution)

The following composition was fed into a mixing tank and agitated under heating to dissolve individual components, thereby preparing a cellulose acetate solution D.

<Composition of cellulose acetate solution D>

| | |
|---|---|
| Cellulose acetate with degree of substitution of 2.86 | 100.0 parts by weight |
| Methylene chloride (first solvent) | 402.0 parts by weight |
| Methanol (second solvent) | 60.0 parts by weight |

(Preparation of Solution of Matting Agent)

20 parts by weight of silicon dioxide particles with an average particle size of 16 nm (AEROSIL R972, manufactured by Nippon Aerosil Co., Ltd.) and 80 parts by weight of methanol were stirred and mixed well for 30 minutes to give a dispersion of silicon dioxide particles. This dispersion together with the following compositions were fed to a disperser and further agitated for 30 minutes or more to dissolve individual components, thereby preparing a solution of matting agent.

(Composition of solution of matting agent)

| | |
|---|---|
| A dispersion of silicon dioxide particles with average particle size of 16 nm | 10.0 parts by weight |
| Methylene chloride (first solvent) | 76.3 parts by weight |
| Methanol (second solvent) | 3.4 parts by weight |
| Cellulose acetate solution D | 10.3 parts by weight |

(Preparation of Additive Solution)

The following compositions were fed into a mixing tank and agitated under heating to dissolve individual components, thereby preparing a cellulose acetate solution. With regard to a compound for reducing optical anisotropy and a chromatic dispersion regulating agent, those listed in the following Table 4 were used.

(Composition of additive solution)

| | |
|---|---|
| Compound for reducing optical anisotropy | 49.3 parts by weight |
| Wavelength dispersion regulating agent | 7.6 parts by weight |
| Methylene chloride (first solvent) | 58.4 parts by weight |
| Methanol (second solvent) | 8.7 parts by weight |
| Cellulose acetate solution D | 12.8 parts by weight |

(Production of Cellulose Acetate Film Sample No. 115)

94.6 parts by weight of the above-mentioned cellulose acetate solution D, 1.3 parts by weight of a solution of matting agent and 4.1 parts by weight of an additive solution were each individually filtered and then mixed. The mixture was cast using a band casting machine. The weight ratios of the compound for reducing optical anisotropy and the chromatic dispersion regulating agent to cellulose acetate in the above-mentioned composition were 12% and 1.8%, respectively. Film was peeled off from the band with the remaining solvent content of 30% and dried at 140° C. for 40 minutes to give a cellulose acetate film. The obtained cellulose acetate film had the remaining solvent content of 0.2% and a film thickness of 40 μm.

(Production of Cellulose Acetate Film Sample Nos. 008 to 011 and 116 to 128)

Cellulose acetate film sample Nos. 008 to 011 and 116 to 128 were produced in the same manner, except that types and contents of a compound for reducing optical anisotropy and a chromatic dispersion regulating agent in additive solutions were substituted with those listed in Table 4. Solution compositions of sample No. 115 production are also listed in Table 4. The difference of retardation in the film thickness direction at a relative humidity of 10% and 80% (ΔRth=Rth 10% RH−Rth 80% RH) of these samples was measured. As a result, comparative sample Nos. 008 and 009 without an optical anisotropy reducing agent and comparative sample Nos. 010 and 011 with a plasticizer (biphenyldiphenyl phosphate (BDP)) instead of an optical anisotropy reducing agent had ΔRth of no less than or equal to 30 nm, and humidity-dependence of the optical anisotropy was large. On the other hand, sample Nos. 115 to 128 containing an optical anisotropy reducing agent had ΔRth in the range of 0 to 30 nm, and it was confirmed that the humidity-dependence of the optical anisotropy was lowered. Further, equilibrium moisture content of these samples at 25° C. and 80% RH was measured, and as a result, it was confirmed that except for sample No. 008, all other samples had equilibrium moisture content of 4% or less and all other cellulose acylate films became hydrophobized by adding the optical anisotropy reducing agent and the chromatic dispersion regulating agent. Moisture permeability (based on 80 μm) of these samples at 60° C. and 95% RH over 24 hours was measured, and as a result, it was confirmed that except for sample No. 008, all other samples Further, weight change in sample Nos. 126 and 127 when they were left to stand at 80° C. and 90% RH for 48 hours was measured. As a result, the weight change of sample No. 126 was −0.12% and sample No. 127 was −0.02%. As for the chromatic dispersion regulating agent, benzotriazole compounds such as UV-21, UV-22 and UV-23 were used. However, it was confirmed that sample No. 127, which does not contain UV-23 (molecular weight: 315.5) having the molecular weight less than or equal to 320, was advantageous over sample No. 126 from the viewpoint of retention.

TABLE 4

<Composition of additive solution for preparation of samples 008 to 011 and 116 to 128>

| Sample No. | Optical anisotropy reducing agent compound | content | Wavelength dispersion regulating agent compound | content | Total content of additive compound (%, relative to cellulose acylate) | ΔRth (Rth 10% RH-Rth 80% RH) | Water content (80% RH) | Moisture permeability (based on 80 μm) | Secondary average particle size of matting agent (μm) | Film white turbidity (bleeding) | Note |
|---|---|---|---|---|---|---|---|---|---|---|---|
| 8 | absence | — | absence | — | 0.0 | 53.2 | 4.3 | 2243 | 1.73 | absence | Comp. Ex. |
| 9 | absence | — | UV-3 | 3.8 parts by weight | 1.8 | 48.2 | 3.3 | 1411 | 1.12 | absence | same |
|   |   |   | UV-7 | 3.8 parts by weight |   |   |   |   |   |   |   |
| 10 | BDP | 49.3 parts by weight | UV-3 | 3.8 parts by weight | 13.6 | 36.2 | 2.8 | 1321 | 0.96 | absence | same |
|   |   |   | UV-7 | 3.8 parts by weight |   |   |   |   |   |   |   |
| 11 | BDP | 197 parts by weight | UV-3 | 3.8 parts by weight | 49.0 | 22.5 | 1.9 | 1152 | Impossible to determine | white turbidity | same |
|   |   |   | UV-7 | 3.8 parts by weight |   |   |   |   |   |   |   |
| 115 | A-19 | 49.3 parts by weight | UV-102 | 7.6 parts by weight | 13.6 | 24.9 | 3.3 | 1063 | 0.84 | absence | invention |
| 116 | A-19 | 49.3 parts by weight | UV-102 | 15.2 parts by weight | 15.4 | 23.7 | 3.2 | 958 | 0.82 | absence | same |
| 117 | A-35 | 49.3 parts by weight | UV-21 | 3.8 parts by weight | 13.6 | 23.1 | 3.1 | 1082 | 0.83 | absence | same |
|   |   |   | UV-22 | 3.8 parts by weight |   |   |   |   |   |   |   |
| 118 | B-30 | 49.3 parts by weight | UV-3 | 3.8 parts by weight | 13.6 | 22.5 | 2.9 | 1006 | 0.83 | absence | same |
|   |   |   | UV-7 | 3.8 parts by weight |   |   |   |   |   |   |   |
| 119 | PL-19 | 49.3 parts by weight | UV-209 | 7.6 parts by weight | 13.6 | 25.3 | 3.4 | 1326 | 0.84 | absence | same |
| 120 | D-21 | 82.2 parts by weight | UV-3 | 3.8 parts by weight | 21.8 | 20.7 | 2.3 | 1134 | 0.82 | absence | same |
|   |   |   | UV-7 | 3.8 parts by weight |   |   |   |   |   |   |   |
| 121 | E-2 | 82.2 parts by weight | UV-209 | 7.6 parts by weight | 21.8 | 20.5 | 2.2 | 1026 | 0.82 | absence | same |
| 122 | I-1 | 82.2 parts by weight | UV-21 | 3.8 parts by weight | 21.8 | 22.3 | 2.2 | 1165 | 0.84 | absence | same |
|   |   |   | UV-22 | 3.8 parts by weight |   |   |   |   |   |   |   |
| 123 | J-1 | 82.2 parts by weight | UV-21 | 3.8 parts by weight | 21.8 | 21.5 | 2.4 | 1058 | 0.83 | absence | same |
|   |   |   | UV-22 | 3.8 parts by weight |   |   |   |   |   |   |   |
| 124 | K-1 | 82.2 parts by weight | UV-21 | 3.8 parts by weight | 21.8 | 22.4 | 2.1 | 995 | 0.83 | absence | same |
|   |   |   | UV-22 | 3.8 parts by weight |   |   |   |   |   |   |   |
| 125 | L-5 | 82.2 parts by weight | UV-21 | 3.8 parts by weight | 21.8 | 23.6 | 2.2 | 982 | 0.83 | absence | same |
|   |   |   | UV-22 | 3.8 parts by weight |   |   |   |   |   |   |   |
| 126 | K-4 | 41.1 parts by weight | UV-21 | 4.2 parts by weight | 22.5 | 19.3 | 2.0 | 863 | 0.80 | absence | same |
|   | K-5 | 41.1 parts by weight | UV-22 | 4.2 parts by weight |   |   |   |   |   |   |   |
|   |   |   | UV-23 | 2.1 parts by weight |   |   |   |   |   |   |   |
| 127 | K-4 | 41.1 parts by weight | UV-21 | 4.2 parts by weight | 22.0 | 20.6 | 2.0 | 907 | 0.82 | absence | same |
|   | K-5 | 41.1 parts by weight | UV-22 | 4.2 parts by weight |   |   |   |   |   |   |   |
| 128 | I-1 | 20.1 parts by weight | UV-21 | 14.8 parts by weight | 22.0 | 24.2 | 2.1 | 1090 | 0.83 | absence | same |
|   | J-1 | 49.3 parts by weight | UV-22 | 6.3 parts by weight |   |   |   |   |   |   |   | had moisture permeability of 400 g/m²·24 hr or more and 2000 g/m²·24 hr or less. It was also confirmed that when compared with comparative sample Nos. 009 and 010, all sample Nos. 115 to 128 that were added with the optical anisotropy reducing agent and the chromatic dispersion regulating agent showed improvement in moisture permeability. In addition, except for comparative sample No. 011, all other samples did not form white turbidity in films, and obtaining a film with sufficient transparency. However, comparative sample No. 011 had the total amount of additive compound as high as 49% corresponding to cellulose acylate, whereby exceeding the range 5 to 45%. In this case, films formed white turbidity, and the compounds precipitated (bleeding). Thus, evaluating as a cellulose acylate film having transparency was impossible.

Preparative Example 4

(Production of Cellulose Acylate Film)

The following composition was fed into a mixing tank and agitated under heating to dissolve individual components, thereby preparing a cellulose acylate solution E. At this time, three kinds of cellulose acylate with degrees of substitution of 2.49, 2.86 and 2.92 were used (Table 5).

<Composition of cellulose acylate solution E>

| Cellulose acetate | 100 parts by weight |
| Methylene chloride (first solvent) | 300 parts by weight |

-continued

<Composition of cellulose acylate solution E>

| | |
|---|---|
| Methanol (second solvent) | 54 parts by weight |
| 1-Butanol | 11 parts by weight |

The following five compositions were fed into other mixing tanks and agitated under heating to dissolve individual components, thereby preparing additive solutions B-20 to B-25. To 465 parts by weight of the cellulose acylate solution E, 40 parts by weight of the additive solutions B-20 to 25 were added respectively to give cellulose acetate film sample Nos. 129 to 132 and comparative sample Nos. 012 to 013 of 40 μm in thickness. With regard to these samples, the followings were measured in the same manner as in Preparative Example 3: difference of retardation in the film thickness direction at a relative humidity of 10% and 80% (ΔRth=Rth 10% RH–Rth 80% RH), equilibrium moisture content at 25° C. and 80% RH, moisture permeability (based on 80 μm) at 60° C. and 95% RH over 24 hours, weight change after 48 hours at 80° C. and 90% RH and dimensional change and modulus of elasticity after 24 hours at 60° C. and 95% RH. As a result, it was confirmed that sample Nos. 129 to 132 using cellulose acylate film with degree of substitution of 2.92, which further contain the optical anisotropy reducing agent and the chromatic dispersion regulating agent, showed improvement in all measurements compared with comparative sample No. 012 with degree of substitution of 2.49.

Preparative Example 5

(Production of Cellulose Acylate Film)

The following composition was fed into a mixing tank and agitated under heating to dissolve individual components, thereby preparing a cellulose acylate solution F. At this time, two kinds of cellulose acylate film with total degree of substitution of 2.85 (degree of acetyl substitution of 2.06+degree of propionyl substitution of 0.79) and total degree of substitution of 2.70 (degree of acetyl substitution of 1.93+degree of propionyl substitution of 0.77) were used.

<Composition of cellulose acylate solution F>

| | |
|---|---|
| Cellulose acylate | 100 parts by weight |
| Methylene chloride (first solvent) | 300 parts by weight |
| Methanol (second solvent) | 54 parts by weight |
| 1-Butanol | 11 parts by weight |

The following compositions of Table 6 were fed into other mixing tanks and agitated under heating to dissolve individual components, thereby preparing additive solutions B-26 to B-31. To 465 parts by weight of the cellulose acylate solution F, 40 parts by weight of the additive solutions B-26 to 31 were added respectively to give cellulose acylate film sample Nos. 133 to 139 of 40 μm in thickness. With regard to these samples, the followings were measured in the same manner as in Preparative Example 3: difference of retardation in the film thickness direction at a relative humidity of 10%

TABLE 5

| Sample No. | Additive solution | Methylene chloride | Methanol | Degree of cellulose acylate substitution | Optical anisotropy reducing agent compound | content | Wavelength dispersion regulating agent compound | content | ΔRth Rth 10% RH – Rth 80% RH |
|---|---|---|---|---|---|---|---|---|---|
| 012 | B-20 | 80 parts by weight | 20 parts by weight | 2.49 | absence | — | absence | — | 65.7 |
| 013 | B-21 | same | same | 2.86 | absence | — | absence | — | 35.2 |
| 129 | B-22 | same | same | 2.92 | A-19 | 40 parts by weight | absence | — | 13.2 |
| 130 | B-23 | same | same | same | A-19 | 40 parts by weight | UV-102 | 4 parts by weight | 11.3 |
| 131 | B-24 | same | same | same | K-4 | 33 parts by weight | UV-21 | 2 parts by weight | 6.3 |
|  |  |  |  |  | K-5 | 33 parts by weight | UV-22 | 2 parts by weight |  |
| 132 | B-25 | same | same | same | L-5 | 67 parts by weight | UV-21 | 2 parts by weight | 4.2 |
|  |  |  |  |  |  |  | UV-22 | 2 parts by weight |  |

| Sample No. | Water content 80% RH | Moisture permeability (based on 80 μm) | Change in mass (%) 80° C., 90% RH for 48 hrs | Change in dimension (%) 60° C., 95% RH for 24 hrs | Modulus of elasticity Kgf/mm$^2$ | Coefficient of photoelasticity ×10$^{-13}$ cm$^2$/dyne | Note |
|---|---|---|---|---|---|---|---|
| 012 | 4.7 | 2780 | 5.4 | 5.3 | 189 | 25 | Comp. Ex. |
| 013 | 3.0 | 1340 | 0.1 | 0.21 | 420 | 13 | same |
| 129 | 2.4 | 1241 | 0.1 | 0.15 | 410 | 12 | Present invention |
| 130 | 2.3 | 941 | 0.2 | 0.13 | 414 | 14 | same |
| 131 | 2.2 | 916 | 0.3 | 0.12 | 423 | 11 | same |
| 132 | 2.0 | 925 | 0.3 | 0.11 | 406 | 13 | same | and 80% (ΔRth=Rth 10% RH–Rth 80% RH), equilibrium moisture content at 25° C. and 80% RH and moisture permeability (based on 80 μm) at 60° C. and 95% RH over 24 hours. As a result, it was confirmed that sample Nos. 133 to 139 using cellulose acylate with the total degree of substitution of 2.85 or 2.70, which further contain the optical anisotropy reducing agent and the chromatic dispersion regulating agent, showed improvement in all measurements compared with comparative sample Nos. 008 to 010 of Preparative Example 3.

TABLE 6

| Sample No. | Additive solution | Methylene chloride | Methanol | Degree of cellulose acylate substitution | Optical anisotropy reducing agent Compound | content |
|---|---|---|---|---|---|---|
| 133 | B-26 | 80 parts by weight | 20 parts by weight | 2.85 (acetyl 2.06 + propionyl 0.79) | A-19 | 40 parts by weight |
| 134 | B-27 | same | same | same | A-19 | 40 parts by weight |
| 135 | B-28 | same | same | same | I-1 | 67 parts by weight |
| 136 | B-29 | same | same | same | I-1 | 67 parts by weight |
| 137 | B-30 | same | same | same | J-1 | 67 parts by weight |
| 138 | B-31 | same | same | 2.70 (acetyl 1.93 + propionyl 0.77) | A-19 | 40 parts by weight |
| 139 | B-31 | same | same | same | I-1 | 20 parts by weight |
|  |  |  |  |  | J-1 | 49 parts by weight |

| Sample No. | Wavelength dispersion regulating agent Compound | content | ΔRth Rth 10% RH – Rth 80% RH | Water content 80% RH | Moisture permeability (based on 80 μm) | Note |
|---|---|---|---|---|---|---|
| 133 | absence | — | 12.3 | 3.1 | 1126 | Present invention |
| 134 | UV-102 | 4 parts by weight | 10.5 | 2.7 | 854 | same |
| 135 | UV-102 | 4 parts by weight | 5.2 | 2.3 | 844 | same |
| 136 | UV-21 | 2 parts by weight | 4.3 | 2.2 | 836 | same |
|  | UV-22 | 2 parts by weight |  |  |  |  |
| 137 | UV-21 | 2 parts by weight | 5.6 | 2.8 | 924 | same |
|  | UV-22 | 2 parts by weight |  |  |  |  |
| 138 | UV-102 | 4 parts by weight | 14.0 | 2.9 | 934 | same |
| 139 | UV-21 | 15 parts by weight | 13.4 | 2.6 | 864 | same |
|  | UV-22 | 6 parts by weight |  |  |  |  |

Preparative Example 6

(Production of Cellulose Acylate Film)

Cellulose acetate film sample Nos. 140 to 145 of 80 or 40 μm in thickness were prepared in the same manner as in Preparative Example 3 using cellulose acylate with degree of acetyl substitution of 2.92, except that the compositions listed in Table 7 below were used (Table 7).

TABLE 7

| Sample No. | Additive solution | Methylene chloride | Methanol | Degree of cellulose acylate substitution | Film thickness (μm) | Optical anisotropy reducing agent compound | content | Wavelength dispersion regulating agent Compound | content |
|---|---|---|---|---|---|---|---|---|---|
| 140 | B-32 | 80 parts by weight | 20 parts by weight | 2.92 | 80 | A-19 | 50 parts by weight | UV-102 | 8 parts by weight |

TABLE 7-continued

| Sample No. | Additive solution | Methylene chloride | Methanol | Degree of cellulose acylate substitution | Film thickness (μm) | Optical anisotropy reducing agent compound | content | Wavelength dispersion regulating agent Compound | content |
|---|---|---|---|---|---|---|---|---|---|
| 141 | B-33 | same | same | 2.92 | 80 | A-19 | 58 parts by weight | UV-102 | 8 parts by weight |
| 142 | B-34 | same | same | 2.92 | 40 | A-19 | 58 parts by weight | UV-102 | 8 parts by weight |
| 143 | B-35 | same | same | 2.92 | 80 | FA-1 | 40 parts by weight | UV-102 | 8 parts by weight |
| 144 | B-36 | same | same | 2.92 | 80 | FB-6 | 40 parts by weight | UV-102 | 8 parts by weight |
| 145 | B-37 | same | same | 2.92 | 80 | FB-10 | 40 parts by weight | UV-102 | 8 parts by weight |

Preparative Example 7

(Production of Cellulose Acylate Film)

Cellulose acetate film sample Nos. 146 to 150 of 80 or 40 μm in thickness were prepared in the same manner as in Preparative Example 3 using cellulose acylate with total degree of substitution of 2.70 (degree of acetyl substitution of 1.0+degree of butyryl substitution of 1.7), except that the compositions listed in Table 8 below were used (Table 8).

TABLE 8

| Sample No. | Additive solution | Methylene chloride | Methanol | Degree of cellulose acylate substitution | Film thickness (μm) | Optical anisotropy reducing agent compound | content | Wavelength dispersion regulating agent Compound | content |
|---|---|---|---|---|---|---|---|---|---|
| 146 | B-38 | 80 parts by weight | 20 parts by weight | 2.70 (acetyl 1.0 + butyryl 1.7) | 80 | A-19 | 50 parts by weight | UV-102 | 8 parts by weight |
| 147 | B-39 | same | same | 2.70 (acetyl 1.0 + butyryl 1.7) | 80 | A-19 | 58 parts by weight | UV-102 | 8 parts by weight |
| 148 | B-40 | same | same | 2.70 (acetyl 1.0 + butyryl 1.7) | 40 | A-19 | 58 parts by weight | UV-102 | 8 parts by weight |
| 149 | B-41 | same | same | 2.70 (acetyl 1.0 + butyryl 1.7) | 80 | FB-6 | 40 parts by weight | UV-102 | 8 parts by weight |
| 150 | B-42 | same | same | 2.70 (acetyl 1.0 + butyryl 1.7) | 80 | FB-10 | 40 parts by weight | UV-102 | 8 parts by weight |

The results of evaluation on the optical characteristics of cellulose acylate film sample Nos. 101 to 139 and comparative sample Nos. 001 to 011 obtained in Preparative Examples 1 to 5 are described in Tables 9 to 12. Sample Nos. 101 to 139 with use of a compound for reducing optical anisotropy showed sufficient reducing of Re (630) and Rth (630) together, compared with comparative sample Nos. 001 to 006 and 008 to 009 without use of a compound for reducing optical anisotropy or comparative sample Nos. 007 and 010 with use of biphenyldiphenyl phosphate (BDP), which is a general plasticizer that has Log P value of 7.3 and is beyond the scope of the invention, thus closing near to optically isotropic. Also, the samples with combined use of a compound for regulating chromatic dispersion and a compound for reducing optical anisotropy showed sufficient reducing of $|Re_{(400)}-Re_{(700)}|$ and $|Rth_{(400)}-Rth_{(700)}|$ together, compared with the comparative samples, thus closing the chromatic dispersion to zero.

TABLE 9

| Sample name | | Described Preparative Example | Film thickness (μm) | Degree of cellulose acylate substitution | Optical anisotropy reducing agent | (LogP value) |
|---|---|---|---|---|---|---|
| Comp. sample | 1 | 1 | 80 | 2.86 | absence | — |
| Comp. sample | 2 | 1 | 80 | 2.86 | absence | — |
| Comp. sample | 3 | 1 | 80 | 2.86 | absence | — |
| Comp. sample | 4 | 2 | 80 | 2.86 | absence | — |
| Comp. sample | 5 | 2 | 80 | 2.86 | absence | — |
| Comp. sample | 6 | 2 | 80 | 2.86 | absence | — |
| Comp. sample | 7 | 2 | 80 | 2.86 | (BDP) (corresponding to 12%) | 7.3 |
| Present invention | 101 | 1 | 80 | 2.86 | A-19 (corresponding to 5.9%) | 2.9 |

TABLE 9-continued

| | | | | | | |
|---|---|---|---|---|---|---|
| Present invention | 102 | 1 | 80 | 2.86 | A-19 (corresponding to 12%) | 2.9 |
| Present invention | 103 | 1 | 80 | 2.86 | A-19 (corresponding to 12%) | 2.9 |
| Present invention | 104 | 1 | 60 | 2.86 | A-19 (corresponding to 12%) | 2.9 |
| Present invention | 105 | 1 | 40 | 2.86 | A-19 (corresponding to 12%) | 2.9 |
| Present invention | 106 | 2 | 80 | 2.86 | C-1 (corresponding to 12%) | 1.2 |
| Present invention | 107 | 2 | 80 | 2.86 | A-7 (corresponding to 12%) | 6.4 |
| Present invention | 108 | 2 | 80 | 2.86 | B-30 (corresponding to 12%) | 3.1 |
| Present invention | 109 | 2 | 80 | 2.86 | PL-1 (corresponding to 12%) | 1.2 |
| Present invention | 110 | 2 | 80 | 2.86 | PL-19 (corresponding to 12%) | 2.4 |
| Present invention | 111 | 2 | 80 | 2.86 | D-7 (corresponding to 12%) | 3.7 |
| Present invention | 112 | 2 | 80 | 2.86 | E-1 (corresponding to 12%) | 2.8 |
| Present invention | 113 | 2 | 80 | 2.86 | I-10 (corresponding to 12%) | 3.0 |
| Present invention | 114 | 2 | 80 | 2.86 | L-1 (corresponding to 12%) | 4.0 |

| Sample name | | $Re_{(630)}$/ nm | $Rth_{(630)}$/ nm | Wavelength dispersion regulating agent | (LogP value) | $|Re_{(400)} - Re_{(700)}|$/ nm | $|Rth_{(400)} - Rth_{(700)}|$/ nm |
|---|---|---|---|---|---|---|---|
| Comp. sample | 1 | 5.1 | 34.0 | absence | — | 13.0 | 29.3 |
| Comp. sample | 2 | 4.5 | 39.3 | UV-102 (corresponding to 0.9%) | 5.6 | 11.0 | 20.7 |
| Comp. sample | 3 | 8.1 | 42.2 | UV-102 (corresponding to 1.8%) | 5.6 | 6.1 | 12.2 |
| Comp. sample | 4 | 6.2 | 35.4 | absence | — | 14.0 | 42.1 |
| Comp. sample | 5 | 4.1 | 30.2 | UV-102 (corresponding to 0.9%) | 5.6 | 11.0 | 26.0 |
| Comp. sample | 6 | 5.8 | 35.2 | UV-102 (corresponding to 1.8%) | 5.6 | 8.1 | 22.4 |
| Comp. sample | 7 | 5.6 | 39.5 | absence | — | 12.0 | 38.0 |
| Present invention | 101 | 1.8 | 23.8 | absence | — | 6.0 | 23.1 |
| Present invention | 102 | 1.9 | 7.2 | absence | — | 5.2 | 24.4 |
| Present invention | 103 | 1.9 | 14.9 | UV-102 (corresponding to 1.8%) | 5.6 | 1.1 | 14.7 |
| Present invention | 104 | 2.0 | 12.3 | UV-102 (corresponding to 1.8%) | 5.6 | 0.8 | 14.2 |
| Present invention | 105 | 1.3 | 8.2 | UV-102 (corresponding to 1.8%) | 5.6 | 0.1 | 13.8 |
| Present invention | 106 | 1.3 | −22.5 | absence | — | 9.0 | 21.5 |
| Present invention | 107 | 0.5 | −2.1 | absence | — | 3.2 | 13.0 |
| Present invention | 108 | 1.1 | 5.1 | absence | — | 3.4 | 14.2 |
| Present invention | 109 | 0.8 | −7.6 | absence | — | 4.0 | 14.5 |
| Present invention | 110 | 1.0 | 7.3 | absence | — | 5.0 | 11.0 |
| Present invention | 111 | 1.7 | −9.9 | absence | — | 5.0 | 18.1 |
| Present invention | 112 | 0.8 | 6.5 | absence | — | 6.0 | 17.4 |
| Present invention | 113 | 0.2 | 17.1 | UV-21 + UV-22 (total corresponding to 1.8%) | 10.10 | 4.8 | 14.8 |
| Present invention | 114 | 0.4 | 11.4 | UV-21 + UV-22 (total corresponding to 1.8%) | 10.10 | 4.4 | 13.2 |

TABLE 10

| Sample name | | Described Preparative Example | Film thickness (μm) | Degree of cellulose acylate substitution | Optical anisotropy reducing agent | (LogP value) |
|---|---|---|---|---|---|---|
| Comp. sample | 8 | 3 | 40 | 2.86 | absence | — |
| Comp. sample | 9 | 3 | 40 | 2.86 | absence | — |
| Comp. sample | 10 | 3 | 40 | 2.86 | (BDP) (corresponding to 12%) | 7.3 |
| Comp. sample | 11 | 3 | 40 | 2.86 | (BDP) (corresponding to 47%) | 7.3 |
| Present invention | 115 | 3 | 40 | 2.86 | A-19 (corresponding to 12%) | 2.9 |

TABLE 10-continued

| Sample name | | | | | | |
|---|---|---|---|---|---|---|
| Present invention | 116 | 3 | 40 | 2.86 | A-19 (corresponding to 12%) | 2.9 |
| Present invention | 117 | 3 | 40 | 2.86 | A-35 (corresponding to 12%) | 2.9 |
| Present invention | 118 | 3 | 40 | 2.86 | B-30 (corresponding to 12%) | 3.4 |
| Present invention | 119 | 3 | 40 | 2.86 | PL-19 (corresponding to 12%) | 2.4 |
| Present invention | 120 | 3 | 40 | 2.86 | D-21 (corresponding to 20%) | 6.8 |
| Present invention | 121 | 3 | 40 | 2.86 | E-2 (corresponding to 20%) | 2.1 |
| Present invention | 122 | 3 | 40 | 2.86 | I-1 (corresponding to 20%) | 6.2 |
| Present invention | 123 | 3 | 40 | 2.86 | J-1 (corresponding to 20%) | 1.9 |
| Present invention | 124 | 3 | 40 | 2.86 | K-1 (corresponding to 20%) | 5.0 |
| Present invention | 125 | 3 | 40 | 2.86 | L-5 (corresponding to 20%) | — |
| Present invention | 126 | 3 | 40 | 2.86 | K-4 + K-5 (total corresponding to 20%) | 5.73, — |
| Present invention | 127 | 3 | 40 | 2.86 | K-4 + K-5 (total corresponding to 20%) | 5.73, — |
| Present invention | 128 | 3 | 40 | 2.86 | I-1 (corresponding to 6%) J-1 (corresponding to 15%) | 6.16 1.88 |

| Sample name | $Re_{(630)}$/ nm | $Rth_{(630)}$/ nm | Wavelength dispersion regulating agent | (LogP value) | $|Re_{(400)} - Re_{(700)}|$/ nm | $|Rth_{(400)} - Rth_{(700)}|$/ nm |
|---|---|---|---|---|---|---|
| Comp. sample | 8 | 3.4 | 27.5 | absence | — | 13.0 | 40.0 |
| Comp. sample | 9 | 2.4 | 26.2 | UV-3 + UV-7 (total corresponding to 1.8%) | 7.1, 7.4 | 7.6 | 22.0 |
| Comp. sample | 10 | 3.1 | 30.2 | UV-3 + UV-7 (total corresponding to 1.8%) | 7.1, 7.4 | 11.0 | 21.2 |
| Comp. sample | 11 | 6.5 | 45.5 | UV-3 + UV-7 (total corresponding to 1.8%) | 7.1, 7.4 | 10.5 | 17.2 |
| Present invention | 115 | 0.3 | 3.2 | UV-102 (corresponding to 1.8%) | 5.6 | 1.2 | 7.5 |
| Present invention | 116 | 0.5 | 0.2 | UV-102 (corresponding to 3.6%) | 5.6 | 1.0 | 2.6 |
| Present invention | 117 | 1.2 | −10.2 | UV-21 + UV-22 (total corresponding to 1.8%) | 10, 10 | 3.2 | 12.3 |
| Present invention | 118 | 0.3 | 2.4 | UV-3 + UV-7 (total corresponding to 1.8%) | 7.1, 7.4 | 2.4 | 12.8 |
| Present invention | 119 | 1.1 | 12.4 | UV-209 (corresponding to 1.8%) | 6.4 | 2.2 | 12.3 |
| Present invention | 120 | 0.2 | −4.3 | UV-3 + UV-7 (total corresponding to 1.8%) | 7.1, 7.4 | 1.8 | 12.5 |
| Present invention | 121 | 0.8 | 4.2 | UV-209 (corresponding to 1.8%) | 6.4 | 2.1 | 10.9 |
| Present invention | 122 | 1.3 | 5.3 | UV-3 + UV-7 (total corresponding to 1.8%) | 7.1, 7.4 | 2.0 | 11.3 |
| Present invention | 123 | 1.7 | 6.2 | UV-21 + UV-22 (total corresponding to 1.8%) | 10, 10 | 1.8 | 12.7 |
| Present invention | 124 | 0.8 | 3.2 | UV-21 + UV-22 (total corresponding to 1.8%) | 10, 10 | 0.7 | 9.7 |
| Present invention | 125 | 1.1 | 4.1 | UV-21 + UV-22 (total corresponding to 1.8%) | 10, 10 | 1.4 | 8.5 |
| Present invention | 126 | 0.6 | 2.8 | UV-21 + UV-22 + UV-23 (total corresponding to 2.5%) | 10, 10, 8.6 | 0.8 | 5.2 |
| Present invention | 127 | 0.2 | 0.4 | UV-21 + UV-22 (total corresponding to 2.0%) | 10, 10 | 0.7 | 6.4 |
| Present invention | 128 | 0.6 | 3.2 | UV-21 + UV-22 (total corresponding to 9.5%) | 10, 10 | 2.1 | 6.3 |

TABLE 11

| Sample name | | Described Preparative Example | Film thickness (μm) | Degree of cellulose acylate substitution | Optical anisotropy reducing agent | (LogP value) |
|---|---|---|---|---|---|---|
| Present invention | 129 | 4 | 40 | 2.92 | A-19 (corresponding to 12%) | 2.9 |
| Present invention | 130 | 4 | 40 | 2.92 | A-19 (corresponding to 12%) | 2.9 |

TABLE 11-continued

| Sample name | | | | | | |
|---|---|---|---|---|---|---|
| Present invention | 131 | 4 | 40 | 2.92 | K-4 + K-5 (total corresponding to 20%) | 5.73, — |
| Present invention | 132 | 4 | 40 | 2.92 | L-5 (corresponding to 20%) | — |
| Present invention | 133 | 5 | 40 | 2.85 (acetyl 2.06 + propionyl 0.79) | A-19 (corresponding to 12%) | 2.9 |
| Present invention | 134 | 5 | 40 | 2.85 (acetyl 2.06 + propionyl 0.79) | A-19 (corresponding to 12%) | 2.9 |
| Present invention | 135 | 5 | 40 | 2.85 (acetyl 2.06 + propionyl 0.79) | I-1 (corresponding to 20%) | 6.2 |
| Present invention | 136 | 5 | 40 | 2.85 (acetyl 2.06 + propionyl 0.79) | I-1 (corresponding to 20%) | 6.2 |
| Present invention | 137 | 5 | 40 | 2.85 (acetyl 2.06 + propionyl 0.79) | J-1 (corresponding to 20%) | 1.9 |
| Present invention | 138 | 5 | 40 | 2.70 (acetyl 1.93 + propionyl 0.77) | A-19 (corresponding to 12%) | 2.9 |
| Present invention | 139 | 5 | 40 | 2.70 (acetyl 1.93 + propionyl 0.77) | I-1 (corresponding to 6%) J-1 (corresponding to 15%) | 6.16 1.88 |

| Sample name | | $Re_{(630)}$/ nm | $Rth_{(630)}$/ nm | Wavelength dispersion regulating agent | (LogP value) | $|Re_{(400)} - Re_{(700)}|$/ nm | $|Rth_{(400)} - Rth_{(700)}|$/ nm |
|---|---|---|---|---|---|---|---|
| Present invention | 129 | 0.1 | −2.8 | absence | — | 1.6 | 19.3 |
| Present invention | 130 | 0.1 | −5.0 | UV-102 (corresponding to 1.8%) | 5.6 | 0.8 | 5.8 |
| Present invention | 131 | 0.1 | −2.4 | UV-21 + UV-22 (total corresponding to 1.8%) | 10, 10 | 1.5 | 10.6 |
| Present invention | 132 | 0.2 | −1.2 | UV-21 + UV-22 (total corresponding to 1.8%) | 10, 10 | 1.3 | 9.2 |
| Present invention | 133 | 0.3 | −8.2 | absence | — | 1.4 | 14.2 |
| Present invention | 134 | 0.4 | −8.2 | UV-102 (corresponding to 1.8%) | 5.6 | 0.7 | 5.2 |
| Present invention | 135 | 0.2 | −3.3 | UV-102 (corresponding to 1.8%) | 5.6 | 0.8 | 4.6 |
| Present invention | 136 | 0.1 | −3.0 | UV-21 + UV-22 (total corresponding to 1.8%) | 10, 10 | 1.2 | 8.6 |
| Present invention | 137 | 0.1 | −2.1 | UV-21 + UV-22 (total corresponding to 1.8%) | 10, 10 | 1.5 | 9.2 |
| Present invention | 138 | 0.3 | 3.2 | UV-102 (corresponding to 1.8%) | 5.6 | 0.5 | 4.3 |
| Present invention | 139 | 0.3 | 6.4 | UV-21 + UV-22 (total corresponding to 9.5%) | 10, 10 | 1.7 | 8.4 |

TABLE 12

| Sample name | | Described Preparative Example | Film thickness (μm) | Degree of cellulose acylate substitution | Optical anisotropy reducing agent | (LogP value) |
|---|---|---|---|---|---|---|
| Present invention | 140 | 6 | 80 | 2.92 | A-19 (corresponding to 15%) | 2.8 |
| Present invention | 141 | 6 | 80 | 2.92 | A-19 (corresponding to 17.5%) | 2.9 |
| Present invention | 142 | 6 | 40 | 2.92 | A-19 (corresponding to 17.5%) | 2.9 |
| Present invention | 143 | 6 | 80 | 2.92 | FA-1 (corresponding to 12%) | 2.4 |
| Present invention | 144 | 6 | 80 | 2.92 | FB-8 (corresponding to 12%) | 5.3 |
| Present invention | 145 | 6 | 80 | 2.92 | FB-10 (corresponding to 12%) | 4.8 |
| Present invention | 146 | 7 | 80 | 2.70 (acetyl 1.0 + butyryl 1.7) | A-19 (corresponding to 15%) | 2.9 |
| Present invention | 147 | 7 | 80 | 2.70 (acetyl 1.0 + butyryl 1.7) | A-19 (corresponding to 17.5%) | 2.9 |
| Present invention | 148 | 7 | 40 | 2.70 (acetyl 1.0 + butyryl 1.7) | A-19 (corresponding to 17.5%) | 2.9 |
| Present invention | 149 | 7 | 80 | 2.70 (acetyl 1.0 + butyryl 1.7) | FB-6 (corresponding to 12%) | 5.3 |
| Present invention | 150 | 7 | 80 | 2.70 (acetyl 1.0 + butyryl 1.7) | FB-10 (corresponding to 12%) | 4.8 |

TABLE 12-continued

| Sample name | | $Re_{(630)}/$ nm | $Rth_{(630)}/$ nm | Wavelength dispersion regulating agent | (LogP value) | $\|Re_{(400)} - Re_{(700)}\|/$ nm | $\|Rth_{(400)} - Rth_{(700)}\|/$ nm |
|---|---|---|---|---|---|---|---|
| Present invention | 140 | 0.5 | −4.2 | UV-102 (corresponding to 2.4%) | 5.6 | 1.1 | 12.5 |
| Present invention | 141 | 0.4 | −6.2 | UV-102 (corresponding to 2.4%) | 5.6 | 0.8 | 11.6 |
| Present invention | 142 | 0.2 | −3.4 | UV-102 (corresponding to 2.4%) | 5.6 | 0.5 | 5.2 |
| Present invention | 143 | 0.3 | −11.2 | UV-102 (corresponding to 2.4%) | 5.6 | 0.8 | 14.5 |
| Present invention | 144 | 0.6 | −2.1 | UV-102 (corresponding to 2.4%) | 5.6 | 0.8 | 15.2 |
| Present invention | 145 | 0.5 | −4.8 | UV-102 (corresponding to 2.4%) | 5.6 | 0.8 | 15.1 |
| Present invention | 146 | 1.1 | −4.8 | UV-102 (corresponding to 2.4%) | 5.6 | 0.6 | 12.4 |
| Present invention | 147 | 0.8 | −1.6 | UV-102 (corresponding to 2.4%) | 5.6 | 0.5 | 12.3 |
| Present invention | 148 | 0.8 | −8.5 | UV-102 (corresponding to 2.4%) | 5.6 | 0.4 | 5.3 |
| Present invention | 149 | 0.8 | 0.5 | UV-102 (corresponding to 2.4%) | 5.6 | 0.6 | 16.3 |
| Present invention | 150 | 0.9 | −2.6 | UV-102 (corresponding to 2.4%) | 5.6 | 0.7 | 16.4 |

Reference Example 1

(Production of Polarizer)

Cellulose acetate film sample No. 101 obtained in Preparative Example 1 was immersed in a 1.5 N aqueous solution of sodium hydroxide at 55° C. for 2 minutes. The sample was washed in a water wash bath at room temperature, and neutralized using 0.1 N sulfuric acid at 30° C. It was washed again in a water wash bath at room temperature and then hot air-dried at 100° C. Thereby, the surface of the cellulose acylate film was saponified.

Subsequently, the roll-shaped polyvinyl alcohol film of 80 µm in thickness was continuously stretched to five times its original length in an aqueous solution of iodine, and dried to give a polarizing film. Two sheets of cellulose acylate film sample No. 101, which were alkali-saponified with a 3% aqueous solution of polyvinyl alcohol (PVA-117H, Kuraray Co., Ltd.) as an adhesive, were prepared. These two sheets of film were adhered to the polarizing film by having the polarizing film in between, thus a polarizer with both sides protected by cellulose acylate films No. 101 was obtained. In this case, the cellulose acylate films sample No. 101 of both sides were adhered to the polarizing film such that the slow axes in the cellulose acylate films were parallel to the transmission axis in the polarizing film. In the same manner, polarizers were also produced with respect to sample Nos. 102 to 150 of Preparative Examples 1 to 7 and comparative sample No. 004 of Preparative Example 2. Cellulose acylate film sample Nos. 101 to 150 and comparative sample No. 004 are sufficient in adhesiveness with stretched polyvinyl alcohols, and have excellent processability of polarizer. Hereinafter, these polarizers are referred to as polarizers 101 to 150 and polarizer 004, respectively.

Reference Comparative Example 1

With regard to Reference Example 1, a polarizer was produced in the same manner, except that two sheets of commercially available polycarbonate film "PANLITE C1400" (manufactured by Teijin Chemicals Ltd.) were used instead of two sheets of the above-mentioned cellulose acylate film for protection of a polarizing film. However, the polarizer was insufficient in adhesiveness with stretched polyvinyl alcohols, and the polycarbonate films did not have functions as a protective film on the polarizing film. Moreover, there were problems in processability of polarizer.

Reference Comparative Example 2

With regard to Reference Example 1, a polarizer was produced in the same manner, except that two sheets of ARTON film (manufactured by JSR Corp.) of 80 µm in thickness were used instead of two sheets of the above-mentioned cellulose acylate film for protection of a polarizing film. However, the polarizer was insufficient in adhesiveness with stretched polyvinyl alcohols, and the ARTON films did not have functions as a protective film on the polarizing film. Moreover, there were problems in processability of polarizer.

(Durability of Polarizer)

Polarizers, which were produced by using cellulose acylate film sample Nos. 101 to 150 and comparative sample No 004 prepared in Reference Example 1, were left to stand in the conditions at 60° C. and 95% RH for 500 hours. Then, the degree of polarization was evaluated. As a result, it was confirmed that polarization characteristics of polarizers using sample Nos. 101 to 150 was superior to that of a polarizer using sample No. 004, and that by adding a compound for reducing the optical anisotropy or the chromatic dispersion regulating agent (comparative sample No. 004 added neither of them), durability of a polarizer processed with cellulose acylate film was improved.

Example 1

Evaluation of Mounting on VA Type Liquid Crystal Display Device

<Production of Polarizer>

A polarizing film was produced by adsorbing iodine on a stretched polyvinyl alcohol film, and by using a polyvinyl alcohol-based adhesive, a predetermined cellulose acylate film as a protective film 1 of Table 13 was adhered to one side of the polarizing film. Subsequently, saponification treatment was carried out on a commercially available cellulose acetate film (FUJITACK TF80UL, manufactured by Fuji Photofilm Co., Ltd.), and the saponified film was adhered to the opposite side of the above-mentioned polarizing film by using a polyvinyl alcohol-based adhesive, thus formed a first polarizer for use in devices of Examples 1 to 6 and devices of Comparative Examples 1 to 5.

Next, by using a polyvinyl alcohol-based adhesive, a predetermined cellulose acylate film as a protective film 1 of Table 13 was adhered to one side of the polarizing film. Subsequently, saponification treatment was carried out on a commercially available cellulose acetate film (FUJITACK TF80UL, manufactured by Fuji Photofilm Co., Ltd.), and the saponified film was adhered to the opposite side of the above-mentioned polarizing film by using a polyvinyl alcohol-based adhesive, thus formed a second polarizer for use in devices of Examples 1 to 6 and devices of Comparative Examples 1 to 5.

<Production of Retardation Film>

Retardation film 1 with Re(589) of 77 nm and Rth(589) of 47 nm was obtained in the same manner as the optical compensatory layer A described in Example 1 of JP-A No. 2003-315556. Further, retardation film 2 with Re(589) of 1.5 nm and Rth(589) of 207 nm was obtained in the same manner as the optical compensatory layer B described in Example 2 of JP-A No. 2003-315556.

(Method for Measurement of In-Plane Retardation (Re) and Retardation in the Film Thickness Direction (Rth))

A sample of 30 mm×40 mm was conditioned in humidity at 25° C. and 60% RH for 2 hours and then the $Re_{(\lambda)}$ was measured by the incidence of a light having a wavelength $\lambda$ nm in a normal direction of the film with the use of an automatic birefringence meter (KOBRA-21ADH, manufactured by Oji Scientific Instruments). In addition, $Rth_{(\lambda)}$ was determined by using a presumptive average refractive index value of 1.48 and the film thickness, based on retardation values measured in three directions, i.e., $Re_{(\lambda)}$ as described above, a retardation value measured by the incidence of the light having the wavelength of $\lambda$ nm in a direction inclining at an angle of +40° to the normal direction of the film using an in-plane slow axis as an inclined axis, and a retardation value measured by the incidence of the light having the wavelength of $\lambda$ nm in a direction inclining at an angle of −40° to the normal direction of the film using an in-plane slow axis as an inclined axis.

With regard to retardation film 1, the average refractive index of 1.52 was used.

With regard to retardation film 2, the average refractive index of 1.6 was used.

<Mounting on VA Type Liquid Crystal Display Device>

Retardation film 1 obtained as in the above and the first polarizer were adhered using an adhesive in a combination shown in Table 13. They were adhered such that nx direction of the retardation film 1 was perpendicular to the absorption axis of the first polarizer. Next, retardation film 2 and the second polarizer were adhered using an adhesive in a combination shown in Table 13. They were adhered such that nx direction of the retardation film 2 was parallel with the absorption axis of the second polarizer.

Adhered product 1 from such retardation film 1 and the first polarizer and adhered product 2 from the retardation film 2 and the second polarizer were combined as shown in Table 13, and such combinations were adhered to a VA type liquid crystal panel respectively using an adhesive.

Here, the combined product 1 was arranged on the visible side such that the absorption axis of the first polarizer to be in horizontal direction of the panel. Meanwhile, the combined product 2 was arranged on the back light side such that the absorption axis of the second polarizer to be in perpendicular to the panel.

Further, the retardation film 1 of the adhered product 1 was adhered on the VA type liquid crystal panel side, and on the opposite side of the liquid crystal cell the retardation film of the adhered product 2 was adhered on the VA type liquid crystal panel side by introducing an adhesive, respectively.

<Evaluation Method>

With regard to liquid crystal display devices obtained as in the above, light leakage in dark state was measured in the directions of azimuthal angle of 45° and polar angle of 70° from the frontal device. The smaller the value was the less light leakage occurred in the direction of an angle of 45° and the better contrast of the display device displayed. Moreover, viewing angle characteristics of liquid crystal display devices can be evaluated.

⊚: Light leakage cannot be observed

○: Small degree of light leakage

Δ: Medium degree of light leakage

Δx: Large light leakage is occurred (unacceptable)

x: Strong light leakage is occurred (unacceptable)

With regard to shift in black color, all shifts (Δuv) in the direction of azimuthal angle in the polar angle of 60° were measured.

⊚: Extremely small color shift

○: Small color shift

Δ: Medium color shift

Δx: Color shift is occurred (unacceptable)

x: Strong color shift is occurred (unacceptable)

With regard to corner staining, evaluation of light leakage in the dark state was carried out by thermal treating the liquid crystal display device at 50° C. and 95% RH for 120 hours, conditioning in humidity at 25° C. and 60% RH for 20 hours, and then lighting the backlight. For the evaluation, 20-inch liquid crystal panel was used.

⊚: No light leakage at four corners

○: Small light leakage occurred at any one of four corners

Δ: Light leakage occurred at 1 to 3 places of four corners

Δx: Light leakage occurred at four corners (unacceptable)

x: Recognizable light leakage occurred at four corners (unacceptable)

<Evaluation Results>

As shown in Table 13, devices of Examples 1 to 6 were excellent in all or any one of light leakage in dark state, shift in black color and corner staining compared with devices of Comparative Example 1 to 5. Therefore, a liquid crystal display device with excellent viewing angle characteristics, reduced corner staining and excellent display characteristics can be constructed by arranging a retardation film between each polarizer and liquid crystal panel, or by using cellulose acylate film, which satisfies $0 \leq Re_{(630)} \leq 10$ or $|Rth_{(630)}| \leq 25$, as a protective film of a polarizer.

TABLE 13

| | Protective Film 1 | Protective Film 2 | Retardation Film 1 | Retardation Film 2 | Light leakage in black display | shift in black color | corner staining |
|---|---|---|---|---|---|---|---|
| Device of Example 1 | FUJITACK TF80UL Re 3 nm Rth 45 nm | Sample No. 101 Re 1.8 nm Rth 23 nm | Re 77 nm Rth 47 nm | Re 1.5 nm Rth 207 nm | Δ | Δ | Δ |
| Device of Example 2 | FUJITACK TF80UL Re 3 nm Rth 45 nm | Sample No. 102 Re 1.9 nm Rth 7.2 nm | Re 77 nm Rth 47 nm | Re 1.5 nm Rth 207 nm | Δ | Δ | ○Δ |
| Device of Example 3 | FUJITACK TF80UL Re 3 nm Rth 45 nm | Sample No. 107 Re 0.5 nm Rth −2.1 nm | Re 77 nm Rth 47 nm | Re 1.5 nm Rth 207 nm | ○Δ | ○Δ | ○ |
| Device of Example 4 | Sample No. 101 Re 1.8 nm Rth 23 nm | Sample No. 101 Re 1.8 nm Rth 23 nm | Re 77 nm Rth 47 nm | Re 1.5 nm Rth 207 nm | ○ | ○ | ○Δ |
| Device of Example 5 | Sample No. 102 Re 1.9 nm Rth 7.2 nm | Sample No. 102 Re 1.9 nm Rth 7.2 nm | Re 77 nm Rth 47 nm | Re 1.5 nm Rth 207 nm | ○ | ○ | ○ |
| Device of Example 6 | Sample No. 107 Re 0.5 nm Rth −2.1 nm | Sample No. 107 Re 0.5 nm Rth −2.1 nm | Re 77 nm Rth 47 nm | Re 1.5 nm Rth 207 nm | ◎ | ◎ | ◎ |
| Device of Comparative Example 1 | FUJITACKTF80UL Re 3 nm Rth 45 nm | Comparative sample No. 006 Re 5.8 nm Rth 35.2 nm | Re 77 nm Rth 47 nm | Re 1.5 nm Rth 207 nm | Δ | Δ | X |
| Device of Comparative Example 2 | Comparative sample No. 006 Re 5.8 nm Rth 35.2 nm | Comparative sample No. 006 Re 5.8 nm Rth 35.2 nm | Re 7 nm Rth 47 nm | Re 1.5 nm Rth 207 nm | Δ | Δ | ΔX |
| Device of Comparative Example 3 | Sample No. 107 Re 0.5 nm Rth −2.1 nm | Sample No. 107 Re 0.5 nm Rth −2.1 nm | absence | Re 1.5 nm Rth 207 nm | ΔX | ΔX | ◎ |
| Device of Comparative Example 4 | Sample No. 107 Re 0.5 nm Rth −2.1 nm | Sample No. 107 Re 0.5 nm Rth −2.1 nm | Re 77 nm Rth 47 nm | absence | ΔX | ΔX | ◎ |
| Device of Comparative Example 5 | Sample No. 107 Re 0.5 nm Rth −2.1 nm | Sample No. 107 Re 0.5 nm Rth −2.1 nm | absence | absence | X | X | ◎ |

Second Embodiment

Example 2

A liquid crystal display device having constituents as same as those shown in FIG. 8 was produced. In particular, with regard to the constituents of a liquid crystal display device, which are laminated with, from the perspective direction (top), an upper polarizer (a protective film (not shown), a polarizing film 11, a cellulose acylate film 13), an optical compensatory film 15, a liquid crystal cell (an upper substrate 16, a liquid crystal layer 17, a lower substrate 18), an optical compensatory film 19 and a lower polarizer (a cellulose acylate film 101, a protective film (not shown)), and which are further arranged with a light source as a back light (not shown), an optical simulation was performed and verification of the effect was carried out. As for optical calculation, LCD MASTER Ver. 6.08 (manufactured by Shintech Inc.) was used. As for liquid crystal cells or electrodes, substrates and polarizer, the values of materials used in the related arts for liquid crystal display were used without modification. As for liquid crystal material, a liquid crystal material having negative dielectric anisotropy of $\Delta\in=-4.2$ was used. Liquid crystal cell was arranged in the direction at a pretilt angle of 89.9° which is nearly perpendicular; cell gap of substrates was 3.6 micron; liquid crystal retardation (i.e. product ($\Delta n \cdot d$) of thickness d (micron) of the liquid crystal layer and refraction index anisotropy $\Delta n$) at a wavelength of 450 nm was 318 nm, at a wavelength of 550 nm was 300 nm and at a wavelength of 650 nm was 295 nm. The values of Re and Rth in each wavelength of optical compensatory film 15+cellulose acylate film 13 and optical compensatory film 19+cellulose acylate film 101 are set with values listed in Table 14, respectively. Further, as for cellulose acylate film, it was not influenced by the wavelength, and $Rth_2$ was 3 nm and $Re_2$ was 1 nm. As for light source, C light source attached to LCD MASTER was used.

In addition, according to the components of liquid crystal display device in FIG. 8, exactly the same results can be obtained even when the position of the backlight and the observer is changed from top and bottom.

Further, as Comparative Example, an optical simulation was also carried out in the same manner as for a liquid crystal display device having the completely same structure as above, except that the values of $Re_{sum}$ and $Rth_{sum}$ of an optical compensatory film 15+a cellulose acylate film 13 and an optical compensatory film 19+a cellulose acylate film 101 are constant without depending on wavelength. Furthermore, this Comparative Example can be referred to as the prior art since the conventional optical compensatory technique does not consider the chromatic dispersion of Re and Rth.

<Measurement of Light Leakage in Liquid Crystal Display Device>

An optical simulation was carried out using the abovementioned values and the calculated results of light leakage are shown in Table 14. In Table 14, the liquid crystal display device No. 1 represents the simulation results of the abovementioned Comparative Example and the liquid crystal display device Nos. 2 to 6 represent the simulation results of Examples.

TABLE 14 dark state transmittance (%) at a viewing angle in the direction of azimuthal angle 45° and polar angle 60°

| Liquid crystal display device No. | wavelength 450 nm | | | | | | | | Wavelength 550 nm | | | | |
|---|---|---|---|---|---|---|---|---|---|---|---|---|---|
| | Liquid crystal | | Sum of compensatory film and cellulose acylate film | | | B = 0.0567, D = 0.0939 | | | Liquid crystal | | Sum of compensatory film and cellulose acylate film | | |
| | Δnd (nm) | Δnd/λ | Re$_{(450)}$ (nm) | Rth$_{(450)}$ (nm) | Re/λ | Rth/λ | A | C | Δnd (nm) | Δnd/λ | Re$_{(550)}$ (nm) | Rth$_{(550)}$ (nm) | Re/λ |
| 1 | 318 | 0.71 | 52 | 128 | 0.116 | 0.284 | 0.483 | 0.0153 | 300 | 0.545 | 52 | 128 | 0.095 |
| 2 | 318 | 0.71 | 51 | 131 | 0.113 | 0.291 | 0.492 | 0.0137 | 300 | 0.545 | 52 | 128 | 0.095 |
| 3 | 318 | 0.71 | 39 | 135 | 0.087 | 0.300 | 0.505 | −0.005 | 300 | 0.545 | 52 | 128 | 0.095 |
| 4 | 318 | 0.71 | 33 | 140 | 0.073 | 0.311 | 0.52 | −0.015 | 300 | 0.545 | 52 | 128 | 0.095 |
| 5 | 318 | 0.71 | 29 | 144 | 0.064 | 0.320 | 0.533 | −0.021 | 300 | 0.545 | 52 | 128 | 0.095 |
| 6 | 318 | 0.71 | 25 | 148 | 0.056 | 0.329 | 0.546 | −0.027 | 300 | 0.545 | 52 | 128 | 0.095 |

| Liquid crystal display device No. | Wavelength 550 nm | | | Wavelength 650 nm | | | | | | | | Transmittance (%) |
|---|---|---|---|---|---|---|---|---|---|---|---|---|
| | B = 0.0567, D = 0.0939 | | | Liquid crystal | | Sum of compensatory film and cellulose acylate film | | | B = 0.0567, D = 0.0939 | | | |
| | Rth/λ | A | C | Δnd (nm) | Δnd/λ | Re$_{(650)}$ (nm) | Rth$_{(650)}$ (nm) | Re/λ | Rth/λ | A | C | |
| 1 | 0.233 | 0.531 | 0.0004 | 295 | 0.454 | 52 | 128 | 0.080 | 0.197 | 0.559 | −0.006 | 0.025 |
| 2 | 0.233 | 0.531 | 0.0004 | 295 | 0.454 | 58 | 123 | 0.089 | 0.189 | 0.542 | −0.002 | 0.019 |
| 3 | 0.233 | 0.531 | 0.0004 | 295 | 0.454 | 64 | 119 | 0.098 | 0.183 | 0.528 | 0.0021 | 0.015 |
| 4 | 0.233 | 0.531 | 0.0004 | 295 | 0.454 | 70 | 115 | 0.108 | 0.177 | 0.515 | 0.0063 | 0.012 |
| 5 | 0.233 | 0.531 | 0.0004 | 295 | 0.454 | 76 | 111 | 0.117 | 0.171 | 0.501 | 0.0104 | 0.016 |
| 6 | 0.233 | 0.531 | 0.0004 | 295 | 0.454 | 84 | 107 | 0.129 | 0.165 | 0.488 | 0.016 | 0.02 |

From the results shown in Table 14, it can be understood that any of the liquid crystal display device Nos. 2 to 6 of Examples according to the invention in which Re$_{sum}$/λ of the optical compensatory film+the cellulose acylate film is 0.056 to 0.113 and Rth$_{sum}$/λ thereof is 0.291 to 0.329 when Δnd/λ of the liquid crystal at a wavelength of 450 nm is 0.707, and Re$_{sum}$/λ of the optical compensatory film+the cellulose acylate film is 0.089 to 0.129 and Rth$_{sum}$/λ thereof is 0.165 to 0.189 when Δnd/λ of the liquid crystal at a wavelength of 650 nm is 0.454, has a low transmittance in the dark state state at a polar angle 60°, as compared to the liquid crystal display device No. 1 as Comparative Example. From the results of Table 14, it can be understood that the transmittance is minimum when Re$_{sum}$/λ=0.073 and Rth$_{sum}$/λ=0.311 at a wavelength of 450 nm, Re$_{sum}$/λ=0.095 and Rth$_{sum}$/λ=0.233 at a wavelength of 550 nm, and Re$_{sum}$/λ=0.108 and Rth$_{sum}$/λ=0.177 at a wavelength of 650 nm.

From the simulation results shown Table 14, it can be understood that any of the liquid crystal display device Nos. 2 to 6 satisfying the above formulae (I) to (IV) has a low transmittance in the dark state state at a polar angle 60°, as compared to the liquid crystal display device No. 1 no satisfying the above formulae (I) to (IV).

Example 3

Optical characteristics of the liquid crystal display device were obtained by calculating with LCD Master in the same conditions as in Example 2, except that the retardation values of the liquid crystal layer were changed from 450 nm to 371 nm, from 550 nm to 350 nm and from 650 nm to 344 nm in wavelengths. In addition, Re$_{sum}$ and Rth$_{sum}$ of an optical compensatory film 15+a cellulose acylate film 13 and an optical compensatory film 19+a cellulose acylate film 101 are as shown in Table 15.

Further, as Comparative Example, an optical simulation was also carried out in the same manner as for a liquid crystal display device having the completely same structure as above, except that the values of Re$_{sum}$ and Rth$_{sum}$ of an optical compensatory film 15+a cellulose acylate film 13 and an optical compensatory film 19+a cellulose acylate film 101 are constant without depending on wavelength. Furthermore, this Comparative Example can be referred to as the prior art since the conventional optical compensatory technique does not consider the chromatic dispersion of Re and Rth.

<Measurement of Light Leakage in Liquid Crystal Display Device>

An optical simulation was carried out using the above-mentioned values and the calculated results of light leakage are shown in Table 15. In Table 15, the liquid crystal display device No. 7 represents the simulation results of the above-mentioned Comparative Example and the liquid crystal display device Nos. 8 to 12 represent the simulation results of Examples.

TABLE 15 dark state transmittance (%) at a viewing angle in the direction of azimuthal angle 45° and polar angle 60°

| Liquid crystal display device No. | Liquid crystal Δnd (nm) | Liquid crystal Δnd/λ | Sum of compensatory film and cellulose acylate film Re$_{(450)}$ (nm) | Sum of compensatory film and cellulose acylate film Rth$_{(450)}$ (nm) | Re/λ | Rth/λ | B = 0.0567, A | D = 0.0939 C | Liquid crystal Δnd (nm) | Liquid crystal Δnd/λ | Sum of compensatory film and cellulose acylate film Re$_{(550)}$ (nm) | Sum of compensatory film and cellulose acylate film Rth$_{(550)}$ (nm) | Re/λ |
|---|---|---|---|---|---|---|---|---|---|---|---|---|---|
| Wavelength 450 nm | | | | | | | | | Wavelength 550 nm | | | | |
| 7 | 371 | 0.82 | 45 | 154 | 0.100 | 0.342 | 0.484 | 0.005 | 350 | 0.636 | 45 | 154 | 0.082 |
| 8 | 371 | 0.82 | 40 | 159.67 | 0.089 | 0.355 | 0.499 | −0.004 | 350 | 0.636 | 45 | 154 | 0.082 |
| 9 | 371 | 0.82 | 35 | 165.33 | 0.078 | 0.367 | 0.514 | −0.013 | 350 | 0.636 | 45 | 154 | 0.082 |
| 10 | 371 | 0.82 | 30 | 171 | 0.067 | 0.38 | 0.53 | −0.022 | 350 | 0.636 | 45 | 154 | 0.082 |
| 11 | 371 | 0.82 | 25 | 176.67 | 0.056 | 0.393 | 0.545 | −0.032 | 350 | 0.636 | 45 | 154 | 0.082 |
| 12 | 371 | 0.82 | 20 | 182.33 | 0.044 | 0.405 | 0.56 | −0.041 | 350 | 0.636 | 45 | 154 | 0.082 |

| Liquid crystal display device No. | Wavelength 550 nm Rth/λ | B = 0.0567, A | D = 0.0939 C | Liquid crystal Δnd (nm) | Liquid crystal Δnd/λ | Sum of compensatory film and cellulose acylate film Re$_{(650)}$ (nm) | Sum of compensatory film and cellulose acylate film Rth$_{(650)}$ (nm) | Re/λ | Rth/λ | B = 0.0567, A | D = 0.0939 C | Transmittance (%) |
|---|---|---|---|---|---|---|---|---|---|---|---|---|
| | | | | | | Wavelength 650 nm | | | | | | |
| 7 | 0.28 | 0.529 | −0.008 | 344 | 0.529 | 45 | 154 | 0.069 | 0.237 | 0.555 | −0.013 | 0.03 |
| 8 | 0.28 | 0.529 | −0.008 | 344 | 0.529 | 51 | 151.33 | 0.078 | 0.233 | 0.547 | −0.008 | 0.023 |
| 9 | 0.28 | 0.529 | −0.008 | 344 | 0.529 | 57 | 148.67 | 0.088 | 0.229 | 0.539 | −0.003 | 0.017 |
| 10 | 0.28 | 0.529 | −0.008 | 344 | 0.529 | 63 | 146 | 0.097 | 0.225 | 0.531 | 0.0016 | 0.012 |
| 11 | 0.28 | 0.529 | −0.008 | 344 | 0.529 | 69 | 143.33 | 0.106 | 0.221 | 0.524 | 0.0065 | 0.018 |
| 12 | 0.28 | 0.529 | −0.008 | 344 | 0.529 | 75 | 140.67 | 0.115 | 0.216 | 0.516 | 0.0114 | 0.022 |

From the results shown in Table 15, it can be understood that any of the liquid crystal display device Nos. 8 to 12 of Examples according to the invention in which Re$_{sum}$/λ of the optical compensatory film+the cellulose acylate film is 0.044 to 0.890 and Rth$_{sum}$/λ thereof is 0.355 to 0.405 when Δnd/λ of the liquid crystal at a wavelength of 450 nm is 0.824, and Re$_{sum}$/λ of the optical compensatory film+the cellulose acylate film is 0.078 to 0.115 and Rth$_{sum}$/λ thereof is 0.216 to 0.233 when Δnd/λ of the liquid crystal at a wavelength of 650 nm is 0.529, has a low transmittance in the dark state state at a polar angle 60°, as compared to the liquid crystal display device No. 7 as Comparative Example. From the results shown in Table 15, it can be understood that the transmittance is minimum when Re$_{sum}$/λ=0.067 and Rth$_{sum}$/λ=0.38 at a wavelength of 450 nm, Re$_{sum}$/λ=0.082 and Rth$_{sum}$/λ=0.28 at a wavelength of 550 nm, and Re$_{sum}$/λ=0.097 and Rth$_{sum}$/λ=0.225 at a wavelength of 650 nm.

From the simulation results shown Table 15, it can be understood that any of the liquid crystal display device Nos. 8 to 12 satisfying the above formulae (I) to (IV) has a low transmittance in the dark state state at a polar angle 60°, as compared to the liquid crystal display device No. 7 no satisfying the above formulae (I) to (IV).

Example 4

Optical characteristics of the liquid crystal display device having a structure shown in FIG. 8 were obtained by calculating with LCD Master, but in Example 4, the optical film 15 was not used. Specifically, an upper polarizer (protective film (not shown), cellulose acylate film 11, protective film 13), a liquid crystal cell (upper substrate 16, liquid crystal layer 17, lower substrate 18), an optical compensatory film 19 (it also serves as a protective film 103) and a lower polarizer (polarizer 101, protective film (not shown)) were laminated from the observation direction (top) and a backlight source (not shown) was further provided. In addition, Re and Rth of an optical compensatory film 19 are as shown in Table 16. Further, the cellulose acylate film of the upper polarizer had Rth$_2$ of 3 nm and Re$_2$ of 1 nm without depending on wavelength. Furthermore, in Example 4, the optical compensatory film was provided in the backlight source side, but the completely same results were obtained even though the relationship between a backlight and an observer was changed. Other conditions are the same those as in Example 2.

Further, as Comparative Example, an optical simulation was also carried out in the same manner as for a liquid crystal display device having the completely same structure as above, except that the values of Re and Rth of an optical compensatory film 19+a cellulose acylate film 11 are constant without depending on wavelength. Furthermore, this Comparative Example can be referred to as the prior art since the conventional optical compensatory technique does not consider the chromatic dispersion of Re and Rth.

<Measurement of Light Leakage in Liquid Crystal Display Device>

An optical simulation was carried out using the above-mentioned values and the calculated results of light leakage are shown in Table 16. In Table 16, the liquid crystal display device No. 13 represents the simulation results of the above-mentioned Comparative Example and the liquid crystal display device Nos. 14 to 18 represent the simulation results of Examples.

TABLE 16 dark state transmittance (%) at a viewing angle in the direction of azimuthal angle 45° and polar angle 60°

| Liquid crystal display device No. | Liquid crystal Δnd (nm) | Δnd/λ | Wavelength 450 nm Sum of compensatory film and cellulose acylate film Re(450) (nm) | Rth(450) (nm) | Re/λ | Rth/λ | D = 0.032 A | C | Liquid crystal Δnd (nm) | Δnd/λ | Wavelength 550 nm Sum of compensatory film and cellulose acylate film Re(550) (nm) | Rth(550) (nm) | Re/λ |
|---|---|---|---|---|---|---|---|---|---|---|---|---|---|
| 13 | 318 | 0.707 | 69 | 233 | 0.153 | 0.518 | 0.733 | 0.0857 | 300 | 0.545 | 69 | 233 | 0.125 |
| 14 | 318 | 0.707 | 60 | 239 | 0.133 | 0.531 | 0.752 | 0.0716 | 300 | 0.545 | 69 | 233 | 0.125 |
| 15 | 318 | 0.707 | 54 | 245 | 0.120 | 0.544 | 0.77 | 0.0622 | 300 | 0.545 | 69 | 233 | 0.125 |
| 16 | 318 | 0.707 | 48 | 243 | 0.107 | 0.540 | 0.764 | 0.0528 | 300 | 0.545 | 69 | 233 | 0.125 |
| 17 | 318 | 0.707 | 43 | 237 | 0.096 | 0.527 | 0.745 | 0.0449 | 300 | 0.545 | 69 | 233 | 0.125 |
| 18 | 318 | 0.707 | 37 | 231 | 0.082 | 0.513 | 0.726 | 0.0355 | 300 | 0.545 | 69 | 233 | 0.125 |

| Liquid crystal display device No. | Wavelength 550 nm D = 0.032 Rth/λ | A | C | Liquid crystal Δnd (nm) | Δnd/λ | Wavelength 650 nm Sum of compensatory and film cellulose acylate film Re(650) (nm) | Rth(650) (nm) | Re/λ | D = 0.032 Rth/λ | A | C | Transmittance (%) |
|---|---|---|---|---|---|---|---|---|---|---|---|---|
| 13 | 0.424 | 0.777 | 0.051 | 295 | 0.454 | 69 | 233 | 0.106 | 0.358 | 0.79 | 0.0337 | 0.024 |
| 14 | 0.424 | 0.777 | 0.051 | 295 | 0.454 | 80 | 232 | 0.123 | 0.357 | 0.786 | 0.0413 | 0.021 |
| 15 | 0.424 | 0.777 | 0.051 | 295 | 0.454 | 89 | 230 | 0.137 | 0.354 | 0.780 | 0.0476 | 0.017 |
| 16 | 0.424 | 0.777 | 0.051 | 295 | 0.454 | 95 | 228 | 0.146 | 0.351 | 0.773 | 0.0518 | 0.012 |
| 17 | 0.424 | 0.777 | 0.051 | 295 | 0.454 | 100 | 222 | 0.154 | 0.342 | 0.753 | 0.0553 | 0.018 |
| 18 | 0.424 | 0.777 | 0.051 | 295 | 0.454 | 106 | 216 | 0.163 | 0.332 | 0.732 | 0.0595 | 0.022 |

From the results shown in Table 16, it can be understood that any of the liquid crystal display device Nos. 14 to 18 of Examples according to the invention in which $Re_{sum}/\lambda$ of the optical compensatory film+the cellulose acylate film is 0.082 to 0.133 and $Rth_{sum}/\lambda$ thereof is 0.513 to 0.531 when $\Delta nd/\lambda$ of the liquid crystal at a wavelength of 450 nm is 0.707, and $Re_{sum}/\lambda$ of the optical compensatory film+the cellulose acylate film is 0.123 to 0.163 and $Rth_{sum}/\lambda$ thereof is 0.332 to 0.357 when $\Delta nd/\lambda$ of the liquid crystal at a wavelength of 650 nm is 0.454, has a low transmittance in the dark state state at a polar angle 60°, as compared to the liquid crystal display device No. 13 as Comparative Example. From the results of Table 16, it can be understood that the transmittance is minimum when $Re_{sum}/\lambda=0.107$ and $Rth_{sum}/\lambda=0.54$ at a wavelength of 450 nm, $Re_{sum}/\lambda=0.125$ and $Rth_{sum}/\lambda=0.424$ at a wavelength of 550 nm, and $Re_{sum}/\lambda=0.416$ and $Rth_{sum}/\lambda=0.351$ at a wavelength of 650 nm.

From the simulation results shown Table 16, it can be understood that any of the liquid crystal display device Nos. 14 to 18 satisfying the above formulae (V) to (VIII) has a low transmittance in the dark state state at a polar angle 60°, as compared to the liquid crystal display device No. 13 no satisfying the above formulae (V) to (VIII).

Example 5

Optical characteristics of the liquid crystal display device were obtained by calculating with LCD Master in the same conditions as in Example 4, except that the retardation values of the liquid crystal layer were changed from 450 nm to 371 nm, from 550 nm to 350 nm and from 650 nm to 344 nm in wavelengths. In addition, $Re_{sum}$ and $Rth_{sum}$ of an optical compensatory film 19+a cellulose acylate film 11 are as shown in Table 17.

Further, as Comparative Example, an optical simulation was also carried out in the same manner as for a liquid crystal display device having the completely same structure as above, except that the values of $Re_{sum}$ and $Rth_{sum}$ of an optical compensatory film 19+a cellulose acylate film 11 are constant without depending on wavelength. Furthermore, this Comparative Example can be referred to as the prior art since the conventional optical compensatory technique does not consider the chromatic dispersion of Re and Rth.

<Measurement of Light Leakage in Liquid Crystal Display Device>

An optical simulation was carried out using the above-mentioned values and the calculated results of light leakage are shown in Table 17. In Table 17, the liquid crystal display device No. 19 represents the simulation results of the above-mentioned Comparative Example and the liquid crystal display device Nos. 20 to 24 represent the simulation results of Examples.

TABLE 17 dark state transmittance (%) at a viewing angle in the direction of azimuthal angle 45° and polar angle 60°

| Liquid crystal display device No. | Wavelength 450 nm | | | | | | | | Wavelength 550 nm | | | | |
|---|---|---|---|---|---|---|---|---|---|---|---|---|---|
| | Liquid crystal | | Sum of compensatory film and cellulose acylate film | | | | D = 0.032 | | Liquid crystal | | Sum of compensatory film and cellulose acylate film | | |
| | $\Delta nd$ (nm) | $\Delta nd/\lambda$ | $Re_{(450)}$ (nm) | $Rth_{(450)}$ (nm) | $Re/\lambda$ | $Rth/\lambda$ | A | C | $\Delta nd$ (nm) | $\Delta nd/\lambda$ | $Re_{(550)}$ (nm) | $Rth_{(550)}$ (nm) | $Re/\lambda$ |
| 19 | 371 | 0.824 | 58 | 279 | 0.129 | 0.620 | 0.752 | 0.0799 | 350 | 0.636 | 58 | 279 | 0.105 |
| 20 | 371 | 0.824 | 52 | 285 | 0.115 | 0.634 | 0.769 | 0.0683 | 350 | 0.636 | 58 | 279 | 0.105 |
| 21 | 371 | 0.824 | 45 | 292 | 0.101 | 0.648 | 0.786 | 0.0567 | 350 | 0.636 | 58 | 279 | 0.105 |
| 22 | 371 | 0.824 | 39 | 298 | 0.087 | 0.662 | 0.803 | 0.0451 | 350 | 0.636 | 58 | 279 | 0.105 |
| 23 | 371 | 0.824 | 33 | 304 | 0.073 | 0.676 | 0.820 | 0.0335 | 350 | 0.636 | 58 | 279 | 0.105 |
| 24 | 371 | 0.824 | 26 | 311 | 0.059 | 0.690 | 0.837 | 0.0219 | 350 | 0.636 | 58 | 279 | 0.105 |

| Liquid crystal display device No. | Wavelength 550 nm | | | Wavelength 650 nm | | | | | | | | Transmittance (%) |
|---|---|---|---|---|---|---|---|---|---|---|---|---|
| | D = 0.032 | | | Liquid crystal | | Sum of compensatory film and cellulose acylate film | | | | D = 0.032 | | |
| | $Rth/\lambda$ | A | C | $\Delta nd$ (nm) | $\Delta nd/\lambda$ | $Re_{(650)}$ (nm) | $Rth_{(650)}$ (nm) | $Re/\lambda$ | $Rth/\lambda$ | A | C | |
| 19 | 0.507 | 0.797 | 0.0467 | 344 | 0.529 | 58 | 279 | 0.089 | 0.429 | 0.811 | 0.0303 | 0.026 |
| 20 | 0.507 | 0.797 | 0.0467 | 344 | 0.529 | 65 | 277 | 0.099 | 0.427 | 0.806 | 0.0357 | 0.024 |
| 21 | 0.507 | 0.797 | 0.0467 | 344 | 0.529 | 71 | 276 | 0.110 | 0.424 | 0.801 | 0.0412 | 0.02 |
| 22 | 0.507 | 0.797 | 0.0467 | 344 | 0.529 | 78 | 274 | 0.120 | 0.422 | 0.796 | 0.0486 | 0.015 |
| 23 | 0.507 | 0.797 | 0.0467 | 344 | 0.529 | 85 | 272 | 0.130 | 0.419 | 0.791 | 0.052 | 0.021 |
| 24 | 0.507 | 0.797 | 0.0467 | 344 | 0.529 | 91 | 271 | 0.141 | 0.416 | 0.786 | 0.0575 | 0.025 |

From the results shown in Table 17, it can be understood that any of the liquid crystal display device Nos. 20 to 24 of Examples according to the invention in which $Re_{sum}/\lambda$ of the optical compensatory film+the cellulose acylate film is 0.059 to 0.115 and $Rth_{sum}/\lambda$ thereof is 0.634 to 0.69 when $\Delta nd/\lambda$ of the liquid crystal at a wavelength of 450 nm is 0.824, and $Re_{sum}/\lambda$ of the optical compensatory film+the cellulose acylate film is 0.099 to 0.141 and $Rth_{sum}/\lambda$ thereof is 0.416 to 0.427 when $\Delta nd/\lambda$ of the liquid crystal at a wavelength of 650 nm is 0.529, has a low transmittance in the dark state state at a polar angle 60°, as compared to the liquid crystal display device No. 19 as Comparative Example. From the results of Table 17, it can be understood that the transmittance is minimum when $Re_{sum}/\lambda=0.087$ and $Rth_{sum}/\lambda=0.662$ at a wavelength of 450 nm, $Re_{sum}/\lambda=0.105$ and $Rth_{sum}/\lambda=0.507$ at a wavelength of 550 nm, and $Re_{sum}/\lambda=0.12$ and $Rth_{sum}/\lambda=0.422$ at a wavelength of 650 nm.

From the simulation results shown in Table 17, it can be understood that any of the liquid crystal display device Nos. 20 to 24 satisfying the above formulae (V) to (VIII) has a low transmittance in the dark state state at a polar angle 60°, as compared to the liquid crystal display device No. 19 no satisfying the above formulae (V) to (VIII).

Third Embodiment (Measurement of Front Retardation Re and Retardation Rth in the Direction of Thickness)

A sample of 30 mm×40 mm was conditioned in humidity at 25° C. and 60% RH for 2 hours and then the $Re_{(\lambda)}$ was measured by the incidence of a light having a wavelength λ nm in a normal direction of the film with the use of an automatic birefringence meter (KOBRA-21ADH, manufactured by Oji Scientific Instruments). In addition, $Rth_{(\lambda)}$ was determined by using a presumptive average refractive index and the film thickness described in Table 18, based on retardation values measured in three directions, i.e., $Re_{(\lambda)}$ as described above, a retardation value measured by the incidence of the light having the wavelength of λ nm in a direction inclining at an angle of +40° to the normal direction of the film using an in-plane slow axis as an inclined axis, and a retardation value measured by the incidence of the light having the wavelength of λ nm in a direction inclining at an angle of −40° to the normal direction of the film using an in-plane slow axis as an inclined axis.

Preparative Example 8

Construction of Protective Film (LR1) Having Antireflective Layer

[Preparation of Coating Solution for Light Scattering Layer]

50 g of a mixture of pentaerythritol triacrylate with pentaerythritol tetraacrylate (PETA, manufactured by Nippon Kayaku Co., Ltd.) was diluted with 38.5 g of toluene. Further, 2 g of a polymerization initiator (IRGACURE 184, manufactured by Ciba Specialty Chemicals) was added and the resultant mixture was mixed with stirring. A coating film obtained by applying this solution and hardening with ultraviolet light had a refractive index of 1.51.

In addition, 1.7 g of a 30% toluene dispersion of crosslinked polystyrene particles (refractive index 1.60, SX-350 manufactured by Soken Chemical & Engineering Co., Ltd.) having an average particle size of 3.5 μm and having been dispersed in a Polytron dispersing machine at 10000 rpm for 20 minutes and 13.3 g of a 30% toluene dispersion of crosslinked acrylic-styrene particles (refractive index 1.55, manufactured by Soken Chemical & Engineering Co., Ltd.) having an average particle size of 3.5 μm were added to this solution. Finally, 0.75 g of a fluorine-based surface modifier (FP-1) and 10 g of a silane coupling agent (KBM-5103, manufactured by Shin-Etsu Chemical Co., Ltd.) were added thereto. The resultant mixture was filtered through a polypropylene filter having a pore size of 30 μm to thereby give a coating solution for light scattering layer.
Fluorine-Based Surface Modifier (FP-1)

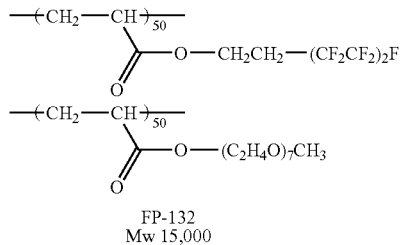

FP-132
Mw 15,000

(Preparation of Coating Solution for Lower Refractive Index Layer)

First, a sol solution a was prepared as follows.

In a reactor equipped with a stirrer and a reflux condenser, 120 parts by weight of methyl ethyl ketone, 100 parts by weight of acryloyloxypropyltrimethoxysilane (KBM-5103, manufactured by Shin-Etsu Chemical Co., Ltd.) and 3 parts by weight of diisopropoxyaluminum ethyl acetoacetate were added and mixed. After adding 30 parts by weight of ion-exchanged water, the mixture was reacted at 60° C. for 4 hours and then cooled to room temperature to give a sol solution a. The weight-average molecular weight thereof was 1600 and components with molecular weight of from 1000 to 20000 amounted to 100% by weight of oligomer components and higher. When analyzed by gas chromatography, no acryloyloxypropyltrimethoxysilane as a starting material remained.

13 g of a heat crosslinking fluorine-containing polymer having a refractive index of 1.42 (JN-7228, solid content 6% by weight, manufactured by JSR Corporation), 1.3 g of silica sol (Silica MEK-ST with different particle size, average particle size 45 nm, solid content 30% by weight, manufactured by NISSAN CHEMICAL INDUSTRIES, LTD.), 0.6 g of the sol solution a prepared as described above, 5 g of methyl ethyl ketone and 0.6 g of cyclohexanone were added under stirring and then filtered through a polypropylene filter having a pore size of 1 μm to thereby prepare a coating solution for lower refractive index layer.

[Construction of Protective Film Having Antireflective Layer]

A triacetyl cellulose film having a thickness of 80 μm (FUJITACK-TDY80UL, manufactured by FUJI PHOTO FILM CO., LTD.), as a base film, was unwound in a rolled state. Then the coating solution for the functional layer (light scattering layer) as described above was applied by using a microgravure roll (diameter: 50 mm) having a gravure pattern of a line density of 180 lines/in. and a depth of 40 μm and a doctor blade at a gravure roll rotation speed of 30 rpm and a conveying speed of 30 m/min. After drying at 60° C. for 150 seconds, the coating layer was hardened by irradiating under nitrogen-purge with ultraviolet light at 250 mJ/cm$^2$ by using an air-cool metal halide lamp of 160 W/cm (manufactured by EYEGRAPHICS Co., Ltd.) at an illuminance of 400 mW/cm$^2$. Thus a functional layer having a thickness of 6 μm was formed followed by winding.

Herein, a commercially available cellulose acylate film usable includes, in addition to above-mentioned FUJITACK-TDY80UL, "FUJITACK-TD80UL", "FUJITACK-TF80UL", "FUJITACK-TFY80UL", "FUJITACK-T80UZ" and "FUJITACK-T40UZ" (the above products were manufactured by FUJI PHOTO FILM CO., LTD.), and "KC4UX2MW" and "KC80UVSFD" (the above products were manufactured by Konica Minolta Opto, Inc.).

The triacetyl cellulose film having the functional layer (light scattering layer) formed thereon was unwound again. In the light scattering layer side thereof, the coating solution for lower refractive index layer prepared above was applied by using a microgravure roll (diameter: 50 mm) having a gravure pattern of a line density of 180 lines/in. and a depth of 40 μm and a doctor blade at a gravure roll rotation speed of 30 rpm and a conveying speed of 15 m/min. After drying at 120° C. for 150 seconds and then at 140° C. for 8 minutes, the coating layer was hardened by irradiating under nitrogen-purge with ultraviolet light at 900 mJ/cm$^2$ by using an air-cool metal halide lamp of 240 W/cm (manufactured by EYEGRAPHICS Co., Ltd.) at an illuminance of 400 mW/cm$^2$. Thus a lower refractive index layer having a thickness of 100 nm was formed followed by winding. Thus, a protective film (LR1) having an antireflective layer was constructed.

Example 6

Preparation of Cellulose Acetate Film (CTA 1, CTA2)

(Preparation of Cellulose Acetate Solution)

The following composition was fed into a mixing tank and agitated to dissolve each component, thereby preparing a cellulose acetate solution D.

| (Formulation of cellulose acetate solution D) | |
|---|---|
| cellulose acetate with acetylation degree of 2.86 | 100.0 parts by weight |
| methylene chloride (first solvent) | 402.0 parts by weight |
| methanol (second solvent) | 60.0 parts by weight |

(Preparation of Solution of Matting Agent)

20 parts by weight of silicon dioxide particles having an average particle size of 16 nm (AEROSIL R972, manufactured by Degussa) and 80 parts by weight of methanol were stirred and mixed well for 30 minutes to obtain a dispersion of the silicon dioxide particles. This dispersion was fed into a disperser together with the following composition, and further stirred for 30 minutes or more to dissolve each component, thereby preparing a solution of a matting agent.

| (Formulation of solution of matting agent) | |
|---|---|
| dispersion of silicon dioxide particles having an average particle size of 16 nm | 10.0 parts by weight |
| methylene chloride (first solvent) | 76.3 parts by weight |
| methanol (second solvent) | 3.4 parts by weight |
| cellulose acetate solution D | 10.3 parts by weight |

(Preparation of Additive Solution)

The following composition was fed into a mixing tank and agitated under heating to dissolve each component, thereby preparing a cellulose acetate solution. The following compound for reducing optical anisotropy is the previously described A19 and the chromatic dispersion regulating agent is the previously described UV102.

| (Formulation of additive solution) | |
|---|---|
| compound for reducing optical anisotropy (A19) | 49.3 parts by weight |
| chromatic dispersion regulating agent (UV102) | 7.6 parts by weight |
| methylene chloride (first solvent) | 58.4 parts by weight |
| methanol (second solvent) | 8.7 parts by weight |
| cellulose acetate solution D | 12.8 parts by weight |

(Preparation of Cellulose Acetate Film CTA1)

94.6 parts by weight of the above-mentioned cellulose acetate solution D, 1.3 parts by weight of the solution of a matting agent and 4.1 parts by weight of the additive solution were respectively filtered and mixed, and were cast with a band casting machine. The weight ratios of the compound for reducing optical anisotropy and the chromatic dispersion regulating agent to cellulose acetate in the above-mentioned formulation were 12% and 1.8%, respectively. The film was peeled off from the band when the amount of the remaining solvent is 30%, and dried at 135° C. for 40 minutes to give a cellulose acetate film CTA1. The obtained cellulose acetate film had the amount of the remaining solvent of 0.2% and a film thickness of 80 μm. $Re_{(450)}$, $Re_{(590)}$, $Re_{(650)}$, $Rth_{(450)}$, $Rth_{(590)}$ and $Rth_{(650)}$ were measured and the results thereof are Table 18.

film thickness of 40 μm. $Re_{(450)}$, $Re_{(590)}$, $Re_{(650)}$, $Rth_{(450)}$, $Rth_{(590)}$ and $Rth_{(650)}$ were measured and the results thereof are Table 18.

$Re_{(450)}$, $Re_{(590)}$, $Re_{(650)}$, $Rth_{(450)}$, $Rth_{(590)}$ and $Rth_{(650)}$ were also measured for ARTON FLZR50 (manufactured by JSR Corporation), ZEONOR ZF14 (manufactured by OPTES INC.), and FUJITACK-TDY80UL and FUJITACK-TFY80UL (manufactured by FUJI PHOTO FILM CO., LTD.) used as a transparent support, and the results thereof are Table 18.

Example 7

Construction of Polarizer PAC1

(Construction of Optically Anisotropic Layer A1 Through Stretching)

After charging an aqueous sodium hydroxide solution and ion-exchanged water into a reactor equipped with a stirrer, a thermometer and a reflux condenser, monomers A and B having the structures shown below were dissolved in the molar ratio of 55/45 mol %, and a small amount of hydrosulfide was added thereto. Methylene chloride was added thereto, and phosgene was blown into the resulting mixture at 20° C. over about 60 minutes. After adding p-tert-butylphenol for emulsification, triethylamine was added and the mixture was stirred at 30° C. for about 3 hours to complete the reaction. After completion of the reaction, the organic phase was

TABLE 18

| Sample | Thickness μm | Average refractive index | $Re_{(590)}$ nm | $Rth_{(590)}$ nm | $Re_{(450)}$ nm | $Re_{(650)}$ nm | $Rth_{(450)}$ nm | $Rth_{(650)}$ nm | $Re_{(650)} - Re_{(450)}$ nm | $Rth_{650} - Rth_{450}$ nm |
|---|---|---|---|---|---|---|---|---|---|---|
| CTA1 | 80 | 1.48 | 1.0 | -2.0 | 1.5 | 0.5 | -12.0 | 1.0 | -1.0 | 13.0 |
| CTA2 | 40 | 1.48 | 0.7 | -1.4 | 1.1 | 0.4 | -8.0 | 0.7 | -0.7 | 8.7 |
| ARTON FLZR50 | 50 | 1.52 | 2.8 | 3.0 | 2.9 | 2.8 | 3.1 | 3.0 | -0.1 | -0.1 |
| ZEONOR ZF14 | 100 | 1.52 | 3.0 | 2.7 | 3.2 | 3.0 | 2.8 | 2.7 | -0.2 | -0.1 |
| FUJITACK-TDY80UL | 80 | 1.48 | 3.0 | 44.0 | 2.0 | 3.2 | 34.0 | 47.0 | 1.2 | 13.0 |
| FUJITACK-TFY80UL | 80 | 1.48 | 2.0 | 49.0 | 1.0 | 2.2 | 39.0 | 52.0 | 1.2 | 13.0 |
| A1 | 83 | 1.6 | 90.0 | 50.0 | 74.0 | 95.4 | 41.1 | 53.0 | 21.4 | 11.9 |
| A2 | 0.9 | 1.5 | 89.0 | 45.0 | 102.3 | 84.6 | 51.8 | 42.8 | -17.7 | -9 |
| A3 | 93 | 1.6 | 32.0 | 30.0 | 26.3 | 33.9 | 24.7 | 31.8 | 7.6 | 7.1 |
| A4 | 0.3 | 1.5 | 30.0 | 15.0 | 34.5 | 28.5 | 17.3 | 14.3 | -6 | -3 |
| C1 | 1.8 | 1.58 | 0.1 | 70.0 | 0.1 | 0.1 | 77.0 | 65.8 | 0.0 | -11.2 |
| C2 | 1.3 | 1.6 | 0.1 | 70.0 | 0.1 | 0.1 | 84.0 | 63.0 | 0.0 | -21.0 |
| C3 | 1.3 | 1.58 | 0.1 | 70.0 | 0.1 | 0.1 | 84.0 | 63.0 | 0.0 | -21.0 |
| C4 | 88 | 1.52 | 3.0 | 70.0 | 3.1 | 3.0 | 73.0 | 69.0 | -0.1 | -4.0 |
| C5 | 3.1 | 1.58 | 0.1 | 120.0 | 0.1 | 0.1 | 132.0 | 112.8 | 0.0 | -19.2 |
| C6 | 15 | 1.59 | 0.1 | 120.0 | 0.1 | 0.1 | 129.6 | 115.2 | 0 | -14.4 |
| C7 | 78 | 1.52 | 4.0 | 120.0 | 4.1 | 4.0 | 125.0 | 118.3 | -0.1 | -6.7 |

(Preparation of Cellulose Acetate Film Cta2)

94.6 parts by weight of the above-mentioned cellulose acetate solution D, 1.3 parts by weight of the solution of a matting agent and 4.1 parts by weight of the additive solution were respectively filtered and mixed, and were cast with a band casting machine. The weight ratios of the compound for reducing optical anisotropy and the chromatic dispersion regulating agent to cellulose acetate in the above-mentioned formulation were 12% and 1.8%, respectively. The film was peeled off from the band when the amount of the remaining solvent is 30%, and dried at 130° C. for 40 minutes to give a cellulose acetate film CTA2. The obtained cellulose acetate film had the amount of the remaining solvent of 0.2% and a separated off and the methylene chloride was evaporated to obtain a polycarbonate copolymer. The compositional ratio of the obtained copolymer was approximately the same as the monomer charging ratio.

The copolymer was dissolved in methylene chloride to prepare a dope solution with a solid content of 15% by weight. A film was fabricated from the dope solution with a band casting machine and stretched at a transverse stretching of 21% with the use of a tenter at a temperature of 210° C. to give an optically anisotropic layer A1. A film thickness after stretching was 83 μm. $Re_{(450)}$, $Re_{(590)}$, $Re_{(650)}$, $Rth_{(450)}$, $Rth_{(590)}$ and $Rth_{(650)}$ were measured and the results thereof are Table 18.

(monomer A)

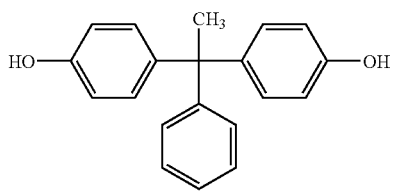

(monomer B)

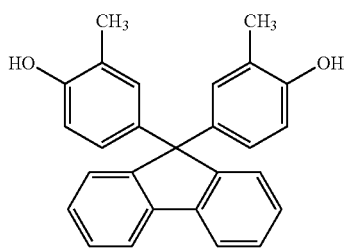

(Construction of Optically Anisotropic Layer C1 Using Non-Liquid Crystalline Compound)

Polyimide, which was synthesized from 2,2'-bis(3,4-dicarboxyphenyl)hexafluoropropane and 2,2'-bis(trifluoromethyl)-4,4'-diaminobiphenyl, was dissolved in cyclohexanone to prepare a polyimide solution of 15% by weight. On the surface of a film A1 subjected to a corona discharge treatment using a solid state corona treating machine model 6 KVA (available from Pillar Inc.), the polyimide solution was applied to 1.8 μm in a film thickness after drying and was dried at 150° C. for 5 minutes to form an optically anisotropic layer C1 comprising polyimide described above. Thus, the optical compensatory sheet AC1 was produced.

On a separately prepared glass substrate, the polyimide solution was applied to 1.8 μm in a film thickness after drying and was dried at 150° C. for 5 minutes to form an optically anisotropic layer C1G comprising polyimide described above. $Re_{(450)}$, $Re_{(590)}$, $Re_{(650)}$, $Rth_{(450)}$, $Rth_{(590)}$ and $Rth_{(650)}$ were measured and the results thereof are Table 18.

(Construction of Polarizer PAC1)

A polyvinyl alcohol (PVA) film having a thickness of 80 μm was immersed in an aqueous iodine solution having an iodine concentration of 0.05% by weight at 30° C. for 60 seconds and stained. Then, the film was stretched in the longitudinal direction to five times its original length while immersing in an aqueous boric acid solution having a boric acid concentration of 4% by weight for 60 seconds, and thereafter was dried at 50° C. for 4 minutes to obtain a polarizer having a thickness of 20 μm.

CTA1 obtained in Example 6 and the protective film LR1 having an antireflective layer obtained in Preparative Example 1 were immersed in an aqueous sodium hydroxide solution having a concentration of 1.5 mol/L at 55° C. and then was washed with water to sufficiently wash away sodium hydroxide. Then, the film was immersed in an aqueous dilute sulfuric acid solution having a concentration of 0.005 mol/L at 35° C. for 1 minute and immersed in water to sufficiently wash away the aqueous dilute sulfuric acid solution. Finally, the sample was sufficiently dried at 120° C.

CTA1 saponified as described above and the protective film LR1 having an antireflective layer were adhered together by the use of a polyvinyl alcohol-based adhesive so as to interpose therebetween the polarizer, thereby giving a polarizer. Herein, the adherence was carried out so that the triacetyl cellulose film side of the protective film LR1 having an antireflective layer was at the side of the polarizer.

An optical compensatory sheet AC1 was adhered to the polarizer CTA1 side, through an acrylic-based adhesive, so that the optically anisotropic layer A1 side was at the adhesive side, thereby giving a polarizer PAC1F. Further, the acrylic-based adhesive was also applied on the optically anisotropic layer C1 side of the optical compensatory sheet. At this time, the long sides of the respective roll films are parallel to each other and continuously adhered together since the polarizer and the protective film at both sides of the polarizer are produced in a roll state. In addition, as shown in FIG. 1, the slow axis of the optically anisotropic layer A1 is parallel to the transmission axis of the polarizer.

Furthermore, a polarizer PAC1R was constructed as in the polarizer PAC1R but replacing the protective film LR1 with a commercially available triacetyl cellulose film (FUJITACK-TDY80UL, manufactured by FUJI PHOTO FILM CO., LTD.) in the polarizer PAC1F. Herein, a commercially available cellulose acylate film usable includes, in addition to above-mentioned FUJITACK-TDY80UL, "FUJITACK-TD80UL", "FUJITACK-TF80UL", "FUJITACK-TFY80UL", "FUJITACK-T80UZ" and "FUJITACK-T40UZ" (the above products were manufactured by FUJI PHOTO FILM CO., LTD.), and "KC4UX2MW" and "KC80UVSFD" (the above products were manufactured by Konica Minolta Opto, Inc.).

Example 8

Construction of Polarizer PAC2

(Construction of Optically Anisotropic Layer C2)

On the surface of the optically anisotropic layer A1 prepared in Example 7, a corona discharge treatment was carried out by the use of a solid state corona treating machine model 6KVA (available from Pillar Inc.) and then a coating solution of the following formulation was applied thereon by a wire bar coater of #14 with an amount of 24 ml/m². The coating was dried for 60 seconds with a warm air of 60° C. and for 150 seconds with a warm air of 90° C. to obtain a film.

| <Formulation of coating solution for alignment film> | |
| --- | --- |
| modified polyvinyl alcohol shown below | 40 parts by weight |
| water | 728 parts by weight |
| methanol | 228 parts by weight |
| glutaraldehyde (crosslinking agent) | 2 parts by weight |
| citrate ester (AS3, manufactured by Sankyo Chemical Industries, Ltd.) | 0.69 parts by weight | modified polyvinyl alcohol

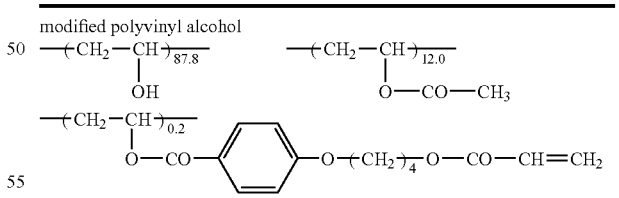

A coating solution was prepared by dissolving 41.01 parts by weight of a discotic liquid crystalline compound shown below, 4.06 parts by weight of ethylene oxide-modified trimethylolpropane triacrylate (V#360, manufactured by Osaka Organic Chemical Industry Ltd.), 1.35 parts by weight of a photopolymerization initiator (IRGACURE 907, manufactured by Ciba-Geigy AG), 0.45 parts by weight of a sensitizer (KAYACURE DETX, manufactured by Nippon Kayaku Co., Ltd.), and 0.12 parts by weight of a melamine-based polymer shown below in 75 parts by weight of methyl ethyl ketone and thereto was then added 0.1 part by weight of a fluoroaliphatic group-containing copolymer (MEGAFACE F780, manufactured by DAINIPPON INK & CHEMICALS, INCORPORATED), and the coating solution was continuously applied to the surface of the alignment film of the optically anisotropic layer A1 which is conveyed at a speed of 20 m/min, with 391 rotations of a #2.8 wire-bar in the same direction as the conveying direction of the film. The solvent was dried in the process in which it was continuously warmed from room temperature to 100° C. and then the coating layer was heated in a drying zone of 135° C. for 90 seconds so that the wind hit against the surface of the discotic liquid crystalline compound has a velocity of 1.5 m/sec and is parallel to the conveying direction of the film, thereby aligning the discotic liquid crystalline compound. Then, the layer was conveyed to a drying zone of 80° C. and, at a state that the temperature on the surface of the film is 100° C., irradiated for 4 seconds with UV light of an illuminance of 600 mW by the use of an ultraviolet irradiation device (ultraviolet lamp: output; 160 W/cm, length of emission; 1.6 m) to crosslink and fix the discotic liquid crystalline compound in the alignment state. Then, the film was allowed to stand to cool to room temperature and cylindrically wound as a rolled state to obtain an optical compensatory sheet AC2 comprising the optically anisotropic layers A1 and C2.

The alignment film and the optically anisotropic layer C2 are formed on the glass substrate separately prepared, instead of the optically anisotropic layer A1 subjected to a corona treatment, to obtain the optically anisotropic layer C2G comprising the discotic liquid crystalline compound. $Re_{(450)}$, $Re_{(590)}$, $Re_{(650)}$, $Rth_{(450)}$, $Rth_{(590)}$ and $Rth_{(650)}$ were measured and the results thereof are Table 18.

Discotic Liquid Crystalline Compound

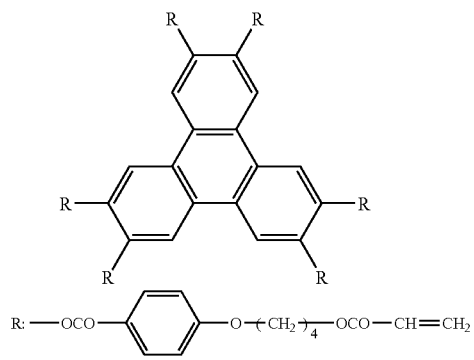

Melamine Polymer (Repeating Unit)

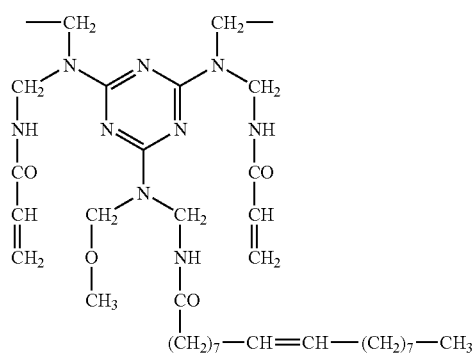

(Construction of Polarizer PAC2)

A polyvinyl alcohol (PVA) film having a thickness of 80 μm was immersed in an aqueous iodine solution having an iodine concentration of 0.05% by weight at 30° C. for 60 seconds and stained. Then, the film was stretched in the longitudinal direction to five times its original length while immersing in an aqueous boric acid solution having a boric acid concentration of 4% by weight for 60 seconds, and thereafter was dried at 50° C. for 4 minutes to obtain a polarizer having a thickness of 20 μm.

CTA1 obtained in Example 6 and the protective film LR1 having an antireflective layer obtained in Preparative Example 1 were immersed in an aqueous sodium hydroxide solution having a concentration of 1.5 mol/L at 55° C. and then was washed with water to sufficiently wash away sodium hydroxide. Then, the film was immersed in an aqueous dilute sulfuric acid solution having a concentration of 0.005 mol/L at 35° C. for 1 minute and immersed in water to sufficiently wash away the aqueous dilute sulfuric acid solution. Finally, the sample was sufficiently dried at 120° C.

CTA1 saponified as described above and the protective film LR1 having an antireflective layer were adhered together by the use of a polyvinyl alcohol-based adhesive so as to interpose therebetween the polarizer, thereby giving a polarizer. Herein, the adherence was carried out so that the triacetyl cellulose film side of the protective film LR1 having an antireflective layer was at the side of the polarizer.

An optical compensatory sheet AC2 was adhered to the polarizer CTA1 side, through an acrylic-based adhesive, so that the optically anisotropic layer A1 side was at the adhesive side, thereby giving a polarizer PAC2F. Further, the acrylic-based adhesive was also applied on the optically anisotropic layer C2 side of the optical compensatory sheet. At this time, the longitudinal directions of the respective roll films are parallel to each other and continuously adhered together since the polarizer and the protective film at both sides of the polarizer are produced in a roll state. In addition, as shown in FIG. 1, the slow axis of the optically anisotropic layer A1 is parallel to the transmission axis of the polarizer.

In addition, a polarizer PAC2F was constructed by replacing the protective film LR1 with a commercially available triacetyl cellulose film (FUJITACK-TDY80UL, manufactured by FUJI PHOTO FILM CO., LTD.) in the polarizer PAC2R.

Example 9

Construction of the Polarizer PAC3

(Construction of the Optically Anisotropic Layer C3)

On the surface of the optically anisotropic layer A1 prepared in Example 7, a corona discharge treatment was carried out by the use of a solid state corona treating machine model 6 KVA (available from Pillar Inc.), and formed an alignment film layer in the same manner as in Example 8.

After subjecting the alignment film to rubbing treatment, 41.01 parts by weight of the following rod-shaped liquid crystalline compound, 1.35 parts by weight of a photopolymerization initiator (ILGACURE 907, manufactured by Ciba-Geigy Co., Ltd.), 0.45 part by weight of a sensitizer (KAYACURE DETX, manufactured by Nippon Kayaku Co., Ltd.) and the reactive monomer having the chiral structure as described below were added so that the selection reflection wavelength is 300 nm. Then, the solution was continuously applied to the surface of the alignment film of the optically anisotropic layer A1 which is conveyed at a speed of 20 m/min, with 391 rotations of a #2 wire-bar in the same direction as the conveying direction of the film. The solvent was dried in the process in which it was continuously warmed from room temperature to 70° C., and then was heated in a drying zone of 90° C. for 90 seconds so that the wind hit against the surface of the rod-shaped liquid crystalline compound layer has a velocity of 1.5 m/sec and is parallel to the conveying direction of the film, thereby cholesteric-aligning the rod-shaped liquid crystalline compound. Then, the layer was conveyed to a drying zone of 80° C. and, at a state that the temperature on the surface of the film is 80° C., irradiated for 4 seconds with UV light of an illuminance of 600 mW by the use of an ultraviolet irradiation device (ultraviolet lamp: output; 160 W/cm, length of emission; 1.6 m) to crosslink and fix the rod-shaped liquid crystalline compound in the alignment state. Then, the film was allowed to stand to cool to room temperature and cylindrically wound as a rolled state to obtain an optical compensatory sheet AC3 comprising the optically anisotropic layers A1 and C3.

The alignment film and the optically anisotropic layer C3 were formed on the glass substrate separately prepared, instead of the optically anisotropic layer A1 subjected to a corona treatment, to obtain the optically anisotropic layer C3G comprising the rod-shaped liquid crystalline compound. $Re_{(450)}$, $Re_{(590)}$, $Re_{(650)}$, $Rth_{(450)}$, $Rth_{(590)}$ and $Rth_{(650)}$ were measured and the results thereof are Table 18.

Rod-Shaped Liquid Crystalline Compound

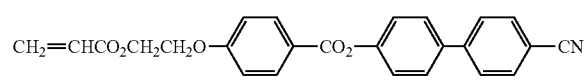

Reactive Monomer

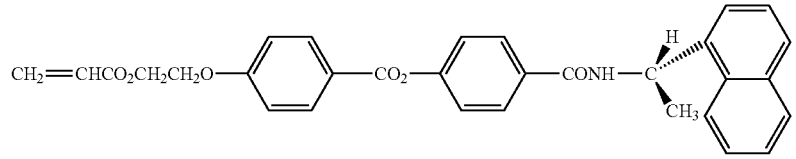

(Construction of the Polarizer PAC3)

A polyvinyl alcohol (PVA) film having a thickness of 80 μm was immersed in an aqueous iodine solution having an iodine concentration of 0.05% by weight at 30° C. for 60 seconds and stained. Then, the film was stretched in the longitudinal direction to five times its original length while immersing in an aqueous boric acid solution having a boric acid concentration of 4% by weight for 60 seconds, and thereafter was dried at 50° C. for 4 minutes to obtain a polarizer having a thickness of 20 μm.

CTA1 obtained in Example 6 and the protective film LR1 having an antireflective layer obtained in Preparative Example 1 were immersed in an aqueous sodium hydroxide solution having a concentration of 1.5 mol/L at 55° C. and then was washed with water to sufficiently wash away sodium hydroxide. Then, the film was immersed in an aqueous dilute sulfuric acid solution having a concentration of 0.005 mol/L at 35° C. for 1 minute and immersed in water to sufficiently wash away the aqueous dilute sulfuric acid solution. Finally, the sample was sufficiently dried at 120° C.

CTA1 saponified as described above and the protective film LR1 having an antireflective layer were adhered together by the use of a polyvinyl alcohol-based adhesive so as to interpose therebetween the polarizer, thereby giving a polarizer.

Herein, the adherence was carried out so that the triacetyl cellulose film side of the protective film LR1 having an antireflective layer was at the side of the polarizer.

An optical compensatory sheet AC3 was adhered to the polarizer CTA1 side, through an acrylic-based adhesive, so that the optically anisotropic layer A1 side was at the adhesive side, thereby giving a polarizer PAC3F. Further, the acrylic-based adhesive was also applied on the optically anisotropic layer C3 side of the optical compensatory sheet. At this time, the longitudinal directions of the respective roll films are parallel to each other and continuously adhered together since the polarizer and the protective film at both sides of the polarizer are produced in a roll state. In addition, as shown in FIG. 1, the slow axis of the optically anisotropic layer A1 is parallel to the transmission axis of the polarizer.

In addition, a polarizer PAC3R was constructed by replacing the protective film LR1 with a commercially available triacetyl cellulose film (FUJITACK-TDY80UL, manufactured by FUJI PHOTO FILM CO., LTD.) in the polarizer PAC3F.

Example 10

Construction of the Polarizer PAC4

(Construction of the Optically Anisotropic Layer C4)

Commercially available ARTON ZF14 was subjected to stretching of 6% in the longitudinal direction and 7% in the horizontal direction with a sequential biaxial drawing machine at the temperature of 140° C., to construct the film C4 (the optically anisotropic layer). The film thickness after stretching was 88 μm. $Re_{(450)}$, $Re_{(590)}$, $Re_{(650)}$, $Rth_{(450)}$, $Rth_{(590)}$ and $Rth_{(650)}$ were measured. The results are shown in Table 18.

(Construction of the Polarizer PAC4)

A polyvinyl alcohol (PVA) film of 80 μm in thickness was immersed in an aqueous iodine solution having an iodine concentration of 0.05% by weight at 30° C. for 60 seconds and stained. Then, the film was stretched in the longitudinal direction to five times its original length while immersing in an aqueous boric acid solution having a boric acid concentration of 4% by weight for 60 seconds, and thereafter was dried at 50° C. for 4 minutes to obtain a polarizer having a thickness of 20 μm.

CTA1 obtained in Example 6 and the protective film LR1 having an antireflective layer obtained in Preparative Example 1 were immersed in an aqueous sodium hydroxide solution having a concentration of 1.5 mol/L at 55° C. and then was washed with water to sufficiently wash away sodium hydroxide. Then, the film was immersed in an aqueous dilute sulfuric acid solution having a concentration of 0.005 mol/L at 35° C. for 1 minute and immersed in water to sufficiently wash away the aqueous dilute sulfuric acid solution. Finally, the sample was sufficiently dried at 120° C.

CTA1 saponified as described above and the protective film LR1 having an antireflective layer were adhered together by the use of a polyvinyl alcohol-based adhesive so as to interpose therebetween the polarizer, thereby giving a polarizer. Herein, the adherence was carried out so that the triacetyl cellulose film side of the protective film LR1 having an antireflective layer was at the side of the polarizer.

The optically anisotropic layer A1 constructed in Example 7 was adhered to CTA1 side of this polarizer through an acrylic-based adhesive. Further, the optically anisotropic layer C4 was adhered to the optically anisotropic layer A1 through acrylic-based adhesive to construct the polarizer PAC4F. Further, the acrylic-based adhesive was also applied on the optically anisotropic layer C4 side of the optical compensatory sheet. At this time, the longitudinal directions of the respective roll films are parallel to each other and continuously adhered together since the polarizer and the protective film at both sides of the polarizer are produced in a roll state. In addition, as shown in FIG. 1, the slow axis of the optically compensatory layer A1 is parallel to the transmission axis of the polarizer.

In addition, a polarizer PAC4R was constructed by replacing the protective film LR1 with a commercially available triacetyl cellulose film (FUJITACK-TDY80UL, manufactured by FUJI PHOTO FILM CO., LTD.) in the polarizer PAC4F.

While conveying the roll-shaped transparent support designed with an alignment film, rubbing treatment was carried out continuously in the longitudinal direction (conveying direction). 100 parts by weight of rod-shaped liquid crystalline molecule (N26), 1 part by weight of a photopolymerization initiator (ILGACURE 907, manufactured by Nippon Ciba-Geigy Co., Ltd.), and 0.3 part by weight of a photopolymerization sensitizer (KAYACURE DETX, manufactured by Nippon Kayaku Co., Ltd.) were dissolved in 900 parts by weight of methylene chloride to prepare a coating solution. The coating solution was continuously applied to the alignment film using #5 wire-bar coater. The coating layer was heated at 110° C. for 2 minutes, and ultraviolet light at 500 mJ/cm$^2$ was irradiated to polymerize the rod-shaped liquid crystalline molecules, thereby fixing the alignment state. Accordingly, an optically anisotropic layer was formed, and the optically anisotropic layer A2 was constructed. The rod-shaped liquid crystalline molecule was aligned such that the longer axis direction is perpendicular to the longitudinal direction of the optical compensatory sheet.

On a separately prepared glass substrate, the alignment film layer having the film thickness of 0.5 μm after drying and the rod-shaped liquid crystal layer having the film thickness of 0.9 μm were formed, thereby giving an optically anisotropic layer A2G comprising the rod-shaped liquid crystalline molecule. $Re_{(450)}$, $Re_{(590)}$, $Re_{(650)}$, $Rth_{(450)}$, $Rth_{(590)}$ and $Rth_{(650)}$ were measured. The results are shown in Table 18.

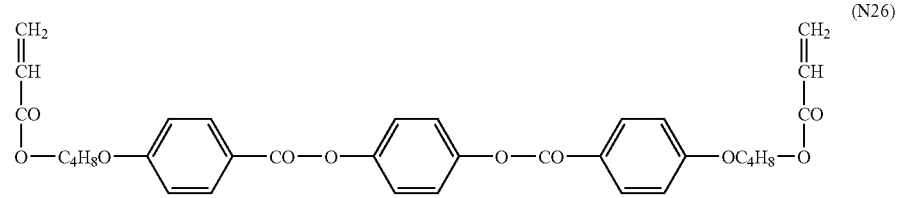

Example 11

Construction of the Polarizer PAC5

(Construction of the Optically Anisotropic Layer A2)

To the surface of the cellulose acetate film CTA1 constructed in Example 6, a solution of polyimide in N-methylpyrrolidone/butylcellosolve as described below was continuously applied using #5 wire-bar coater while conveying a roll-shaped transparent support. It was heated at 140° C. for 3 minutes, thereby forming an alignment film of 0.5 μm in thickness.
Polyimide (Repeating Unit)

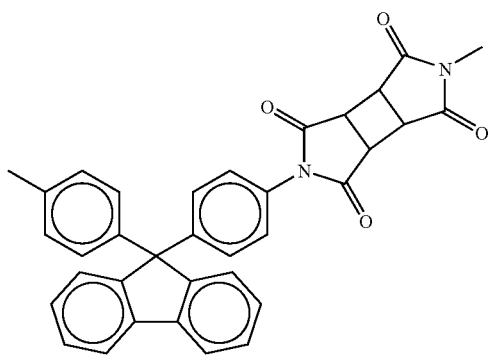

On the optically anisotropic layer A2, the polyamide solution described in Example 7 was applied to 1.8 μm in a film thickness after drying and was dried at 150° C. for 5 minutes to form the optical compensatory layer C1 comprising polyimide described above, thereby to construct the optical compensatory sheet AC5.

On a separately prepared glass substrate, the polyimide solution was applied to 1.8 μm in a film thickness after drying and was dried at 150° C. for 5 minutes to form an optically anisotropic layer C1G comprising polyimide described above. $Re_{(450)}$, $Re_{(590)}$, $Re_{(650)}$, $Rth_{(450)}$, $Rth_{(590)}$ and $Rth_{(650)}$ were measured. The results are shown in Table 18.

(Construction of the Polarizer PAC5)

A polyvinyl alcohol (PVA) film having a thickness of 80 μm was immersed in an aqueous iodine solution having an iodine concentration of 0.05% by weight at 30° C. for 60 seconds and stained. Then, the film was stretched in the longitudinal direction to five times its original length while immersing in an aqueous boric acid solution having a boric acid concentration of 4% by weight for 60 seconds, and thereafter was dried at 50° C. for 4 minutes to obtain a polarizer having a thickness of 20 μm.

The optical compensatory sheet AC5 constructed above and the protective film LR1 having an antireflective layer obtained in Preparative Example 1 were immersed in an aqueous sodium hydroxide solution having a concentration of 1.5 mol/L at 55° C. and then was washed with water to sufficiently wash away sodium hydroxide. Then, the film was immersed in an aqueous dilute sulfuric acid solution having a concentration of 0.005 mol/L at 35° C. for 1 minute and immersed in water to sufficiently wash away the aqueous dilute sulfuric acid solution. Finally, the sample was sufficiently dried at 120° C.

The optical compensatory sheet AC5 saponified as described above and the protective film LR1 having an antireflective layer were adhered together by the use of a polyvinyl alcohol-based adhesive so as to interpose therebetween the polarizer, thereby giving a polarizer PAC4F. Herein, the adherence was carried out so that the cellulose acylate film CTA1 side of the optical compensatory sheet AC5 and the triacetyl cellulose film side of the protective film LR1 having an antireflective layer were at the side of the polarizer.

Further, the acrylic-based adhesive was also applied on the optically anisotropic layer C1 side of the optical compensatory sheet, thereby giving a polarizer PAC5F. At this time, the longitudinal directions of the respective roll films are parallel to each other and continuously adhered together since the polarizer and the protective film at both sides of the polarizer are produced in a roll state. In addition, as shown in FIG. 1, the slow axis of the optically anisotropic layer A2 is parallel to the transmission axis of the polarizer.

In addition, a polarizer PAC5R was constructed by replacing the protective film LR1 with a commercially available triacetyl cellulose film (FUJITACK-TDY80UL, manufactured by FUJI PHOTO FILM CO., LTD.) in the polarizer PAC5F.

Example 12

Construction of the Polarizer PAC6

A polyvinyl alcohol (PVA) film having a thickness of 80 μm was immersed in an aqueous iodine solution having an iodine concentration of 0.05% by weight at 30° C. for 60 seconds and stained. Then, the film was stretched in the longitudinal direction to five times its original length while immersing in an aqueous boric acid solution having a boric acid concentration of 4% by weight for 60 seconds, and thereafter was dried at 50° C. for 4 minutes to obtain a polarizer having a thickness of 20 μm.

The protective film LR1 having an antireflective layer obtained in Preparative Example 1 was immersed in an aqueous sodium hydroxide solution having a concentration of 1.5 mol/L at 55° C. and then was washed with water to sufficiently wash away sodium hydroxide. Then, the film was immersed in an aqueous dilute sulfuric acid solution having a concentration of 0.005 mol/L at 35° C. for 1 minute and immersed in water to sufficiently wash away the aqueous dilute sulfuric acid solution. Finally, the sample was sufficiently dried at 120° C.

On the surface of ARTON FLZR50 (manufactured by JSR Corp.) a corona discharge treatment was carried out by the use of a solid state corona treating machine model 6 KVA (available from Pillar Inc.).

The corona treated ARTON FLZR50 and the saponified protective film LR1 having the antireflective layer were adhered together by the use of a polyvinyl alcohol-based adhesive so as to interpose therebetween the polarizer. Herein, the adherence was carried out so that the triacetyl cellulose film side of the protective film LR1 having an antireflective layer was at the side of the polarizer.

An optical compensatory sheet AC1 produced in Example 7 was adhered to ARTON FLZR50 side, through an acrylic-based adhesive, so that the optically anisotropic layer A1 side was at the polarizer side, thereby giving a polarizer PAC6F. At this time, the longitudinal directions of the respective roll films are parallel to each other and continuously adhered together since the polarizer and the protective film at both sides of the polarizer are produced in a roll state. In addition, as shown in FIG. 1, the slow axis of the optically anisotropic layer A1 is parallel to the transmission axis of the polarizer.

In addition, a polarizer PAC6R was constructed by replacing the protective film LR1 with a commercially available triacetyl cellulose film (FUJITACK-TDY80UL, manufactured by FUJI PHOTO FILM CO., LTD.) in the polarizer PAC6F.

Comparative Example 1

Construction of the Polarizer PAC7

The polarizers PAC7F and PAC7R were constructed in the same manner as in Example 7, except that the cellulose acetate film CTA1 of the polarizer PAC1 in Example 7 was substituted with a commercially available triacetyl cellulose film (FUJITACK-TDY80UL, manufactured by FUJI PHOTO FILM CO., LTD).

Comparative Example 2

Construction of the Polarizer PAC8

The polarizers PAC8F and PAC8R were constructed in the same manner as in Example 10 except that the cellulose acetate film CTA1 of the polarizer PAC4 in Example 10 was substituted with a commercially available triacetyl cellulose film (FUJITACK-TDY80UL, manufactured by FUJI PHOTO FILM CO., LTD).

Comparative Example 3

Construction of the Polarizer PAC9

The polarizers PAC9F and PAC9R were constructed in the same manner as in Example 11 except that the cellulose acetate film CTA1 of the polarizer PAC5 in Example 11 was substituted with commercially available triacetyl cellulose film (FUJITACK-TDY80UL, manufactured by FUJI PHOTO FILM CO., LTD).

Example 13

Construction of the Polarizer PCA1

(Construction of the Optically Anisotropic Layer A3 Through Stretching)

A film was fabricated from the dope solution of the polycarbonate copolymer of Example 7 with a band casting machine and stretched at a transverse stretching of 7% with the use of a tenter at a temperature of 210° C. to give an optically anisotropic layer A3. A film thickness after stretching was 93 μm. $Re_{(450)}$, $Re_{(590)}$, $Re_{(650)}$, $Rth_{(450)}$, $Rth_{(590)}$ and $Rth_{(650)}$ were measured. The results are shown in Table 18.

(Construction of the Optically, Anisotropic Layer C5 Using Non-Liquid Crystalline Compound)

Polyimide, which was synthesized from 2,2'-bis(3,4-dicarboxyphenyl)hexafluoropropane and 2,2'-bis(trifluoromethyl)-4,4'-diaminobiphenyl, was dissolved in cyclohexanone to prepare a polyimide solution of 15% by weight. On the cellulose acetate film CTA2, the polyimide solution was applied to 3.1 μm in a film thickness after drying and was dried at 150° C. for 5 minutes to form an optically anisotropic layer C5 comprising the polyimide described above, thereby giving the optical compensatory sheet CA1 having the optically anisotropic layer C5 on the cellulose acetate film CTA2.

On a separately prepared glass substrate, the polyimide solution was applied to 3.1 μm in a film thickness after drying and was dried at 150° C. for 5 minutes to form an optical compensatory layer C5G comprising the polyimide described above. $Re_{(450)}$, $Re_{(590)}$, $Re_{(650)}$, $Rth_{(450)}$, $Rth_{(590)}$ and $Rth_{(650)}$ were measured. The results are shown in Table 18.

(Construction of the Polarizer PCA1)

A polyvinyl alcohol (PVA) film having a thickness of 80 μm was immersed in an aqueous iodine solution having an iodine concentration of 0.05% by weight at 30° C. for 60 seconds and stained. Then, the film was stretched in the longitudinal direction to five times its original length while immersing in an aqueous boric acid solution having a boric acid concentration of 4% by weight for 60 seconds, and thereafter was dried at 50° C. for 4 minutes to obtain a polarizer having a thickness of 20 μm.

The optical compensatory sheet CA1 constructed above and the protective film LR1 having an antireflective layer obtained in Preparative Example 1 were immersed in an aqueous sodium hydroxide solution having a concentration of 1.5 mol/L at 55° C. and then was washed with water to sufficiently wash away sodium hydroxide. Then, the film was immersed in an aqueous dilute sulfuric acid solution having a concentration of 0.005 mol/L at 35° C. for 1 minute and immersed in water to sufficiently wash away the aqueous dilute sulfuric acid solution. Finally, the sample was sufficiently dried at 120° C.

The optical compensatory sheet CA1 saponified as described above and the protective film LR1 having an antireflective layer were adhered together by the use of a polyvinyl alcohol-based adhesive so as to interpose therebetween the polarizer, thereby giving a polarizer. Herein, the adherence was carried out so that the triacetyl cellulose film side of the protective film LR1 having an antireflective layer and the cellulose acetate film CTA2 side of the optical compensatory sheet CA1 were at the side of the polarizer.

An optically anisotropic layer A3 was adhered to the optically anisotropic layer C5 side of this polarizer, through an acrylic-based adhesive, so that the optically anisotropic layer A3 side was at the adhesive side, thereby giving a polarizer PCA1F. Further, the acrylic-based adhesive was also applied on the optically anisotropic layer A3 of the optical compensatory sheet. At this time, the longitudinal directions of the respective roll films are parallel to each other and continuously adhered together since the polarizer and the protective film at both sides of the polarizer are produced in a roll state. In addition, as shown in FIG. 1, the slow axis of the optically anisotropic layer A1 is parallel to the transmission axis of the polarizer.

In addition, a polarizer PCA1R was constructed by replacing the protective film LR1 with a commercially available triacetyl cellulose film (FUJITACK-TDY80UL, manufactured by FUJI PHOTO FILM CO., LTD.) in the polarizer PCA1F.

Example 14

Construction of the Polarizer PCA2

(Construction of the Optically Anisotropic Layer C6)

To the surface of the cellulose acetate film CTA2 constructed in Example 6, a solution of polyimide in N-methylpyrrolidone/butylcellosolve used in Example 11 was continuously applied using #30 wire-bar coater while conveying a roll-shaped transparent support. It was heated at 140° C. for 3 minutes, thereby forming an optically anisotropic layer C6 of 15 μm in thickness.

On a separately prepared glass substrate, the polyimide solution was applied to 15 μm in a film thickness after drying and was dried at 150° C. for 5 minutes to form an optical compensatory layer C6G comprising the polyimide described above. $Re_{(450)}$, $Re_{(590)}$, $Re_{(650)}$, $Rth_{(450)}$, $Rth_{(590)}$ and $Rth_{(650)}$ were measured. The results are shown in Table 18.

While conveying the roll-shaped transparent support designed with an optically anisotropic layer C6, rubbing treatment was carried out continuously in the longitudinal direction (conveying direction). 100 parts by weight of the aforementioned rod-shaped liquid crystalline molecule (N26), 1 part by weight of a photopolymerization initiator (ILGACURE 907, manufactured by Nippon Ciba-Geigy Co., Ltd.), and 0.3 part by weight of a photopolymerization sensitizer (KAYACURE DETX, manufactured by Nippon Kayaku Co., Ltd.) were dissolved in 900 parts by weight of methylene chloride to prepare a coating solution. The coating solution was continuously applied to the alignment film using #2 wire-bar coater. The coating layer was heated at 110° C. for 2 minutes, and ultraviolet light at 500 mJ/cm² was irradiated to polymerize the rod-shaped liquid crystalline molecules, thereby fixing the alignment state. Accordingly, an optically anisotropic layer A4 was formed, and an optical compensatory sheet CA2 was constructed. The rod-shaped liquid crystalline molecule was aligned such that the longer axis direction is perpendicular to the longitudinal direction of the optical compensatory sheet.

On a separately prepared glass substrate, the alignment film layer having the film thickness of 0.5 μm after drying and the rod-shaped liquid crystal layer having the film thickness of 0.3 μm were formed, thereby giving an optically anisotropic layer A4G comprising the rod-shaped liquid crystalline molecule. $Re_{(450)}$, $Re_{(590)}$, $Re_{(650)}$, $Rth_{(450)}$, $Rth_{(590)}$ and $Rth_{(650)}$ were measured. The results are shown in Table 18.

(Construction of the Polarizer PCA2)

A polyvinyl alcohol (PVA) film having a thickness of 80 Mm was immersed in an aqueous iodine solution having an iodine concentration of 0.05% by weight at 30° C. for 60 seconds and stained. Then, the film was stretched in the longitudinal direction to five times its original length while immersing in an aqueous boric acid solution having a boric acid concentration of 4% by weight for 60 seconds, and thereafter was dried at 50° C. for 4 minutes to obtain a polarizer having a thickness of 20 μm.

The optical compensatory sheet CA2 constructed above and the protective film LR1 having an antireflective layer obtained in Preparative Example 1 were immersed in an aqueous sodium hydroxide solution having a concentration of 1.5 mol/L at 55° C. and then was washed with water to sufficiently wash away sodium hydroxide. Then, the film was immersed in an aqueous dilute sulfuric acid solution having a concentration of 0.005 mol/L at 35° C. for 1 minute and immersed in water to sufficiently wash away the aqueous dilute sulfuric acid solution. Finally, the sample was sufficiently dried at 120° C.

The optical compensatory sheet CA2 saponified as described above and the protective film LR1 having an antireflective layer were adhered together by the use of a polyvinyl alcohol-based adhesive so as to interpose therebetween the polarizer, thereby giving a polarizer PCA2F. Herein, the adherence was carried out so that the cellulose acylate film CTA2 side of the optical compensatory sheet AC2 and the triacetyl cellulose film side of the protective film LR1 having the antireflective layer were at the side of the polarizer.

Further, the acrylic-based adhesive was also applied on the optically anisotropic layer CA2 side of the optical compensatory sheet, thereby giving a polarizer PCA2F. At this time, the longitudinal directions of the respective roll films are parallel to each other and continuously adhered together since the polarizer and the protective film at both sides of the polarizer are produced in a roll state. In addition, as shown in FIG. 1, the slow axis of the optically anisotropic layer A4 is parallel to the transmission axis of the polarizer.

In addition, a polarizer PCA2R was constructed by replacing the protective film LR1 with a commercially available triacetyl cellulose film (FUJITACK-TDY80UL, manufactured by FUJI PHOTO FILM CO., LTD.) in the polarizer PCA2F.

Example 15

Construction of the Polarizer PCA3

(Construction of the Optically Anisotropic Layer C5 Using Non-Liquid Crystalline Compound)

On the surface of ZEONOR ZF14 (manufactured by Optes Inc.) a corona discharge treatment was carried out by the use of a solid state corona treating machine model 6 KVA (available from Pillar Inc.), and the optically anisotropic layer C5 was formed in the same manner as in Example 13, and the optical compensatory sheet CA3 was constructed.
(Construction of the Polarizer PCA3)

A polyvinyl alcohol (PVA) film having a thickness of 80 µm was immersed in an aqueous iodine solution having an iodine concentration of 0.05% by weight at 30° C. for 60 seconds and stained. Then, the film was stretched in the longitudinal direction to five times its original length while immersing in an aqueous boric acid solution having a boric acid concentration of 4% by weight for 60 seconds, and thereafter was dried at 50° C. for 4 minutes to obtain a polarizer having a thickness of 20 µm.

The optical compensatory sheet CA3 constructed above and the protective film LR1 having an antireflective layer obtained in Preparative Example 1 were immersed in an aqueous sodium hydroxide solution having a concentration of 1.5 mol/L at 55° C. and then was washed with water to sufficiently wash away sodium hydroxide. Then, the film was immersed in an aqueous dilute sulfuric acid solution having a concentration of 0.005 mol/L at 35° C. for 1 minute and immersed in water to sufficiently wash away the aqueous dilute sulfuric acid solution. Finally, the sample was sufficiently dried at 120° C.

The optical compensatory sheet CA3 saponified as described above and the protective film LR1 having an antireflective layer were adhered together by the use of a polyvinyl alcohol-based adhesive so as to interpose therebetween the polarizer, thereby giving a polarizer. Herein, the adherence was carried out so that the triacetyl cellulose film side of the protective film LR1 having an antireflective layer and the transparent support side of the optical compensatory sheet CA3 were at the side of the polarizer.

An optically anisotropic layer A3 was adhered to the optically anisotropic layer C5 side of this polarizer, through an acrylic-based adhesive, thereby giving a polarizer PCA3F. Further, the acrylic-based adhesive was also applied on the optically anisotropic layer A3 of the optical compensatory sheet. At this time, the longitudinal directions of the respective roll films are parallel to each other and continuously adhered together since the polarizer and the protective film at both sides of the polarizer are produced in a roll state. In addition, as shown in FIG. 1, the slow axis of the optically anisotropic layer A3 is parallel to the transmission axis of the polarizer.

In addition, a polarizer PCA3R was constructed by replacing the protective film LR1 with a commercially available triacetyl cellulose film (FUJITACK-TFY80UL, manufactured by FUJI PHOTO FILM CO., LTD.) in the polarizer PCA3F.

Comparative Example 4

Construction of the Polarizer PCA4

The polarizers PCA4F and PCA4R were constructed in the same manner as in Example 13, except that the cellulose acetate film CTA2 of the polarizer PCA1 in Example 13 was substituted with a commercially available triacetyl cellulose film (FUJITACK TFY80UL, manufactured by FUJI PHOTO FILM CO., LTD).

Comparative Example 5

Construction of the Polarizer PCA5

The polarizers PCA5F and PCA5R were constructed in the same manner as in Example 14, except that the cellulose acetate film CTA2 of the polarizer PCA2 in Example 14 was substituted with a commercially available triacetyl cellulose film (FUJITACK TFY80UL, manufactured by FUJI PHOTO FILM CO., LTD).

Comparative Example 6

Construction of the Polarizer PCA6

(Construction of the Optically Anisotropic Layer C7)

Commercially, available ARTON ZF14 was subjected to stretching of 13% in the longitudinal direction and 14% in the horizontal direction with a sequential biaxial drawing machine at the temperature of 140° C. to construct the film C7 (the optically anisotropic layer). The film thickness after stretching was 78 µm. $Re_{(450)}$, $Re_{(590)}$, $Re_{(650)}$, $Rth_{(450)}$, $Rth_{(590)}$ and $Rth_{(650)}$ were measured. The results are shown in Table 18.
(Construction of the Optically Anisotropic Layer A4)

On the surface of the optically anisotropic layer C7 constructed above, a corona discharge treatment was carried out by the use of a solid state corona treating machine model 6 KVA (available from Pillar Inc.), and on the surface, a solution of aforementioned polyimide in N-methylpyrrolidone/butylcellosolve was continuously applied using #5 wire-bar coater while conveying a roll-shaped transparent support. It was heated at 140° C. for 3 minutes, thereby forming an alignment film of 0.5 µm in thickness.

While conveying the roll-shaped transparent support designed with an alignment film, rubbing treatment was carried out continuously in the longitudinal direction (conveying direction). 100 parts by weight of the aforementioned rod-shaped liquid crystalline molecule (N26), 1 part by weight of a photopolymerization initiator (ILGACURE 907, manufactured by Nippon Ciba-Geigy Co., Ltd.), and 0.3 part by weight of a photopolymerization sensitizer (KAYACURE DETX, manufactured by Nippon Kayaku Co., Ltd.) were dissolved in 900 parts by weight of methylene chloride to prepare a coating solution. The coating solution was continuously applied to the alignment film using #2 wire-bar coater. The coating layer was heated at 110° C. for 2 minutes, and ultraviolet light at 500 mJ/cm² was irradiated to polymerize the rod-shaped liquid crystalline molecules, thereby fixing the alignment state. Accordingly, an optically anisotropic layer was formed, and an optically anisotropic layer A4 was constructed. The rod-shaped liquid crystalline molecule was aligned such that the longer axis direction is perpendicular to the longitudinal direction of the optical compensatory sheet. Thus, an optical compensatory sheet CA6 was produced.

On a separately prepared glass substrate, the alignment film layer having the film thickness of 0.5 μm after drying and the rod-shaped liquid crystal layer having the film thickness of 0.3 μm were formed, thereby giving optical compensatory layer A4G comprising the rod-shaped liquid crystalline molecule. $Re_{(450)}$, $Re_{(590)}$, $Re_{(650)}$, $Rth_{(450)}$, $Rth_{(590)}$ and $Rth_{(650)}$ were measured. The results are shown in Table 18.

(Construction of the Polarizer PCA6)

A polyvinyl alcohol (PVA) film having a thickness of 80 μm was immersed in an aqueous iodine solution having an iodine concentration of 0.05% by weight at 30° C. for 60 seconds and stained. Then, the film was stretched in the longitudinal direction to five times its original length while immersing in an aqueous boric acid solution having a boric acid concentration of 4% by weight for 60 seconds, and thereafter was dried at 50° C. for 4 minutes to obtain a polarizer having a thickness of 20 μm.

Commercially available triacetyl cellulose film (FUJI-TACK TFY80UL) and the protective film LR1 having an antireflective layer obtained in Preparative Example 1 were immersed in an aqueous sodium hydroxide solution having a concentration of 1.5 mol/L at 55° C. and then was washed with water to sufficiently wash away sodium hydroxide. Then, the film was immersed in an aqueous dilute sulfuric acid solution having a concentration of 0.005 mol/L at 35° C. for 1 minute and immersed in water to sufficiently wash away the aqueous dilute sulfuric acid solution. Finally, the sample was sufficiently dried at 120° C.

The commercially available triacetyl cellulose film (FUJI-TACK TFY80UL) saponified as described above and the protective film LR1 having an antireflective layer were adhered together by the use of a polyvinyl alcohol-based adhesive so as to interpose therebetween the polarizer. Herein, the adherence was carried out so that the triacetyl cellulose film side of the protective film LR1 having an antireflective layer was at the side of the polarizer.

An optically anisotropic layer C7 side of the optical compensatory sheet CA6 was adhered to the commercially available triacetyl cellulose film of the above-mentioned polarizer, through an acrylic-based adhesive, thereby giving a polarizer PCA6F. Further, the acrylic-based adhesive was also applied on the optically anisotropic layer A4 of the optical compensatory sheet CA6.

At this time, the longitudinal directions of the respective roll films are parallel to each other and continuously adhered together since the polarizer and the protective film at both sides of the polarizer are produced in a roll state. In addition, as shown in FIG. 1, the slow axis of the optically compensatory layer A4 is parallel to the transmission axis of the polarizer.

In addition, a polarizer PCA6R was constructed by replacing the protective film LR1 with a commercially available triacetyl cellulose film (FUJITACK-TFY80UL, manufactured by FUJI PHOTO FILM CO., LTD.) in the polarizer PCA6F.

Example 16

Mounting to VA Panel

The polarizers PAC1F to 9F and PCA1F to 6F on the visible side (the front side) constructed in Examples 7 to 12, Comparative Examples 1 to 3, Examples 13 to 15 and Comparative Examples 4 to 6, were punched such that the absorption axis of the polarizer in the size of 26-inch wide was in the longer side. In addition, the polarizers PAC1R to 9R and PCA1R to 6R on the backlight side (the rear side) were punched such that the absorption axis of the polarizer in the size of 26-inch wide was in the shorter side.

Inner and outer sides of the polarizer and the retardation plate on the VA mode liquid crystal TV (KDL-L26HVX, manufactured by Sony Co., Ltd.) were peeled off, and the polarizers punched as described above were adhered thereto, thereby producing liquid crystal display devices 1 to 15 as shown in Table 19. After pasting the polarizers, they were kept at 50° C. and 5 kg/cm² for 20 minutes, and adhered. At this time, they were arranged such that the absorption axis of the polarizer on the visible side was in the horizontal direction to the panel, and the absorption axis of the polarizer on the backlight side was in the vertical direction to the panel, and the adhesive side was the liquid crystal cell side.

Using the measuring instrument constructed as described above (EZ-Contrast 160D, manufactured by ELDIM SA), the view angle (the contrast ratio in the range of 20 or more) was calculated from brightness measurement of dark state and white display. The azimuthal directions in the angle of 45° are shown in Table 19.

In addition, color measurement was carried out on u'v' chromaticity diagram of dark state, and from measurement values of the chromaticity of the panel normal direction (polar angle of 0°) (u'0, v'0), and the chromaticity of the direction tilted by 60° to the panel surface from the panel normal direction at the azimuth rotated by 45° in the counter-clock direction from the screen horizontal direction (azimuthal angle of 45°) (polar angle of 60°) (u'60, v'60), the color change index ΔCu'v' was calculated as defined in the following equation. The results are shown in Table 19. From Table 19, it is shown that by the present invention, a liquid crystal display device is obtained having the improved view angle property, and further, the improved color change when the optic angle is reversed from the front in dark state.

$$\Delta Cu'v' = ((u'0 - v'60)^2 - (v'0 - v'60)^2)^{0.5}$$

TABLE 19

| Visible side polarizer | Cell side protective film | | | Backlight side polarizer | Cell side protective film | | | Viewing angle | ΔCu'v' | Note |
|---|---|---|---|---|---|---|---|---|---|---|
| PAC1F | CTA1 | A1 | C1 | PAC1R | CTA1 | A1 | C1 | >80° | 0.02 | Present invention |
| PAC2F | CTA1 | A1 | C2 | PAC2R | CTA1 | A1 | C2 | >80° | 0.04 | Present invention |
| PAC3F | CTA1 | A1 | C3 | PAC3R | CTA1 | A1 | C3 | >80° | 0.02 | Present invention |
| PAC4F | CTA1 | A1 | C4 | PAC4R | CTA1 | A1 | C4 | >80° | 0.02 | Present invention |
| PAC5F | CTA1 | A2 | C1 | PAC5R | CTA1 | A2 | C1 | >80° | 0.04 | Present invention |
| PAC6F | ARTON FLZR50 | A1 | C1 | PAC6R | ARTON | A1 | C1 | >80° | 0.02 | Present invention |
| PAC7F | TDY80UL | A1 | C1 | PAC7R | TDY80UL | A1 | C1 | 60° | 0.05 | Comp. Sample |
| PAC8F | TDY80UL | A1 | C4 | PAC8R | TDY80UL | A1 | C4 | 58° | 0.07 | Comp. Sample |
| PAC9F | TDY80UL | A2 | C1 | PAC9R | TDY80UL | A2 | C1 | 61° | 0.1 | Comp. Sample |
| PCA1F | CTA2 | C5 | A3 | PCA1R | CTA2 | C5 | A3 | >80° | 0.02 | Present invention |
| PCA2F | CTA2 | C6 | A4 | PCA2R | CTA2 | C6 | A4 | >80° | 0.04 | Present invention |
| PCA3F | ZEONOR ZF14 | C5 | A3 | PCA3R | ZEONOR ZF14 | C5 | A3 | >80° | 0.02 | Present invention |
| PCA4F | TFY80UL | C5 | A3 | PCA4R | TFY80UL | C5 | A3 | 62° | 0.05 | Comp. Sample |
| PCA5F | TFY80UL | C6 | A4 | PCA5R | TFY80UL | C6 | A4 | 60° | 0.07 | Comp. Sample |
| PCA6F | TFY80UL | C7 | A4 | PCA6R | TFY80UL | C7 | A4 | 59° | 0.1 | Comp. Sample |

INDUSTRIAL APPLICABILITY

According to the present invention, there is provided a VA mode liquid crystal display device having excellent viewing angle characteristics, reduced corner spots and excellent display characteristics, by using a cellulose acylate film having small optical anisotropy (Re, Rth) below a certain level as a protective film for polarizer.

According to the invention, there is also provided a liquid crystal display device, particularly a VA mode liquid crystal display device, having improved color shift when the viewing angle is tilted from the front during dark state.

The invention claimed is:

1. A liquid crystal display device comprising a pair of substrates disposed to face each other, at least one of them having an electrode, and a nematic liquid crystal material interposed between the pair of substrates; and having a liquid crystal cell having a liquid crystal layer in which the liquid crystal molecules of the nematic liquid crystal material align approximately vertically to the surfaces of the pair of substrates during dark state, a first polarizing film and a second polarizing film disposed such that the liquid crystal cell is interposed between the films, an optical compensatory film disposed between the liquid crystal layer and one of the first and second polarizing films, and a cellulose acylate film disposed between the liquid crystal layer and at least one of the first and second polarizing films, wherein when the thickness of the liquid crystal layer is d (unit: nm), the refractive index anisotropy at a wavelength λ (unit: nm) is $\Delta n_{(\lambda)}$, the sum of the in-plane retardations of the optical compensatory film and the cellulose acylate film at the wavelength λ is $Re_{sum(\lambda)}$, and the sum of the retardations of the optical compensatory film and the cellulose acylate film in the thickness direction at the wavelength λ is $Rth_{sum(\lambda)}$, with respect to at least two different wavelengths in the wavelength range of 380 nm to 780 nm, the following formulas (V) to (VIII) are satisfied:

$200 \leq \Delta n_{(\lambda)} \times d \leq 1000$, (V)

$Rth_{sum(\lambda)}/\lambda = E \times \Delta n_{(\lambda)} \times d/\lambda$, (VI)

$Re_{sum(\lambda)}/\lambda = F \times \lambda/\{\Delta n_{(\lambda)} \times d\} + G$, and (VII)

$0.726 \leq E \leq 0.958$, (VIII)

$0.0207 \leq F \leq 0.0716$, and
$G = 0.032$; and wherein when the in-plane retardation of the cellulose acylate film at the wavelength λ (unit: nm) is $Re_{2(\lambda)}$, and the retardation in the thickness direction of the cellulose acylate film at the wavelength λ (unit: nm) is $Rth_{2(\lambda)}$, the following formulas (IX) and (X) are satisfied:

$0 \leq Re_{2(630)} \leq 10$ and $|Rth_{2(630)}| \leq 25$, and (IX)

$|Re_{2(400)} - Re_{2(700)}| \leq 10$ and (X)

$|Rth_{2(400)} - Rth_{2(700)}| \leq 35$.

2. The liquid crystal display device according to claim 1, wherein the in-plane slow axis of the optical compensatory film, and the transmission axis of the polarizing film among the first and the second polarizing films, which is disposed closer to the optical compensatory film, are substantially parallel.

3. The liquid crystal display device according to claim 1, wherein the angle between the in-plane slow axis of the cellulose acylate film and the transmission axis of the polarizing film among the first and second polarizing films, which is disposed closer to the cellulose acylate film, is between −10° and 10°, or between 80° and 110°.

4. The liquid crystal display device according to claim 1, wherein with respect to at least two wavelengths differing by 50 nm or greater, the above formulas (V) to (VIII) are satisfied.

5. The liquid crystal display device according to claim 1, wherein with respect to all wavelengths of 450 nm, 550 nm and 650 nm, the above formulas (V) to (VIII) are satisfied.

6. The liquid crystal display device according to claim 1, wherein the optical compensatory film comprises a stretched birefringent polymer film or an optically anisotropic layer formed by fixing a liquid crystalline compound in a specific orientation.

* * * * *